(12) United States Patent
De Kesel et al.

(10) Patent No.: US 12,552,831 B2
(45) Date of Patent: Feb. 17, 2026

(54) SAPONIN PURIFICATION

(71) Applicant: GLAXOSMITHKLINE BIOLOGICALS SA, Rixensart (BE)

(72) Inventors: Carine Berthe Ghislaine De Kesel, Rixensart (BE); Chad Austin Farrenburg, Hamilton, MT (US); Jeri Kay Sandvick, Hamilton, MT (US); Jeb Yeatts Vandenburg, Hamilton, MT (US)

(73) Assignee: GlaxoSmithKline Biologicals SA, Rixensart (BE)

( * ) Notice: Subject to any disclaimer, the term of this patent is extended or adjusted under 35 U.S.C. 154(b) by 896 days.

(21) Appl. No.: 17/615,254

(22) PCT Filed: Jun. 3, 2020

(86) PCT No.: PCT/EP2020/065366
§ 371 (c)(1),
(2) Date: Nov. 30, 2021

(87) PCT Pub. No.: WO2020/245207
PCT Pub. Date: Dec. 10, 2020

(65) Prior Publication Data
US 2022/0235095 A1 Jul. 28, 2022

Related U.S. Application Data

(60) Provisional application No. 62/966,170, filed on Jan. 27, 2020, provisional application No. 62/857,490, filed on Jun. 5, 2019.

(51) Int. Cl.
*C07J 63/00* (2006.01)
*A61K 31/704* (2006.01)
*A61K 39/00* (2006.01)

(52) U.S. Cl.
CPC .......... *C07J 63/008* (2013.01); *A61K 31/704* (2013.01); *A61K 2039/55577* (2013.01)

(58) Field of Classification Search
CPC .................. A61K 39/00; A61K 39/39; A61K 2039/55555; A61K 2039/55572; A61K 2039/55577; C07J 63/008
See application file for complete search history.

(56) References Cited

U.S. PATENT DOCUMENTS 5,057,540 A  10/1991  Kensil et al.
5,583,112 A  12/1996  Kensil et al.
(Continued)

FOREIGN PATENT DOCUMENTS

CL  2011003113 A1  8/2012
CL  2020001439 A1  2/2021
(Continued)

OTHER PUBLICATIONS

Alving, C. et al "Adjuvants for human vaccines" Curr. Opin. Immunol., vol. 24, No. 3, pp. 310-315. (Year: 2012).*
(Continued)

*Primary Examiner* — Eric Olson
(74) *Attorney, Agent, or Firm* — Christopher L. Wright

(57) ABSTRACT

Saponin extracts containing at least 88% QS-21 main peak and >3% to 10% 2018 component by UV absorbance at 214 nm, methods for making said extracts, their use as vaccine adjuvants and related aspects.

20 Claims, 25 Drawing Sheets

Specification includes a Sequence Listing.

(56) References Cited

U.S. PATENT DOCUMENTS

| | | | |
|---|---|---|---|
| 6,231,859 | B1 | 5/2001 | Kensil |
| 6,916,476 | B1 | 7/2005 | Livingston et al. |
| 11,591,364 | B2 | 2/2023 | Baig et al. |
| 11,744,890 | B2 | 9/2023 | Baig et al. |
| 2012/0087976 | A1* | 4/2012 | Henderickx ............ A61P 37/00 424/277.1 |
| 2023/0272000 | A1 | 8/2023 | Baig et al. |
| 2023/0355752 | A1 | 11/2023 | Baig et al. |
| 2024/0024467 | A1 | 1/2024 | Baig et al. |

FOREIGN PATENT DOCUMENTS

| | | | |
|---|---|---|---|
| CL | 2020001440 | A1 | 2/2021 |
| CN | 1149875 | A | 5/1997 |
| CN | 104662031 | A | 5/2015 |
| CN | 111372604 | A | 7/2020 |
| JP | H07504156 | A | 5/1995 |
| JP | 2001505573 | A | 4/2001 |
| JP | 2015522643 | A | 8/2015 |
| JP | 2020529565 | A | 10/2020 |
| JP | 2020529601 | A | 10/2020 |
| JP | 2021504424 | A | 2/2021 |
| WO | 8809336 | A1 | 12/1988 |
| WO | 9632401 | A1 | 10/1996 |
| WO | 1998/24319 | A1 | 6/1998 |
| WO | 9953933 | A1 | 10/1999 |
| WO | 2007068907 | A2 | 6/2007 |
| WO | 2010142685 | A1 | 12/2010 |
| WO | 2014016374 | A1 | 1/2014 |
| WO | 2019025520 | A1 | 2/2019 |
| WO | 2019047150 | A1 | 3/2019 |
| WO | WO-2019106191 | A1 * | 6/2019 ........... A61K 36/185 |

OTHER PUBLICATIONS

Govind Ragupathi et al., "Natural and synthetic saponin adjuvant QS-21 for vaccines against cancer", Expert Review of Vaccines; vol. 10; No. 4; Apr. 1, 2011, pp. 463-470.

International Search Report and Written Opinion in corresponding International Application No. PCT/EP2020/065366, mailed Sep. 25, 2020 (10 pages).

Geoffrey C. Kite, et al. "Metabolomic analysis of saponins in crude extracts of Quillaja saponaria by liquid chromatography/mass spectrometry for product authentication," Rapid Comunications in Mass Spectrometry, 2004, vol. 18, pp. 2859-2870.

U.S. Appl. No. 18/353,172, filed Jul. 17, 2023, published as U.S. Publication No. 20230355752.

U.S. Appl. No. 18/353,169, filed Jul. 17, 2023, published as U.S. Publication No. 20240024467.

U.S. Appl. No. 18/098,949 filed Jan. 19, 2023, published as U.S. Publication No. 20230272000.

Bankefors J., et al., "Structural Classification of Acyl-Substituted Quillaja saponins by Electrospray Ionisation Ion Trap Multiple-Stage Mass Spectrometry in Combination with Multivariate Analysis," Rapid Communications in Mass Spectrometry, 2008, vol. 22, pp. 3851-3860.

Brunner L., et al., "QS-21 Adjuvant: Laboratory Scale Purification Method and Formulation Into Liposomes," Methods in Molecular Biology, 2017, vol. 1494, pp. 73-86.

Chaicharoenpong C., et al., "Quantitative Thin Layer Chromatographic Analysis of the Saponins in Tea Seed Meal," Phytochemical Analysis, Mar. 29, 2009, vol. 20, pp. 253-255.

Chipley J.R., "Sodium Benzoate and Benzoic Acid," Antimicrobials in Food, 2005, pp. 11-48, A.L. Branen, J.N. Sofos, and P.M. Davidson (Eds.), Taylor Francis Group.

Gilabert-Oriol R., et al., "Electrophoretic Mobility as a Tool to Separate Immune Adjuvant Saponins From Quillaja Saponaria Molina," International Journal of Pharmaceutics, 2015, vol. 487, pp. 39-48.

Guo S., et al., "Triterpenoid Saponins From Quillaja Saponaria," Phytochemistry, 1998, vol. 48, No. 1, pp. 175-180.

Higuchi R., et al., "An Acylated Triterpenoid Saponin From Quillaja Saponaria," Phytochemistry, 1988, vol. 27, No. 4, pp. 1165-1168.

International Preliminary Report on Patentability for International Application No. PCT/EP2018/083233, mailed Jun. 11, 2020, 7 Pages.

International Search Report and Written Opinion for International Application No. PCT/EP2018/083233, mailed Mar. 8, 2019, 9 Pages.

International Search Report and Written Opinion for International Application No. PCT/EP2018/083234, mailed Feb. 14, 2019, 11 Pages.

Marty-Roix M., et al., "Identification of QS-21 as an Inflammasome-Activating Molecular Component of Saponin Adjuvants," Journal of Biological Chemistry, Jan. 15, 2016, vol. 291, No. 3, pp. 1123-1136 (15 Pages).

Nord L.I., et al., "Separation and Structural Analysis of Saponins in a Bark Extract from Quillaja saponaria Molina," Carbohydrate Research, 1999, vol. 320, pp. 70-81.

Nord L.I., et al., "Novel Acetylated Triterpenoid Saponins in a Chromatographic Fraction From Quillaja Saponaria Molina," Carbohydrate Research, 2000, vol. 329, No. 4, pp. 817-829.

Sen S., et al., "Effect of Quillaja Saponaria Saponins and Yucca Schidigera Plant Extract on Growth of *Escherichia coli*," Letters in Applied Microbiology, 1998, vol. 28, No. 1, pp. 35-38.

Sewlikar S., et al., "Antimicrobial Effects of Quillaja Saponaria Extract against *Escherichia Coli* O157:H7 and the Emerging Non-O157 Shiga Toxin-Producing *E. coli*," Journal of Food Science, 2017, vol. 82, No. 5, pp. 1171-1177.

Thalhamer B., et al., "Characterization of Quillaja Bark Extracts and Evaluation of Their Purity Using Liquid Chromatography-High Resolution Mass Spectrometry," Phytochemistry Letters, 2014, vol. 8, pp. 97-100.

Tippel J., et al., "Composition of Quillaja Saponin Extract Affects Lipid Oxidation in Oil-in-Water Emulsions," Food Chemistry, 2017, vol. 221, pp. 386-394.

\* cited by examiner

SAPONIN PURIFICATION

CROSS-REFERENCE TO RELATED APPLICATIONS

The present application is a national stage application under 35 U.S.C. § 371 of International Application No. PCT/EP2020/065366, filed Jun. 3, 2020, which claims priority under 35 U.S.C. § 119(e)(1) to U.S. Provisional Application No. 62/857,490, filed Jun. 5, 2019, and U.S. Provisional Application No. 62/966,170, filed Jan. 27, 2020. The complete contents of the above-listed applications are hereby incorporated by reference into the present application for all purposes.

INCORPORATION BY REFERENCE OF COMPUTER-READABLE FORM OF SEQUENCE LISTING

The instant application contains a Sequence Listing, which has been submitted electronically in computer-readable form in ASCII file format and is hereby incorporated by reference in its entirety. Said ASCII file, created on Jun. 3, 2020, is named "eolf-seql.txt", and is 39,871 bytes in size.

TECHNICAL FIELD

The present application generally relates to saponin extracts, in particular extracts of *Quillaja saponaria* Molina, methods for their manufacture and to associated aspects.

BACKGROUND

Adjuvants are included in vaccines to improve humoral and cellular immune responses, particularly in the case of poorly immunogenic subunit vaccines. Similar to natural infections by pathogens, adjuvants rely on the activation of the innate immune system to promote long-lasting adaptive immunity.

The Adjuvant System 01 (AS01) is a liposome-based adjuvant which contains two immunostimulants, 3-O-desacyl-4'-monophosphoryl lipid A (3D-MPL) and QS-21 (Garcon and Van Mechelen, 2011; Didierlaurent et al., 2017). 3D-MPL is a non-toxic derivative of the lipopolysaccharide from *Salmonella minnesota* which is a TLR4 agonist) and QS-21 is a natural saponin extract from the bark of the South American tree *Quillaja saponaria* Molina (Kensil et al., 1991; Ragupathi et al., 2011). AS01 is included in the recently developed vaccines for malaria (RTS,S—Mosquirix™) and *Herpes zoster* (HZ/su—Shingrix™), and in multiple candidate vaccines in development against pathogens such as human immunodeficiency virus and *Mycobacterium tuberculosis*.

AS01 injection results in rapid and transient activation of innate immunity in animal models. Neutrophils and monocytes are rapidly recruited to the draining lymph node (dLN) upon immunization. Moreover, AS01 induces recruitment and activation of MHCII$^{high}$ dendritic cells (DC), which are necessary for T cell activation (Didierlaurent A. M. et al., 2014). Some data are also available on the mechanism of action of the components of AS01. 3D-MPL signals via TLR4, stimulating NF-•B transcriptional activity and cytokine production and directly activates antigen-presenting cells (APCs) both in humans and in mice (De Becker et al., 2000; Ismaili et al., 2002; Martin et al., 2003; Mata-Haro et al., 2007). QS-21 promotes high antigen-specific antibody responses and CD8$^+$ T-cell responses in mice (Kensil and Kammer, 1998; Newman et al., 1992; Soltysik et al., 1995) and antigen-specific antibody responses in humans (Livingston et al., 1994). Because of its physical properties, it is thought that QS-21 might act as a danger signal in vivo (Lambrecht et al., 2009; Li et al., 2008). Although QS-21 has been shown to activate ASC-NLRP3 inflammasome and subsequent IL-1•/IL-18 release (Marty-Roix, R. et al., 2016), the exact molecular pathways involved in the adjuvant effect of saponins have yet to be clearly defined.

As with any component of a product which is approved as a human medicament, production of QS-21 requires the use of approved manufacturing processes and careful control of final composition to ensure that it meets a specification which is safe and efficacious. Modification of existing processes requires costly and time-consuming re-validation, yet deviations from specification also result in waste. There is a continuing need for robust methods for the manufacture of QS-21 and for QS-21 material of defined composition.

The QS-21 saponin extract included in commercially available AS01 currently contains 3% or less of a triterpenoid glycoside component known as 2018 component. The present inventors have observed that QS-21 saponin extracts having a higher percentage of 2018 component show a similar bioactivity profile.

SUMMARY OF THE INVENTION

The present invention provides a saponin extract containing (i) at least 88% QS-21 main peak and (ii) >3 to 10% 2018 component by ultraviolet (UV) absorbance at 214 nanometres (nm).

Also provided is a saponin extract containing (i) at least 88% by UV absorbance at 214 nm triterpenoid glycosides having by negative ion electrospray mass spectrometry m/z of 1855.9, 1987.9 or 2001.9, and (ii) >3 to 10% by UV absorbance at 214 nm triterpenoid glycosides having m/z 2017.9.

Additionally, provided is a saponin extract containing (i) at least 88%:

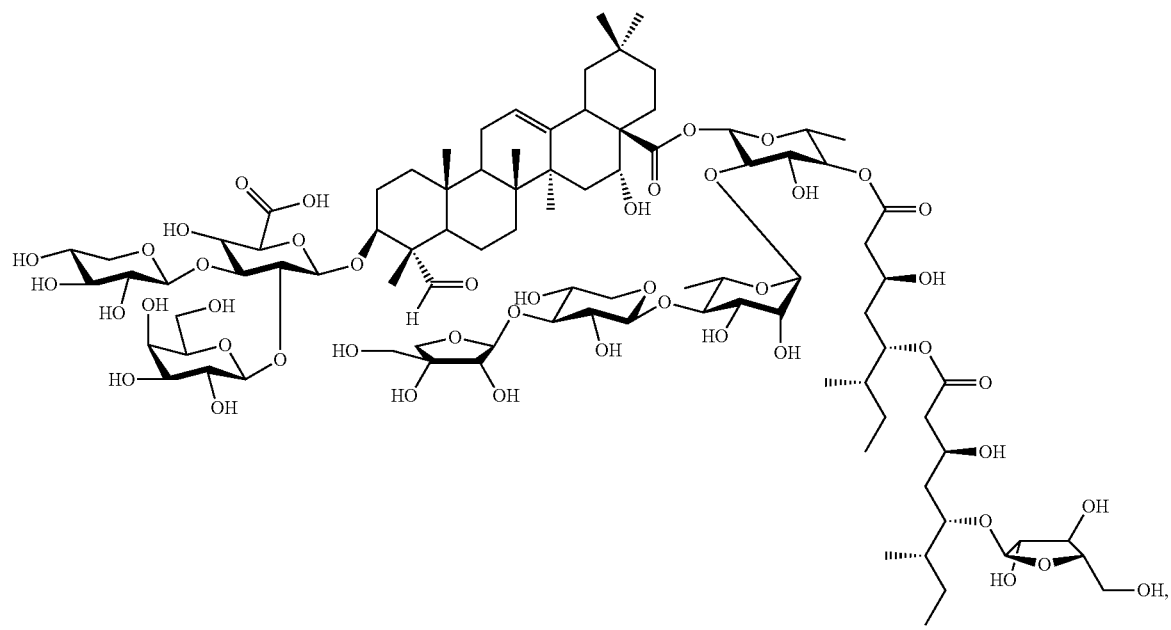
3
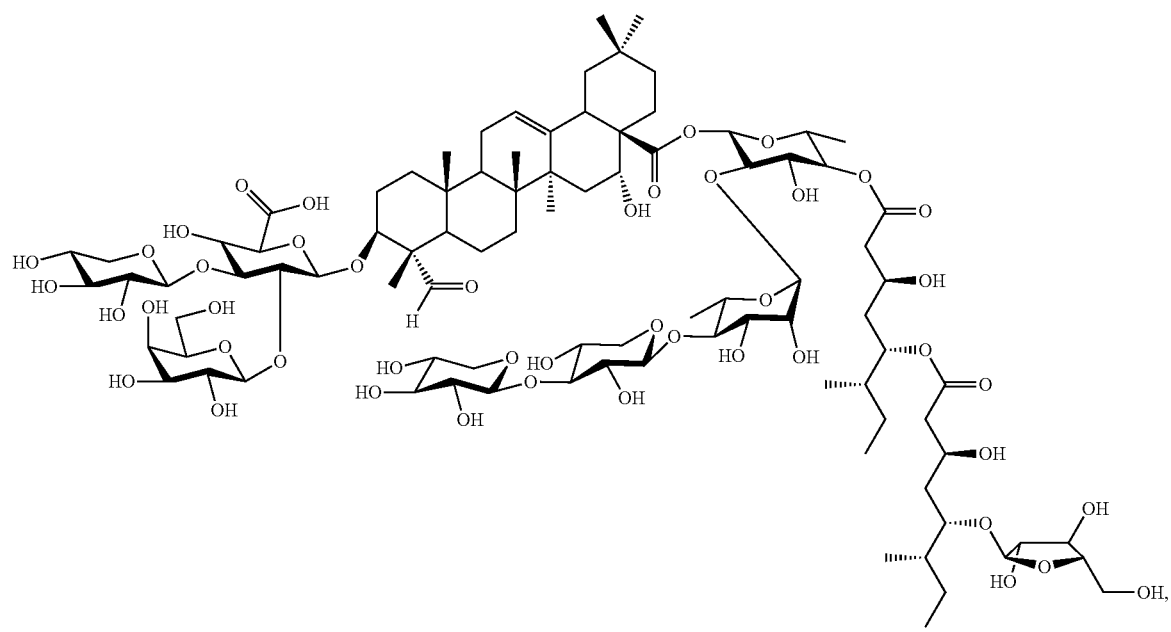
4

-continued
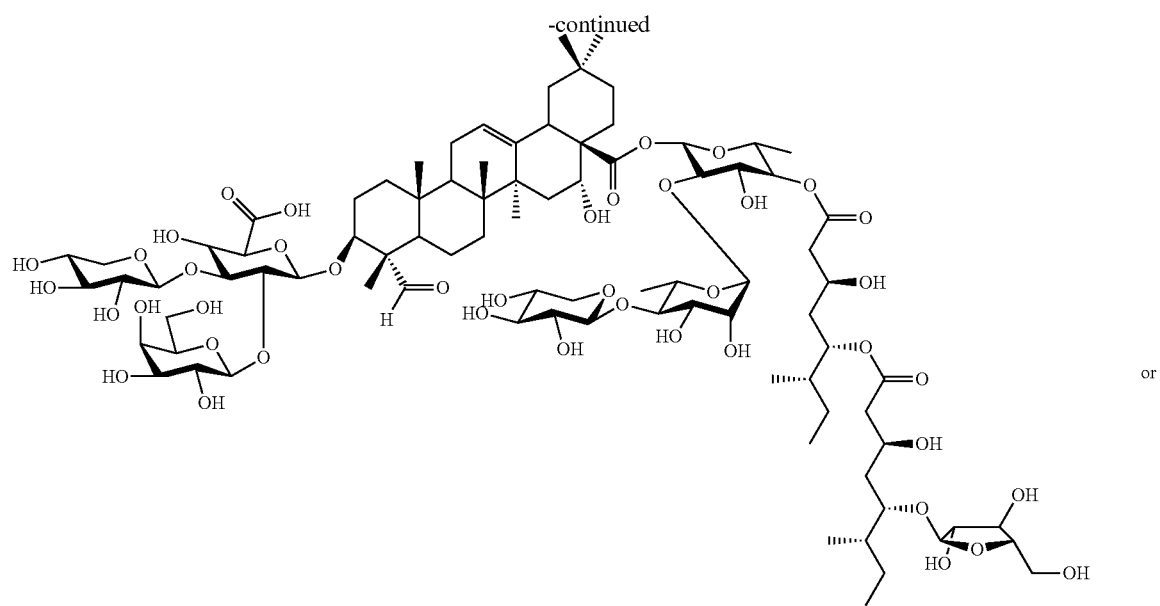
or
and (ii) >3 to 10%:
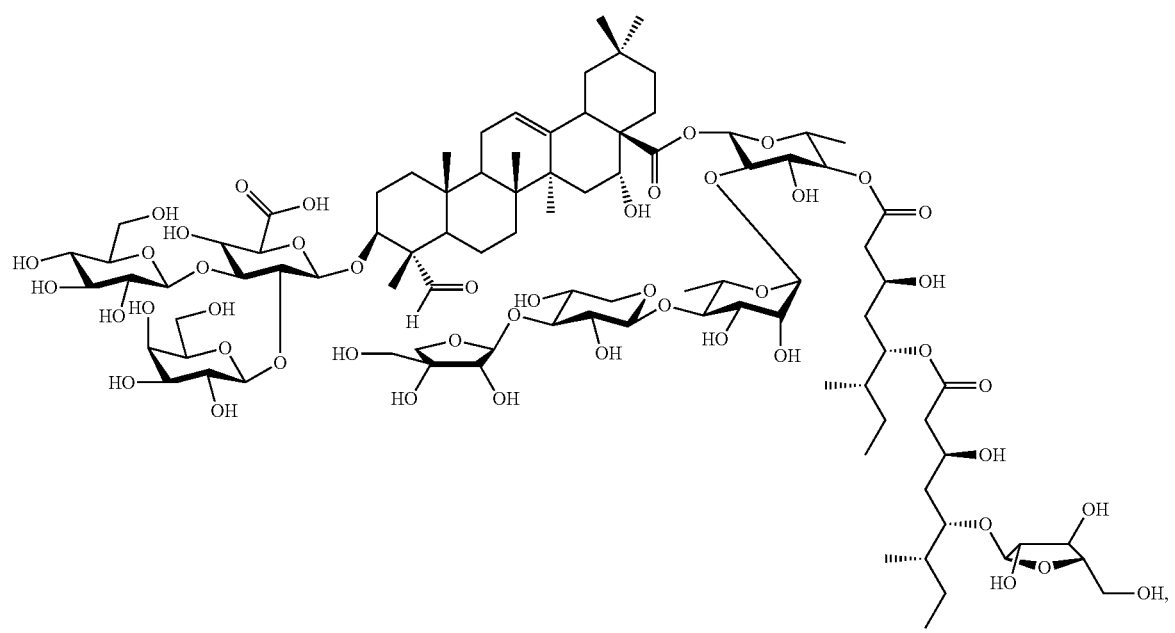

by UV absorbance at 214 nm.

Further, there is provided a method for the manufacture of a saponin extract comprising the steps of:
(i) selecting a crude aqueous extract of *Quillaja saponaria* Molina having a suitable 2018 component composition;
(ii) purifying the extract by reverse phase chromatography using a polystyrene resin; and
(iii) purifying the extract by reverse phase chromatography using a phenyl resin.

There is provided the use of a saponin extract of the present invention in the manufacture of a medicament.

Also provided are adjuvant compositions and vaccine compositions comprising a saponin extract of the present invention.

BRIEF DESCRIPTION OF THE SEQUENCES IDENTIFIERS

Figure 1:
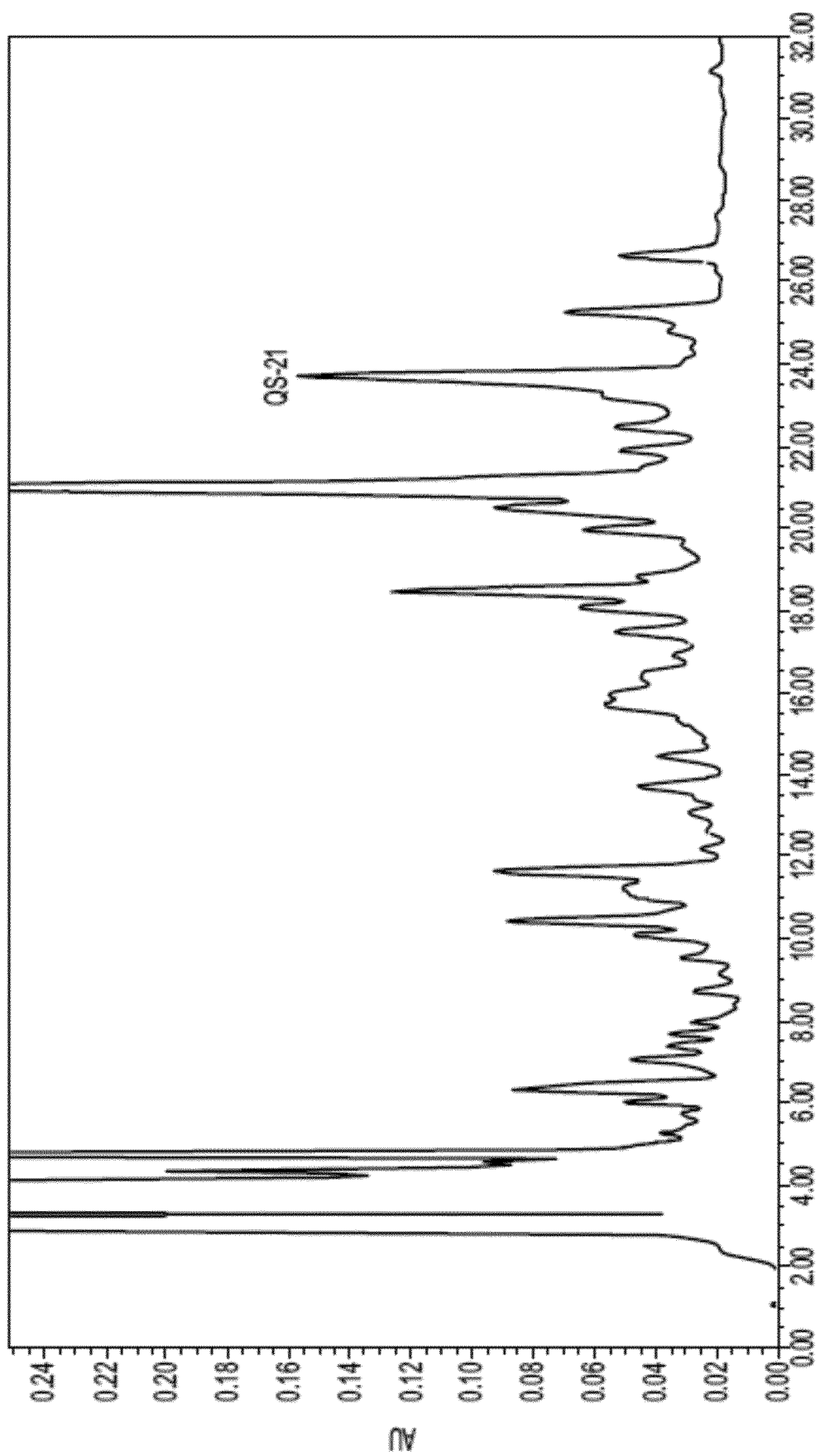
FIG. 1 HPLC chromatogram of a crude aqueous *Quillaja saponaria* Molina bark extract FIG. 2 HPLC-UV chromatogram of a crude aqueous *Quillaja saponaria* Molina bark extract FIG. 3 UPLC-UV chromatogram of a crude aqueous *Quillaja saponaria* Molina bark extract FIG. 4 UPLC-UV chromatogram of a polystyrene *Quillaja saponaria* Molina QS-21 purified saponin extract with low content of 2018 component FIG. 5 UPLC-UV/MS chromatogram of a *Quillaja saponaria* Molina QS-21 purified saponin extract with low content of 2018 component FIG. 6 UPLC-UV/MS chromatogram detail of a *Quillaja saponaria* Molina QS-21 purified saponin extract with low content of 2018 component FIG. 7A-7B Extracted mass chromatograms for 1988 (FIG. 7A) and 2002 (FIG. 7B) molecular weight ions of a *Quillaja saponaria* Molina QS-21 purified saponin extract with low content of 2018 component FIG. 8 Combined centroid spectrum of *Quillaja saponaria* Molina QS-21 purified saponin extract with low content of 2018 component FIG. 9 UPLC-UV chromatogram of *Quillaja saponaria* Molina QS-21 purified saponin extract with low 2018 component content used for the preparation of a saponin extract enriched in 2018 component FIG. 10A-10B UPLC-UV chromatogram and peak measurements for batches A (FIG. 10A) and B (FIG. 10B) of a purified saponin extract enriched in 2018 component FIG. 11 TNF-α response induced by QS-21 purified saponin extracts having an increasing percentage of 2018 component FIG. 12 TNF-α response ratios (increasing percentage of 2018 component over 2.2% 2018 component)

SEQ ID No. 1: RTS polypeptide sequence
SEQ ID No. 2: *M. tuberculosis* H37Rv strain Rv1196 polypeptide sequence
SEQ ID No. 3: *M. tuberculosis* H37Rv strain Rv0125 polypeptide sequence
SEQ ID No. 4: M72 fusion polypeptide sequence
SEQ ID No. 5: M72-2his fusion polypeptide sequence
SEQ ID No. 6: Varicella zoster virus (VZV) truncated gE polypeptide sequence
SEQ ID No. 7: Conformationally constrained RSV PreF antigen polypeptide sequence
SEQ ID No. 8: HIV TV1 gp120 polypeptide sequence
SEQ ID No. 9: HIV 1086.0 gp120 polypeptide sequence

DETAILED DESCRIPTION OF THE INVENTION

As mentioned previously, any component of a product which is authorised as a human medicament requires the use of approved manufacturing processes and careful control of final composition to ensure that it meets a specification which is safe and efficacious. Deviations from specification during manufacturing result in waste.

The present inventors have found that crude aqueous extract of *Quillaja saponaria* Molina varies in composition, in particular with respect to a component referred to herein as the 2018 component. Commercially available AS01 currently includes a QS-21 saponin extract containing 3% or less of 2018 component. Therefore, current manufacturing methods result in waste if the 2018 component is found to be present at levels of >3% in the purified QS-21 saponin extract. In order to address this potential waste, the present inventors have observed that QS-21 saponin extracts having a higher percentage of 2018 component show a similar bioactivity profile, thereby enabling the use of a greater range of crude aqueous extracts of *Quillaja saponaria* Molina and reducing the waste.

In the context of the present invention, the purified QS-21 saponin extract included in commercially available AS01 containing 3% or less of 2018 component will be referred to as a "QS-21 purified saponin extract with low content of 2018 component", as opposed to the purified QS-21 saponin extract defined according to the present invention which contains greater than 3 and up to 10% of 2018 component. For clarity purposes, such purified saponin extract defined according to the present invention will be referred to as a "QS-21 purified saponin extract with high content of 2018 component", where appropriate. Stated another way, "QS-21 purified saponin extract with high content of 2018 component" comprises more than 3%, but no more than 10%, 2018 component.

The present invention provides a saponin extract containing (i) at least 88% QS-21 main peak and (ii) >3 to 10% 2018 component by UV absorbance at 214 nm, in particular, wherein the monoisotope of the most abundant species is 1987.9 m/z. Suitably, the saponin extract contains at least 98% QS-21 group by UV absorbance at 214 nm. Typically, the saponin extract contains 1% or less of lyo impurity, especially 1% or less of the largest peak outside the QS-21 group by UV absorbance at 214 nm. Suitably, the saponin extract contains at least 90% QS-21 main peak, such as at least 91%, at least 92% or at least 93%.

Of particular interest are saponin extracts containing at least 98% QS-21 group, with (i) at least 88% QS-21 main peak, (ii) >3 to 10% 2018 component, and (iii) 1% or less of largest peak outside the QS-21 group by UV absorbance at 214 nm and wherein the monoisotope of the most abundant species is 1987.9 m/z. Suitably, the saponin extract contains at least 90% QS-21 main peak, such as at least 91%, at least 92% or at least 93%.

Also provided is a saponin extract containing (i) at least 88% triterpenoid glycosides having m/z of 1855.9, 1987.9 or 2001.9, and (ii) >3 to 10% triterpenoid glycosides having m/z 2017.9 by UV absorbance at 214 nm, in particular, wherein the monoisotope of the most abundant species is 1987.9 m/z. Desirably, the saponin extract contains (i) at least 88% triterpenoid glycosides having m/z of 1855.9, 1987.9 or 2001.9, excluding B-isomer and lyo impurity, and (ii) >3 to 10% triterpenoid glycosides having m/z 2017.9 by UV absorbance at 214 nm, in particular, wherein the monoisotope of the most abundant species is 1987.9 m/z. Suitably, the saponin extract contains at least 98% triterpenoid glycosides having m/z of 1517.7, 1711.8, 1855.9, 1987.9, 2001.9, 2017.9 or 2118 by UV absorbance at 214 nm. Desirably, the saponin extract contains at least 98% triterpenoid glycosides having m/z of 1517.7, 1711.8, 1855.9, 1987.9, 2001.9, 2017.9 or 2118, excluding the lyo impurity, by UV absorbance at 214 nm. Typically, the saponin extract contains 1% or less of lyo impurity by UV absorbance at 214 nm. Suitably, the saponin extract contains 1% or less of any other peak by UV absorbance at 214 nm. Suitably, the saponin extract contains at least 90% triterpenoid glycosides having m/z of 1855.9, 1987.9 or 2001.9, such as at least 91%, at least 92% or at least 93%.

Of particular interest are saponin extracts containing at least 98% triterpenoid glycosides having m/z of 1517.7, 1711.8, 1855.9, 1987.9, 2001.9, 2017.9 or 2118, with (i) at least 88% triterpenoid glycosides having m/z of 1855.9, 1987.9 or 2001.9, (ii) >3 to 10% triterpenoid glycosides having m/z 2017.9, (iii) 1% or less of any other peak by UV absorbance at 214 nm and wherein the monoisotope of the most abundant species is 1987.9 m/z, especially wherein the saponin extract contains at least 98% triterpenoid glycosides having m/z of 1517.7, 1711.8, 1855.9, 1987.9, 2001.9, 2017.9 or 2118, excluding the lyo impurity, with (i) at least 88% triterpenoid glycosides having m/z of 1855.9, 1987.9 or 2001.9 excluding B-isomer and lyo impurity, (ii) >3 to 10% triterpenoid glycosides having m/z 2017.9, and (iii) 1% or less of any other peak by UV absorbance at 214 nm and wherein the monoisotope of the most abundant species is 1987.9 m/z. Suitably, the saponin extract contains at least 90% triterpenoid glycosides having m/z of 1855.9, 1987.9 or 2001.9, such as at least 91%, at least 92% or at least 93%.

Additionally, provided is a saponin extract containing (i) at least 88%, such as at least 90%, at least 91%, at least 92% or at least 93%:

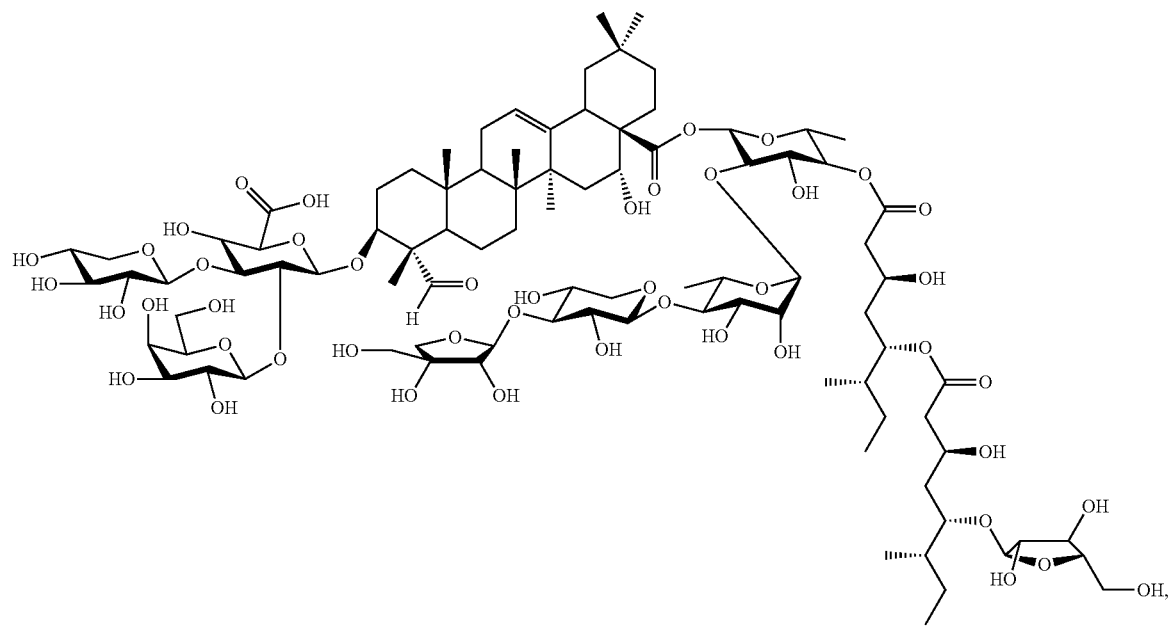
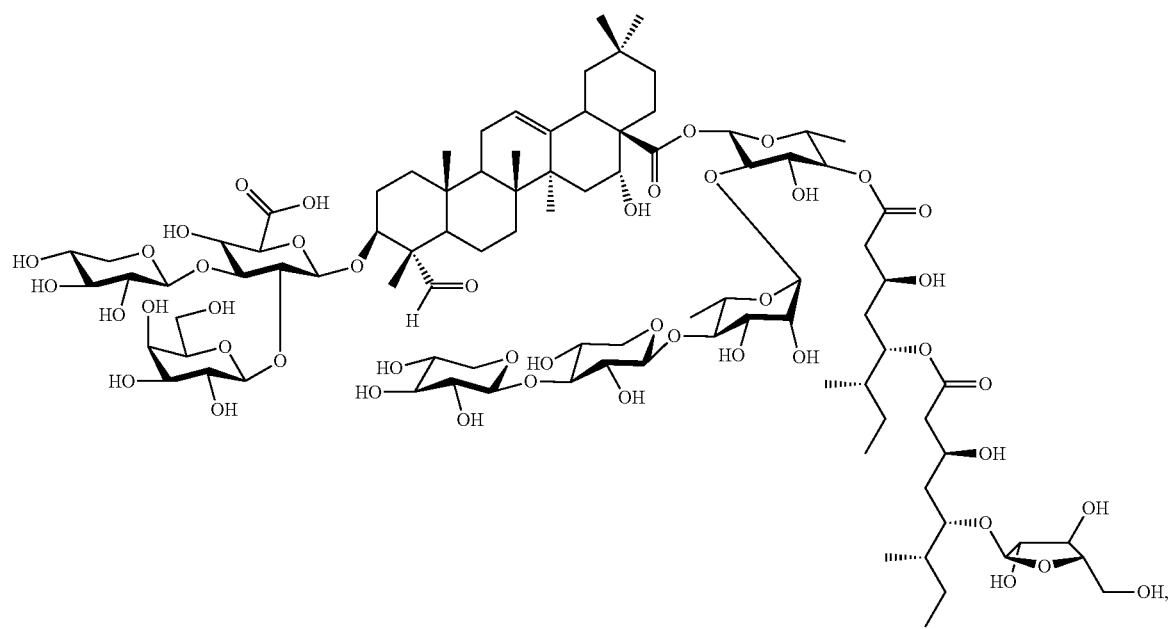

-continued
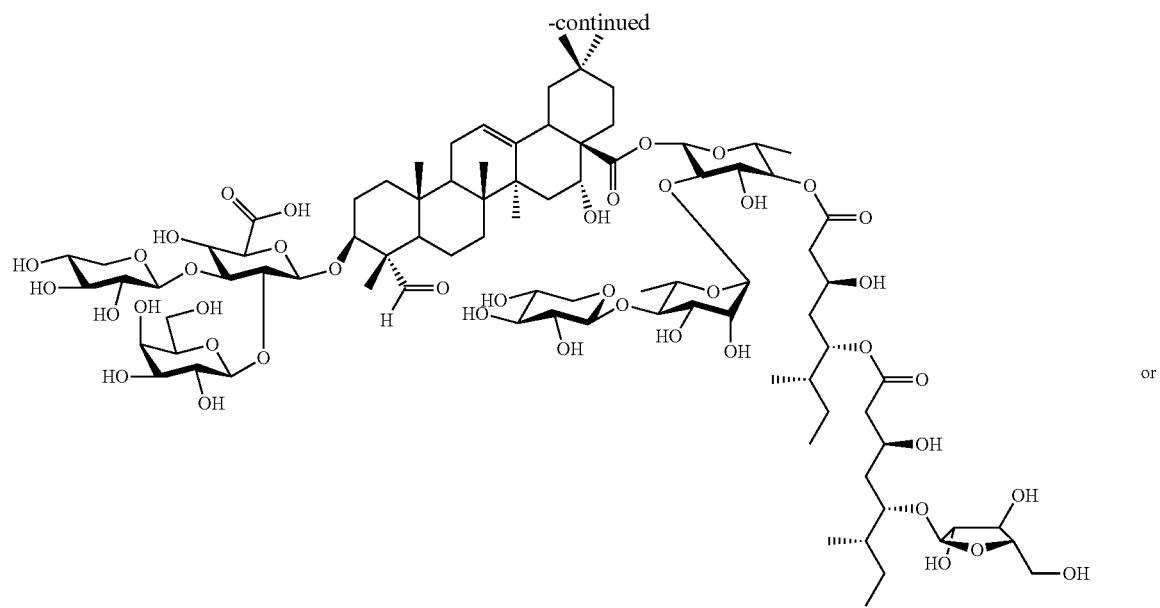
or
and (ii) >3 to 10%:
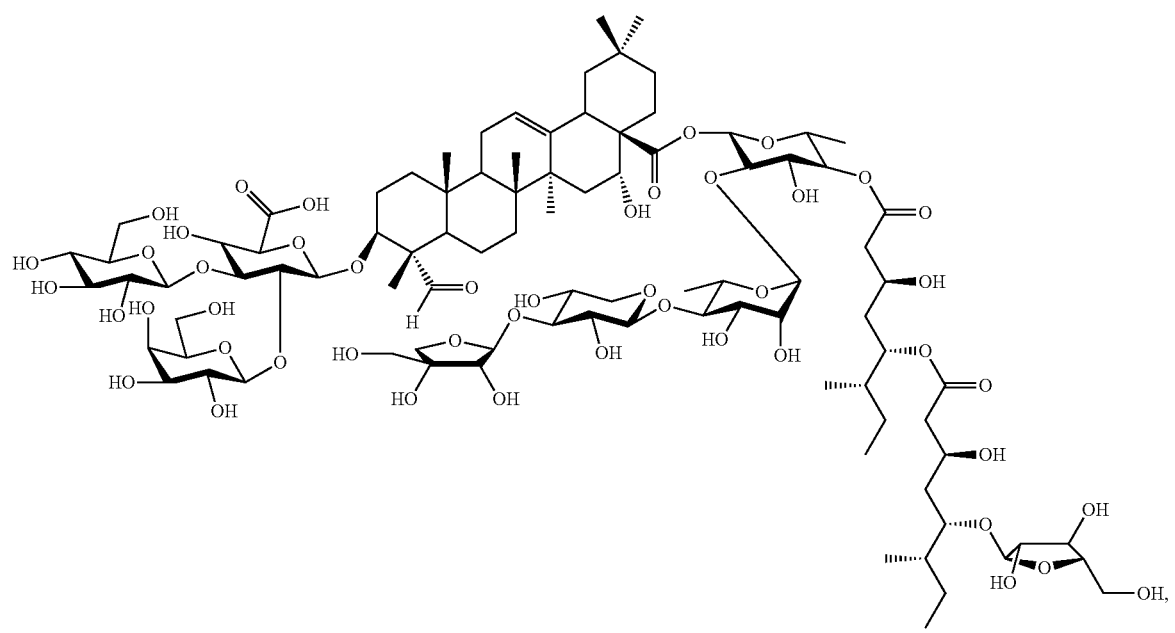

-continued
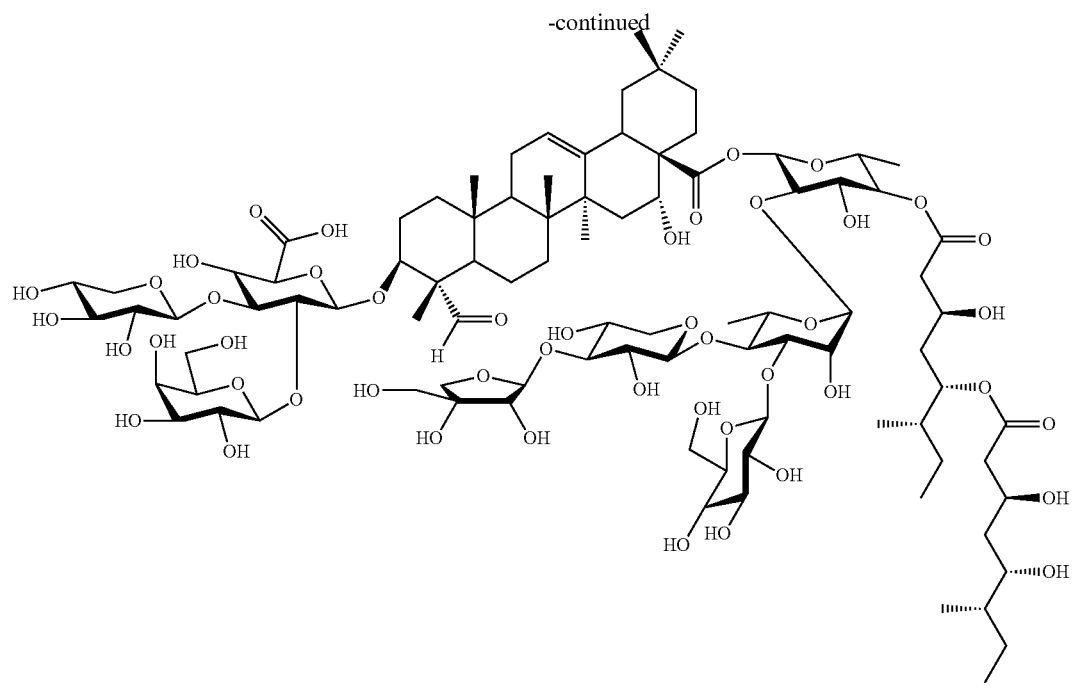
by UV absorbance at 214 nm, in particular, wherein the monoisotope of the most abundant species is 1987.9 m/z. Suitably the saponin extract contains at least 98%:
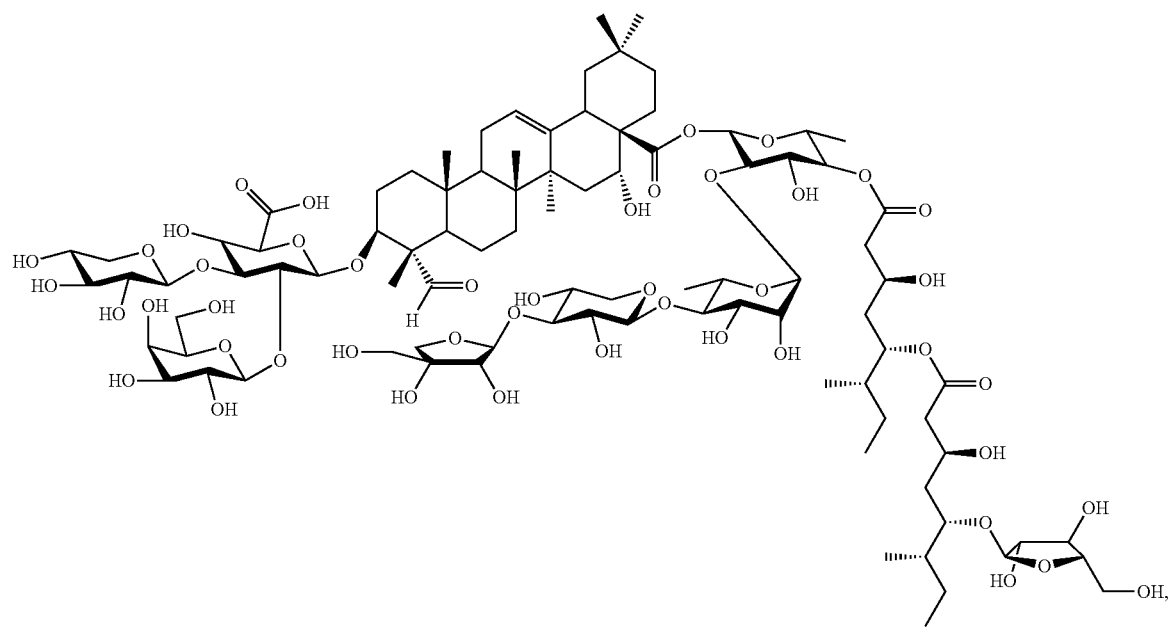

-continued
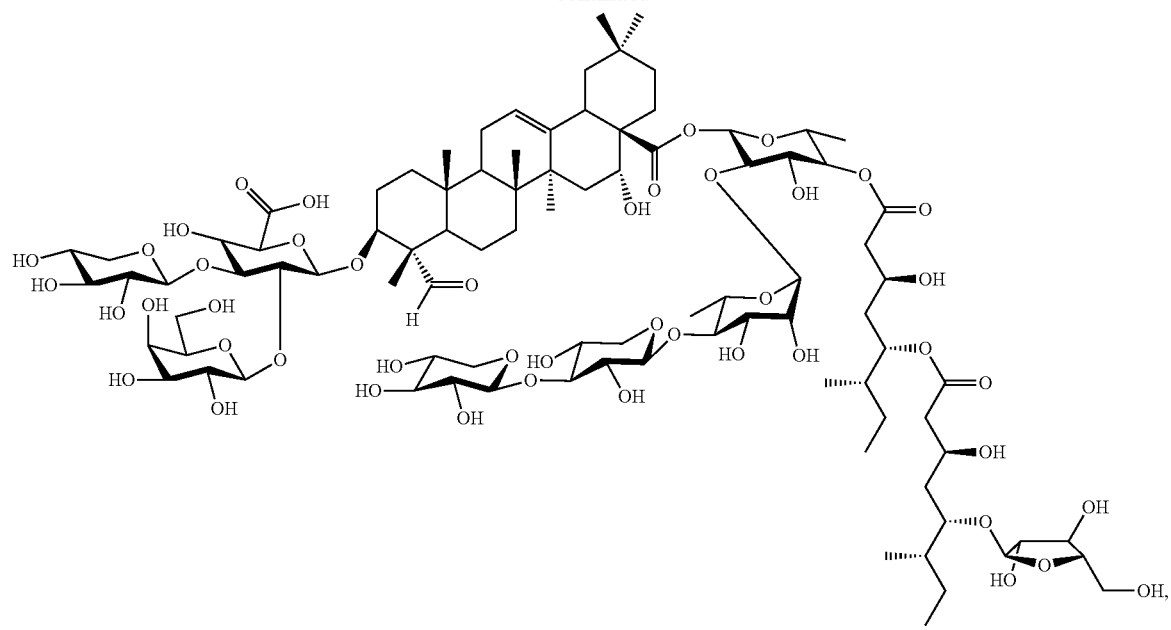
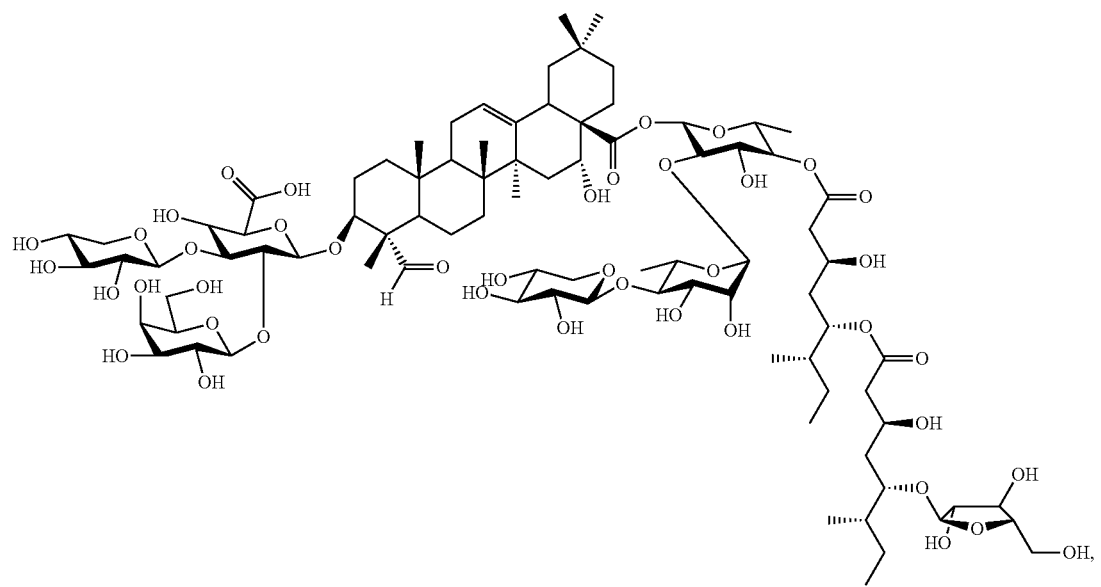

-continued
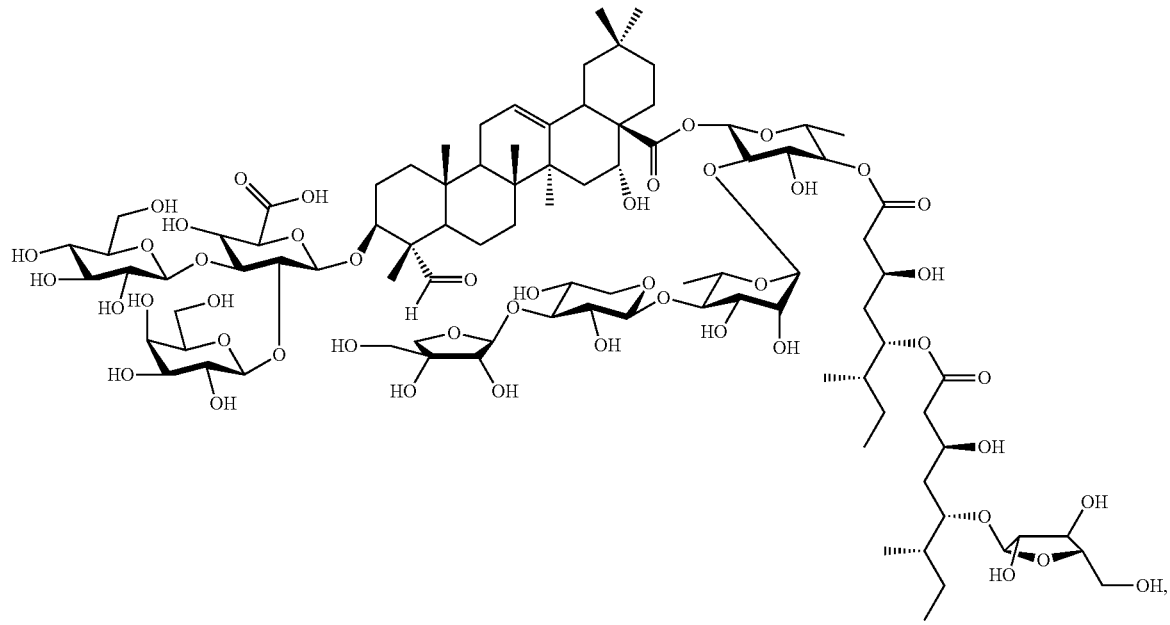
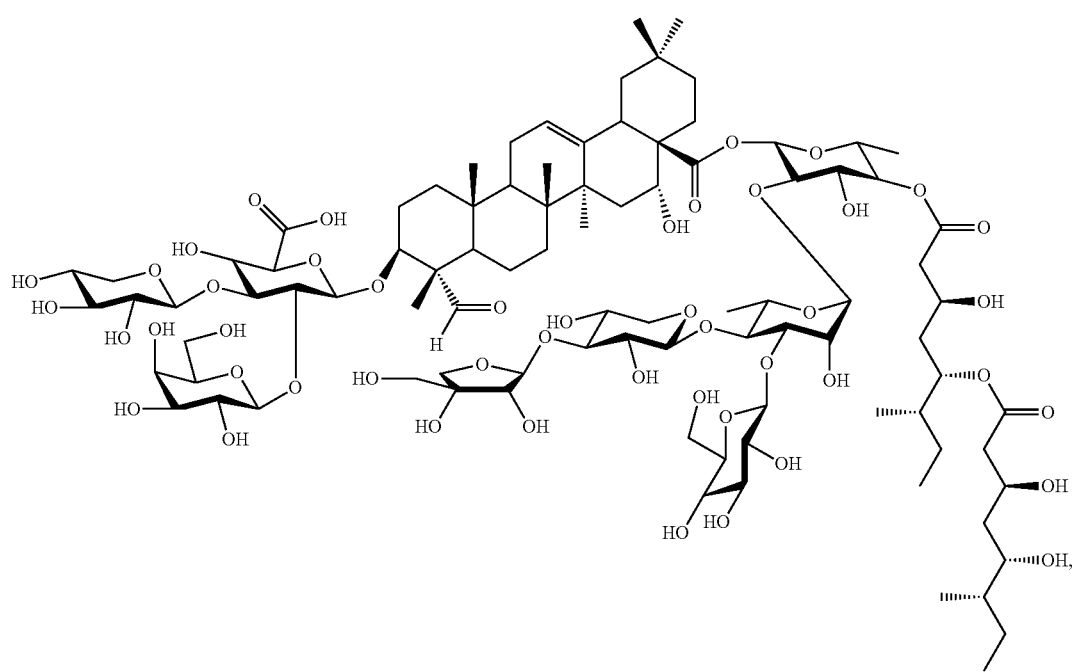

-continued
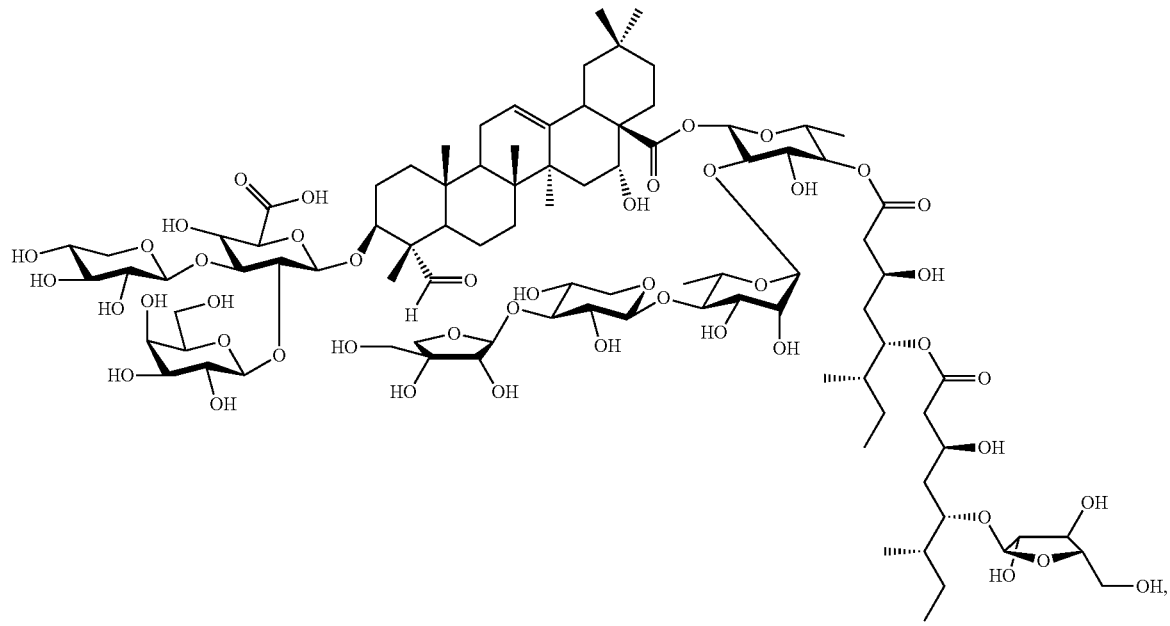
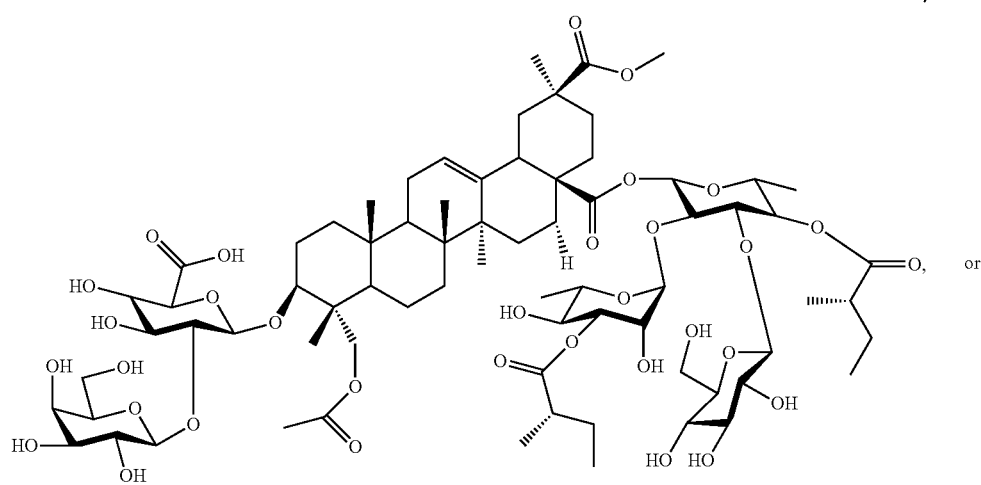
or
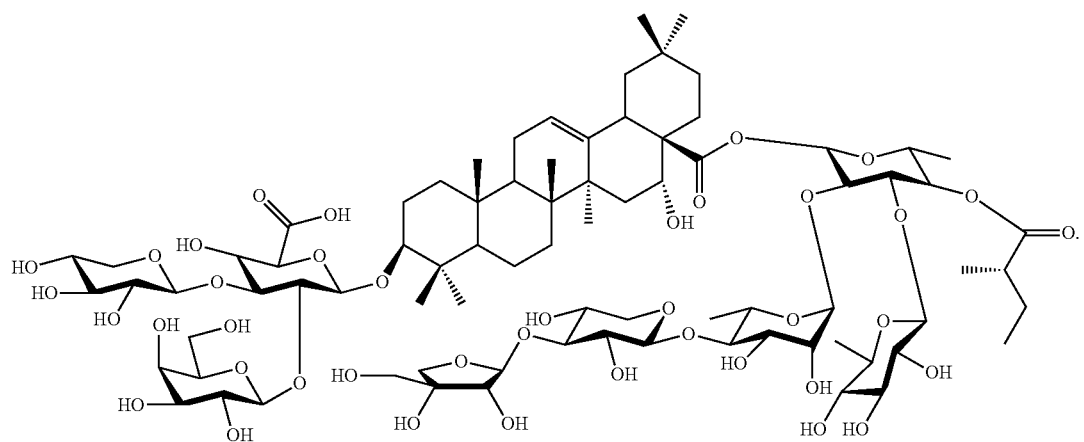

Suitably the saponin extract contains 98% of the aforementioned components and the 2118 component. Typically, the saponin extract contains 1% or less:
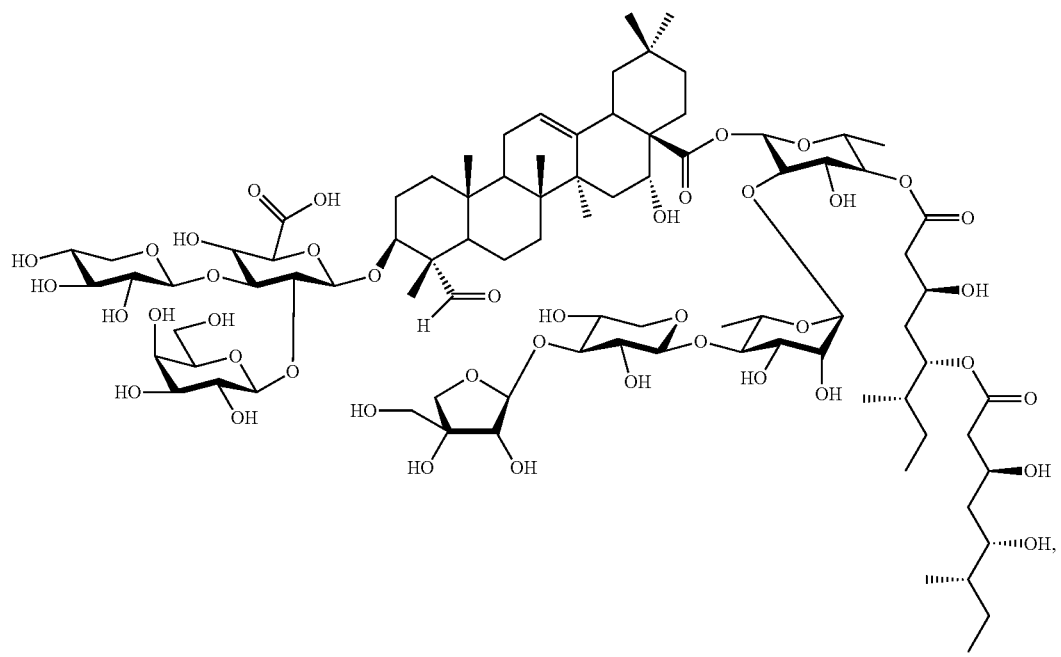
especially 1% or less of any other peak by UV absorbance at 214 nm.
Of particular interest are saponin extracts containing at least 98%:
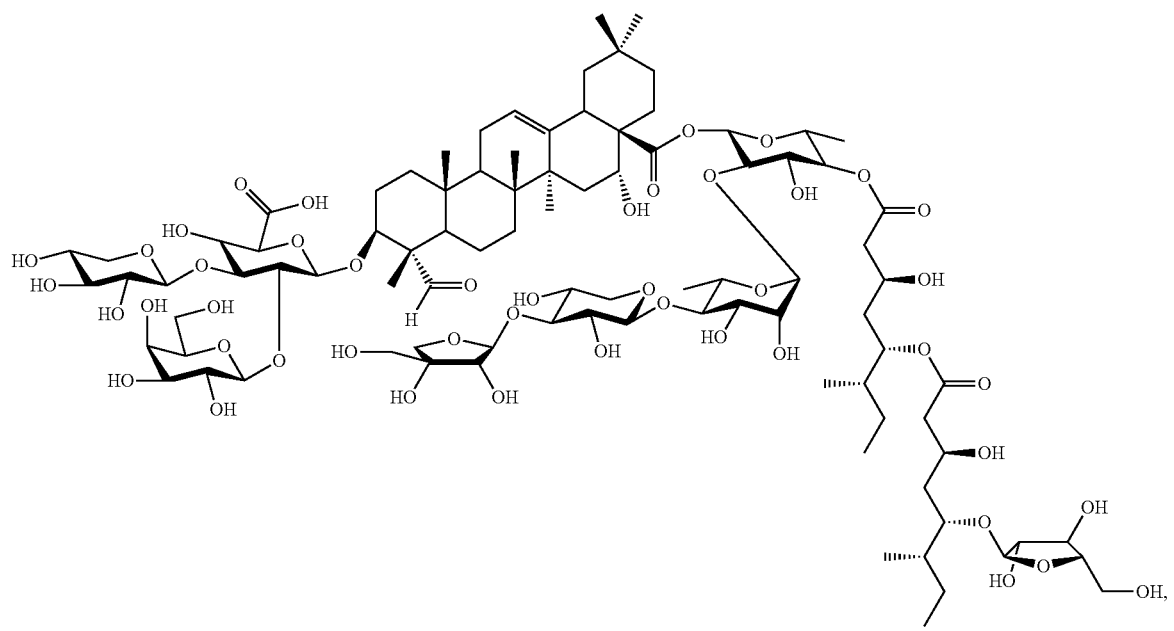

-continued
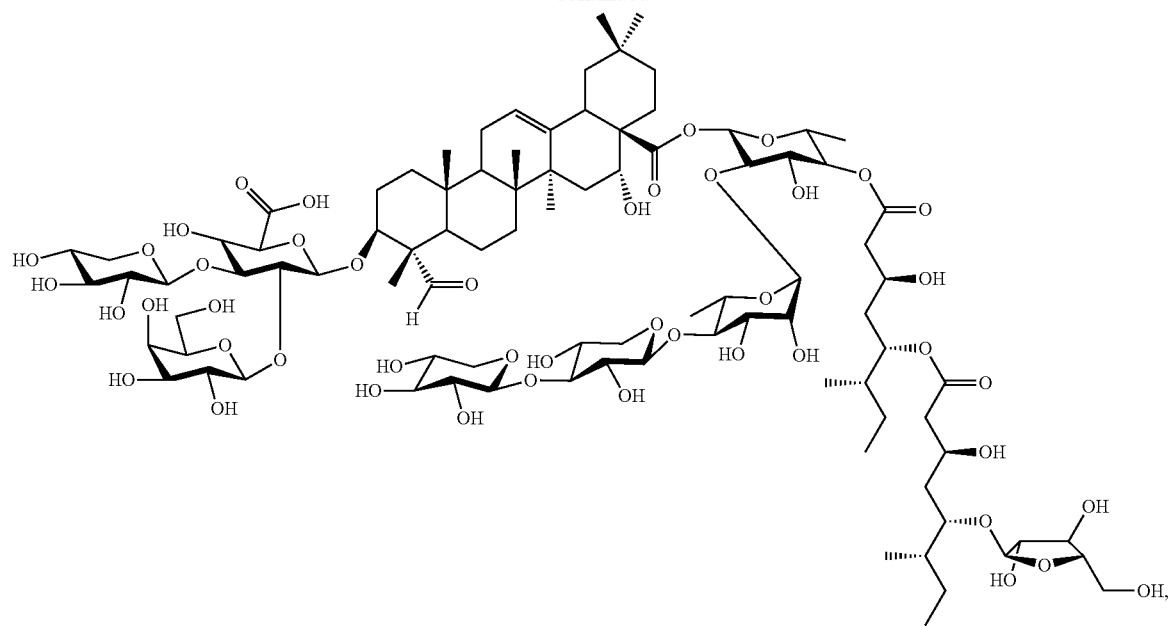
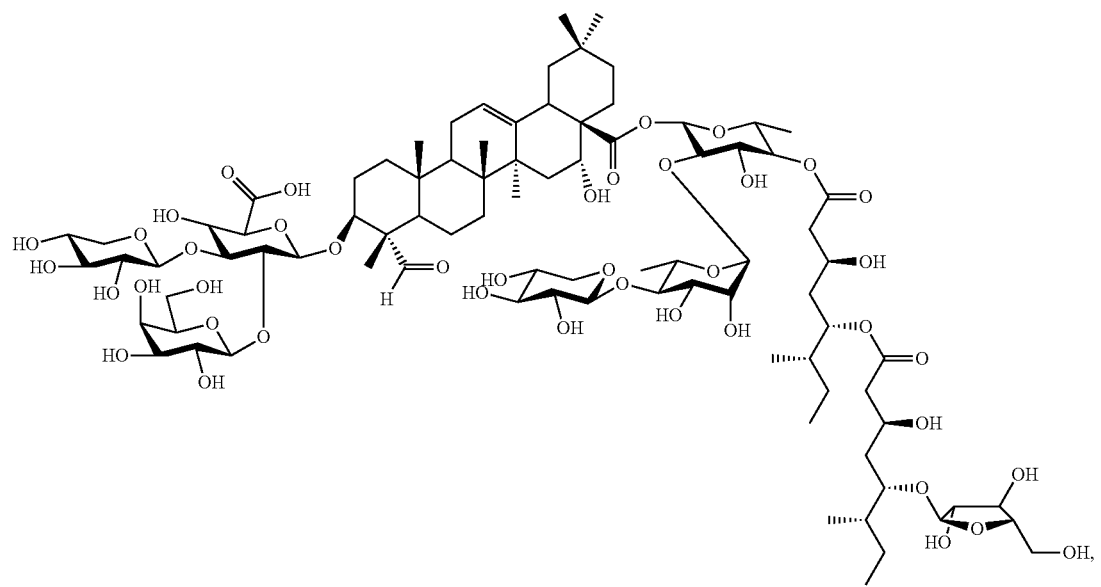

-continued
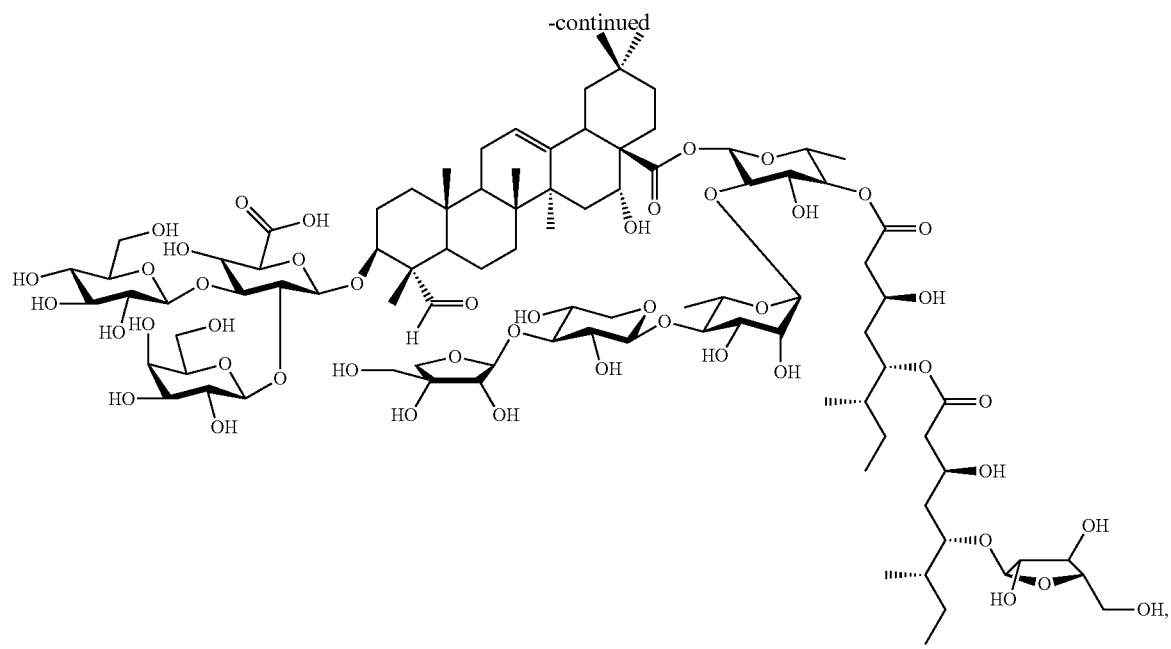
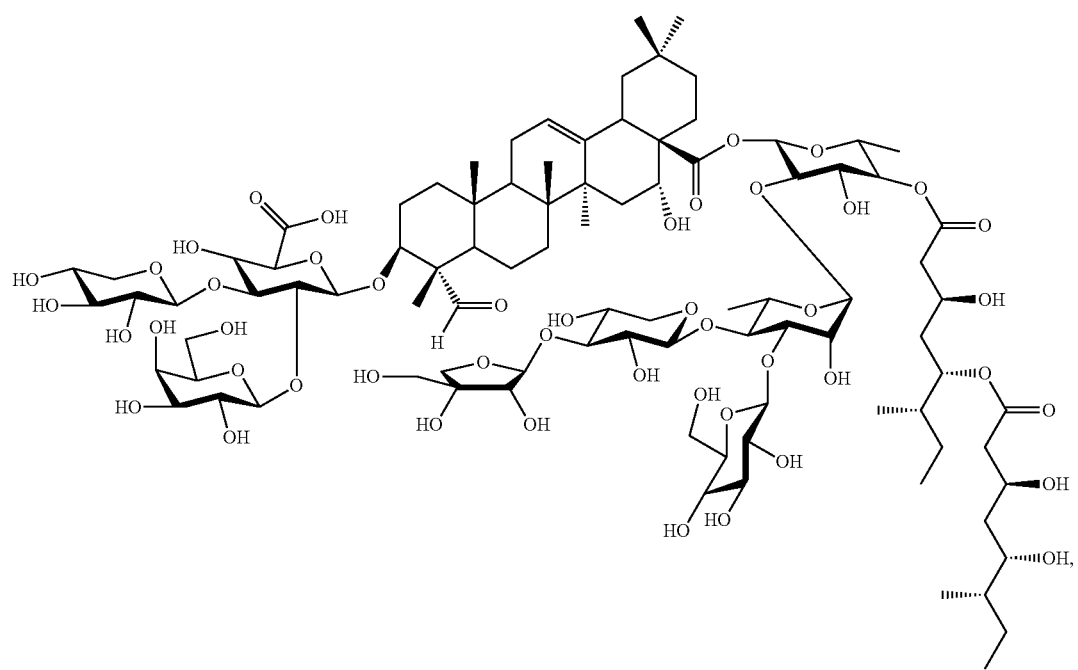

-continued
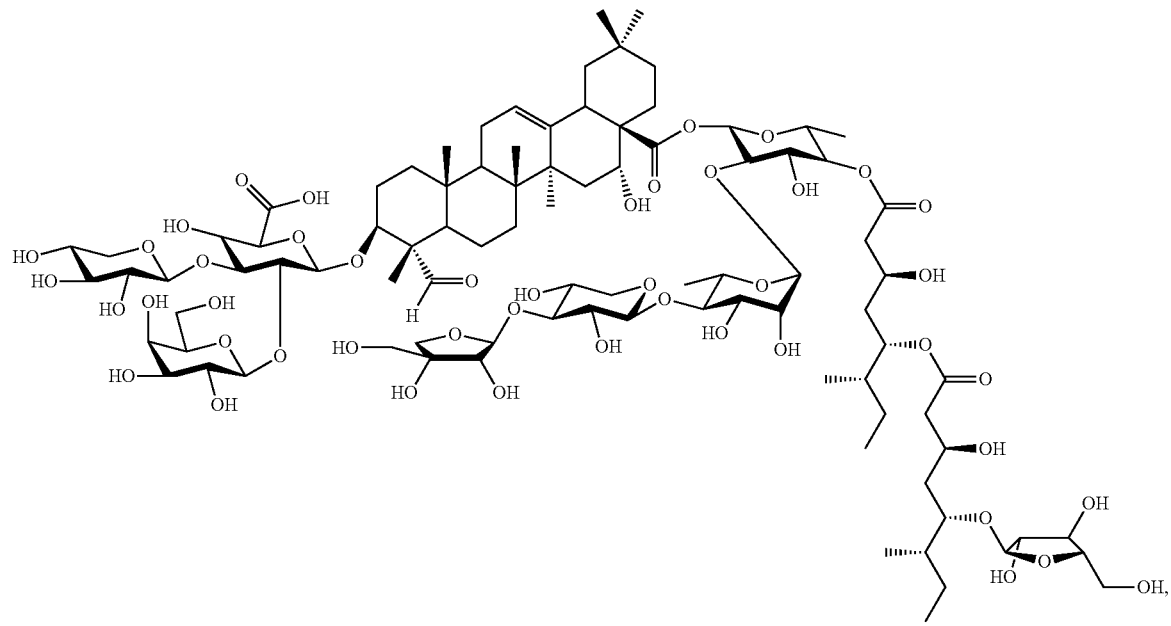
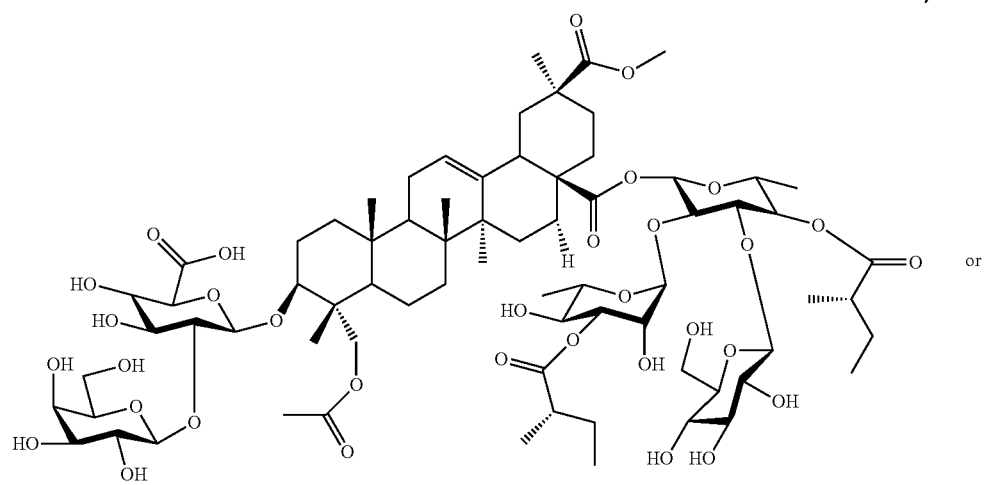
or
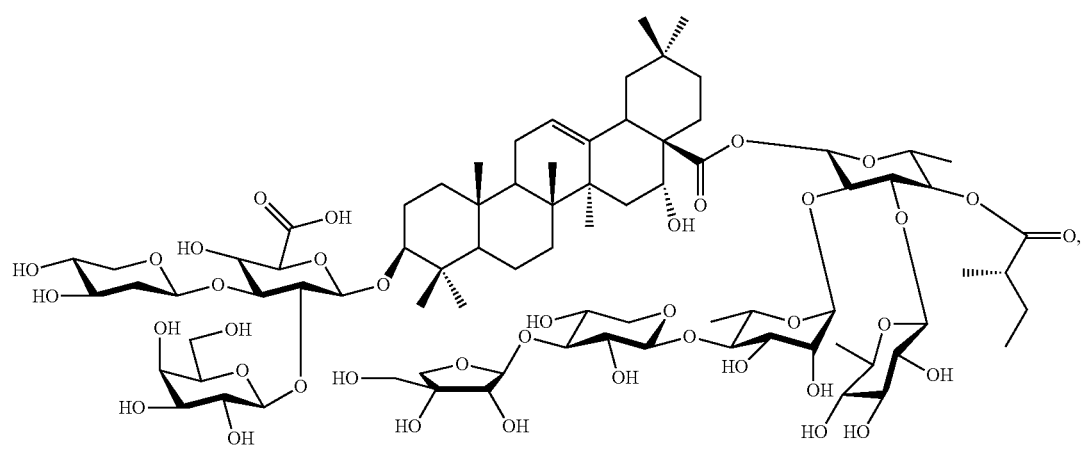

with (i) at least 88%, such as at least 90%, at least 91%, at least 92% or at least 93%:
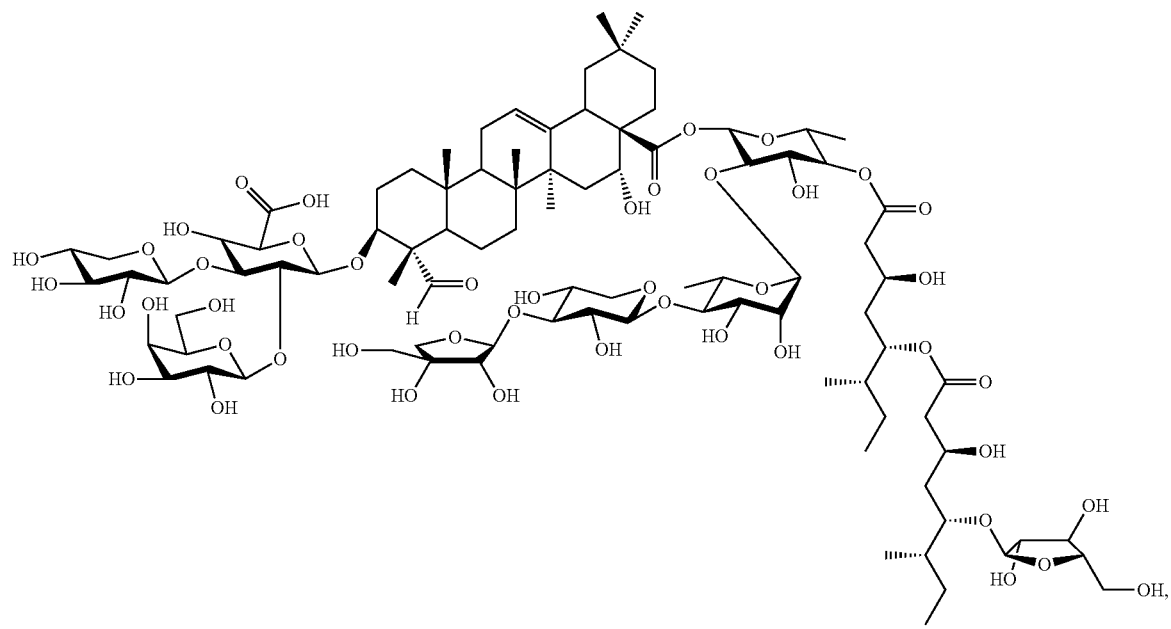
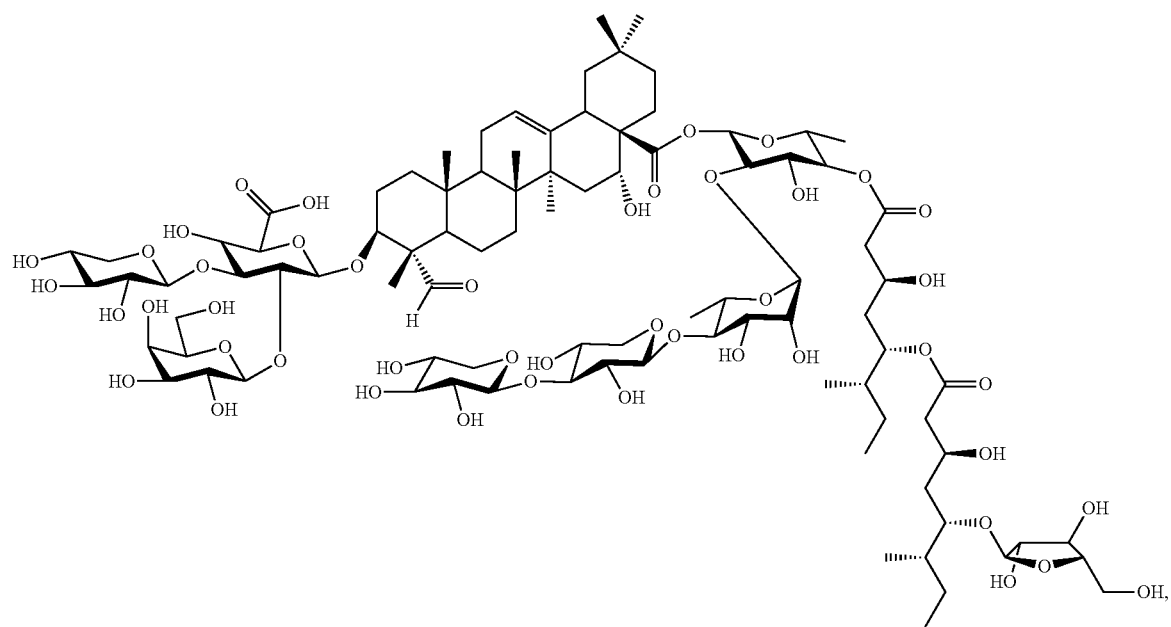

-continued
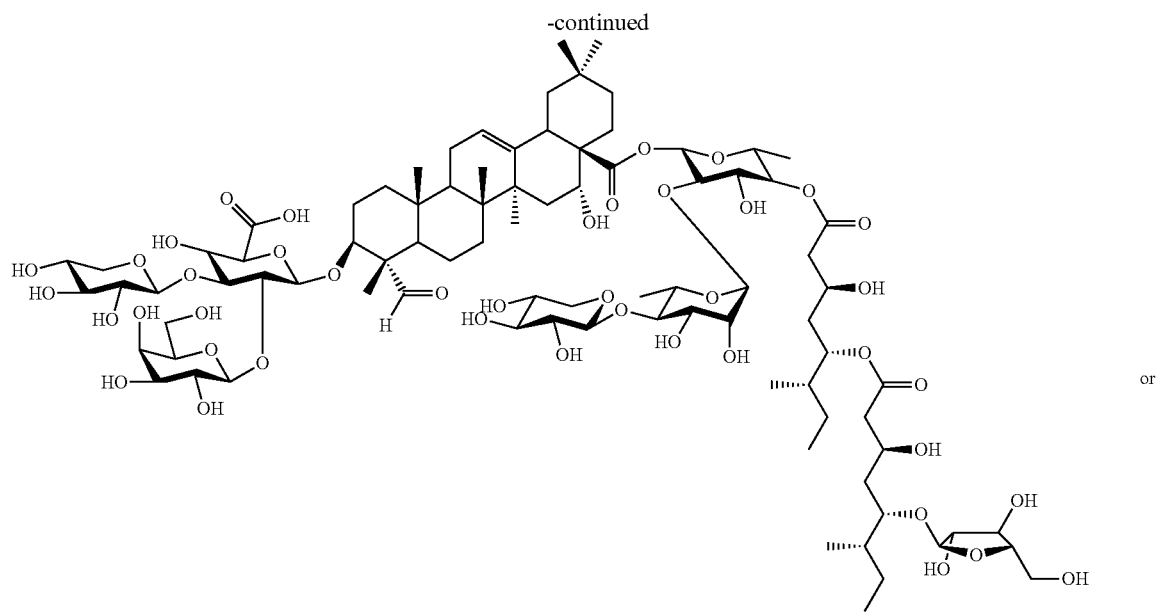
or
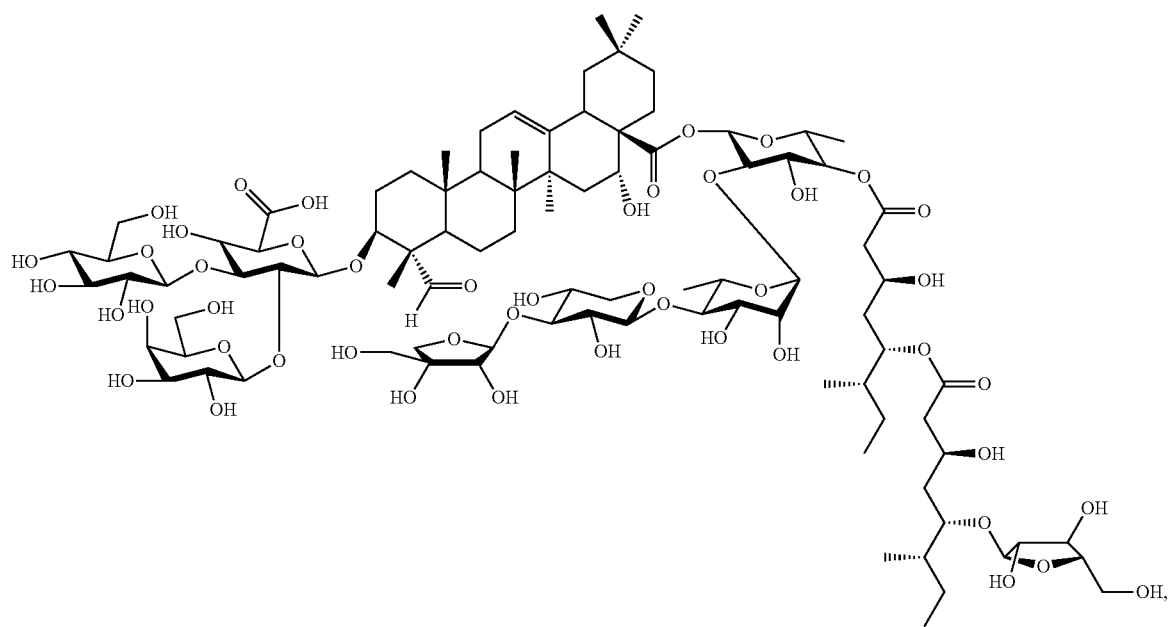

(ii) >3 to 10%:
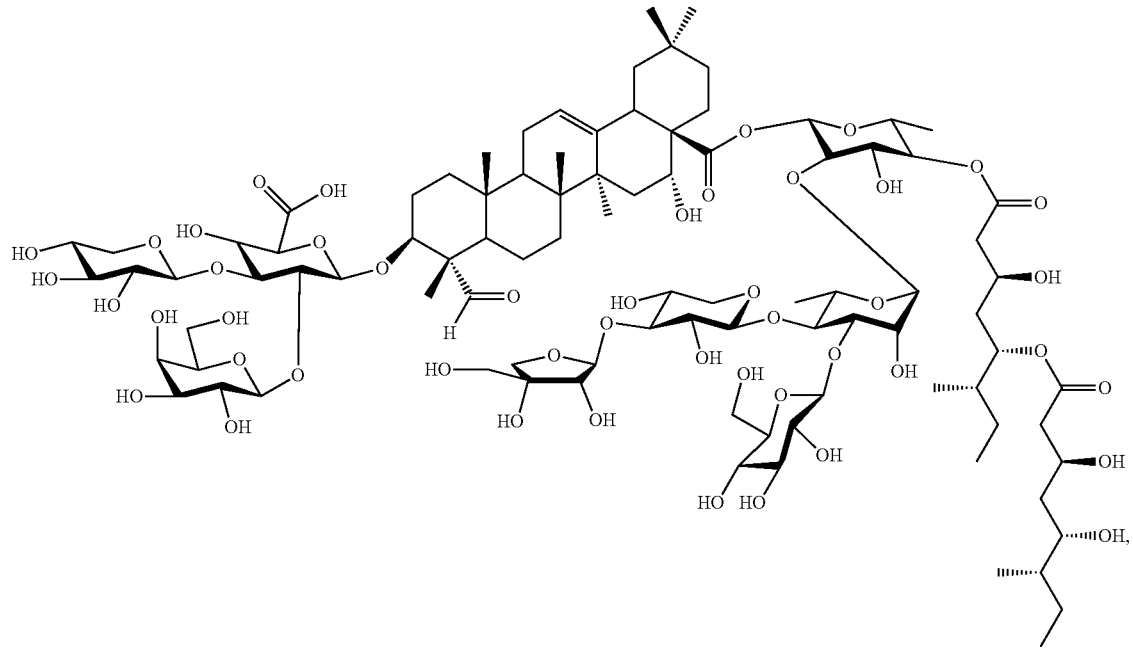
and (iii) 1% or less of any other peak by UV absorbance at 214 nm and wherein the monoisotope of the most abundant species is 1987.9 m/z. Especially of interest are saponin extracts containing at least 98%:
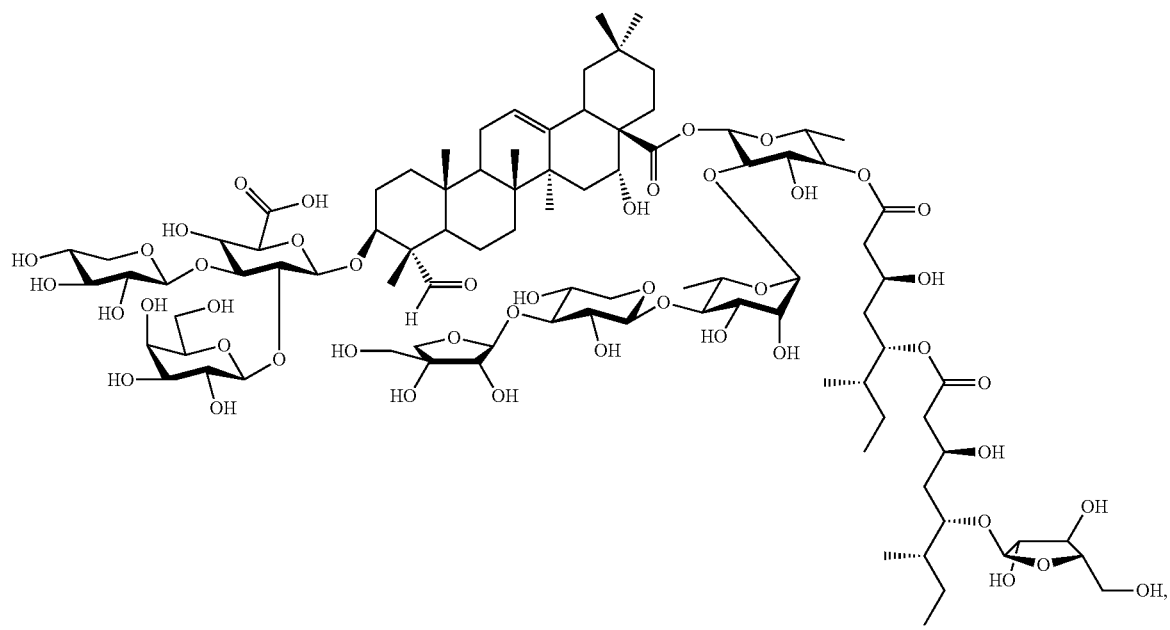

-continued
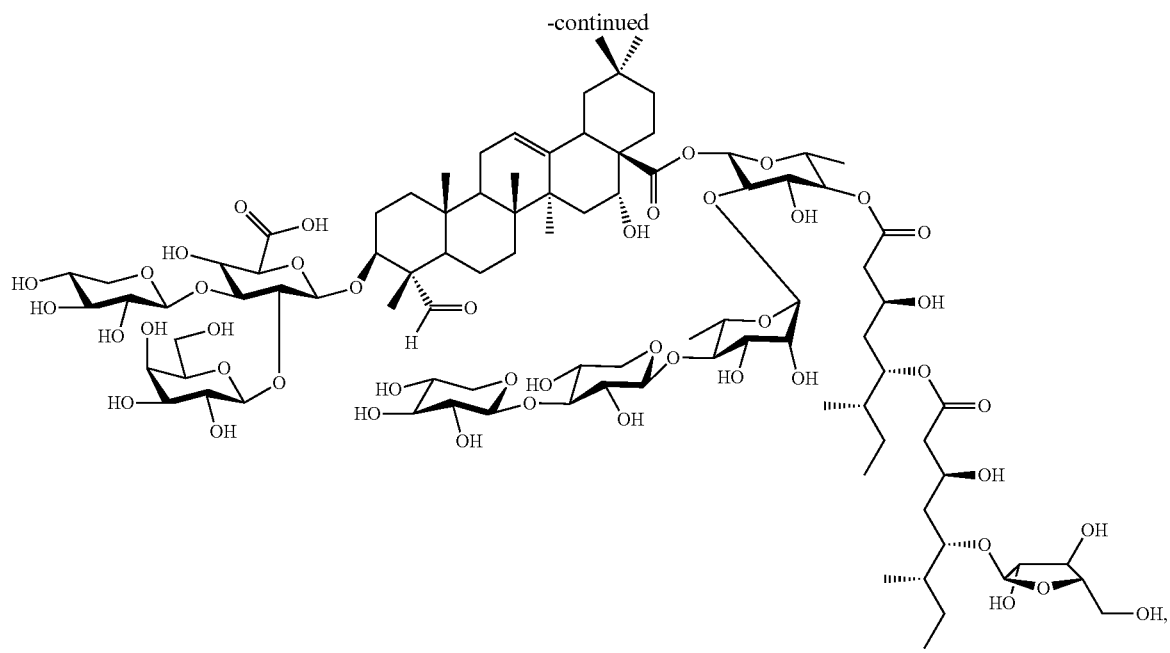
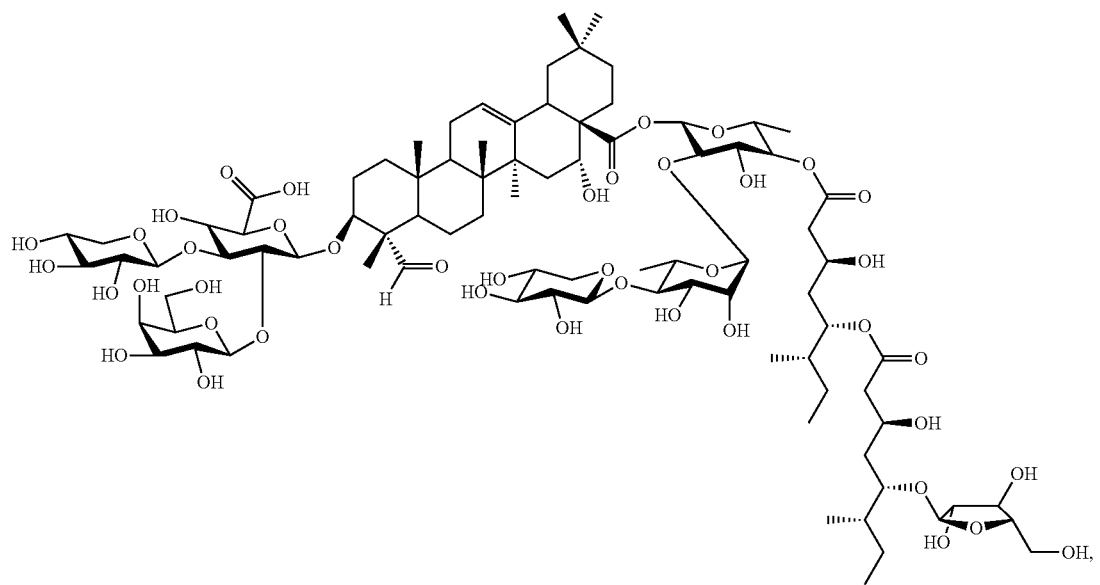

-continued
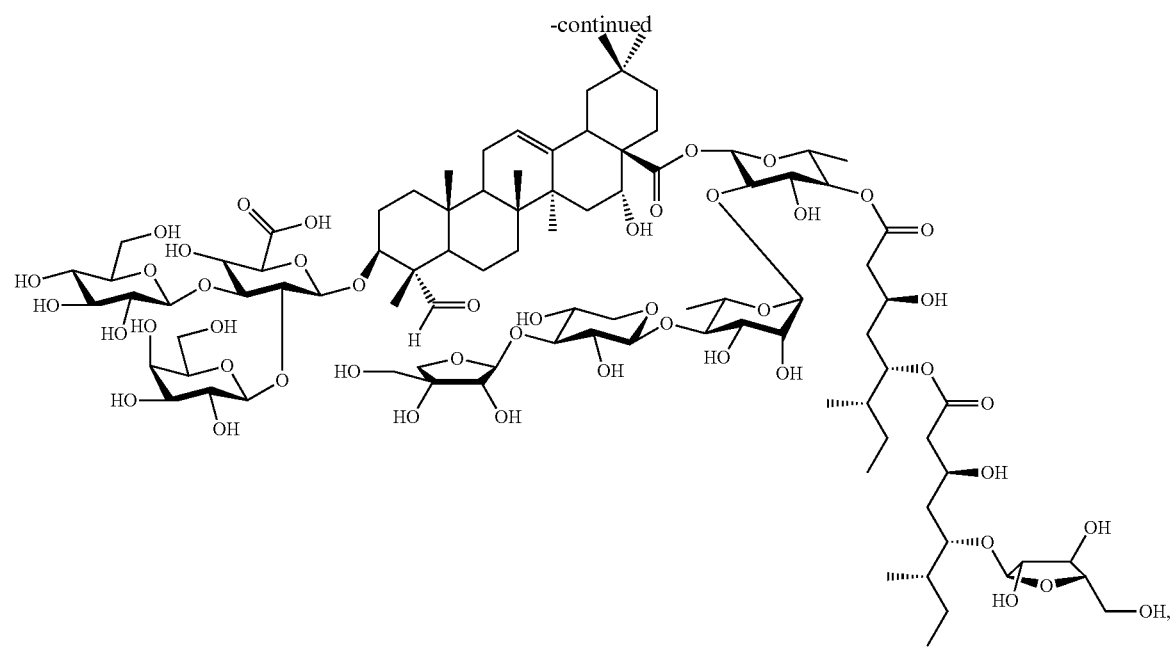
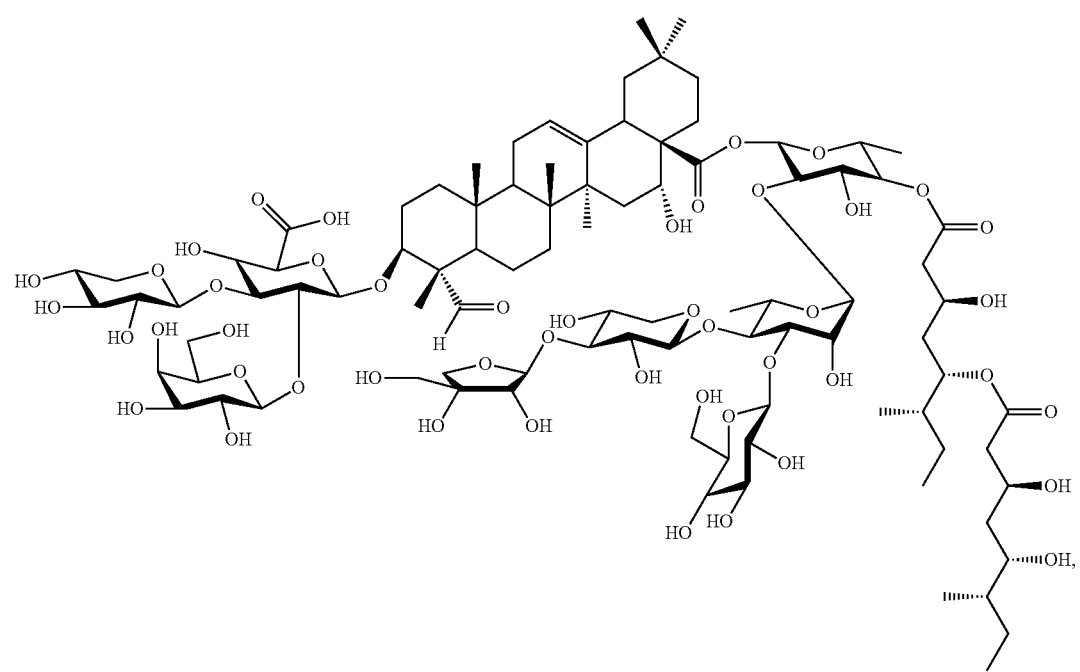

-continued
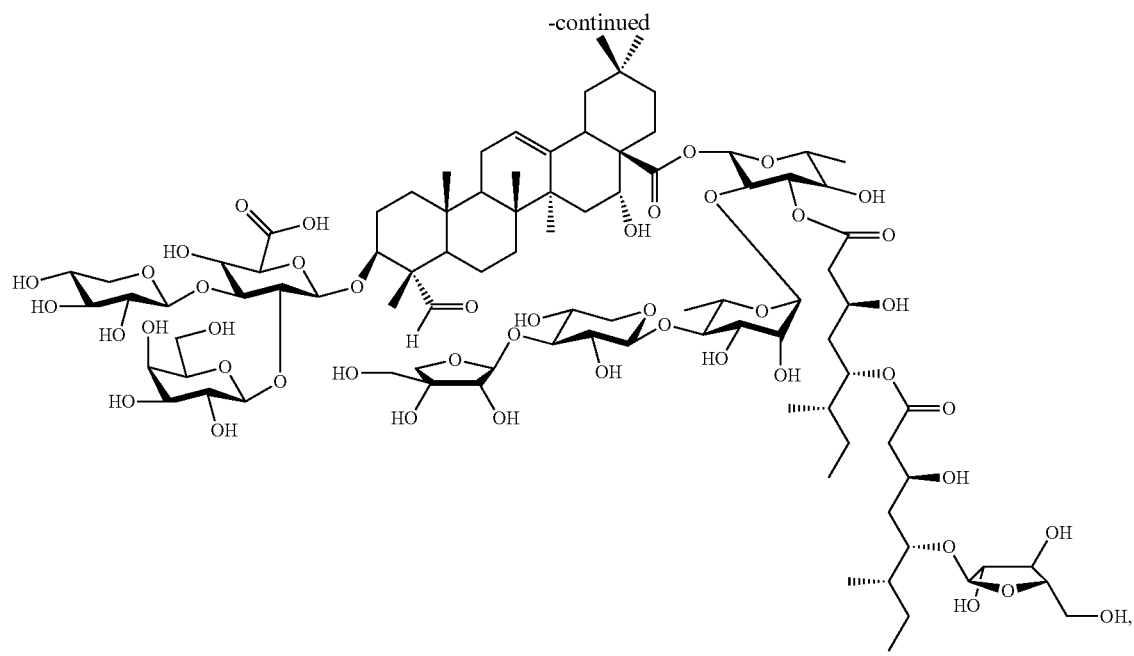
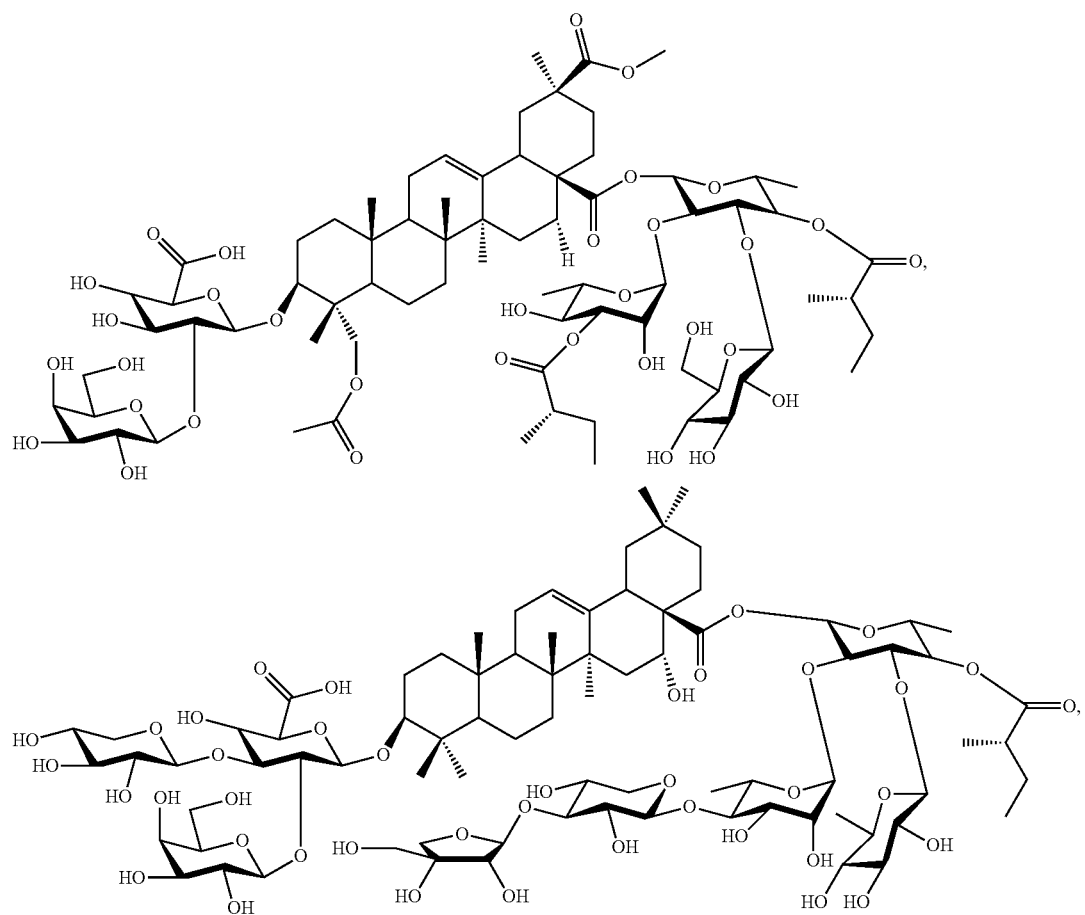
or 2118 component, with (i) at least 88%, such as at least 90%, at least 91%, at least 92% or at least 93%:
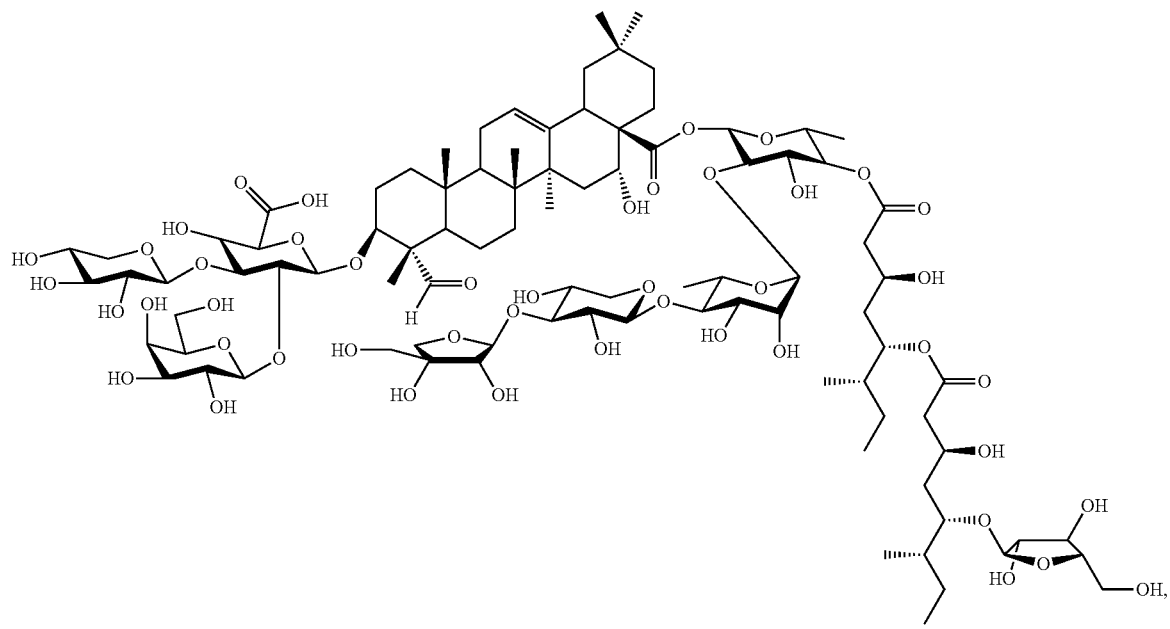
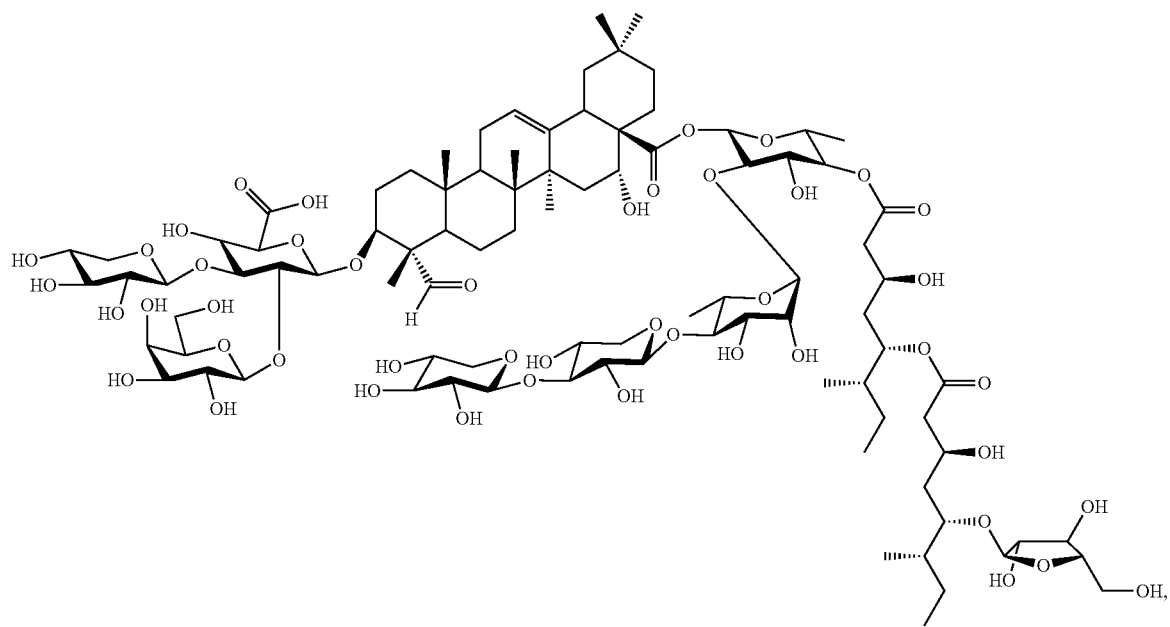

-continued
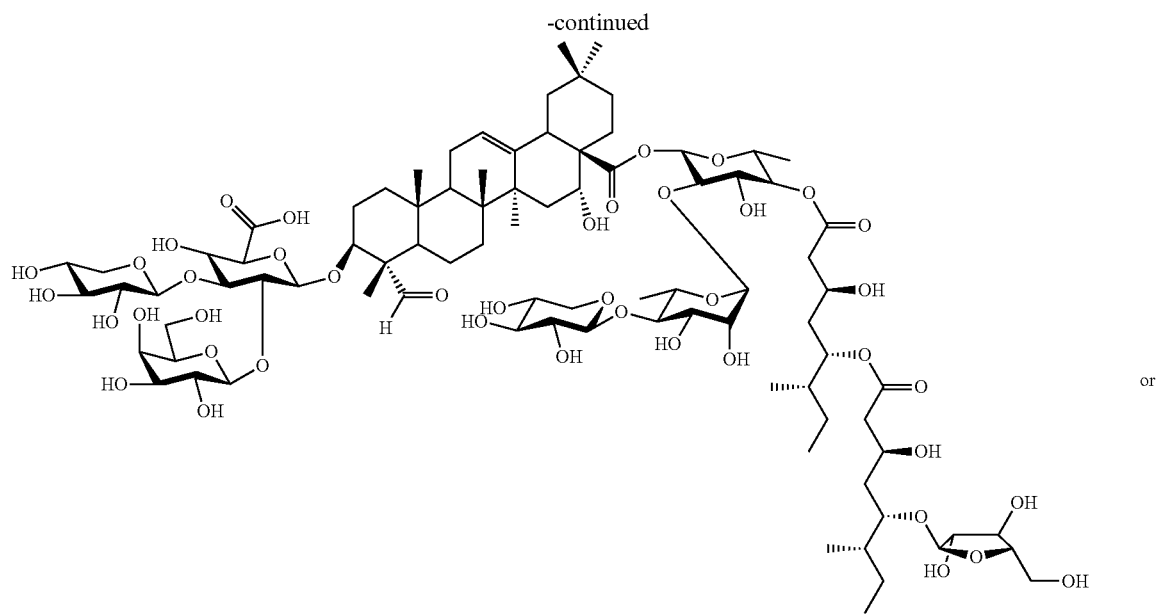
or
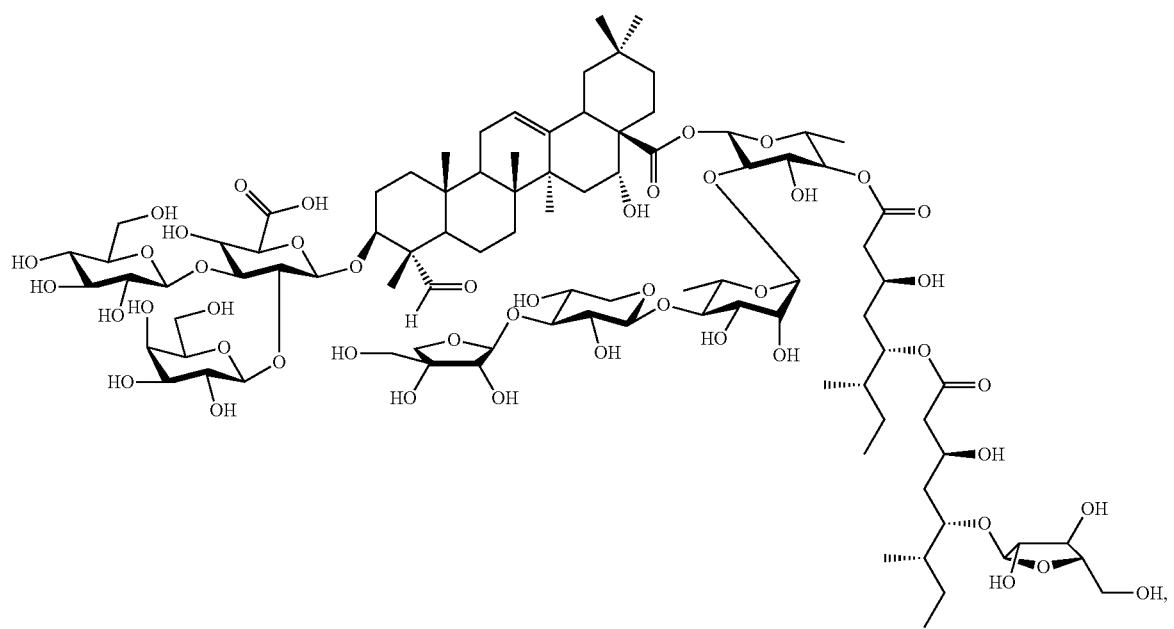

(ii) >3 to 10%:

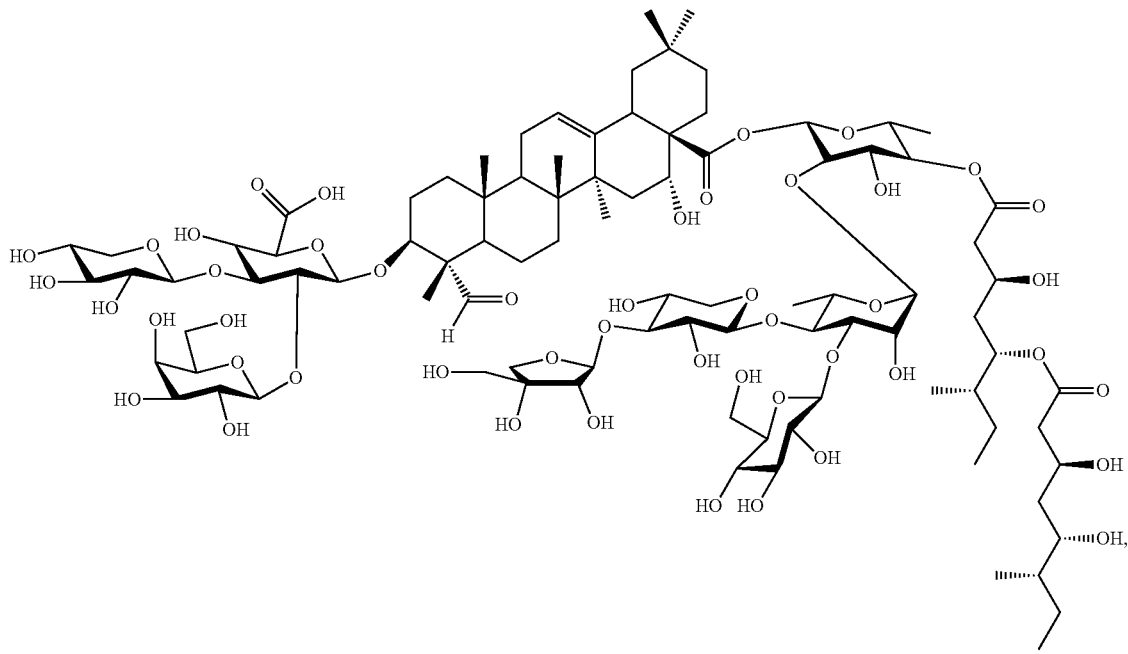

and (iii) 1% or less of any other peak by UV absorbance at 214 nm and wherein the monoisotope of the most abundant species is 1987.9 m/z.

For the avoidance of doubt, the term 'at least 88% triterpenoid glycosides having m/z of 1855.9, 1987.9 or 2001.9', unless excluded by the context, means 'triterpenoid glycosides having m/z of 1855.9, 1987.9 or 2001.9, or combinations thereof'. Other like terms including 'or', such as 'at least 98% triterpenoid glycosides having m/z of 1517.7, 1711.8, 1855.9, 1987.9, 2001.9, 2017.9 or 2118' are interpreted accordingly, unless excluded by the context should also be taken to include combinations.

In certain embodiments, the saponin extracts contain at least 40%, such as at least 50%, in particular at least 60%, especially at least 65%, such as at least 70%, 1988 component as determined by UV absorbance at 214 nm and by relative ion abundance. In certain embodiments the saponin extracts contain 90% or less, such as 85% or less, or 80% or less, 1988 component as determined by UV absorbance at 214 nm and by relative ion abundance. In certain embodiments, the saponin extracts contain from 40% to 90% 1988 component, such as 50% to 85% 1988 component, especially 70% to 80% 1988 component as determined by UV absorbance at 214 nm and by relative ion abundance.

In certain embodiments, the saponin extracts contain 30% or less, such as 25% or less, 1856 component as determined by UV absorbance at 214 nm and by relative ion abundance. In certain embodiments the saponin extracts contain at least 5%, such as at least 10% 1856 component by UV absorbance at 214 nm and by relative ion abundance. In certain embodiments, the saponin extracts contain from 5% to 30% 1856 component, such as 10% to 25% 1856 component as determined by UV absorbance at 214 nm and by relative ion abundance.

In certain embodiments, the saponin extracts contain 40% or less, such as 30% or less, in particular 20% or less, especially 10% or less 2002 component by UV absorbance at 214 nm and by relative ion abundance. In certain embodiments, the saponin extracts contain at least 0.5%, such as at least 1%, 2002 component by UV absorbance at 214 nm and by relative ion abundance. In certain embodiments, the saponin extracts contain from 0.5% to 40% 2002 component, such as 1% to 10% 2002 component as determined by UV absorbance at 214 nm and by relative ion abundance.

In certain embodiments, the saponin extracts contain at least 3.5%, such as at least 4%, or at least 4.5% 2018 component by UV absorbance at 214 nm and by relative ion abundance.

In certain embodiments, the saponin extracts contain 9% or less, such as 8% or less, such as 7% or less 2018 component by UV absorbance at 214 nm and by relative ion abundance.

In certain embodiments, the saponin extracts contain 4 to 8%, such as 5 to 7%, or about 6% (such as 5.5 to 6.5%), 2018 component by UV absorbance at 214 nm and by relative ion abundance.

In certain embodiments, the saponin extracts contain at least 40%, such as at least 50%, in particular at least 60%, especially at least 65%, such as at least 70%:

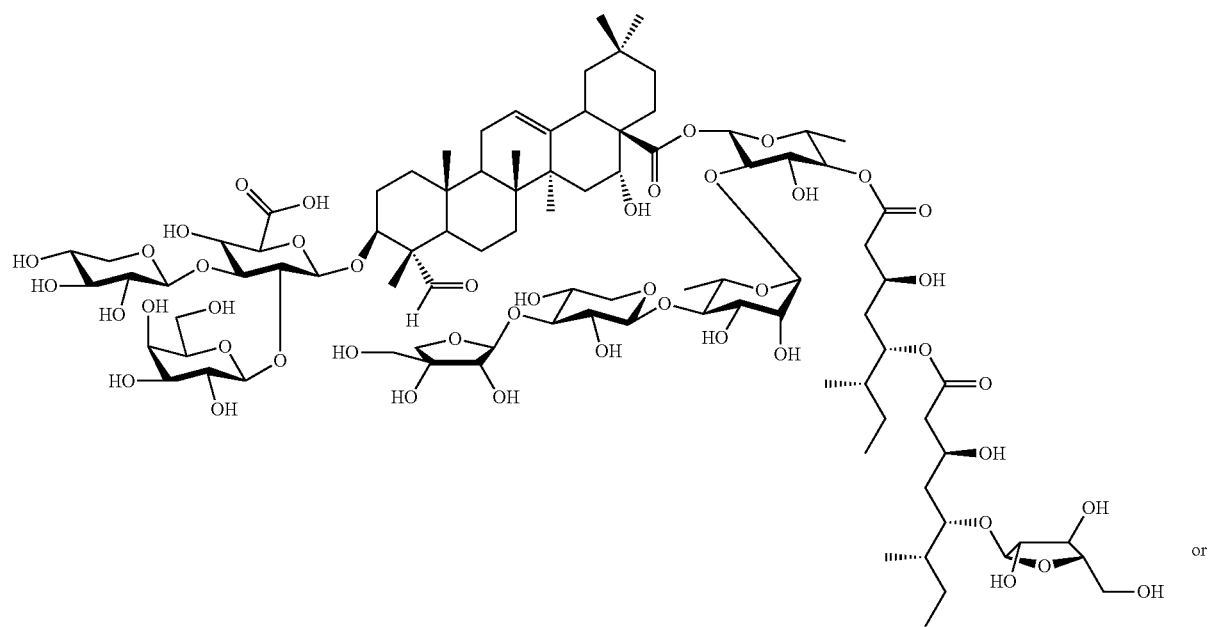
or
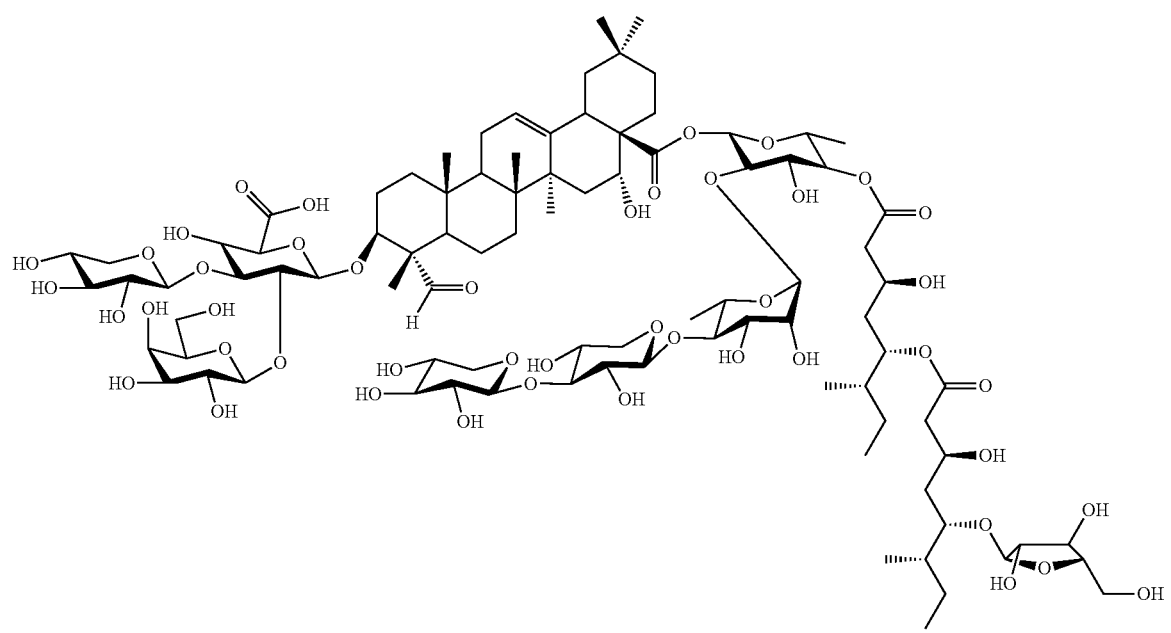
by UV absorbance at 214 nm and by relative ion abundance.

In certain embodiments, the saponin extracts contain 90% or less, such as 85% or less, or 80% or less:
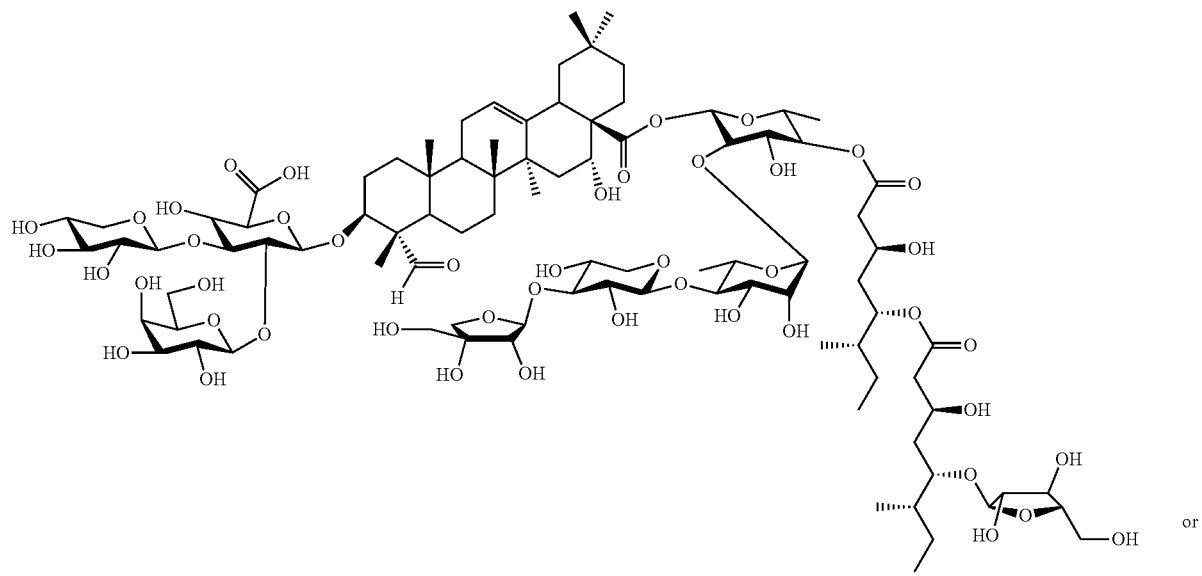
or
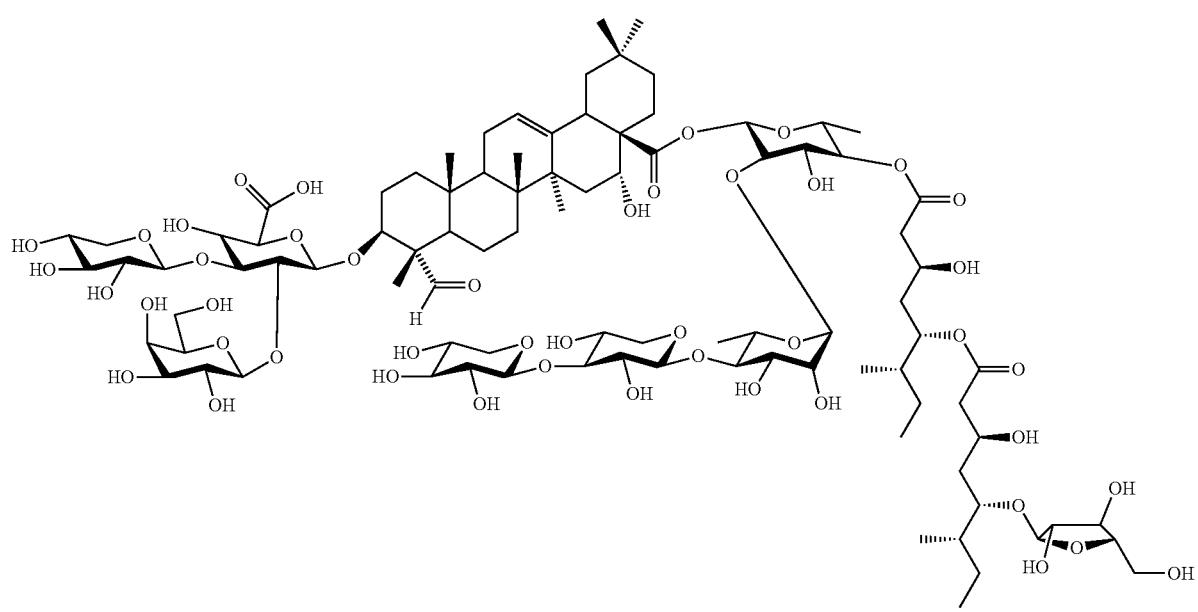
by UV absorbance at 214 nm and by relative ion abundance.

In certain embodiments the saponin extracts contain 30% or less, such as 25% or less:
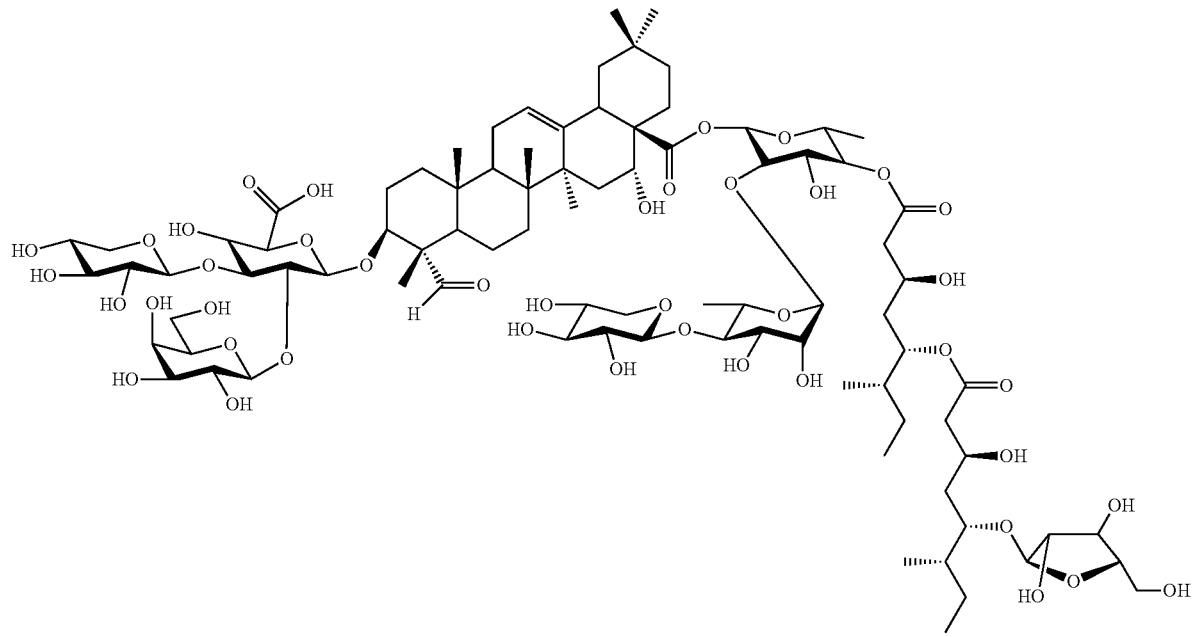
by UV absorbance at 214 nm and by relative ion abundance. In certain embodiments, the saponin extracts contain at least 5%, such as at least 10%:
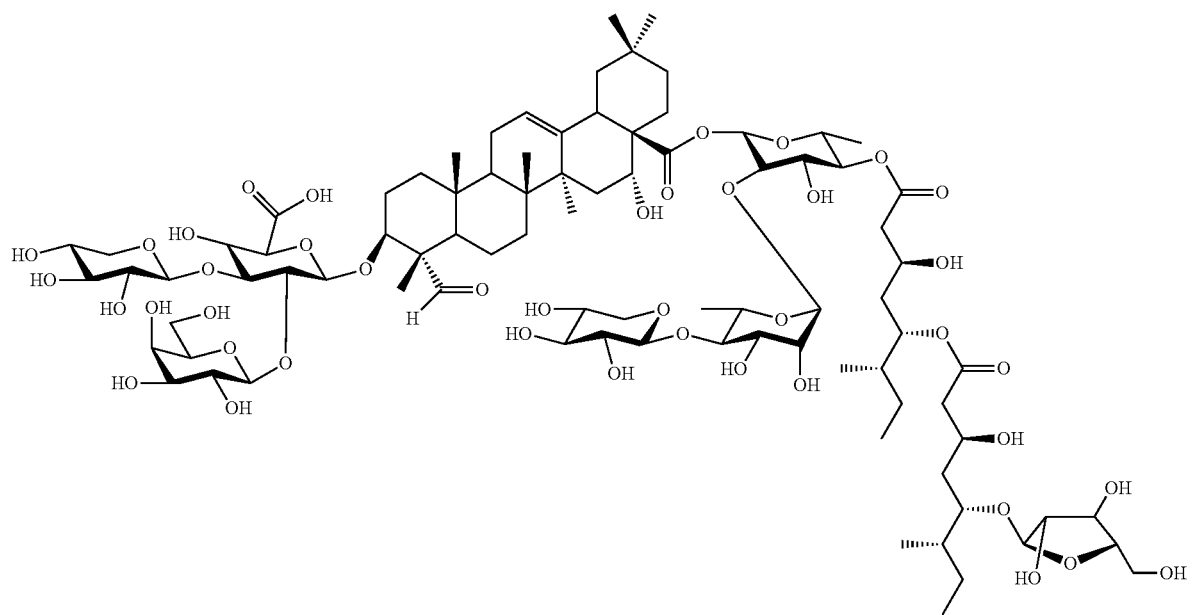
by UV absorbance at 214 nm and by relative ion abundance.

In certain embodiments the saponin extracts contain 40% or less, such as 30% or less, in particular 20% or less, especially 10% or less:
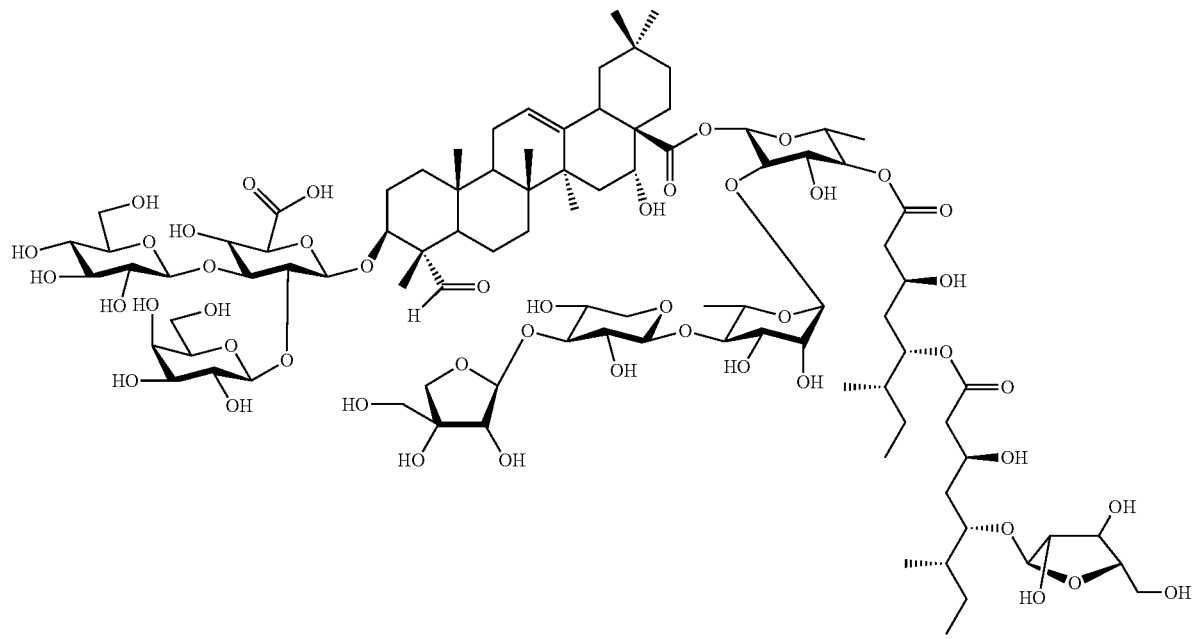
by UV absorbance at 214 nm and by relative ion abundance. In certain embodiments the saponin extracts contain at least 0.5%, such as at least 1%,
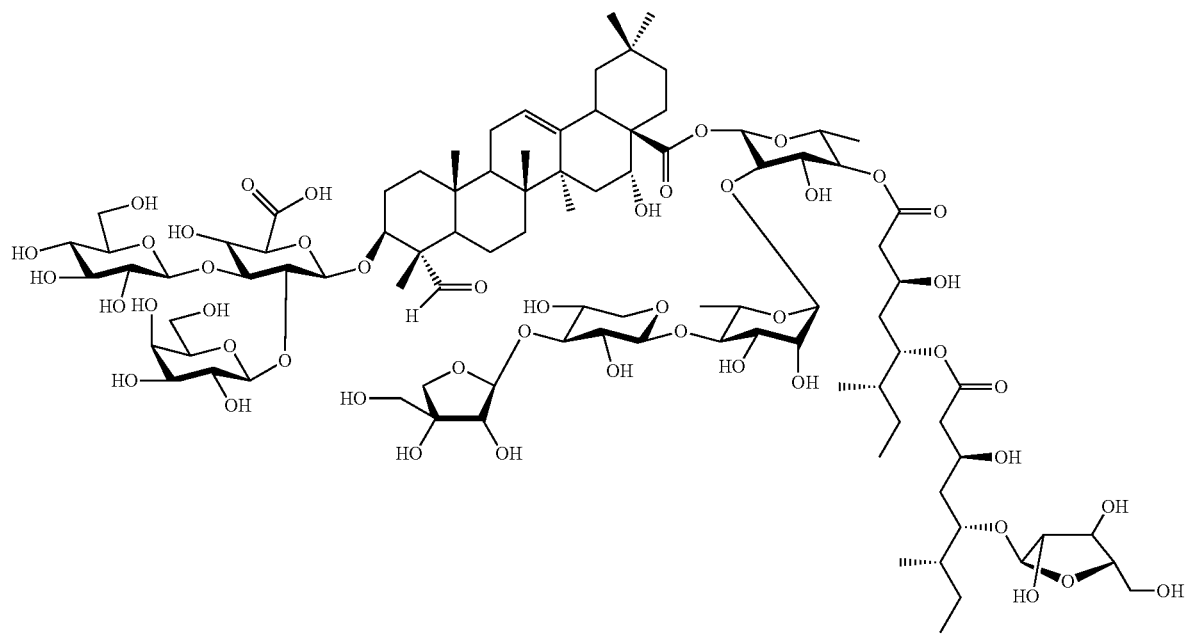
by ion abundance by UV absorbance at 214 nm and by relative ion abundance.

In certain embodiments, the saponin extracts contain at least 3.5%, such as at least 4%, or at least 4.5%
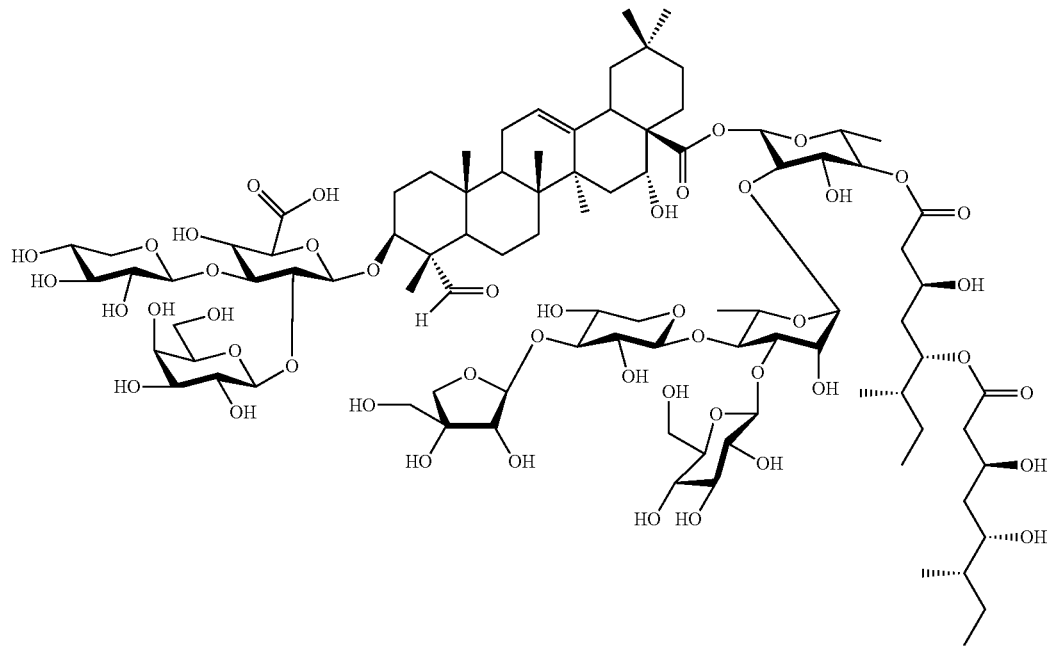
by UV absorbance at 214 nm and by relative ion abundance.
In certain embodiments, the saponin extracts contain 9% or less, such as 8% or less, such as 7% or less
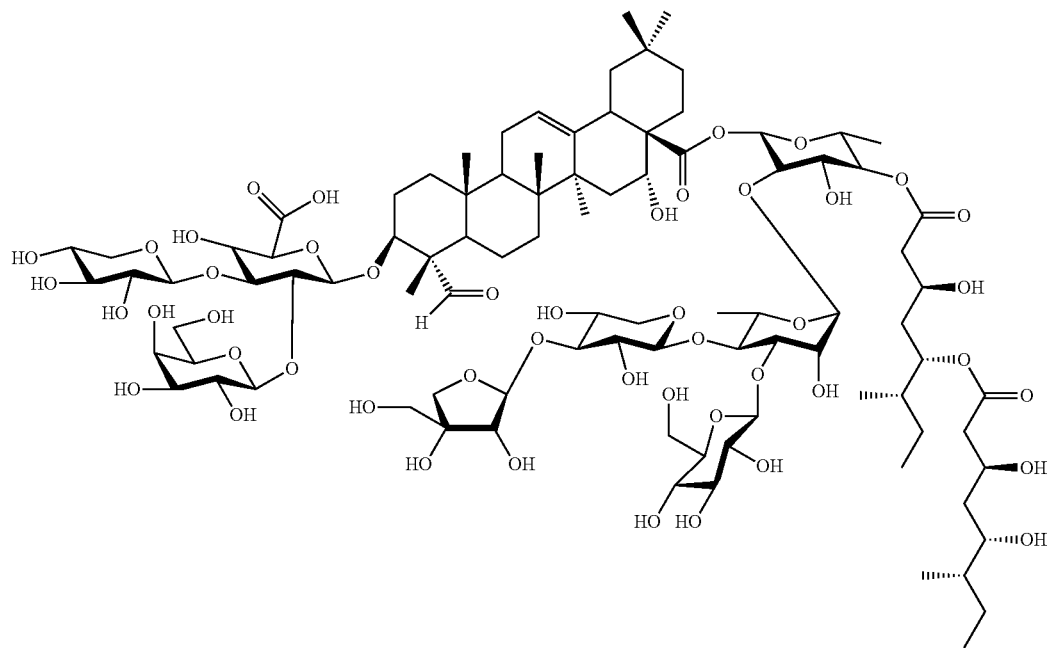
by UV absorbance at 214 nm and by relative ion abundance.

Quil A is a saponin preparation isolated from the South American tree *Quillaja saponaria* Molina and was first described as having adjuvant activity by Dalsgaard et al. in 1974 ("Saponin adjuvants", Archiv. für die gesamte Virusforschung, Vol. 44, Springer Verlag, Berlin, p243-254). Purified fractions of Quil A have been isolated by High Performance Liquid Chromatography (HPLC) which retain adjuvant activity without the toxicity associated with Quil A (see, for example, EP03622789). Various fractions have been found to have adjuvant activity, such as QS-7, QS-17, QS-18 and QS-21, although their toxicity varies considerably.

By the term 'saponin extract' as used herein is meant an extract of *Quillaja saponaria* Molina.

By the term 'triterpenoid glycosides' as used herein is meant an entity or entities having a triterpenoid core derivatised by sugars which are attached via glycosidic bonds.

Certain structures herein have been determined by tandem mass spectrometry (MS/MS), limitations of the technique in differentiating certain branching, stereochemistry and isomeric sugar species (e.g. apiose and xylose) means that some structures are putative and based on an assumed conserved core. Putative structures should therefore be taken to mean the actual structure of the component which has otherwise been identified, in the event the putative structure is incorrect for any reason.

Figure 6:
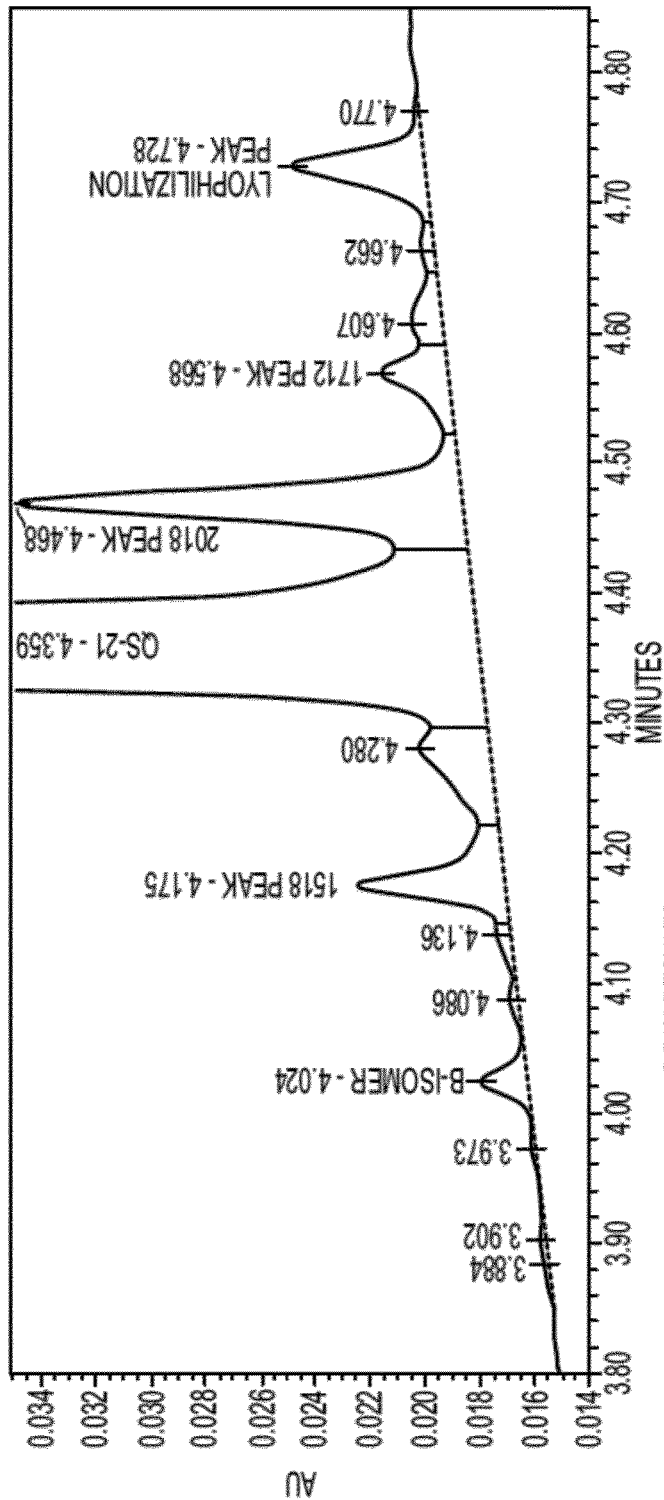

By the term '2018 component' is meant the triterpenoid glycosides identified as '2018 Peak' in FIG. 6. Suitably the 2018 component in the UPLC-UV/MS methods described herein has a retention time of approximately 4.5 min, the primary component of the peak having a monoisotopic molecular weight of 2017.9. The 2018 component may also be identified in the UPLC-UV methods described herein with a retention time of approximately 5.8 min. The primary 2018 component has been identified as having the putative structure.

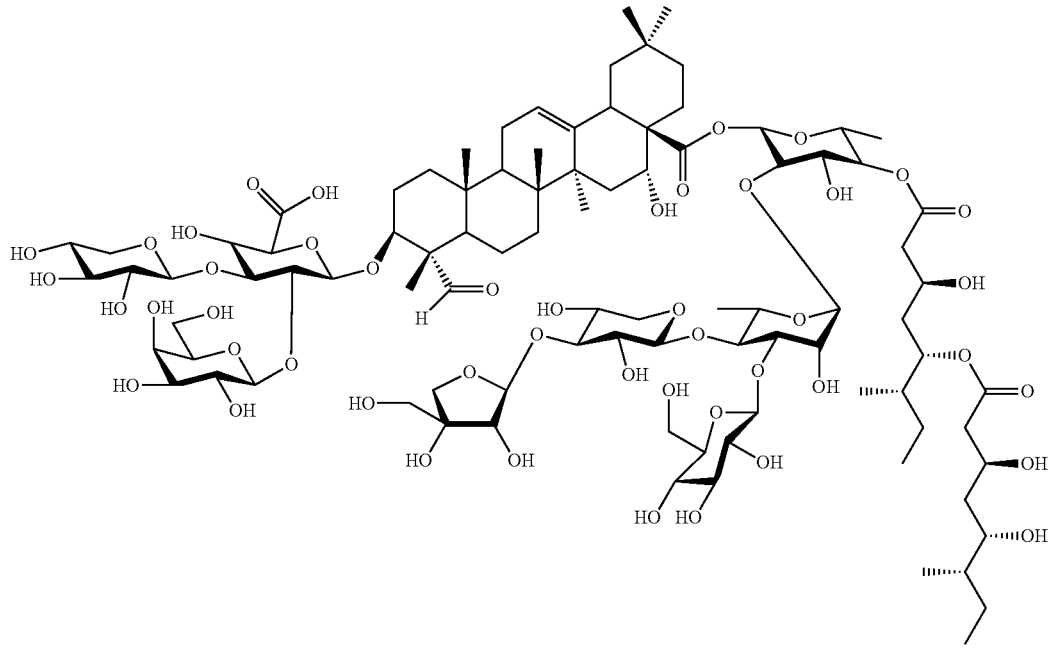

by MS/MS.

By the term '1988 component' is meant the triterpenoid glycosides identified as part of the QS-21 main peak in FIG. 6 and having a monoisotopic molecular weight of 1987.9. Suitably the 1988 component in the UPLC-UV/MS methods described herein has a retention time of approximately 4.4 min and a monoisotopic molecular weight of 1987.9. The 1988 component may consist of QS-21A V1:

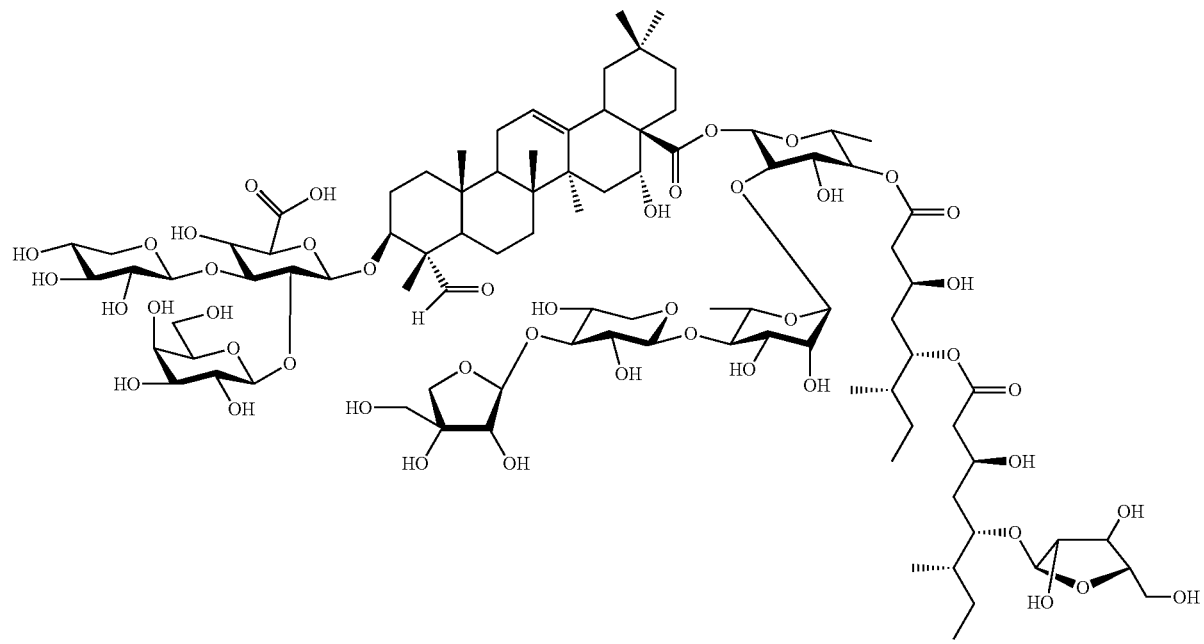
and QS-21A V2
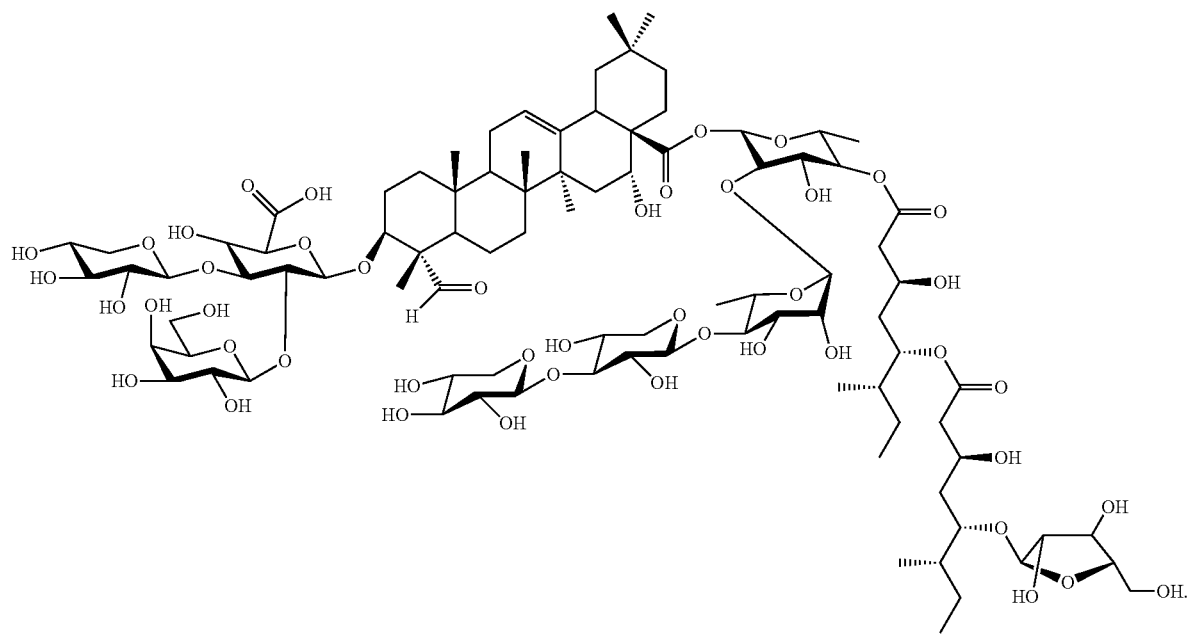
By the term '1856 component' is meant the triterpenoid glycosides identified as part of the QS-21 main peak in FIG. 6 and having a monoisotopic molecular weight of 1855.9. Suitably the 1856 component in the UPLC-UV/MS methods described herein has a retention time of approximately 4.4 min and a monoisotopic molecular weight of 1855.9. The 1856 component may consist of:

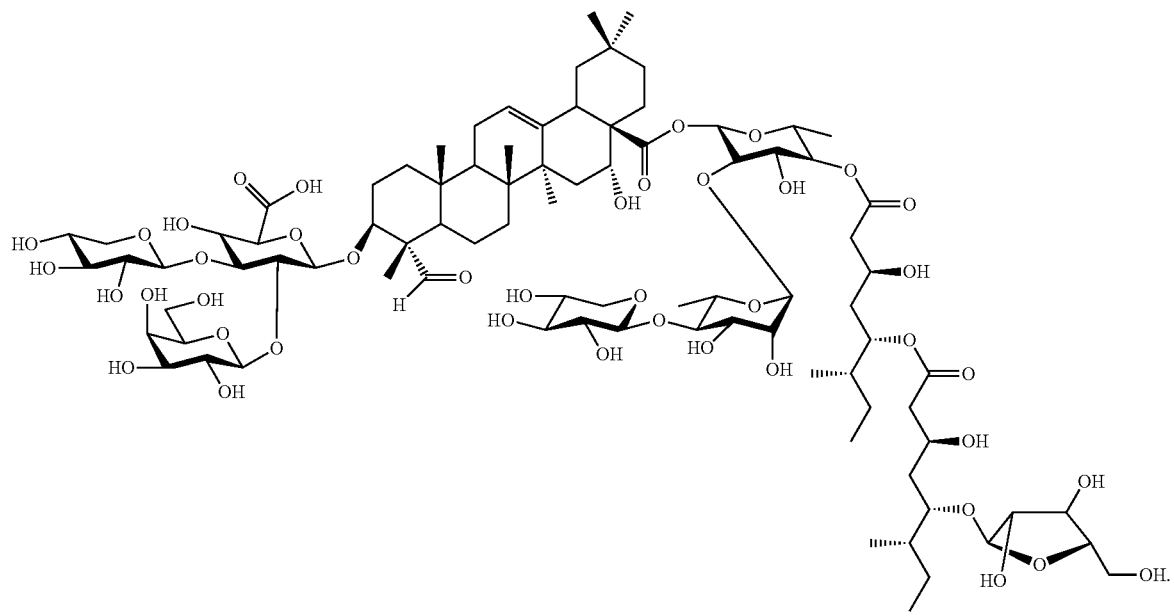

By the term '2002 component' is meant the triterpenoid glycosides identified as part of the QS-21 main peak in FIG. 6 and having a monoisotopic molecular weight of 2001.9. Suitably the 2002 component in the UPLC-UV/MS methods described herein has a retention time of approximately 4.4 min and a monoisotopic molecular weight of 2001.9. The 2002 component has been identified as having the putative structure:

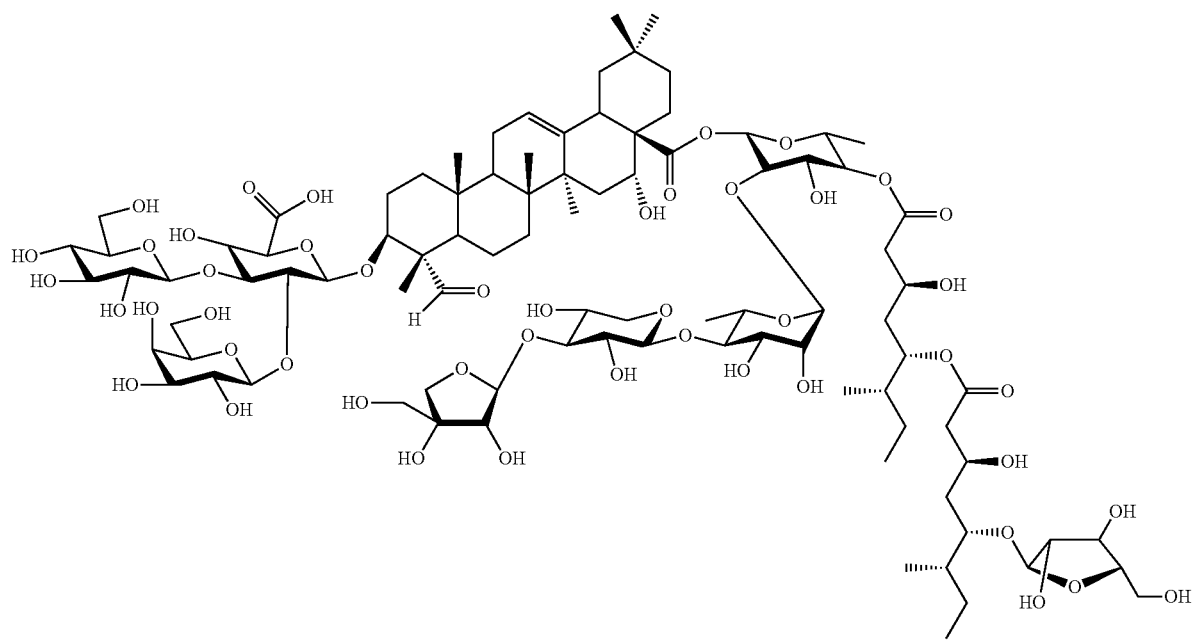

by MS/MS.

By the term 'lyo impurity' is meant the triterpenoid glycosides identified as lyophilization Peak' in FIG. 6. Suitably the lyo impurity in the UPLC-UV/MS methods described herein has a retention time of approximately 4.7 min and the primary component of the peak having a monoisotopic molecular weight of 1855.9. The primary lyo impurity has been identified as having the putative structure:

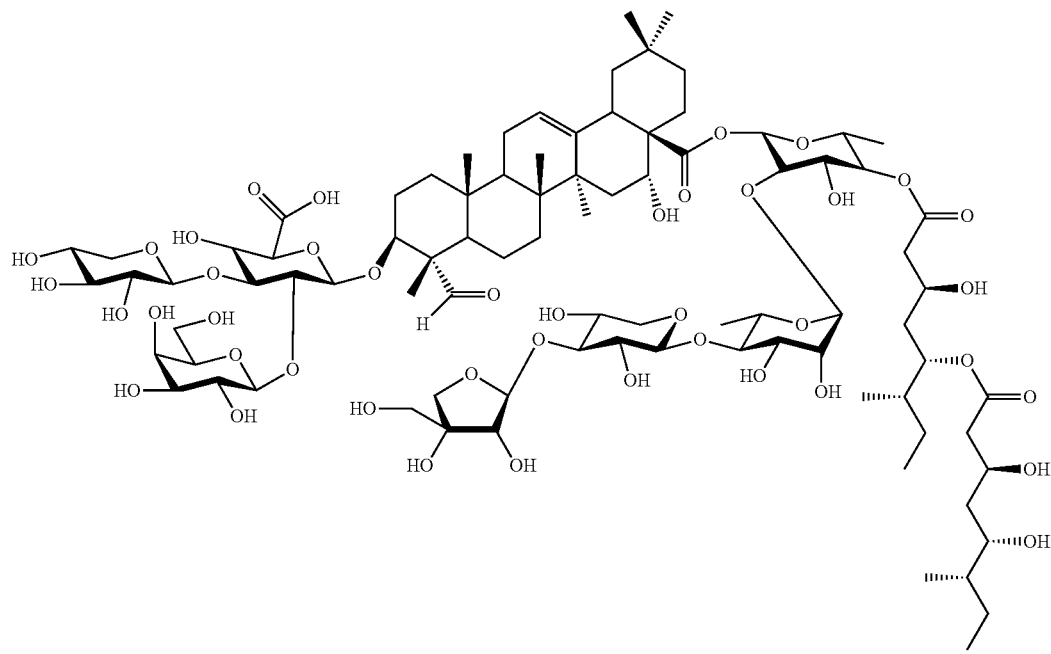

by MS/MS.

By the term 'B-isomer' is meant the triterpenoid glycosides identified as 'B-isomer' in FIG. 6. Suitably the B-isomer in the UPLC-UV/MS methods described herein has a retention time of approximately 4.0 min and the primary component of the peak having a monoisotopic molecular weight of 1987.9. The primary B-isomer component has been identified as having the putative structure:

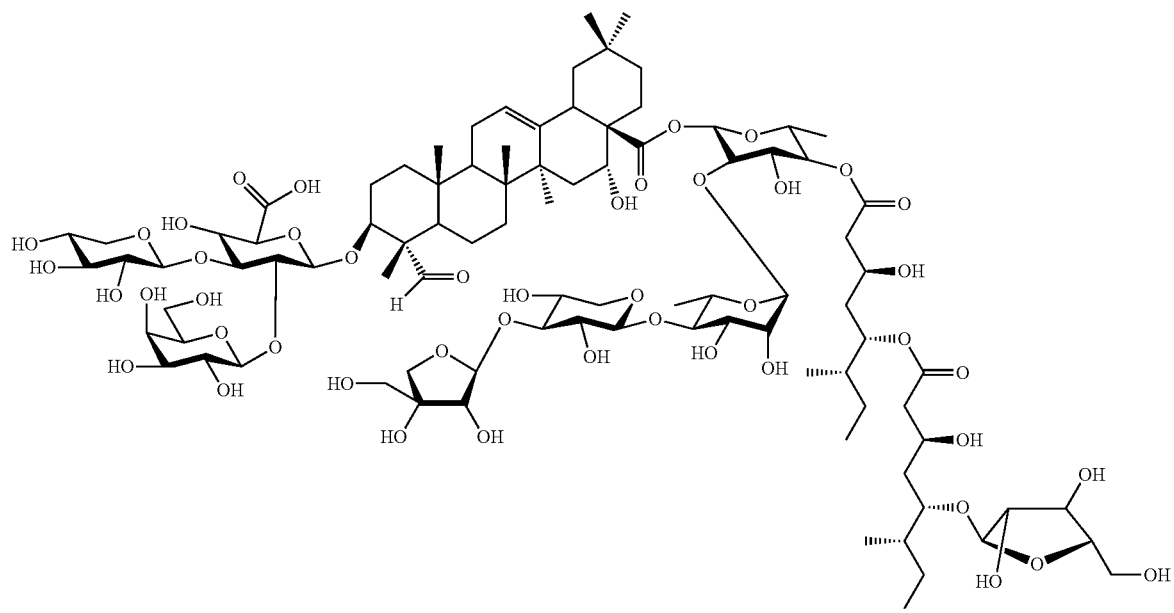

by MS/MS.

By the term '1518 component' is meant the triterpenoid glycosides identified as '1518 Peak' in FIG. 6. Suitably the 1518 component in the UPLC-UV/MS methods described herein has a retention time of approximately 4.2 min and the primary component of the peak having a monoisotopic molecular weight of 1517.7. The primary 1518 component has been identified as having the putative structure:

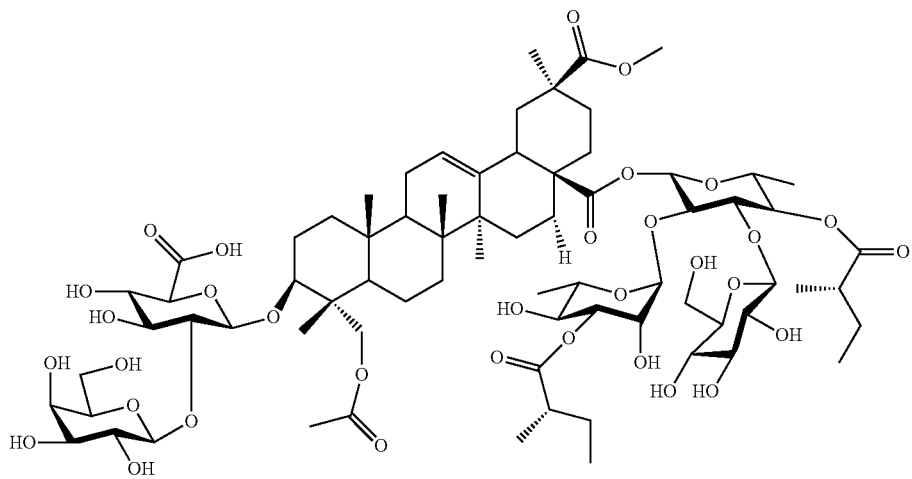

by MS/MS.

By the term '1712 component' is meant the triterpenoid glycosides identified as '1712 Peak' in FIG. 6. Suitably, the 1712 component in the UPLC-UV/MS methods described herein has a retention time of approximately 4.6 min and the primary component of the peak having a monoisotopic molecular weight of 1711.8. The primary 1712 component has been identified as having the putative structure:

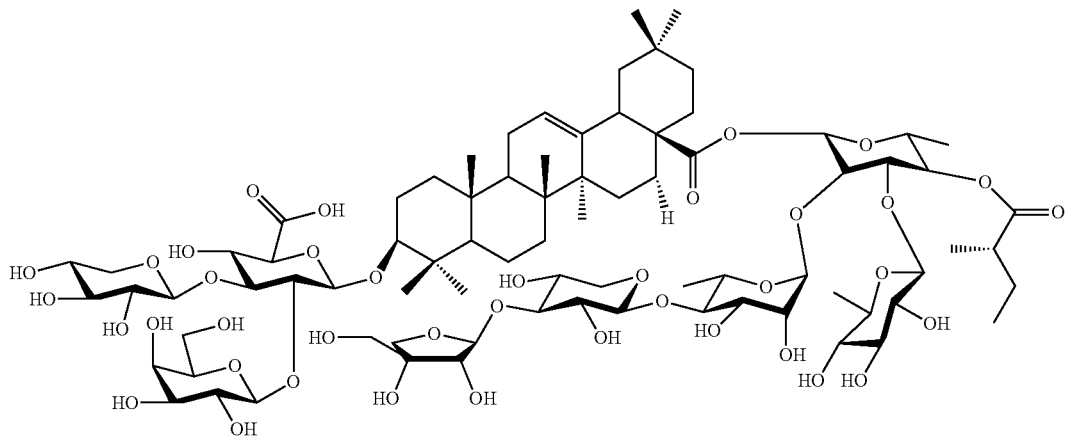

by MS/MS.

By the term '2118 component' is meant the triterpenoid glycosides identified as '4.607' in FIG. 6. Suitably the 2118 component in the UPLC-UV/MS methods described herein has a retention time of approximately 4.6 and the primary component of the peak having a monoisotopic molecular weight of 2118.

By the term 'QS-21 main peak' is meant the triterpenoid glycosides identified as 'QS-21' in FIG. 6. Suitably, QS-21 main peak in the UPLC-UV/MS methods described herein has a retention time of approximately 4.4 min and molecular weight components of 1855.9 (1856 component), 1987.9 (1988 component) and 2001.9 (2002 component) m/z. The QS-21 main peak may consist of QS-21A V1:
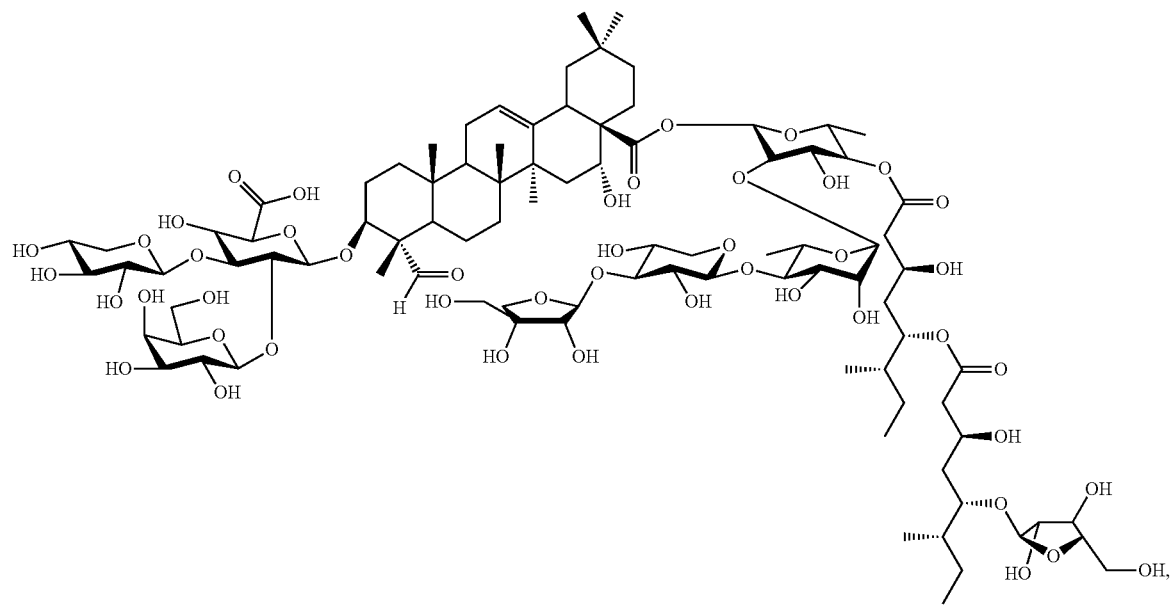
QS-21A V2:
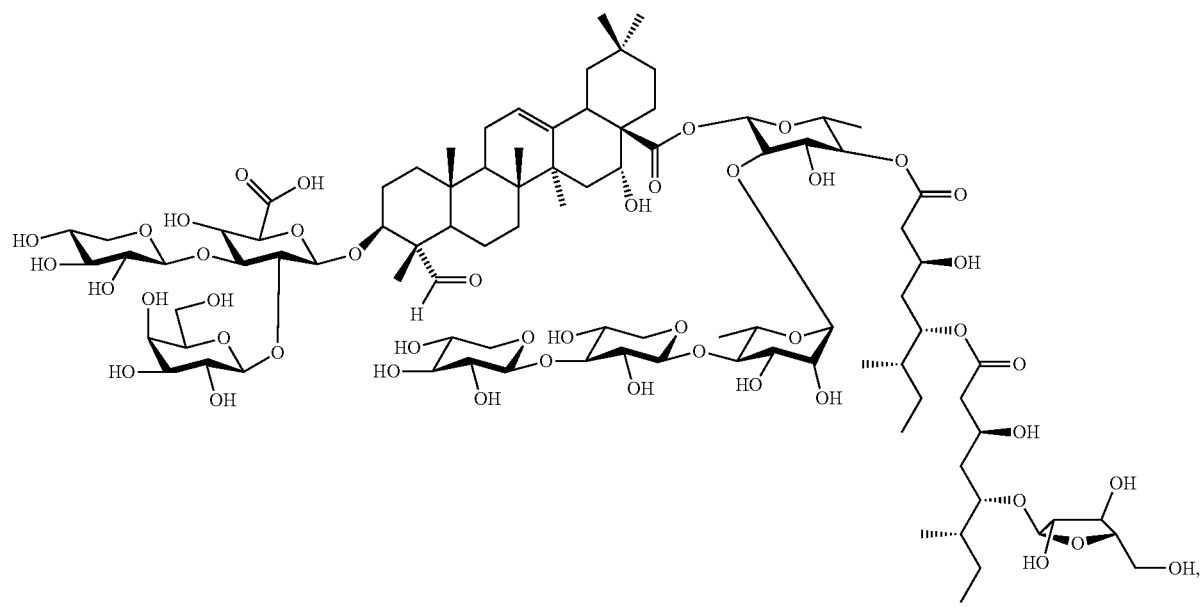

1856 component:

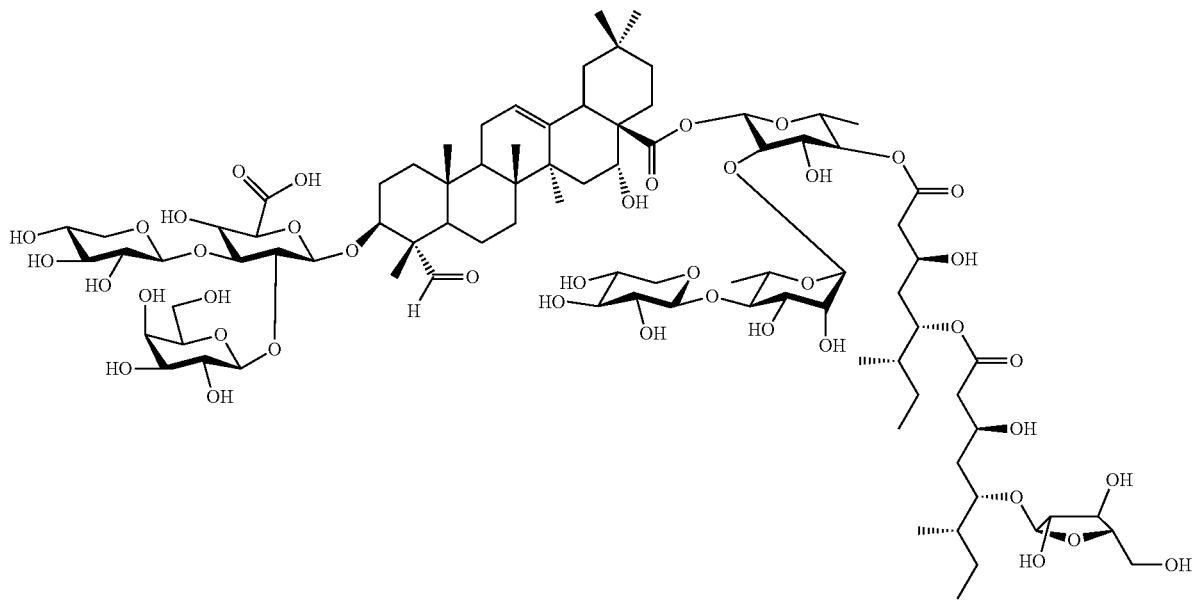

and 2002 component:

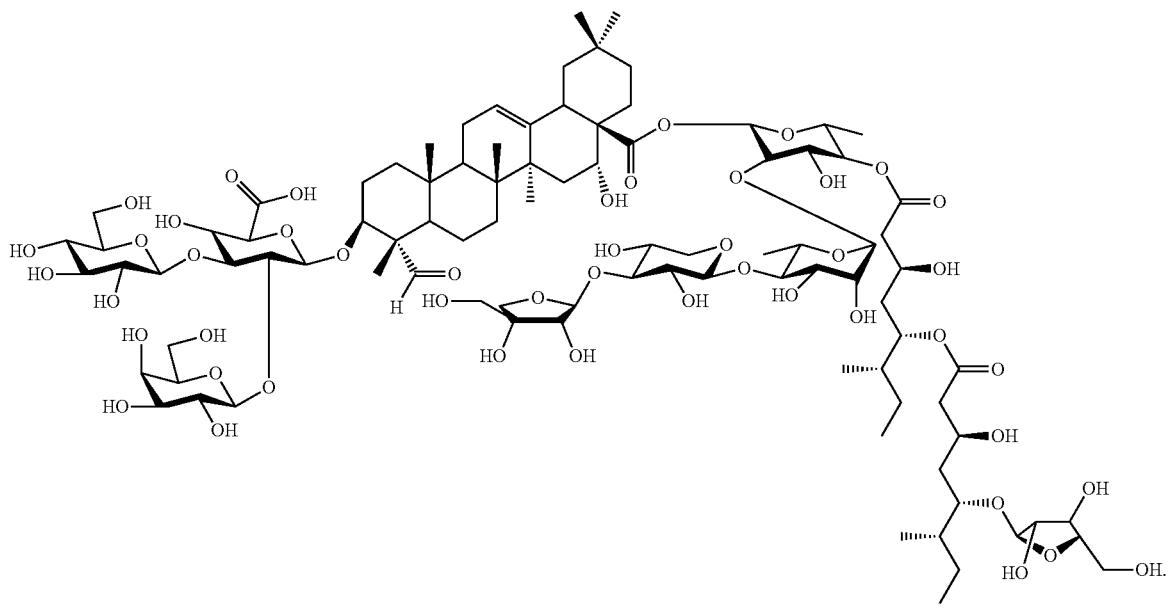

By the term 'QS-21 group' is meant the triterpenoid glycosides identified from the B-isomer to the peak preceding the lyo impurity in the UPLC-UV/MS methods described herein as having a retention time from approximately 4.0 min to approximately 4.7 min and having primary monoisotopic molecular weights of 1517.7 (1518 component), 1711.8 (1712 component), 1855.9 (1856 component), 1987.9 (1988 component), 2001.9 (2002 component), 2017.9 (2018 component) or 2118 (2118 component). The QS-21 group may consist of QS-21A V1:

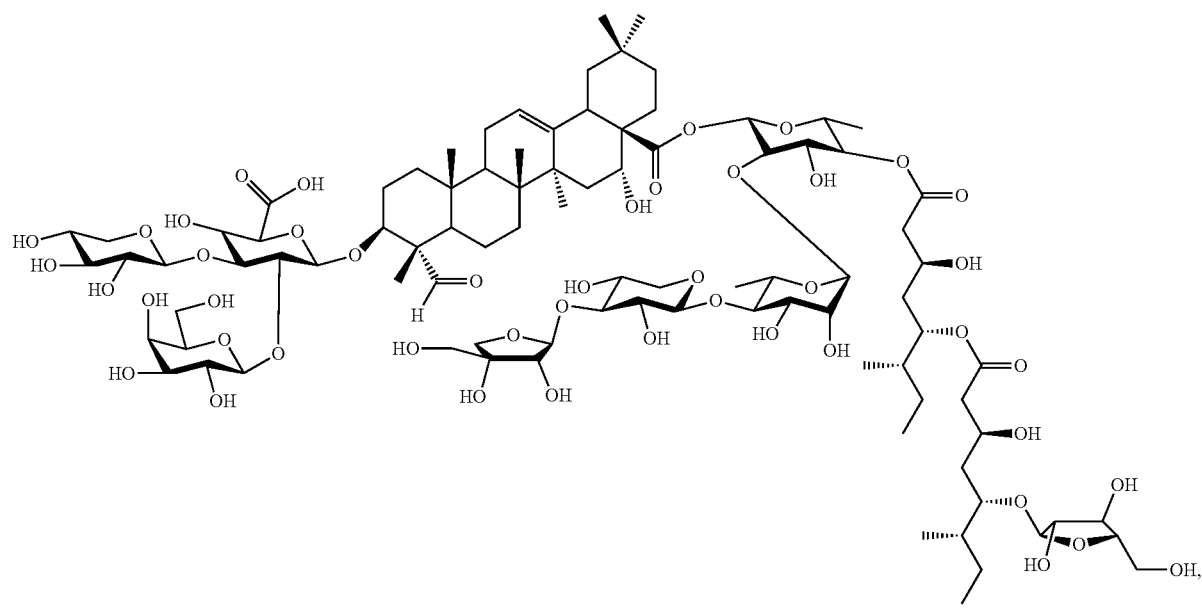
QS-21A V2:
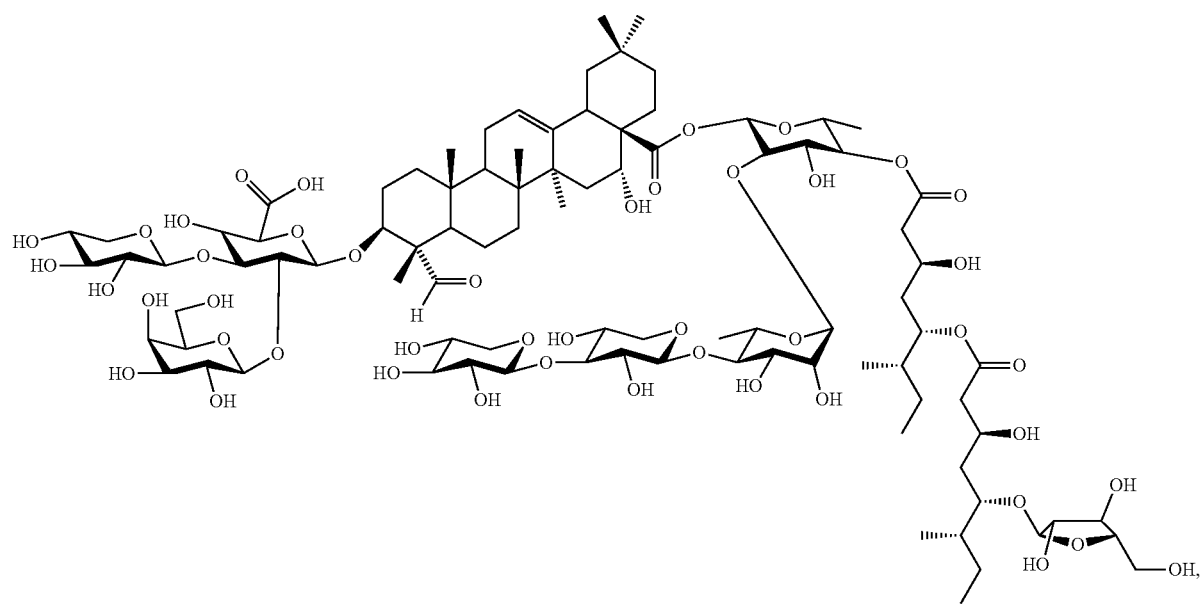

1856 component:
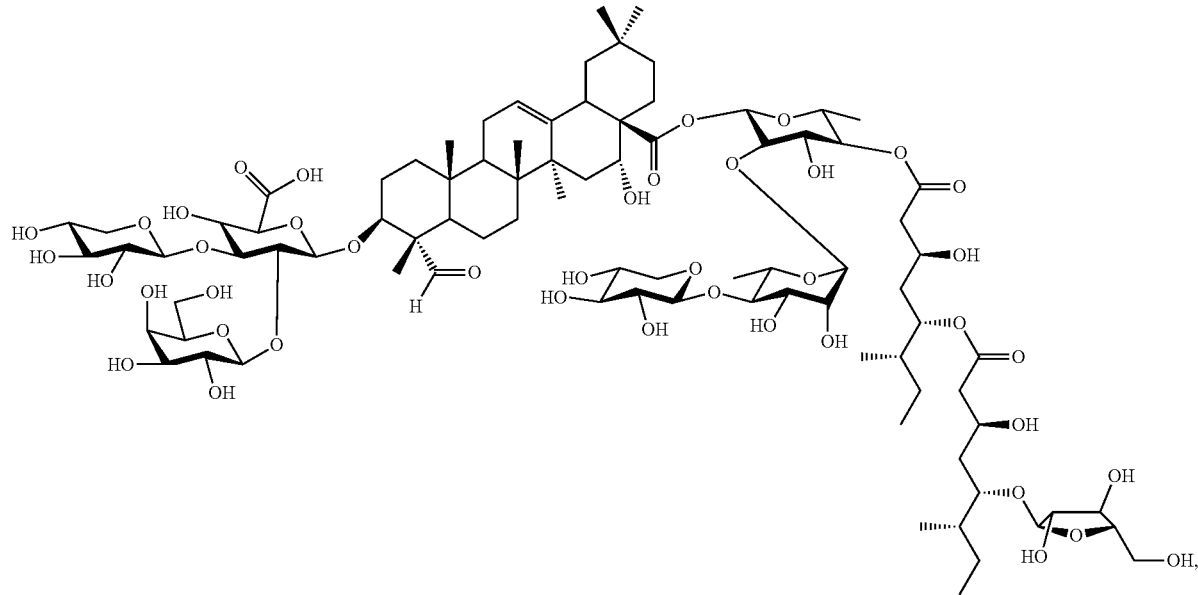
2002 component:
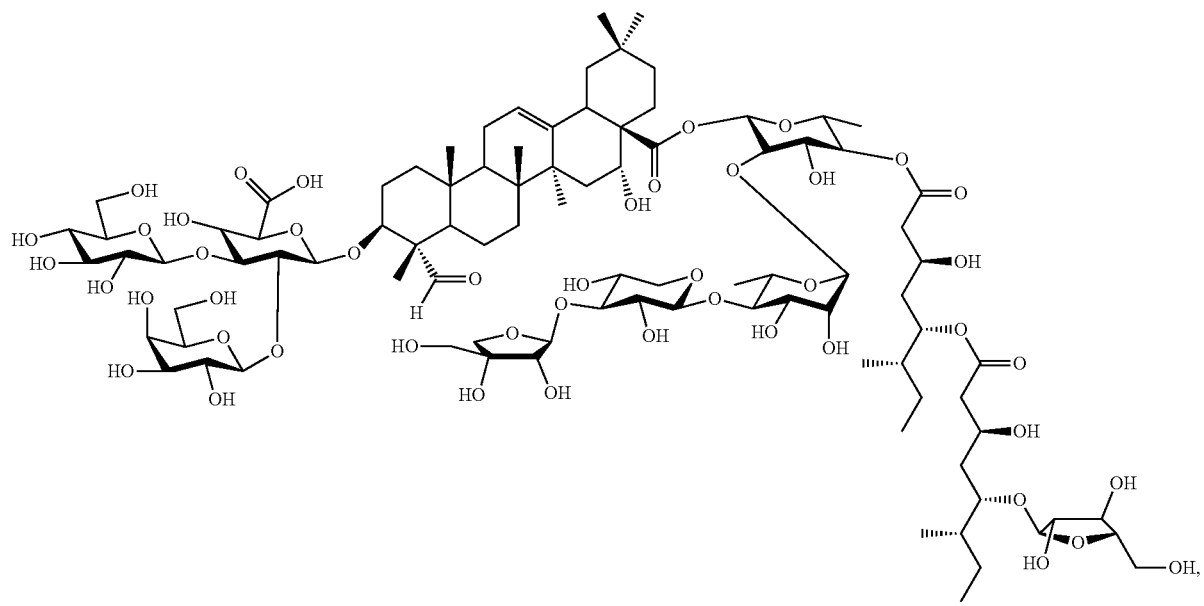

2018 component:
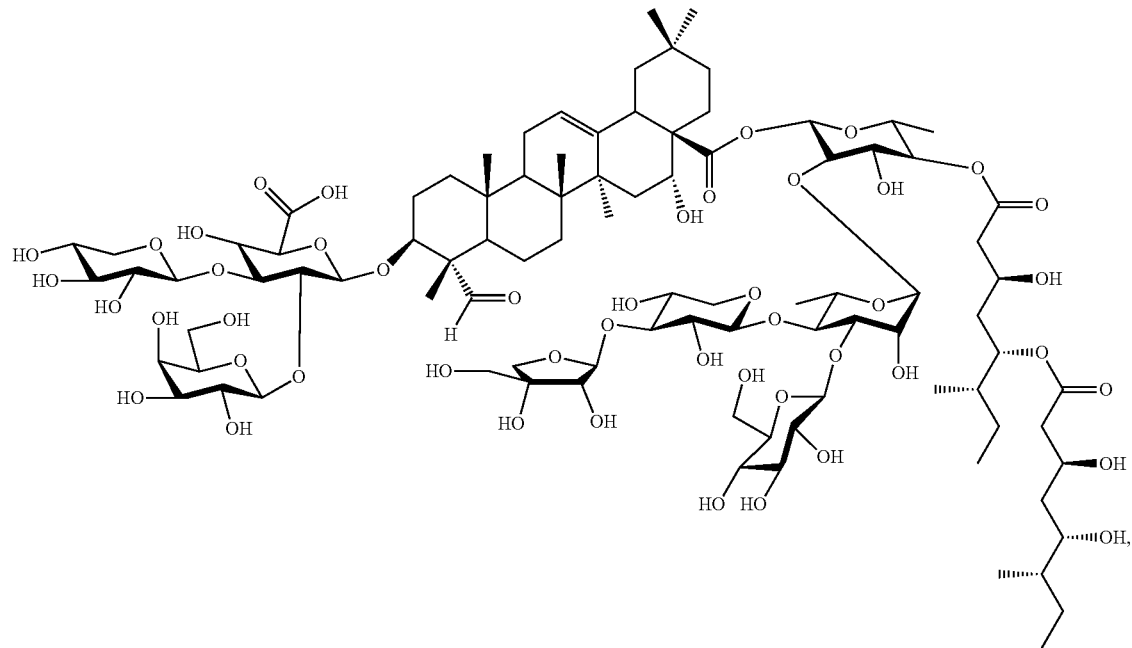
B-isomer:
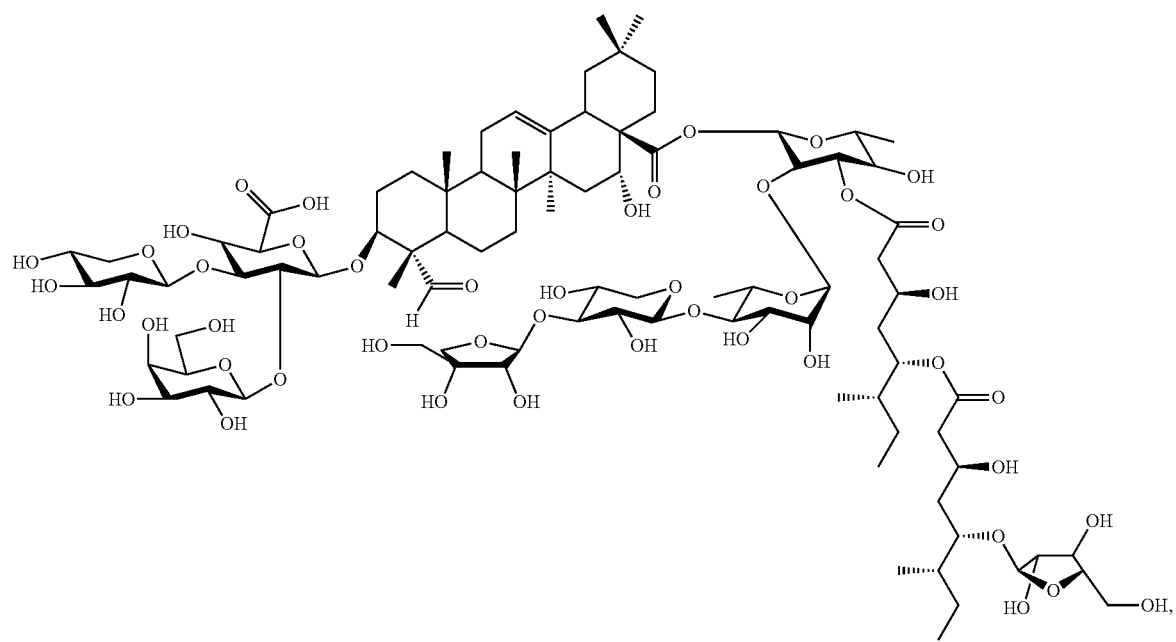

1518 component:

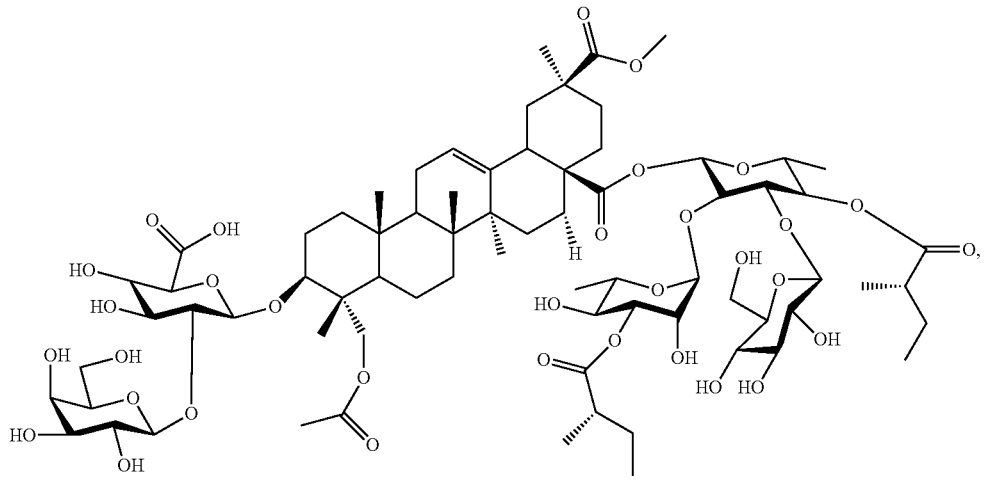

1712 component:

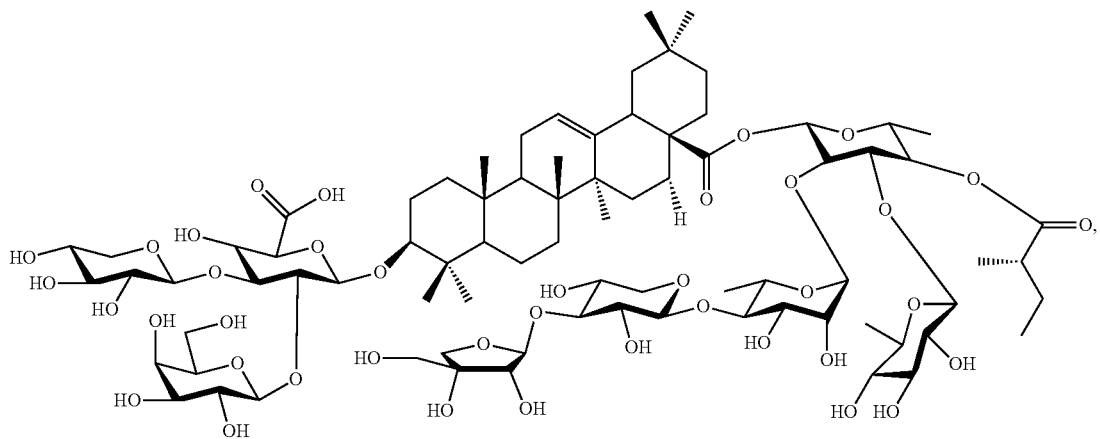

and 2118 component.

By the term 'largest peak outside QS-21 group' is meant the largest peak by UV, detectable in the UPLC-UV/MS methods described herein which is not part of the QS-21 group.

Figure 2:
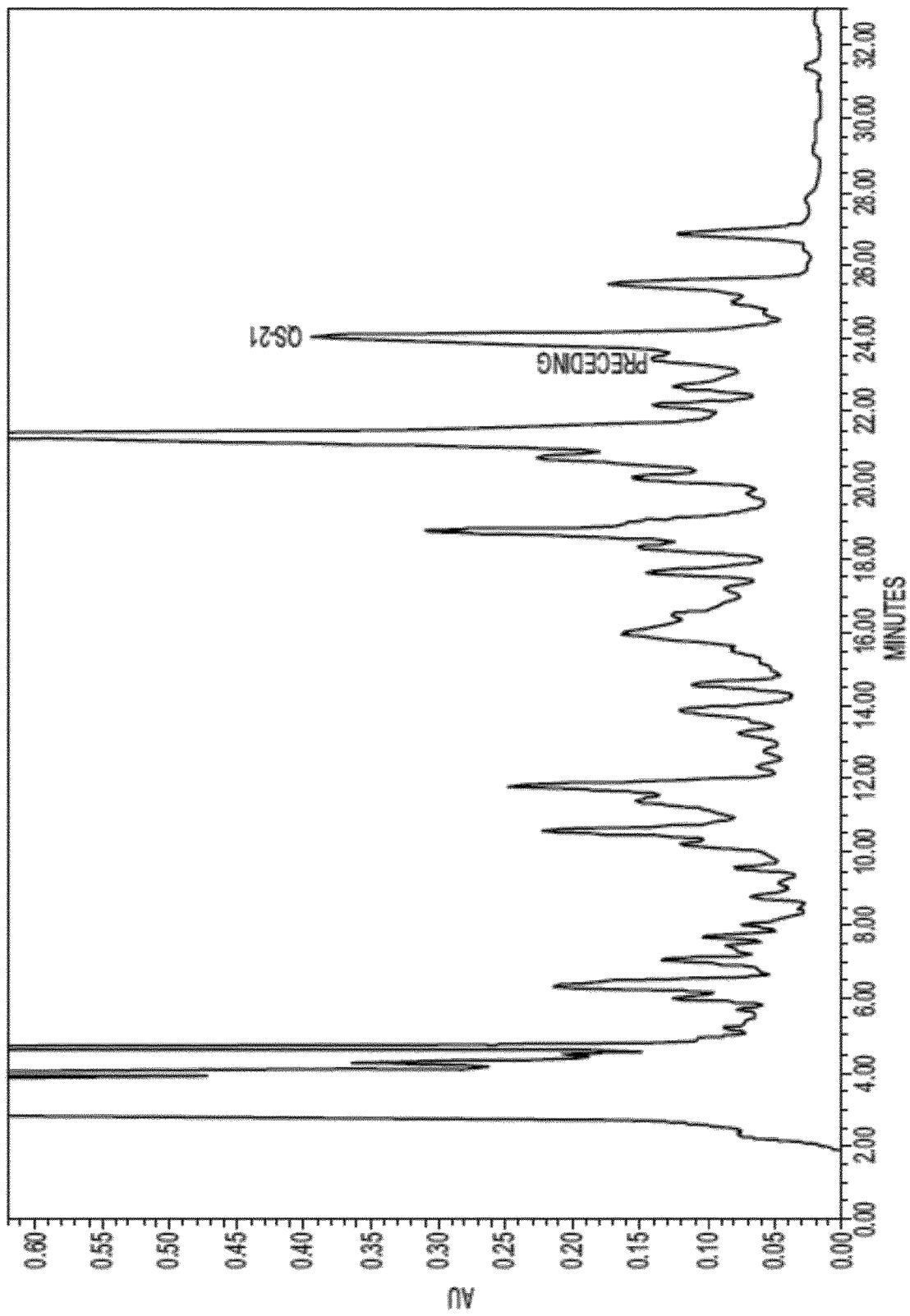

By the term 'Preceding peak' is meant the peak immediately preceding the QS-21 main peak in the HPLC-UV methods described herein (see FIG. 2).

By the term 'm/z' is meant the mass to charge ratio of the monoisotope peak. Unless otherwise specified, 'm/z' is determined by negative ion electrospray mass spectrometry.

By the term 'ion abundance' is meant the amount of a specified m/z measured in the sample, or in a given peak as required by the context. The mass chromatogram for the specified m/z may be extracted from the MS total ion chromatogram in the UPLC-UV/MS methods described herein. The mass chromatogram plots the signal intensity versus time. Ion abundance is measured as the area of the integrated peak. The area for a specified m/z/area for a relative reference m/z=relative abundance.

By the term 'UV absorbance at 214 nm' is meant the area of an integrated peak in the UV absorbance chromatogram.

The (area for a specified peak)/(area of all integrated peaks in the chromatogram)×100=percentage area for the specified peak.

By the term 'UV absorbance at 214 nm and relative ion abundance' is meant an estimate for the percentage of a given m/z for co-eluting species. (Percentage area for given UV peak)×(relative ion abundance for m/z of interest in given peak)/(sum of all relative ion abundance for given peak)=percentage of m/z of interest in the given UV peak, assumes relative ion abundance included for all coeluting species.

By the term 'wherein the monoisotope of the most abundant species is 1988 m/z' is meant the monoisotope of the most abundant species, first peak in the isotopic group with highest response per m/z is m/z 1987.9. The most abundant species may be determined by creating a combined spectrum across the entire total ion chromatogram using the UPLC-UV/MS method (negative ion electrospray) as described herein.

By the term 'dried' is meant that substantially all solvent has been removed. A dried extract will typically contain less than 5% solvent w/w (such as less than 5% water w/w). Suitably the dried extract will contain 100 ppm or less acetonitrile (w/w).

There is provided a method for the manufacture of a purified saponin extract containing at least 88% QS-21 main peak and >3 to 10% 2018 component by UV absorbance at 214 nm (such as those described herein), said method comprising the steps of:
(i) selecting *Quillaja saponaria* Molina material having a suitable 2018 component composition;
(ii) preparing a crude aqueous extract of the *Quillaja saponaria* Molina material under suitable conditions; and
(iii) purifying the crude aqueous extract to obtain the purified saponin extract.

The skilled person will appreciate that the composition of the purified saponin extract will depend on the *Quillaja saponaria* Molina material used, the conditions applied during aqueous extraction and the conditions applied during purification. Appropriate adaptation of these parameters can ensure a purified saponin extract of the desired composition. Step (ii) may comprise multiple parallel extractions, some or all of the products of which extractions are combined before proceeding to Step (iii). Step (iii) may comprise multiple parallel purifications, some or all of the products of which purifications are combined to obtain the final purified saponin extract. Optionally, purified saponin extracts resulting from Step (iii) may be obtained by a combination of purifying the crude aqueous extract and adding some 2018 component (i.e. '2018 spiking', e.g. as described in Example 4).

Although less desirable, the purified saponin extracts containing at least 88% QS-21 main peak and >3 to 10% 2018 component by UV absorbance at 214 nm (such as those described herein) can be prepared by initially obtaining highly purified individual components of QS-21 and then by combining such individual components in the required proportions.

Further, there is provided a method for the manufacture of a saponin extract comprising the steps of:
(i) selecting a crude aqueous extract of *Quillaja saponaria* Molina having a suitable 2018 component composition;
(ii) purifying the extract by reverse phase chromatography using a polystyrene resin; and
(iii) purifying the extract by reverse phase chromatography using a phenyl resin.

Desirably, the process comprises the steps of:
(i) selecting a crude aqueous extract of *Quillaja saponaria* Molina having a suitable 2018 component composition;
(ii) purifying the extract by polyvinylpyrollidone adsorption;
(iii) purifying the extract by diafiltration, ultrafiltration or dialysis;
(iv) purifying the extract by reverse phase chromatography using a polystyrene resin; and
(v) purifying the extract by reverse phase chromatography using a phenyl resin;
wherein step (ii) and (iii) may optionally be in reverse order or undertaken concurrently, though are typically in the order shown.

The crude aqueous extract of *Quillaja saponaria* Molina is obtained by aqueous extraction (but need not be in aqueous form, e.g. it may subsequently have been dried, subjected to solvent exchange or reconstituted into a different solvent). By the term 'crude aqueous extract of *Quillaja saponaria* Molina having a suitable 2018 component composition' is meant an aqueous extract of *Quillaja saponaria* Molina material, such as an extract of *Quillaja saponaria* Molina bark, the extract having a 2018 component to QS-21 main peak ratio of >0.075 (as determined by UPLC-UV absorbance at 214 nm). Suitably, the extract has a 2018 component to QS-21 main peak ratio of >0.078.

By the term '*Quillaja saponaria* Molina material having a suitable 2018 component composition' is meant *Quillaja saponaria* Molina material, such as *Quillaja saponaria* Molina bark, which can provide an extract having a 2018 component to QS-21 main peak ratio of >0.075 (as determined by UPLC-UV absorbance at 214 nm). Suitably, the extract has a 2018 component to QS-21 main peak ratio of >0.078.

Suitably, the Preceding peak to QS-21 main peak ratio is 0.45 or lower, in particular 0.4 or lower (as determined by HPLC-UV absorbance at 214 nm). The Preceding peak to QS-21 main peak ratio may be 0.05 or higher, in particular 0.1 or higher (as determined by HPLC-UV absorbance at 214 nm).

Typically, the crude aqueous extract is a bark extract. Suitably the QS-21 main peak content in an aqueous solution of crude aqueous extract of *Quillaja saponaria* Molina is at least 1 g/L, such as at least 2 g/L, especially at least 2.5 g/L and in particular at least 2.8 g/L (e.g. as determined by UV absorbance relative to a control sample of known concentration).

Suitably the step of selecting a crude aqueous extract of *Quillaja saponaria* Molina having a suitable 2018 component composition, includes testing the composition to determine the 2018 component content.

The step of purifying the extract by polyvinylpyrollidone adsorption involves treatment of the extract with polyvinylpyrollidone resin. Typically, the extract is agitated with the polyvinylpyrollidone resin. The extract may subsequently be separated from the polyvinylpyrollidone resin with adsorbed impurities by filtration. This step of the process generally removes polyphenolic impurities such as tannins.

The step of purifying the extract by diafiltration, ultrafiltration or dialysis, is suitably purification by diafiltration. typically using tangential flow. An appropriate example of a membrane is a 30 kDa cut-off. This step of the process generally removes salts, sugars and other low molecular weight materials.

The step of purifying the extract by reverse phase chromatography using a polystyrene resin typically uses acetonitrile and water as solvent, usually acidified with a suitable acid such as acetic acid. An example of a suitable resin is Amberchrom XT20. Chromatography may be undertaken using isocratic conditions, though is typically operated under a solvent gradient (continuous, such as linear, or stepped), such as those provided in the Examples. This step of the process generally removes non-saponin material and enriches the desired saponins. Selected fractions may be pooled to maximise yield of material matching the required criteria (typically % QS-21•18%, as determined by UV absorbance following HPLC-UV and 2018/QS-21 Ratio >0.054, as determined by UV absorbance following UPLC-UV). Each polystyrene chromatography run is typically at a scale of between 25-200 g of QS-21, such as between 50-150 g and in particular between 70-110 g (amounts being based on QS-21 main peak content in the material by UV).

Purifying the extract by reverse phase chromatography using a phenyl resin typically uses acetonitrile and water as solvent, usually acidified with a suitable acid such as acetic acid. Chromatography may be undertaken using a solvent gradient (continuous, such as linear, or stepped), though is typically operated under isocratic conditions. This step of the process provides the final purification of the desired saponins. Selected fractions may be pooled to maximise yield of material matching the required criteria (typically % QS-21 group•98.5, % QS-21 main peak•94.5, 2002/1988•0.027, %2018 >2.7%, main peak outside of the QS-21 group •1%, as determined by UPLC-UV/MS). Each phenyl chromatography run is typically at a scale of between 4-40 g of QS-21, such as between 10-30 g and in particular between 13-21 g (amounts being based on QS-21 main peak content in the material by UV).

The method may comprise the further step of removing solvent to provide a dried saponin extract. Consequently, the invention provides a method for the manufacture of a saponin extract comprising the steps of:
  (i) selecting a crude aqueous extract of *Quillaja saponaria* Molina having a suitable 2018 component composition;
  (ii) purifying the extract by reverse phase chromatography using a polystyrene resin;
  (iii) purifying the extract by reverse phase chromatography using a phenyl resin; and
  (iv) removing solvent to provide a dried saponin extract.

The invention also provides a method for the manufacture of a saponin extract comprising the steps of:
  (i) selecting a crude aqueous extract of *Quillaja saponaria* Molina having a suitable 2018 component composition;
  (ii) purifying the extract by polyvinylpyrollidone adsorption;
  (iii) purifying the extract by diafiltration, ultrafiltration or dialysis;
  (iv) purifying the extract by reverse phase chromatography using a polystyrene resin;
  (v) purifying the extract by reverse phase chromatography using a phenyl resin; and
  (vi) removing solvent to provide a dried saponin extract.
wherein step (ii) and (iii) may optionally be in reverse order or undertaken concurrently, though are typically in the order shown.

In order to improve drying efficiency, it may be desirable to undertake further steps of concentrating the extract, such as by capture and release using an appropriate technique, for example reverse phase chromatography (e.g. using a C8 resin), and/or exchanging the solvent in advance of the drying step.

Also provided is a method for the manufacture of a saponin extract comprising the steps:
  (i) selecting a crude aqueous extract of *Quillaja saponaria* Molina having a suitable 2018 component composition;
  (ii) purifying the extract by polyvinylpyrollidone adsorption;
  (iii) purifying the extract by diafiltration, ultrafiltration or dialysis;
  (iv) purifying the extract by reverse phase chromatography using a polystyrene resin;
  (v) purifying the extract by reverse phase chromatography using a phenyl resin;
  (vi) optionally concentrating the extract;
  (vii) optionally exchanging the solvent; and
  (viii) removing the remaining solvent to provide a dried saponin extract;
wherein steps (vi) and (vii) may be optionally be in reverse order or undertaken concurrently, though are typically in the order shown.

Also provided is a method for the manufacture of a saponin extract comprising the steps:
  (i) selecting a crude aqueous extract of *Quillaja saponaria* Molina having a suitable 2018 component composition;
  (ii) purifying the extract by polyvinylpyrollidone adsorption;
  (iii) purifying the extract by diafiltration, ultrafiltration or dialysis;
  (iv) purifying the extract by reverse phase chromatography using a polystyrene resin;
  (v) purifying the extract by reverse phase chromatography using a phenyl resin;
  (vi) concentrating the extract by reverse phase chromatography using a C8 resin;
  (vii) exchanging the solvent; and
  (viii) removing the remaining solvent to provide a dried saponin extract.

Concentration of the extract may be performed using any suitable technique. For example, concentration may be performed using a capture and release methodology, such as reverse phase chromatography, in particular using a C8 resin. The reverse phase chromatography typically uses acetonitrile and water as solvent, usually acidified with a suitable acid such as acetic acid. Chromatography is typically operated under a solvent gradient, with the saponin extract captured in low organic solvent and eluted in high organic solvent, in particular, a stepped solvent gradient.

Exchanging the solvent may be performed using any suitable technique, in particular diafiltration, ultrafiltration or dialysis, especially diafiltration. Solvent exchange may be useful, for example, in reducing the acetonitrile content such as described in WO2014016374. A suitable membrane may be selected to allow solvent exchange while retaining the saponin extract, such as a 1 kDa membrane.

Drying, by removing the solvent, may be undertaken by any suitable means, in particular by lyophilisation. During drying, degradation of the saponin extract can occur, leading to the formation of lyo impurity. Consequently, it is desirable to dry under conditions which limit formation of lyo impurity, such as by limiting the drying temperature and/or drying time. Suitably removal of solvent is undertaken by a single lyophilisation process. The extent of drying required will depend on the nature of the solvent, for example non-pharmaceutically acceptable solvents will desirably be removed to a high degree, whereas some pharmaceutically acceptable solvents (such as water) may be removed to a lesser degree.

Suitably the methods of the present invention are undertaken at a scale of between 25-1000 g of QS-21, such as between 50-500 g and in particular between 100-500 g (amounts being based on QS-21 main peak content in the material by UV).

Also provided is a method for identifying a crude aqueous extract of *Quillaja saponaria* Molina for use in the manufacture of a purified saponin extract, such as the saponin extracts of the invention, said method comprising the steps of:
  (i) determining the 2018 component to QS-21 main peak ratio by UPLC-UV absorbance at 214 nm;
  (ii) selecting a crude extract having a 2018 component to QS-21 main peak ratio of >0.075.

In one embodiment, the crude aqueous extract selected in step (ii) has a 2018 component to QS-21 main peak ratio of >0.078.

The invention also provides a method for the determining the 2018 component to QS-21 main peak ratio in a crude aqueous extract of *Quillaja saponaria* Molina, said method comprising the steps of:

(i) determining the 2018 component content in the crude aqueous extract of *Quillaja saponaria* Molina by UPLC-UV absorbance at 214 nm;
(ii) determining the QS-21 main peak content in the crude aqueous extract of *Quillaja saponaria* Molina by UPLC-UV absorbance at 214 nm; and
(iii) comparing the 2018 component content to the QS-21 main peak content to determine the 2018 component to QS-21 main peak ratio.

There is provided the use of a saponin extract of the present invention in the manufacture of a medicament. Additionally, provided is a saponin extract of the present invention for use as a medicament, in particular as an adjuvant. Also provided is an adjuvant composition comprising a saponin extract of the present invention.

The saponin extracts of the present invention may be combined with further adjuvants, such as a TLR4 agonist, in particular lipopolysaccharide TLR4 agonists, such as lipid A derivatives, especially a monophosphoryl lipid A e.g. 3-de-O-acylated monophosphoryl lipid A (3D-MPL). 3D-MPL is sold under the name 'MPL' by GlaxoSmithKline Biologicals N.A. and is referred throughout the document as 3D-MPL. See, for example, U.S. Pat. Nos. 4,436,727; 4,877,611; 4,866,034 and 4,912,094. 3D-MPL can be produced according to the methods described in GB 2 220 211 A. Chemically it is a mixture of 3-deacylated monophosphoryl lipid A with 4, 5 or 6 acylated chains.

Other TLR4 agonists which may be of use in the present invention include Glucopyranosyl Lipid Adjuvant (GLA) such as described in WO2008/153541 or WO2009/143457 or the literature articles Coler R N et al. (2011) Development and Characterization of Synthetic Glucopyranosyl Lipid Adjuvant System as a Vaccine Adjuvant. PLoS ONE 6(1): e16333. doi:10.1371/journal.pone.0016333 and Arias M A et al. (2012) Glucopyranosyl Lipid Adjuvant (GLA), a Synthetic TLR4 Agonist, Promotes Potent Systemic and Mucosal Responses to Intranasal Immunization with HIVgp140. PLoS ONE 7(7): e41144. doi:10.1371/journal.pone.0041144. WO2008/153541 or WO2009/143457 are incorporated herein by reference for the purpose of defining TLR4 agonists which may be of use in the present invention.

A particular alkyl glucosaminide phosphate (AGP) of interest is set forth as follows:

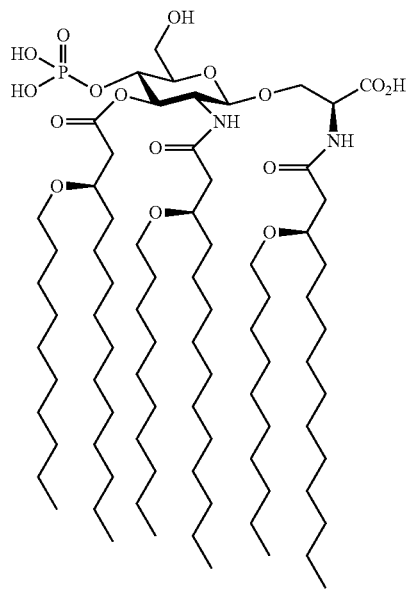

CRX601

TLR4 agonists of interest include:

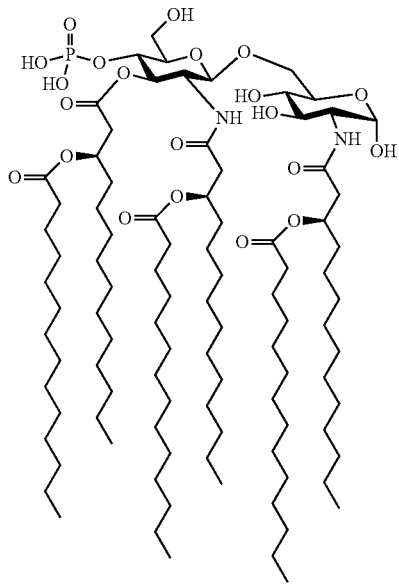

A.

3-deacyl monophosphoryl hexa-acyl lipid

Another TLR4 agonist of interest is:

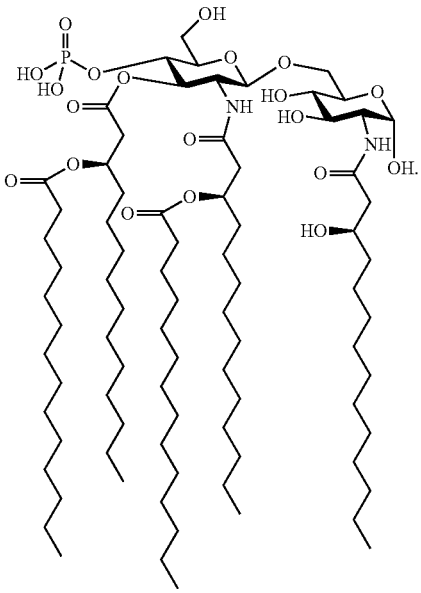

3-deacyl monophosphoryl lipid A

A TLR4 agonist of interest is dLOS (as described in Han, 2014):

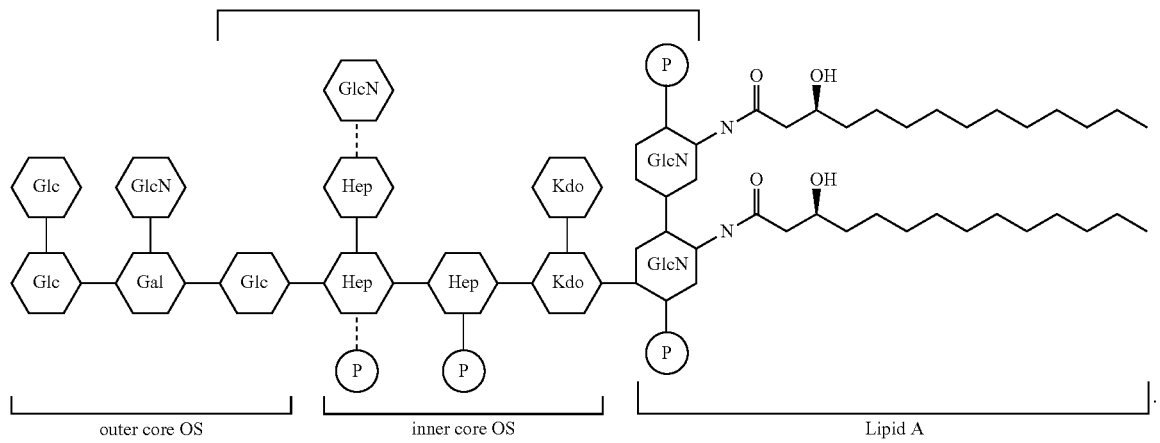

A typical adult human dose of adjuvant will comprise a saponin extract at amounts between 1 and 100 ug per human dose. The saponin extract may be used at a level of about 50 ug. Examples of suitable ranges are 40-60 ug, suitably 45-55 ug or 49-51 ug, such as 50 ug. In a further embodiment, the human dose comprises saponin extract at a level of about 25 ug. Examples of lower ranges include 20-30 ug, suitably 22-28 ug or 24-26 ug, such as 25 ug. Human doses intended for children may be reduced compared to those intended for an adult (e.g. reduction by 50%).

The TLR4 agonists, such as a lipopolysaccharide, such as 3D-MPL, can be used at amounts between 1 and 100 ug per human dose. 3D-MPL may be used at a level of about 50 ug. Examples of suitable ranges are 40-60 ug, suitably 45-55 ug or 49-51 ug, such as 50 ug. In a further embodiment, the human dose comprises 3D-MPL at a level of about 25 ug. Examples of lower ranges include 20-30 ug, suitably 22-28 ug or 24-26 ug, such as 25 ug. Human doses intended for children may be reduced compared to those intended for an adult (e.g. reduction by 50%).

When both a TLR4 agonist and a saponin extract are present in the adjuvant, then the weight ratio of TLR4 agonist to saponin is suitably between 1:5 to 5:1, suitably 1:1. For example, where 3D-MPL is present at an amount of 50 ug or 25 ug, then suitably QS-21 may also be present at an amount of 50 ug or 25 ug per human dose.

Adjuvants may also comprise a suitable carrier, such as an emulsion (e.g. and oil in water emulsion) or liposomes.

Liposomes

The term 'liposome' is well known in the art and defines a general category of vesicles which comprise one or more lipid bilayers surrounding an aqueous space. Liposomes thus consist of one or more lipid and/or phospholipid bilayers and can contain other molecules, such as proteins or carbohydrates, in their structure. Because both lipid and aqueous phases are present, liposomes can encapsulate or entrap water-soluble material, lipid-soluble material, and/or amphiphilic compounds.

Liposome size may vary from 30 nm to several um depending on the phospholipid composition and the method used for their preparation.

The liposomes of use in the present invention suitably contain DOPC, or, consist essentially of DOPC and sterol (with saponin and optionally TLR4 agonist).

In the present invention, the liposome size will be in the range of 50 nm to 200 nm, especially 60 nm to 180 nm, such as 70-165 nm. Optimally, the liposomes should be stable and have a diameter of ~100 nm to allow convenient sterilization by filtration.

Structural integrity of the liposomes may be assessed by methods such as dynamic light scattering (DLS) measuring the size (Z-average diameter, Zav) and polydispersity of the liposomes, or, by electron microscopy for analysis of the structure of the liposomes. In one embodiment the average particle size is between 95 and 120 nm, and/or, the polydispersity (PdI) index is not more than 0.3 (such as not more than 0.2).

Further Excipients

In a further embodiment, a buffer is added to the composition. The pH of a liquid preparation is adjusted in view of the components of the composition and necessary suitability for administration to the subject. Suitably, the pH of a liquid mixture is at least 4, at least 5, at least 5.5, at least 5.8, at least 6. The pH of the liquid mixture may be less than 9, less than 8, less than 7.5 or less than 7. In other embodiments, pH of the liquid mixture is between 4 and 9, between 5 and 8, such as between 5.5 and 8. Consequently, the pH will suitably be between 6-9, such as 6.5-8.5. In a particularly preferred embodiment the pH is between 5.8 and 6.4. An appropriate buffer may be selected from acetate, citrate, histidine, maleate, phosphate, succinate, tartrate and TRIS. In one embodiment, the buffer is a phosphate buffer such as $Na/Na_2PO_4$, $Na/K_2PO_4$ or $K/K_2PO_4$.

The buffer can be present in the liquid mixture in an amount of at least 6 mM, at least 10 mM or at least 40 mM. The buffer can be present in the liquid mixture in an amount of less than 100 mM, less than 60 mM or less than 40 mM.

It is well known that for parenteral administration solutions should have a pharmaceutically acceptable osmolality to avoid cell distortion or lysis. A pharmaceutically acceptable osmolality will generally mean that solutions will have an osmolality which is approximately isotonic or mildly hypertonic. Suitably the compositions (when reconstituted, if presented in dried form) will have an osmolality in the range of 250 to 750 mOsm/kg, for example, the osmolality may be in the range of 250 to 550 mOsm/kg, such as in the range of 280 to 500 mOsm/kg. In a particularly preferred embodiment the osmolality may be in the range of 280 to 310 mOsm/kg. Osmolality may be measured according to techniques known in the art, such as by the use of a commercially available osmometer, for example the Advanced® Model 2020 available from Advanced Instruments Inc. (USA).

An "isotonicity agent" is a compound that is physiologically tolerated and imparts a suitable tonicity to a formulation to prevent the net flow of water across cell membranes that are in contact with the formulation. In some embodiments, the isotonicity agent used for the composition is a salt (or mixtures of salts), conveniently the salt is sodium chloride, suitably at a concentration of approximately 150 nM. In other embodiments, however, the composition comprises a non-ionic isotonicity agent and the concentration of sodium chloride in the composition is less than 100 mM, such as less than 80 mM, e.g. less than 50 mM, such as less 40 mM, less than 30 mM and especially less than 20 mM. The ionic strength in the composition may be less than 100 mM, such as less than 80 mM, e.g. less than 50 mM, such as less 40 mM or less than 30 mM.

In a particular embodiment, the non-ionic isotonicity agent is a polyol, such as sucrose and/or sorbitol. The concentration of sorbitol may e.g. between about 3% and about 15% (w/v), such as between about 4% and about 10% (w/v). Adjuvants comprising an immunologically active saponin fraction and a TLR4 agonist wherein the isotonicity agent is salt or a polyol have been described in WO2012/080369.

Suitably, a human dose volume of between 0.05 ml and 1 ml, such as between 0.1 and 0.5 ml, in particular a dose volume of about 0.5 ml, or 0.7 ml. The volumes of the compositions used may depend on the delivery route and location, with smaller doses being given by the intradermal route. A unit dose container may contain an overage to allow for proper manipulation of materials during administration of the unit dose.

The ratio of saponin:DOPC will typically be in the order of 1:50 to 1:10 (w/w), suitably between 1:25 to 1:15 (w/w), and preferably 1:22 to 1:18 (w/w), such as 1:20 (w/w).

Suitably the saponin is presented in a less reactogenic composition where it is quenched with an exogenous sterol, such as cholesterol. Cholesterol is disclosed in the Merck Index, 13th Edn., page 381, as a naturally occurring sterol found in animal fat. Cholesterol has the formula ($C_{27}H_{46}O$) and is also known as (3•)-cholest-5-en-3-ol.

The ratio of saponin:sterol will typically be in the order of 1:100 to 1:1 (w/w), suitably between 1:10 to 1:1 (w/w), and preferably 1:5 to 1:1 (w/w). Suitably excess sterol is present, the ratio of saponin:sterol being at least 1:2 (w/w). In one embodiment, the ratio of saponin:sterol is 1:5 (w/w). In one embodiment, the sterol is cholesterol.

The amount of liposome (weight of lipid and sterol) will typically be in the range of 0.1 mg to 10 mg per human dose of a composition, in particular 0.5 mg to 2 mg per human dose of a composition.

In a particularly suitable embodiment, liposomes used in the invention comprise DOPC and a sterol, in particular cholesterol. Thus, in a particular embodiment, a composition used in the invention comprises saponin extract in the form of a liposome, wherein said liposome comprises DOPC and a sterol, in particular cholesterol.

A particular adjuvant of interest features liposomes comprising DOPC and cholesterol, with TLR4 agonist and a saponin extract of the invention, especially 3D-MPL and a saponin extract of the invention.

Another adjuvant of interest features liposomes comprising DOTAP and DMPC, with TLR4 agonist and a saponin extract of the invention, especially dLOS and a saponin extract of the invention.

Antigens

The adjuvants prepared according to the present invention may be utilised in conjunction with an immunogen or antigen. In some embodiments a polynucleotide encoding the immunogen or antigen is provided.

The adjuvant may be administered to a subject separately from an immunogen or antigen, or the adjuvant may be combined, either during manufacturing or extemporaneously, with an immunogen or antigen to provide an immunogenic composition for combined administration.

As used herein, a subject is a mammalian animal, such as a rodent, non-human primate, or human.

Consequently, there is provided a method for the preparation of an immunogenic composition comprising an immunogen or antigen, or a polynucleotide encoding the immunogen or antigen, said method comprising the steps of:
(i) preparing an adjuvant composition comprising a saponin extract of the present invention;
(ii) mixing the adjuvant with an immunogen or antigen, or a polynucleotide encoding the immunogen or antigen.

There is also provided the use of an adjuvant comprising a saponin extract of the present invention in the manufacture of a medicament. Suitably the medicament comprises an immunogen or antigen, or a polynucleotide encoding the immunogen or antigen.

Further provided is an adjuvant comprising a saponin extract of the present invention for use as a medicament. Suitably the medicament comprises an immunogen or antigen, or a polynucleotide encoding the immunogen or antigen.

By the term immunogen is meant a polypeptide which is capable of eliciting an immune response. Suitably the immunogen is an antigen which comprises at least one B or T cell epitope. The elicited immune response may be an antigen specific B cell response, which produces neutralizing antibodies. The elicited immune response may be an antigen specific T cell response, which may be a systemic and/or a local response. The antigen specific T cell response may comprise a CD4+ T cell response, such as a response involving CD4+ T cells expressing a plurality of cytokines, e.g. IFNgamma, TNFalpha and/or IL2. Alternatively, or additionally, the antigen specific T cell response comprises a CD8+ T cell response, such as a response involving CD8+ T cells expressing a plurality of cytokines, e.g., IFNgamma, TNFalpha and/or IL2.

The antigen may be derived (such as obtained from) from a human or non-human pathogen including, e.g., bacteria, fungi, parasitic microorganisms or multicellular parasites which infect human and non-human vertebrates, or from a cancer cell or tumor cell.

In one embodiment the antigen is a recombinant protein, such as a recombinant prokaryotic protein.

In one embodiment, the antigen is derived from *Plasmodium* spp. (such as *Plasmodium falciparum*), *Mycobacterium* spp. (such as *Mycobacterium tuberculosis* (TB)), Varicella Zoster Virus (VZV), human respiratory syncytial virus, Human Immunodeficiency Virus (HIV), *Moraxella* spp. (such as *Moraxella catarrhalis*) or nontypable *Haemophilus influenzae* (ntHi).

The antigen may comprise or consist of preparations derived from parasites that cause malaria such as *Plasmodium falciparum* or *Plasmodium vivax*.

In one embodiment, the antigen may be the *Plasmodium falciparum* circumsporozoite (CS) protein or a variant thereof. A suitable variant of the CS protein may be a variant wherein parts of the CS protein are in the form of a hybrid protein with the surface antigen S from hepatitis B (HBsAg). The CS variant antigen may e.g. be in the form of a hybrid protein comprising substantially all the C-terminal portion of the CS protein, four or more tandem repeats of the CS protein immunodominant region, and HBsAg. The hybrid protein may comprise a sequence which contains at least 160 amino acids and which is substantially homologous to the C-terminal portion of the CS protein, but devoid of the hydrophobic anchor sequence. The CS protein may be devoid of the last 12 amino-acids from the C terminal. Further, it may contain 4 or more e.g. 10 or more Asn-Ala-Asn-Pro tetrapeptide (NANP) repeat motifs.

The hybrid protein for use in the invention may be a protein which comprises a portion of the CS protein of *P. falciparum* substantially as corresponding to amino acids 207-395 of *P. falciparum* clone 3D7, derived from the strain NF54 fused in frame via a linear linker to the N-terminus of HBsAg. The linker may comprise a portion of preS2 from HBsAg. CS constructs suitable for use in the present invention are outlined in WO93/10152, which granted in the US as U.S. Pat. Nos. 5,928,902 and 6,169,171, both of which are incorporated by reference for the purpose of describing suitable proteins for use in the present invention.

A particular hybrid protein for use in the invention is the hybrid protein known as RTS (SEQ ID No. 1, also described in WO2015/150568, WO93/10152 (wherein it is denoted RTS*) and in WO98/05355, which consists of:
   a methionine residue
   three amino acid residues, Met Ala Pro
   a stretch of 189 amino acids representing amino acids 207 to 395 of the CS protein of *P. falciparum* strain 3D7
   an glycine residue
   four amino acid residues, Pro Val Thr Asn, representing the four carboxy terminal residues of the hepatitis B virus (adw serotype) preS2 protein, and
   a stretch of 226 amino acids, encoded by nucleotides 1653 to 2330, and specifying the S protein of hepatitis B virus (adw serotype).
RTS may be in the form of RTS,S mixed particles. RTS,S particles comprise two polypeptides, RTS and S, that may be synthesized simultaneously and spontaneously form composite particulate structures (RTS,S).

The antigen may comprise or consist of preparations derived from *Mycobacterium* spp., such as *Mycobacterium bovis* or *Mycobacterium tuberculosis*, in particular *Mycobacterium tuberculosis*.

Antigens of interest in the field of tuberculosis include Rv1196 and Rv0125. Rv1196 (described, for example, by the name Mtb39a in Dillon et al Infection and Immunity 1999 67(6): 2941-2950) is highly conserved, with 100% sequence identity across H37Rv, C, Haarlem, CDC1551, 94-M4241A, 98-R604INH-RIF-EM, KZN605, KZN1435, KZN4207, KZNR506 strains, the F11 strain having a single point mutation Q30K (most other clinical isolates have in excess of 90% identity to H37Rv). Rv0125 (described, for example, by the name Mtb32a in Skeiky et al Infection and Immunity 1999 67(8): 3998-4007) is also highly conserved, with 100% sequence identity across many strains. Full length Rv0125 includes an N-terminal signal sequence which is cleaved to provide the mature protein.

In one embodiment the antigen is derived from Rv1196, such as comprise, such as consist of, a sequence having at least 70% identity to SEQ ID No: 2, such as at least 80%, in particular at least 90%, especially at least 95%, for example at least 98%, such as at least 99%. Typical Rv1196 related antigens will comprise (such as consist of) a derivative of SEQ ID No: 2 having a small number of deletions, insertions and/or substitutions. Examples are those having deletions of up to 5 residues at 0-5 locations, insertions of up to 5 residues at 0-5 five locations and substitution of up to 20 residues. Other derivatives of Rv1196 are those comprising (such as consisting of) a fragment of SEQ ID No: 2 which is at least 200 amino acids in length, such as at least 250 amino acids in length, in particular at least 300 amino acids in length, especially at least 350 amino acids in length.

In one embodiment the antigen is derived from Rv0125, such as comprise, such as consist of, a sequence having at least 70% identity to SEQ ID No: 3, such as at least 80%, in particular at least 90%, especially at least 95%, for example at least 98%, such as at least 99%. Typical Rv0125 related antigens will comprise (such as consist of) a derivative of SEQ ID No: 3 having a small number of deletions, insertions and/or substitutions. Examples are those having deletions of up to 5 residues at 0-5 locations, insertions of up to 5 residues at 0-5 five locations and substitution of up to 20 residues. Other derivatives of Rv0125 are those comprising (such as consisting of) a fragment of SEQ ID No: 3 which is at least 150 amino acids in length, such as at least 200 amino acids in length, in particular at least 250 amino acids in length, especially at least 300 amino acids in length. Particular derivatives of Rv0125 are those comprising (such as consisting of) the fragment of SEQ ID No: 3 corresponding to residues 1-195 of SEQ ID No: 3. Further immunogenic derivatives of Rv0125 are those comprising (such as consisting of) the fragment of SEQ ID No: 3 corresponding to residues 192-323 of SEQ ID No: 3. Particularly preferred Rv0125 related antigens are derivatives of SEQ ID No: 3 wherein at least one (for example one, two or even all three) of the catalytic triad have been substituted or deleted, such that the protease activity has been reduced and the protein more easily produced—the catalytic serine residue may be deleted or substituted (e.g. substituted with alanine) and/or the catalytic histidine residue may be deleted or substituted and/or substituted the catalytic aspartic acid residue may be deleted or substituted. Especially of interest are derivatives of SEQ ID No: 3 wherein the catalytic serine residue has been substituted (e.g. substituted with alanine). Also of interest are Rv0125 related antigens which comprise, such as consist of, a sequence having at least 70% identity to SEQ ID No: 3, such as at least 80%, in particular at least 90%, especially at least 95%, for example at least 98%, such as at least 99% and wherein at least one of the catalytic triad have been substituted or deleted or those comprising, such as consisting of, a fragment of SEQ ID No: 3 which is at least 150 amino acids in length, such as at least 200 amino acids in length, in particular at least 250 amino acids in length, especially at least 300 amino acids in length and wherein at least one of the catalytic triad have been substituted or deleted. Further immunogenic derivatives of Rv0125 are those comprising (such as consisting of) the fragment of SEQ ID No: 3 corresponding to residues 192-323 of SEQ ID No: 3 wherein at least one (for example one, two or even all three) of the catalytic triad have been substituted or deleted. Particular immunogenic derivatives of Rv0125 are those comprising (such as consisting of) the fragment of SEQ ID No: 3 corresponding to residues 1-195 of SEQ ID No: 3 wherein the catalytic serine residue (position 176 of SEQ ID No: 3) has been substituted (e.g. substituted with alanine).

Suitably the antigen will comprise, such as consist of, a sequence having at least 70% identity to SEQ ID No. 4, such as at least 80%, in particular at least 90%, especially at least 95%, such as at least 98%, for example at least 99%. Typical M72 related antigens will comprise, such as consist of, a derivative of SEQ ID No: 4 having a small number of deletions, insertions and/or substitutions. Examples are those having deletions of up to 5 residues at 0-5 locations, insertions of up to 5 residues at 0-5 five locations and substitution of up to 20 residues. Other derivatives of M72 are those comprising, such as consisting of, a fragment of SEQ ID No: 4 which is at least 450 amino acids in length, such as at least 500 amino acids in length, such as at least 550 amino acids in length, such as at least 600 amino acids in length, such as at least 650 amino acids in length or at least 700 amino acids in length. As M72 is a fusion protein derived from the two individual antigens Rv0125 and Rv1196, any fragment of at least 450 residues will comprise a plurality of epitopes from the full length sequence (Skeiky et al J. Immunol. 2004 172:7618-7628; Skeiky Infect. Immun. 1999 67(8):3998-4007; Dillon Infect. Immun. 1999 67(6):2941-2950).

M72 related antigen will comprise, such as consist of, a sequence having at least 70% identity to SEQ ID No. 4, such as at least 80%, in particular at least 90%, especially at least 95%, such as at least 98%, for example at least 99%.

Typical M72 related antigens will comprise, such as consist of, a derivative of SEQ ID No: 4 having a small number of deletions, insertions and/or substitutions. Examples are those having deletions of up to 5 residues at 0-5 locations, insertions of up to 5 residues at 0-5 five locations and substitution of up to 20 residues.

In particular embodiments the M72 related antigen will comprise residues 2-723 of SEQ ID No. 4, for example comprise (or consist of) SEQ ID No. 4 or comprise (or consist) of SEQ ID No. 5.

A further antigen that may be employed in accordance with the present invention is the tuberculosis antigen Rv1753 and variants thereof, such as described in WO2010010180, for example a Rv1753 sequence selected from Seq ID Nos: 1 and 2-7 of WO2010010180, in particular Seq ID No: 1. Another antigen of interest in the field of tuberculosis is Rv2386 and variants thereof, such as described in WO2010010179, for example a Rv2386 sequence selected from Seq ID Nos: 1 and 2-7 of WO2010010179, in particular Seq ID No: 1. Other antigens of interest in the field of tuberculosis include Rv3616 and variants thereof, such as described in WO2011092253, for example a natural Rv3616 sequence selected from Seq ID Nos: 1 and 2-7 of WO2011092253 or a modified Rv3616 sequence such as those selected from Seq ID Nos: 161 to 169, 179 and 180 of WO2011092253, in particular Seq ID No: 167. An additional antigen of interest is HBHA, such as described in WO97044463, WO03044048 and WO2010149657. The aforementioned patent applications WO2010010180, WO2010010179, WO2011092253, WO97044463, WO03044048 and WO2010149657 are incorporated herein by reference in their entirety for the purpose of defining antigens which may be of use in the present invention.

Other antigens of interest are those comprising (or consisting of): Rv1174, also known as DPV, such as described in SEQ ID No 8 of WO2010010177; Rv1793, also known as MTI or Mtb9.9, such as described in SEQ ID No 10 of WO2010010177; Rv2087, also known as MSL or Mtb9.8, such as described in SEQ ID No 9 of WO2010010177; Rv3616, also known as HTCC1 or Mtb40, such as described in SEQ ID Nos 1 and 2-7 WO2010010177 or SEQ ID Nos 161-169, 179 or 180 of WO2011092253; and/or Rv3874, also known as CFP10 or Tb38.1, such as described in SEQ ID No 9 of WO2010010177; or an immunogenic portion (such as at least 20, 50, 75 or 100 residues therefrom) or variant thereof (such as having at least 70%, 80%, 90% or 95% identity thereto). (WO2010010177 and WO2011092253 are incorporated herein by reference in their entirety for the purpose of defining antigens which may be of use in the present invention).

Tuberculosis antigens are most suitably utilised in the form of a polypeptide, but may alternatively be provided in the form of a polynucleotide encoding said polypeptide.

A further antigen that may be employed in accordance with the present invention is derived from Varicella zoster virus (VZV). The VZV antigen for use in the invention may be any suitable VZV antigen or immunogenic derivative thereof, suitably being a purified VZV antigen.

In one embodiment, the VZV antigen is the VZV glycoprotein gE (also known as gp1) or immunogenic derivative hereof. The wild type or full length gE protein consists of 623 amino acids comprising a signal peptide, the main part of the protein, a hydrophobic anchor region (residues 546-558) and a C-terminal tail. In one aspect, a gE C-terminal truncate (also referred to truncated gE or gE truncate) is used whereby the truncation removes 4 to 20 percent of the total amino acid residues at the carboxy terminal end. In a further aspect, the truncated gE lacks the carboxy terminal anchor region (suitably approximately amino acids 547-623 of the wild type sequence). In a further aspect gE is a truncated gE having the sequence of SEQ ID NO. 6. The gE antigen, anchorless derivatives thereof (which are also immunogenic derivatives) and production thereof is described in EP0405867 and references therein [see also Vafai A., Antibody binding sites on truncated forms of varicella-zoster virus gpl(gE) glycoprotein, Vaccine 1994 12:1265-9). EP192902 also describes gE and production thereof. Truncated gE is also described by Haumont et al. Virus Research (1996) vol 40, p199-204, herein incorporated fully by reference. An adjuvanted VZV gE composition suitable for use in accordance of the present invention is described in WO2006/094756, i.e. a carboxyterminal truncated VZV gE in combination with adjuvant comprising QS-21, 3D-MPL and liposomes further containing cholesterol. Leroux-Roels I. et al. (J. Infect. Dis. 2012,206: 1280-1290) reported on a phase I/II clinical trial evaluating the adjuvanted VZV truncated gE subunit vaccine.

The antigen may comprise or consist of preparations derived from human respiratory syncytial virus (RSV). In certain favorable embodiments, a polypeptide antigen is an F protein polypeptide antigen from RSV. Particularly suitable as a polypeptide antigen component in the context of the are conformationally constrained F polypeptide antigens. Conformationally constrained F proteins have previously been described in both the prefusion (PreF) and postfusion (PostF) conformations. Such conformationally constrained F proteins typically comprise an engineered RSV F protein ectodomain. An F protein ectodomain polypeptide is a portion of the RSV F protein that includes all or a portion of the extracellular domain of the RSV F protein and lacks a functional (e.g., by deletion or substitution) transmembrane domain, which can be expressed, e.g., in soluble (not attached to a membrane) form in cell culture. Exemplary F protein antigens conformationally constrained in the prefusion conformation have been described in the art and are disclosed in detail in e.g., U.S. Pat. No. 8,563,002 (WO2009079796); US Published patent application No. US2012/0093847 (WO2010/149745); US2011/0305727 (WO2011/008974); US2014/0141037, WO2012/158613 and WO2014/160463 each of which is incorporated herein by reference for the purpose of illustrating prefusion F polypeptides (and nucleic acids), and methods of their production. Typically, the antigen is in the form of a trimer of polypeptides. Additional publications providing examples of F proteins in the prefusion conformation include: McLellan et al., Science, Vol. 340: 1113-1117; McLellan et al., Science, Vol 342: 592-598, and Rigter et al., PLOS One, Vol. 8: e71072, each of which can also be used in the context of the immunogenic combinations disclosed herein.

For example, an F protein polypeptide stabilized in the prefusion conformation typically includes an ectodomain of an F protein (e.g., a soluble F protein polypeptide) comprising at least one modification that stabilized the prefusion conformation of the F protein. For example, the modification can be selected from an addition of a trimerization domain (typically to the C terminal end), deletion of one or more of the furin cleavage sites (at amino acids ~105-109 and ~133-136), a deletion of the pep27 domain, substitution or addition of a hydrophilic amino acid in a hydrophobic domain (e.g., HRA and/or HRB). In an embodiment, the conformationally constrained PreF antigen comprises an F2 domain (e.g., amino acids 1-105) and an F1 domain (e.g., amino acids 137-516) of an RSV F protein polypeptide with no intervening furin cleavage site wherein the polypeptide further comprises a heterologous trimerization domain positioned C-terminal to the F1 domain. Optionally, the PreF antigen also comprises a modification that alters glycosylation (e.g., increases glycosylation), such as a substitution of one or more amino acids at positions corresponding to amino acids ~500-502 of an RSV F protein. When an oligomerization sequence is present, it is preferably a trimerization sequence. Suitable oligomerization sequences are well known in the art and include, for example, the coiled coil of the yeast GCN4 leucine zipper protein, trimerizing sequence from bacteriophage T4 fibritin ("foldon"), and the trimer domain of influenza HA. Additionally or alternatively, the F polypeptide conformationally constrained in the prefusion conformation can include at least two introduced cysteine residues, which are in close proximity to one another and form a disulfide bond that stabilizes the prefusion RSV F polypeptide. For example, the two cysteines can be within about 10 Å of each other. For example, cysteines can be introduced at positions 165 and 296 or at positions 155 and 290. An exemplary PreF antigen is represented by SEQ ID NO:7. The antigen may comprise or consist of preparations derived from HIV. The antigen may be a HIV protein such as a HIV envelope protein. For example, the antigen may be a HIV envelope gp120 polypeptide or an immunogenic fragment thereof.

One suitable antigen is the HIV clade B gp120 polypeptide of SEQ ID NO: 8 of the published application WO 2008/107370 (or an immunogenic fragment of this polypeptide). SEQ ID NO: 8 of WO 2008/107370 is incorporated by reference into this application.

Suitable antigens also include a polypeptide comprising the V1V2 region of SEQ ID NO: 1 of the published application WO 2015/036061, or an immunogenic derivative or fragment of the V1V2 region of SEQ ID NO: 1. In addition, a polypeptide comprising the V1V2 region of SEQ ID NO: 5 of WO 2015/036061 or an immunogenic derivative or fragment of the V1V2 region of SEQ ID NO: 5 may be used as a suitable antigen. SEQ ID NO: 1 and SEQ ID NO: 5 of WO2015/036061 are incorporated by reference.

In another embodiment, the antigen may comprise two or more different HIV envelope gp120 polypeptide antigens (or immunogenic fragments of these polypeptides). Suitable antigens include the and HIV clade C gp120 polypeptide antigens including TV1 gp120 (SEQ ID No: 8) and 1086.0 gp120 (SEQ ID No: 9).

Other suitable HIV antigens include Nef, Gag and Pol HIV proteins and immunogenic fragments thereof.

The composition may comprise non-typeable *Haemophilus influenzae* antigen(s) for example selected from: Fimbrin protein [(U.S. Pat. No. 5,766,608—Ohio State Research Foundation)] and fusions comprising peptides therefrom [e.g. LB1(f) peptide fusions; U.S. Pat. No. 5,843,464 (OSU) or WO 99/64067]; OMP26 [WO 97/01638 (Cortecs)]; P6 [EP 281673 (State University of New York)]; TbpA and/or TbpB; Hia; Hsf; Hin47; Hif; Hmw1; Hmw2; Hmw3; Hmw4; Hap; D15 (WO 94/12641); protein D (EP 594610); P2; and P5 (WO 94/26304); protein E (WO07/084053) and/or PilA (WO05/063802). The composition may comprise *Moraxella catarrhalis* protein antigen(s), for example selected from: OMP106 [WO 97/41731 (Antex) & WO 96/34960 (PMC)]; OMP21; LbpA &/or LbpB [WO 98/55606 (PMC)]; TbpA &/or TbpB [WO 97/13785 & WO 97/32980 (PMC)]; CopB [Helminen M E, et al. (1993) Infect. Immun. 61:2003-2010]; UspA1 and/or UspA2 [WO 93/03761 (University of Texas)]; OmpCD; HasR (PCT/EP99/03824); PilQ (PCT/EP99/03823); OMP85 (PCT/EP00/01468); lipo06 (GB 9917977.2); lipo10 (GB 9918208.1); lipo11 (GB 9918302.2); lipo18 (GB 9918038.2); P6 (PCT/EP99/03038); D15 (PCT/EP99/03822); OmplA1 (PCT/EP99/06781); Hly3 (PCT/EP99/03257); and OmpE. In an embodiment, the composition may comprise non-typeable *H. influenzae* (NTHi) protein antigen(s) and/or *M. catarrhalis* protein antigen(s). The composition may comprise Protein D (PD) from *H. influenzae*. Protein D may be as described in WO91/18926. The composition may further comprise Protein E (PE) and/or Pilin A (PilA) from *H. Influenzae*. Protein E and Pilin A may be as described in WO2012/139225. Protein E and Pilin A may be presented as a fusion protein; for example LVL735 as described in WO2012/139225. For example, the composition may comprise three NTHi antigens (PD, PE and PilA, with the two last ones combined as a PEPiIA fusion protein). The composition may further comprise UspA2 from *M. catarrhalis*. UspA2 may be as described in WO2015125118, for example MC-009 ((M) (UspA2 31-564)(HH)) described in WO2015125118. For example, the composition may comprise three NTHi antigens (PD, PE and PilA, with the two last ones combined as a PEPiIA fusion protein) and one *M. catarrhalis* antigen (UspA2).

A plurality of antigens may be provided. For example, a plurality of antigens may be provided to strengthen the elicited immune response (e.g. to ensure strong protection), a plurality of antigens may be provided to broaden the immune response (e.g. to ensure protection against a range of pathogen strains or in a large proportion of a subject population) or a plurality of antigens may be provided to currently elicit immune responses in respect of a number of disorders (thereby simplifying administration protocols). Where a plurality of antigens are provided, these may be as distinct proteins or may be in the form of one or more fusion proteins.

Antigen may be provided in an amount of 0.1 to 100 ug per human dose. The present invention may be applied for use in the treatment or prophylaxis of a disease or disorder associated with one or more antigens described above. In one embodiment the disease or disorder is selected from malaria, tuberculosis, COPD, HIV and herpes.

The adjuvant may be administered separately from an immunogen or antigen, or may be combined, either during manufacturing or extemporaneously), with an immunogen or antigen to provide an immunogenic composition for combined administration.

Sterilisation

For parenteral administration in particular, compositions should be sterile. Sterilisation can be performed by various methods although is conveniently undertaken by filtration through a sterile grade filter. Sterilisation may be performed a number of times during preparation of an adjuvant or immunogenic composition, but is typically performed at least at the end of manufacture.

By "sterile grade filter" it is meant a filter that produces a sterile effluent after being challenged by microorganisms at a challenge level of greater than or equal to $1 \times 10^7/cm^2$ of effective filtration area. Sterile grade filters are well known to the person skilled in the art of the invention for the purpose of the present invention, sterile grade filters have a pore size between 0.15 and 0.25 um, suitably 0.18-0.22 um, such as 0.2 or 0.22 urn.

The membranes of the sterile grade filter can be made from any suitable material known to the skilled person, for example, but not limited to cellulose acetate, polyethersulfone (PES), polyvinylidene fluoride (PVDF), polytetrafluoroethylene (PTFE). In a particular embodiment of the invention one or more or all of the filter membranes of the present invention comprise polyethersulfone (PES), in particular hydrophilic polyethersulfone. In a particular embodiment of the invention, the filters used in the processes described herein are a double layer filter, in particular a sterile filter with built-in prefilter having larger pore size than the pore size of the end filter. In one embodiment the sterilizing filter is a double layer filter wherein the pre-filter membrane layer has a pore size between 0.3 and 0.5 nm, such as 0.35 or 0.45 nm. According to further embodiments, filters comprise asymmetric filter membrane(s), such as asymmetric hydrophilic PES filter membrane(s). Alternatively, the sterilizing filter layer may be made of PVDF, e.g. in combination with an asymmetric hydrophilic PES pre-filter membrane layer.

In light of the intended medical uses, materials should be of pharmaceutical grade (such as parenteral grade).

The invention is illustrated by the following clauses:

Clause 1. A saponin extract containing at least 88% QS-21 main peak and >3% to 10% 2018 component by UV absorbance at 214 nm.

Clause 2. The saponin extract according to clause 1, wherein the extract contains at least 3.5% 2018 component.

Clause 3. The saponin extract according to clause 2, wherein the extract contains at least 4% 2018 component.

Clause 4. The saponin extract according to clause 4, wherein the extract contains at least 4.5% 2018 component.

Clause 5. The saponin extract according to any one of clauses 1 to 4, wherein the extract contains 9% or less 2018 component.

Clause 6. The saponin extract according to clause 5, wherein the extract contains 8% or less 2018 component.

Clause 7. The saponin extract according to clause 6, wherein the extract contains 7% or less 2018 component.

Clause 8. The saponin extract according to any one of clauses 1 to 7, wherein the extract contains at least 90%, such as at least 91%, at least 92% or at least 93% QS-21 main peak.

Clause 9. The saponin extract according to any one of clauses 1 to 8, wherein the monoisotope of the most abundant species is 1987.9 m/z.

Clause 10. The saponin extract according to any one of clauses 1 to 9, containing at least 98%, at least 99%, at least 99.5% or at least 99.8% QS-21 group by UV absorbance at 214 nm.

Clause 11. The saponin extract according to any one of clauses 1 to 10, wherein the extract contains 1% or less of lyo impurity by UV absorbance at 214 nm.

Clause 12. The saponin extract according to clause 11, wherein the extract contains 1% or less of largest peak outside the QS-21 group by UV absorbance at 214 nm.

Clause 13. The saponin extract according to clause 1, containing at least 98% QS-21 group, at least 88% QS-21 main peak, >3% to 10% 2018 component, 1% or less of largest peak outside the QS-21 group by UV absorbance at 214 nm and wherein the monoisotope of the most abundant species is 1987.9 m/z.

Clause 14. The saponin extract according to any one of clauses 1 to 13, containing at least 40%, such as at least 50%, in particular at least 60%, especially at least 65%, such as at least 70%, 1988 component by UV absorbance at 214 nm and by relative ion abundance.

Clause 15. The saponin extract according to any one of clauses 1 to 14, containing 90% or less, such as 85% or less, or 80% or less, 1988 component as determined by UV absorbance at 214 nm and by relative ion abundance.

Clause 16. The saponin extract according to any one of clauses 1 to 15, containing 30% or less, such as 25% or less, 1856 component by UV absorbance at 214 nm and by relative ion abundance.

Clause 17. The saponin extract according to any one of clauses 1 to 16, containing at least 5%, such as at least 10%, 1856 component by UV absorbance at 214 nm and by relative ion abundance.

Clause 18. The saponin extract according to any one of clauses 1 to 17, containing 40% or less, such as 30% or less, in particular 20% or less, especially 10% or less 2002 component by UV absorbance at 214 nm and by relative ion abundance.

Clause 19. The saponin extract according to any one of clauses 1 to 18, containing at least 0.5%, such as at least 1%, 2002 component by UV absorbance at 214 nm and by relative ion abundance.

Clause 20. A saponin extract containing at least 88%, such as at least 90%, at least 91%, at least 92% or at least 93%, triterpenoid glycosides having m/z of 1855.9, 1987.9 or 2001.9, and >3% to 10% triterpenoid glycosides having m/z 2017.9 by UV absorbance at 214 nm.

Clause 21. The saponin extract according to clause 20, wherein the monoisotope of the most abundant species is 1987.9 m/z.

Clause 22. The saponin extract according to clause 20 or 21, containing at least 88% triterpenoid glycosides having m/z of 1855.9, 1987.9 or 2001.9, excluding B-isomer and lyo impurity, by UV absorbance at 214 nm.

Clause 23. The saponin extract according to any one of clauses 20 to 22, containing at least 98% triterpenoid glycosides having m/z of 1517.7, 1711.8, 1855.9, 1987.9, 2001.9, 2017.9 or 2118 by UV absorbance at 214 nm.

Clause 24. The saponin extract according to any one of clauses 20 to 23, containing at least 98% triterpenoid glycosides having m/z of 1517.7, 1711.8, 1855.9, 1987.9, 2001.9, 2017.9 or 2118, excluding the lyo impurity, by UV absorbance at 214 nm.

Clause 25. The saponin extract according to any one of clauses 20 to 24, wherein the extract contains 1% or less of triterpenoid glycosides having m/z of lyo impurity by UV absorbance at 214 nm.

Clause 26. The saponin extract according to clause 25, wherein the extract contains 1% or less of any other peak by UV absorbance at 214 nm.

Clause 27. The saponin extract according to clause 20, containing at least 98% triterpenoid glycosides having m/z of 1517.7, 1711.8, 1855.9, 1987.9, 2001.9, 2017.9 or 2118, at least 88% triterpenoid glycosides having m/z of 1855.9, 1987.9 or 2001.9, >3% to 10% triterpenoid glycosides having m/z 2017.9, 1% or less of any other peak by UV absorbance at 214 nm and wherein the monoisotope of the most abundant species is 1987.9 m/z Clause 28. The saponin extract according to any one of clauses 20 to 27, containing at least 40%, such as at least 50%, in particular at least 60%, especially at least 65%, such as at least 70%, 1988 component by UV absorbance at 214 nm and by relative ion abundance.

Clause 29. The saponin extract according to any one of clauses 20 to 28, containing 90% or less, such as 85% or less, or 80% or less, 1988 component as determined by UV absorbance at 214 nm and by relative ion abundance.

Clause 30. The saponin extract according to any one of clauses 20 to 29, containing 30% or less, such as 25% or less, 1856 component by UV absorbance at 214 nm and by relative ion abundance.

Clause 31. The saponin extract according to any one of clauses 20 to 30, containing at least 5%, such as at least 10%, 1856 component by UV absorbance at 214 nm and by relative ion abundance.

Clause 32. The saponin extract according to any one of clauses 20 to 31, containing 10% or less, such as 5% or less, 2002 component by UV absorbance at 214 nm and by relative ion abundance.

Clause 33. The saponin extract according to any one of clauses 20 to 32, containing at least 0.5%, such as at least 1%, 2002 component by UV absorbance at 214 nm and by relative ion abundance.

Clause 34. The saponin extract according to any one of clauses 20 to 33, comprising at least 3.5% triterpenoid glycosides having m/z 2017.9 by UV absorbance at 214 nm.

Clause 35. The saponin extract according to clause 34, wherein the extract contains at least 4% triterpenoid glycosides having m/z 2017.9 by UV absorbance at 214 nm.

Clause 36. The saponin extract according to clause 35, wherein the extract contains at least 4.5% triterpenoid glycosides having m/z 2017.9 by UV absorbance at 214 nm.

Clause 37. The saponin extract according to any one of clauses 20 to 36, wherein the extract contains 9% or less triterpenoid glycosides having m/z 2017.9 by UV absorbance at 214 nm.

Clause 38. The saponin extract according to clause 37, wherein the extract contains 8% or less triterpenoid glycosides having m/z 2017.9 by UV absorbance at 214 nm.

Clause 39. The saponin extract according to clause 38, wherein the extract contains 7% or less triterpenoid glycosides having m/z 2017.9 by UV absorbance at 214 nm.

Clause 40. A saponin extract containing at least 88%, such as at least 90%, at least 91%, at least 92% or at least 93%:

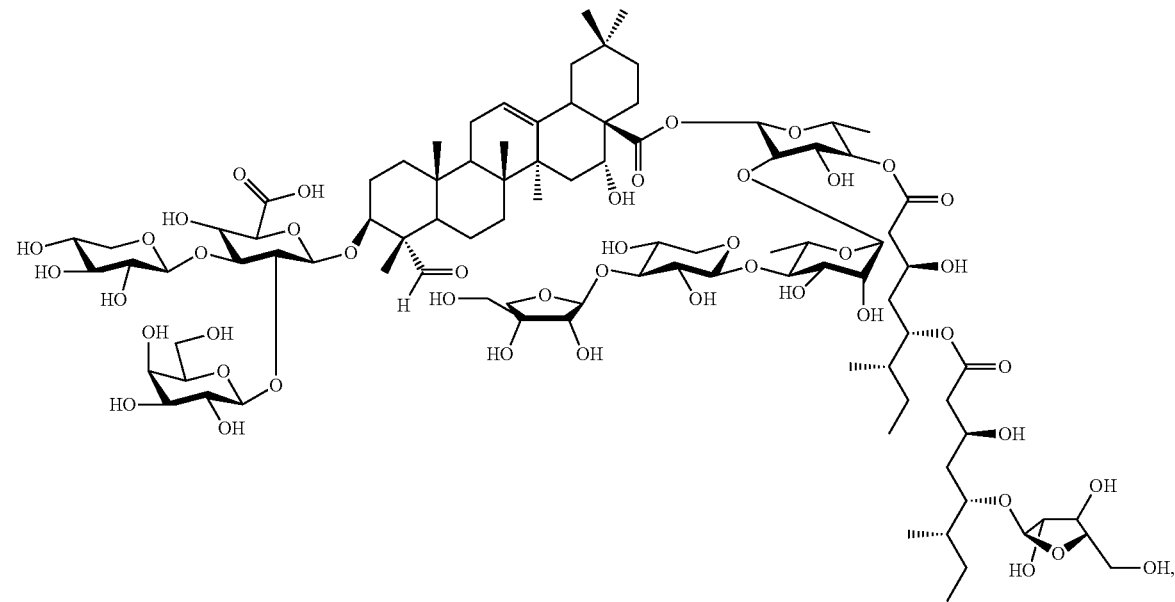

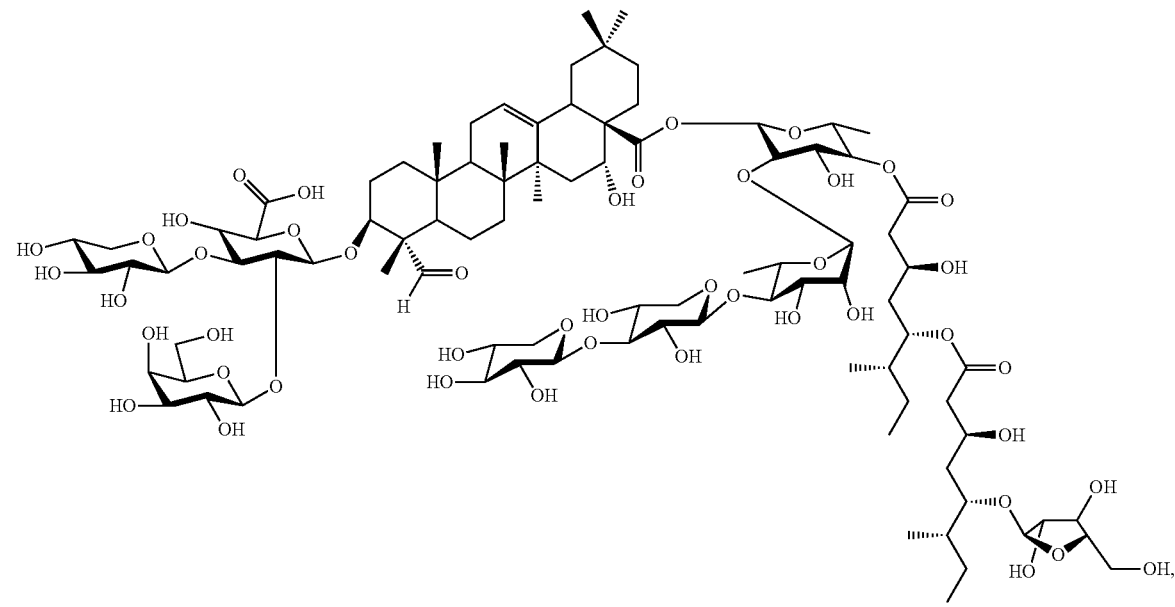

-continued
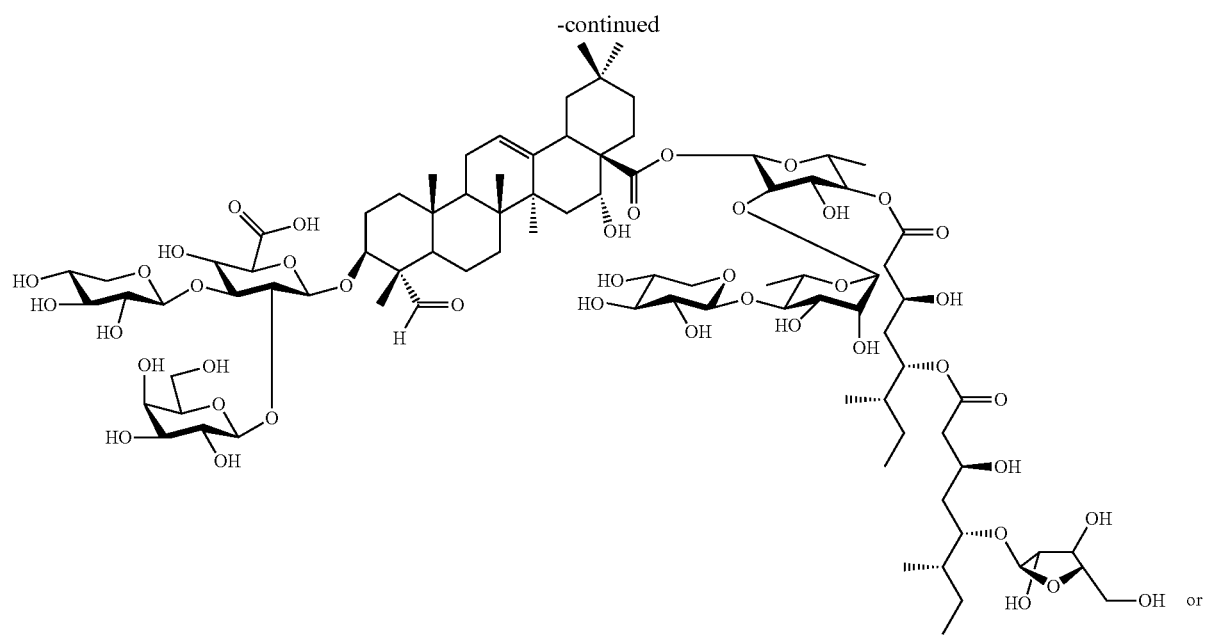
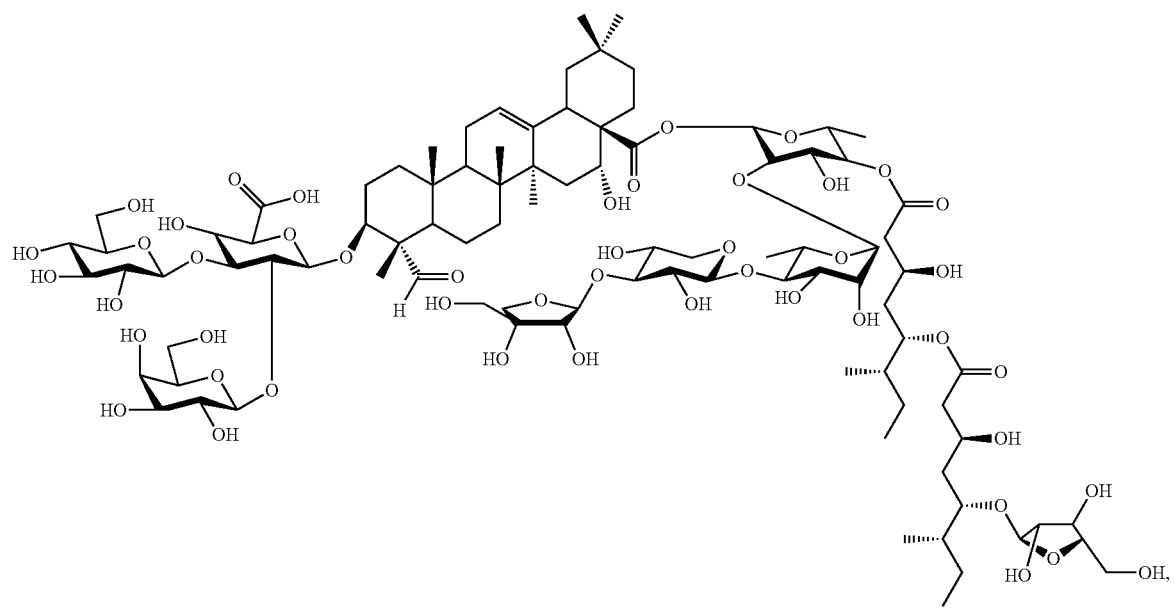

and >3% to 10%:
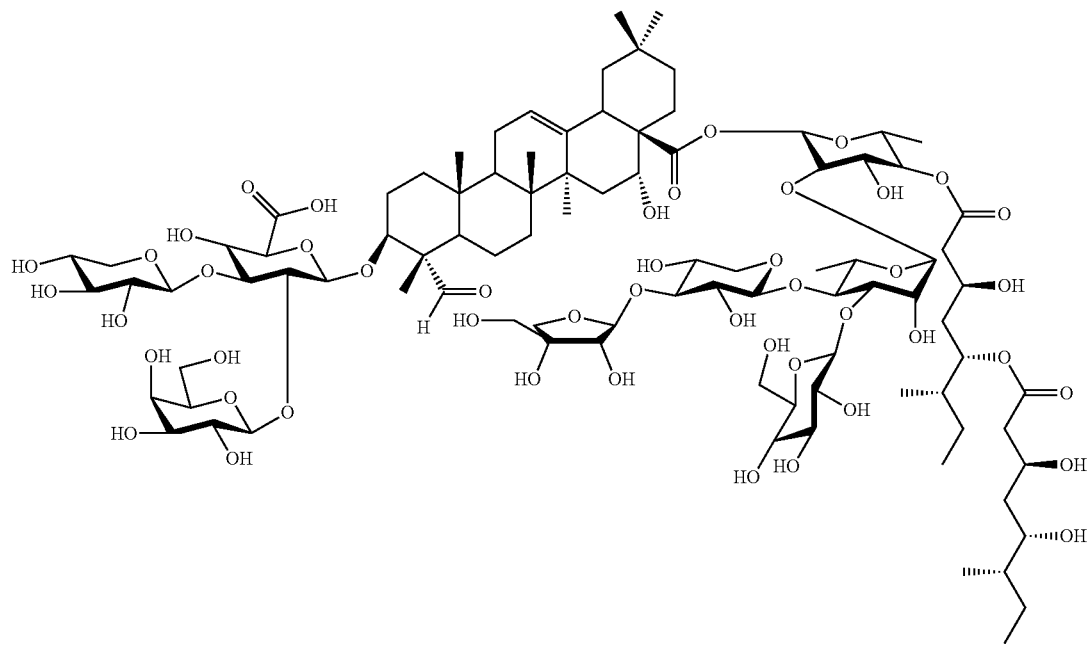
by UV absorbance at 214 nm.
Clause 41. The saponin extract according to clause 40, wherein the monoisotope of the most abundant species is 1987.9 m/z.
Clause 42. The saponin extract according to clause 40 or 41, containing at least 98%
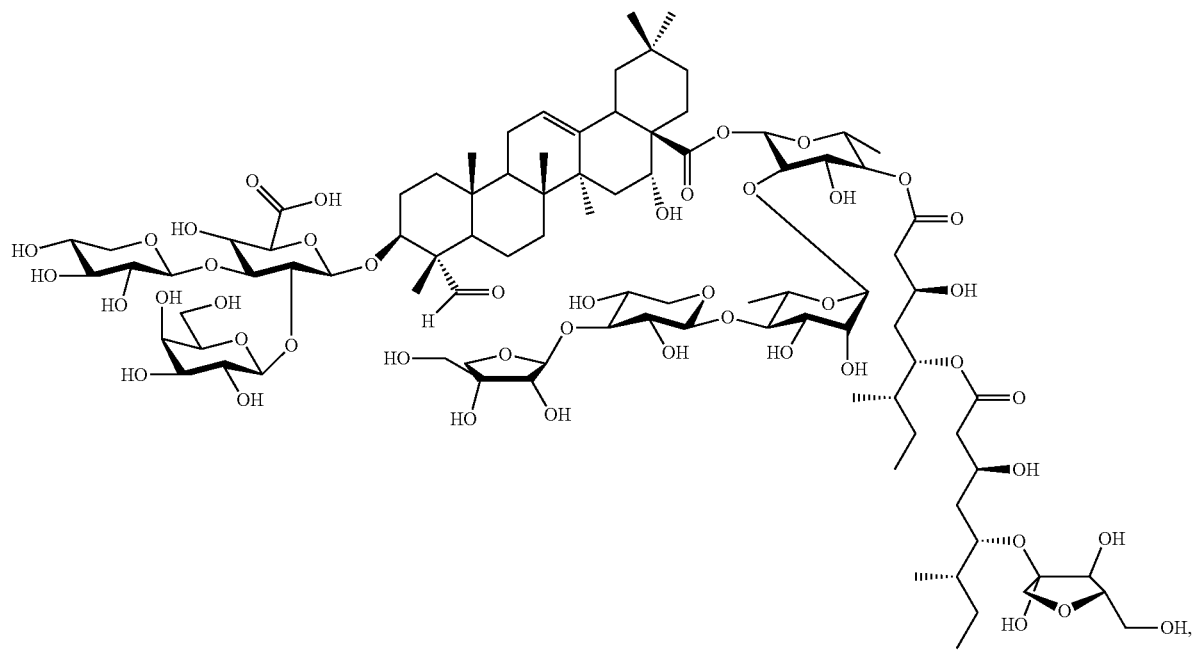

-continued
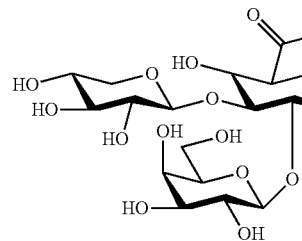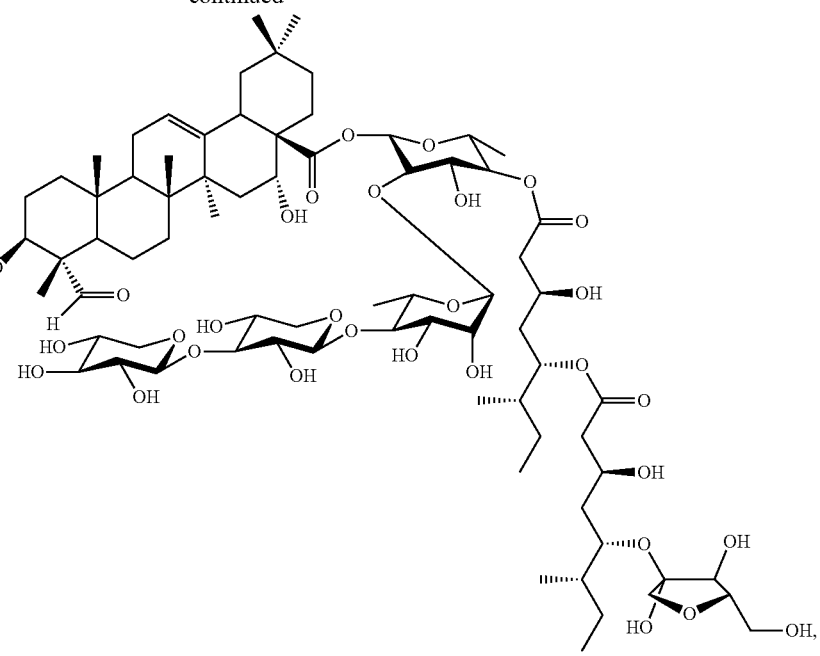
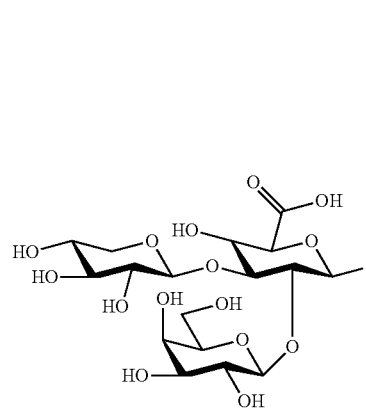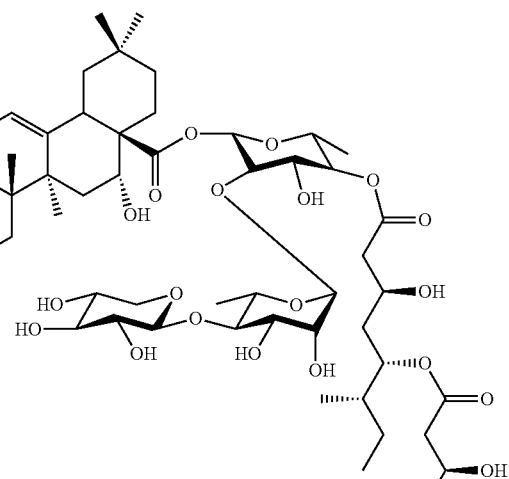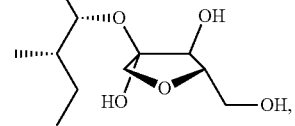

-continued
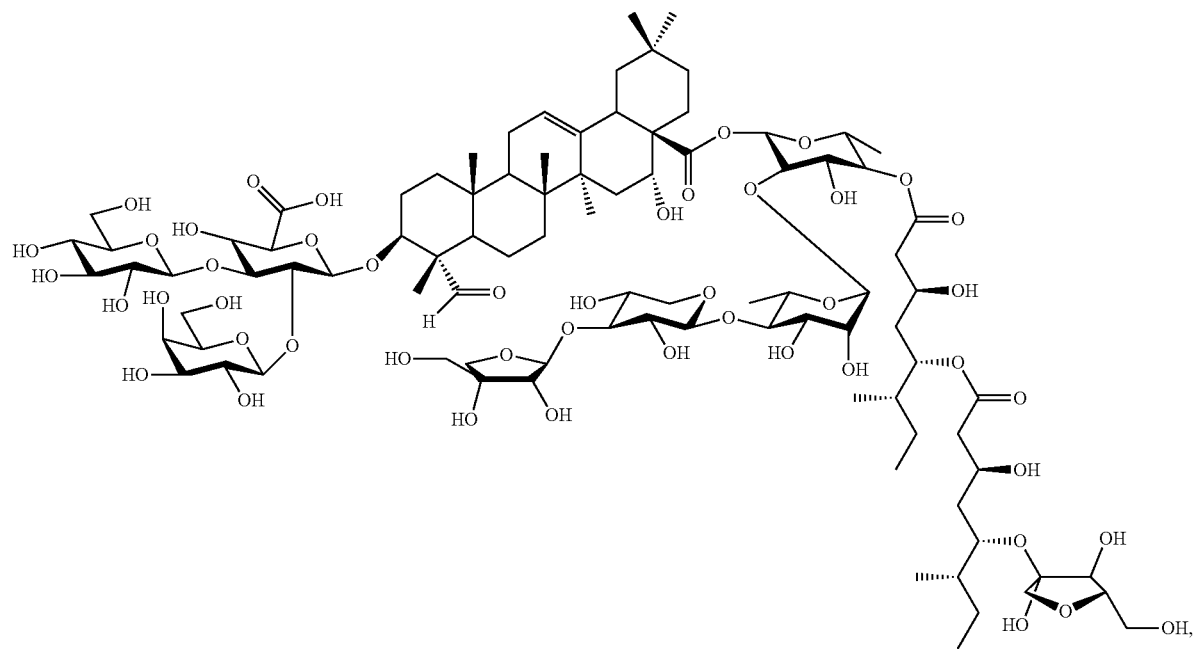
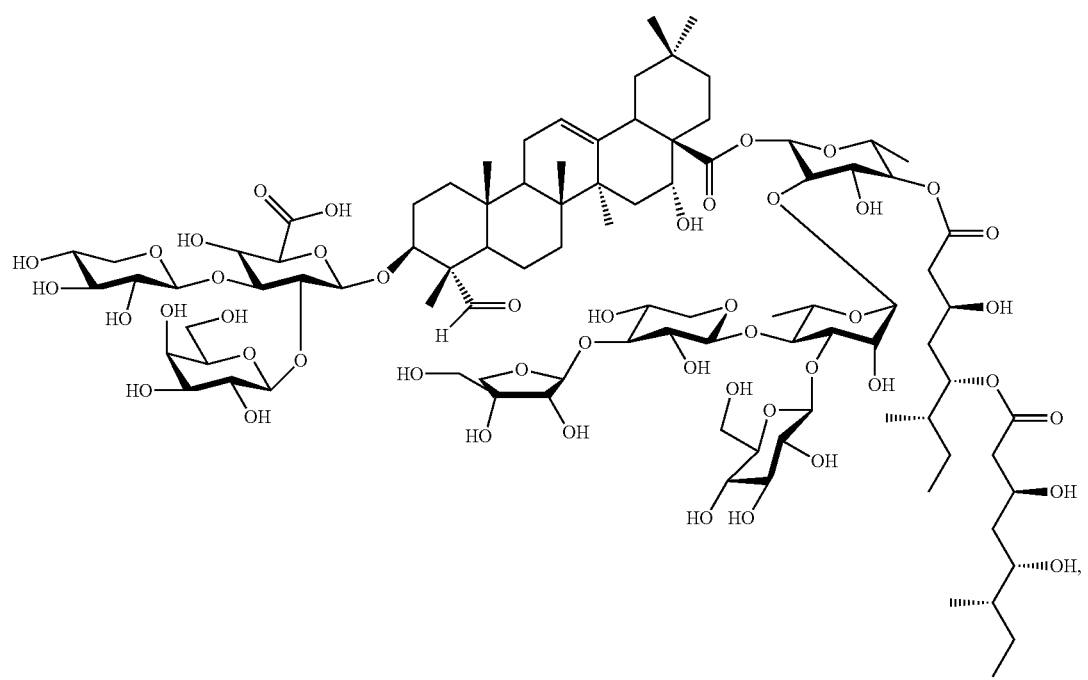

-continued
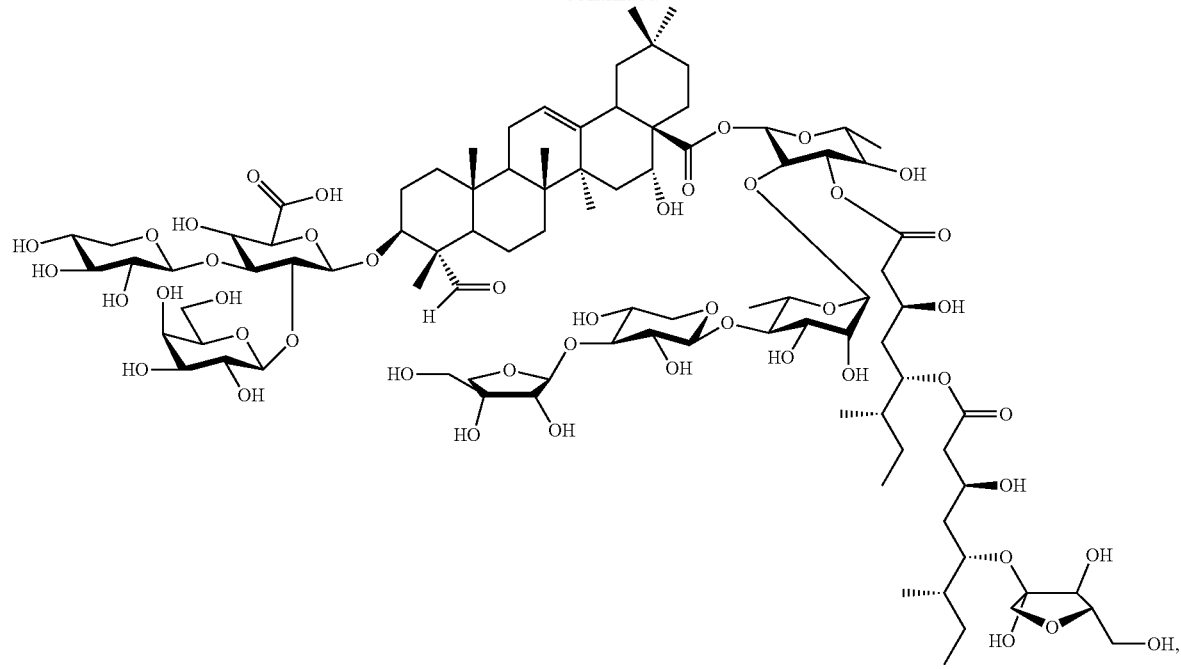
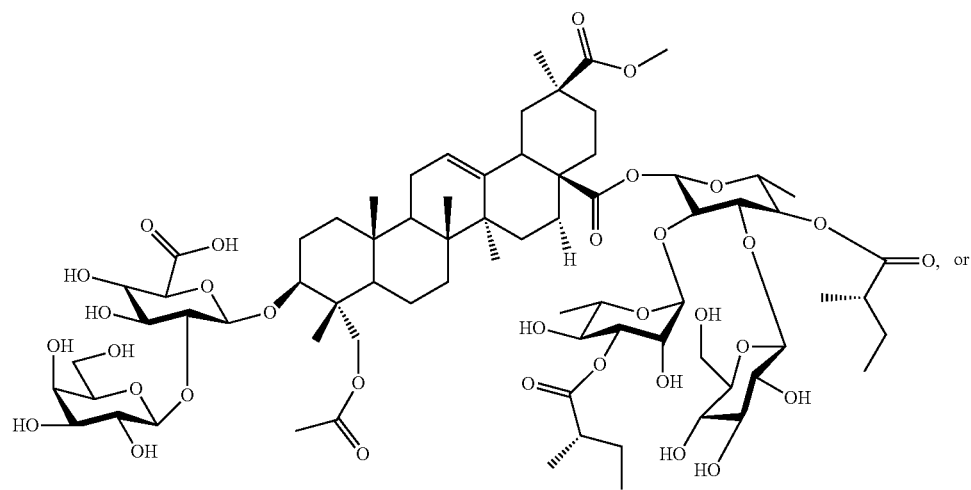
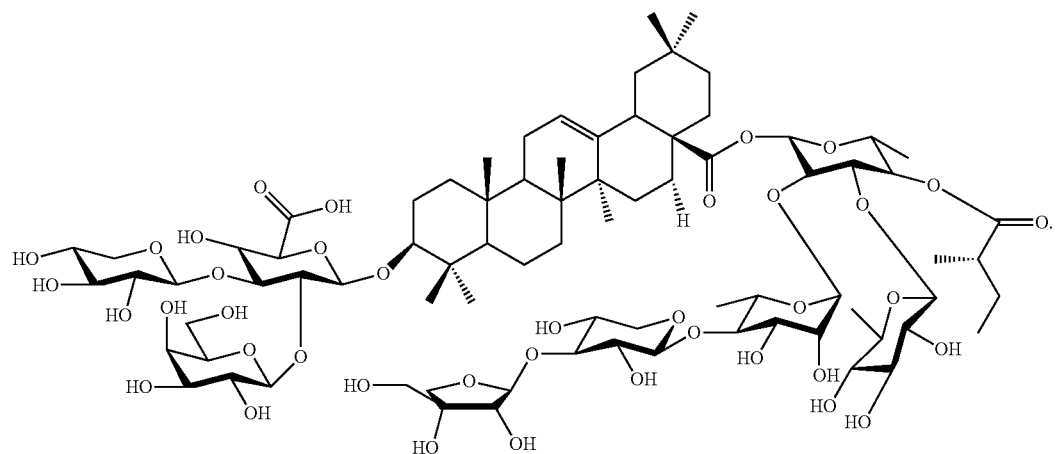

Clause 43. The saponin extract according to any one of clauses 40 to 42, containing at least 98%
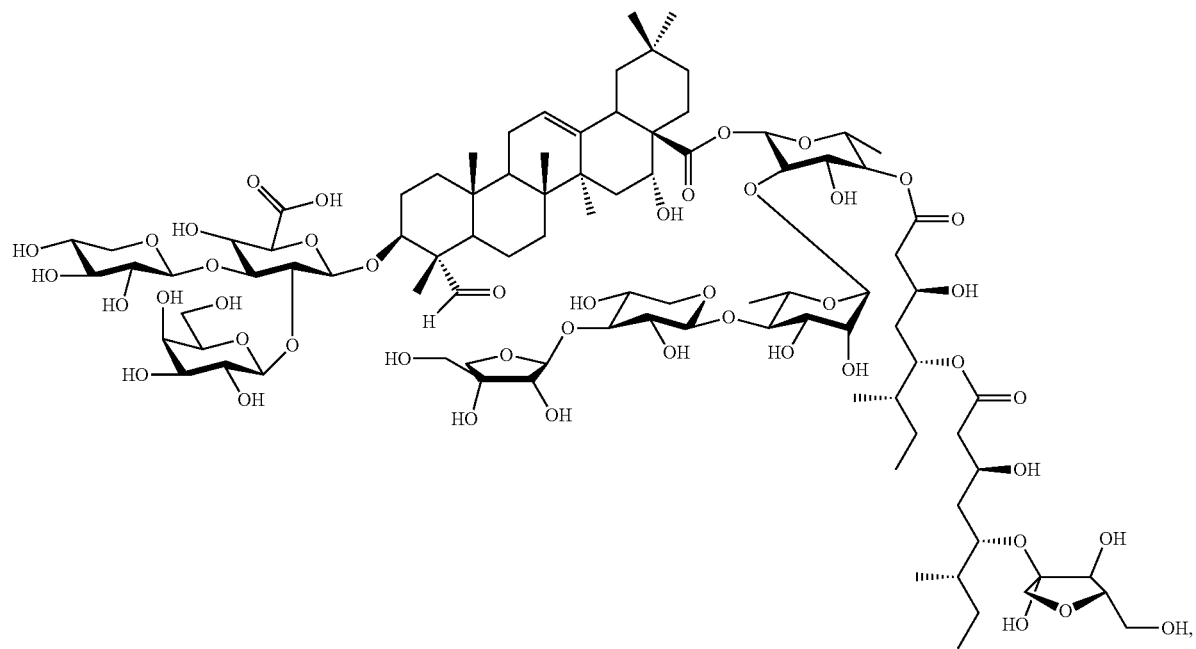
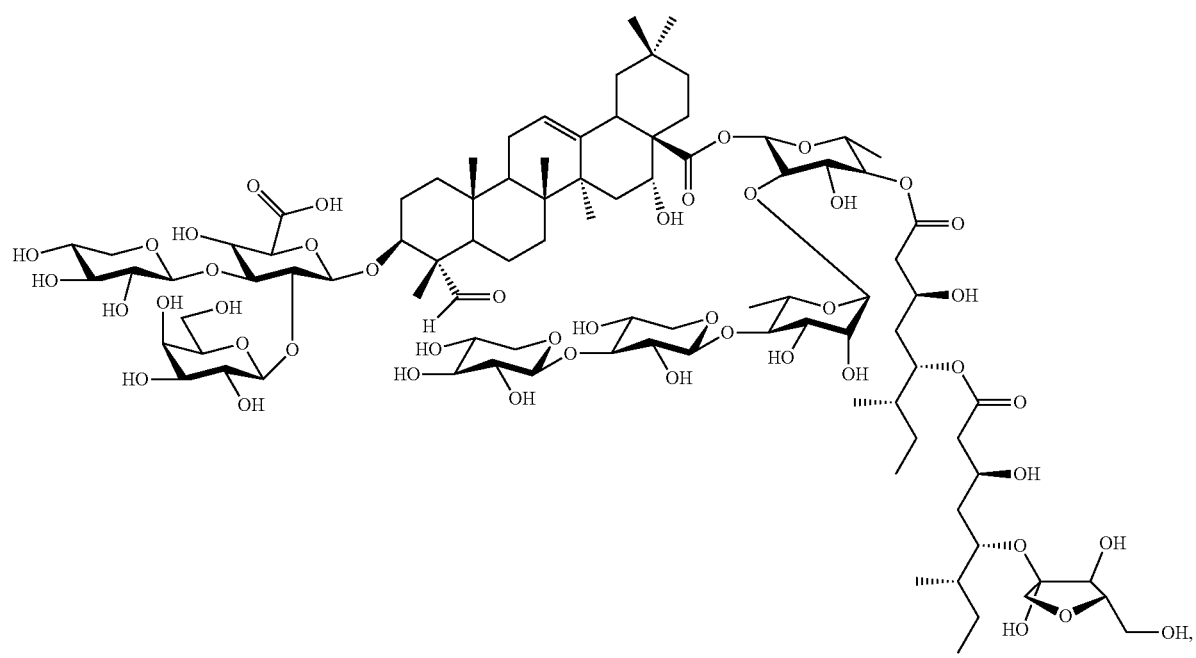

-continued
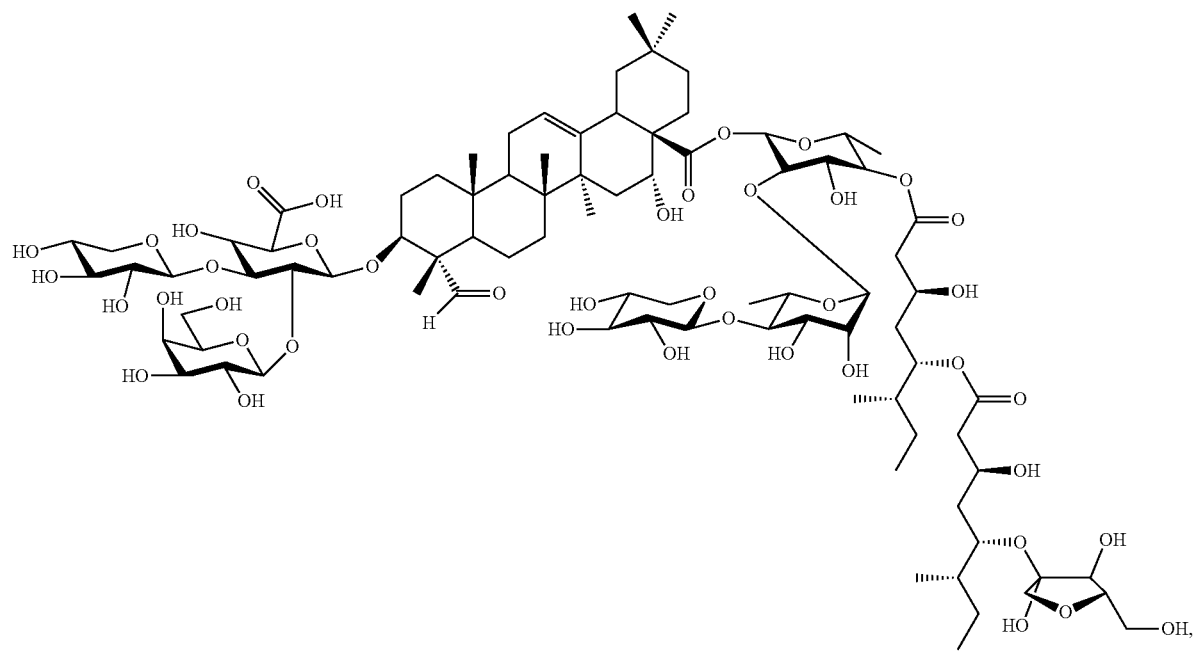
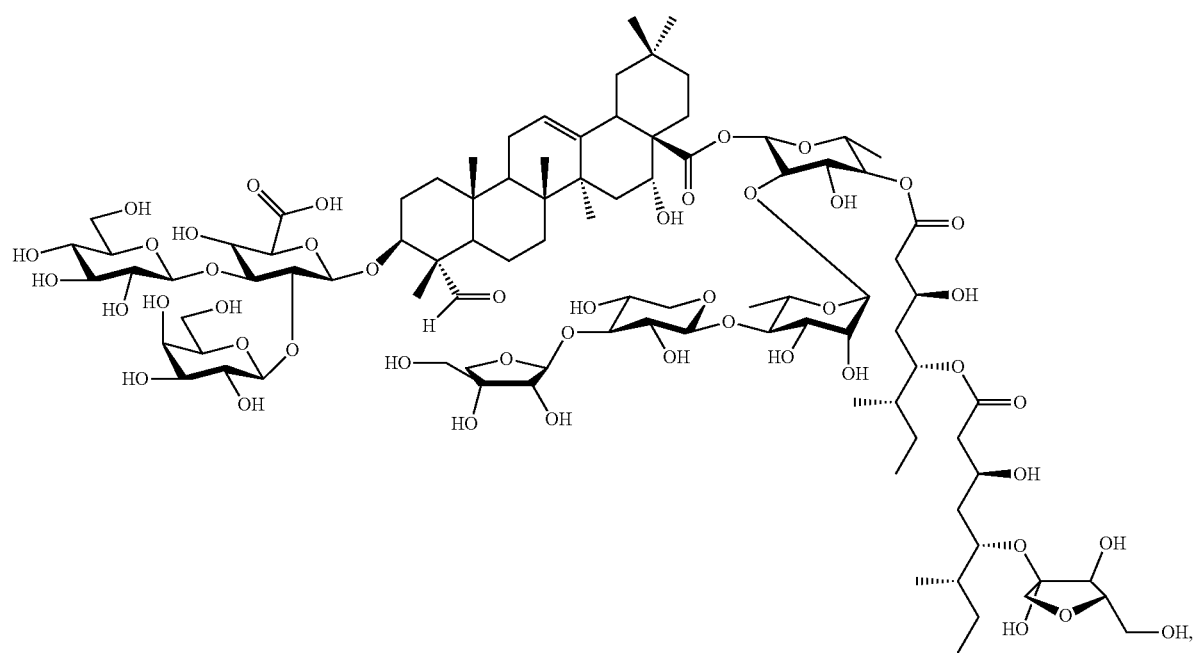

-continued
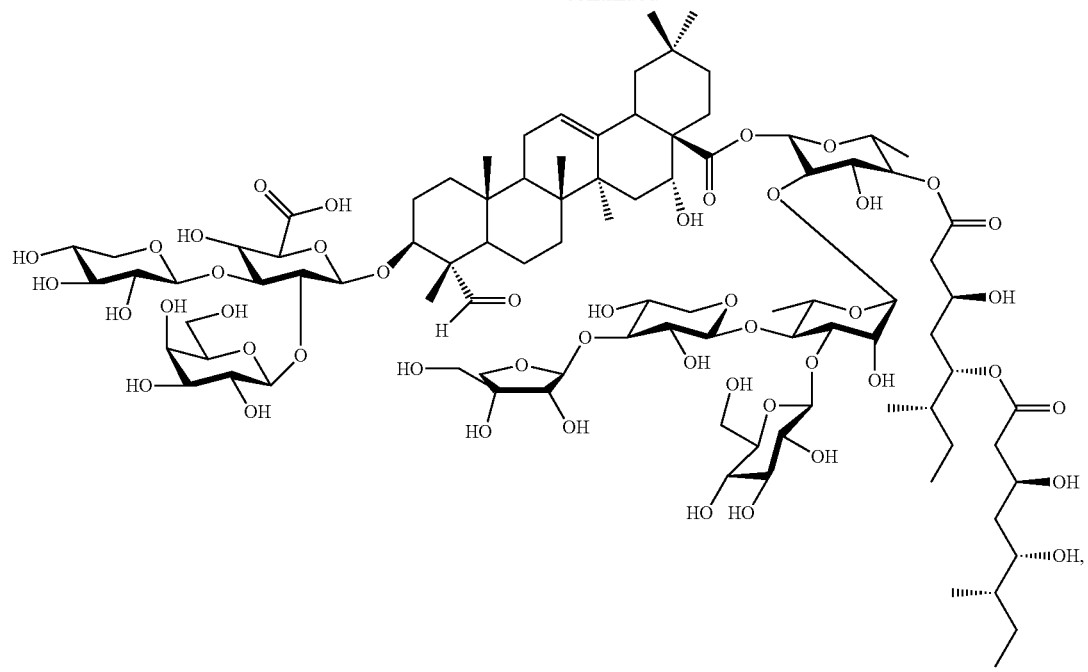
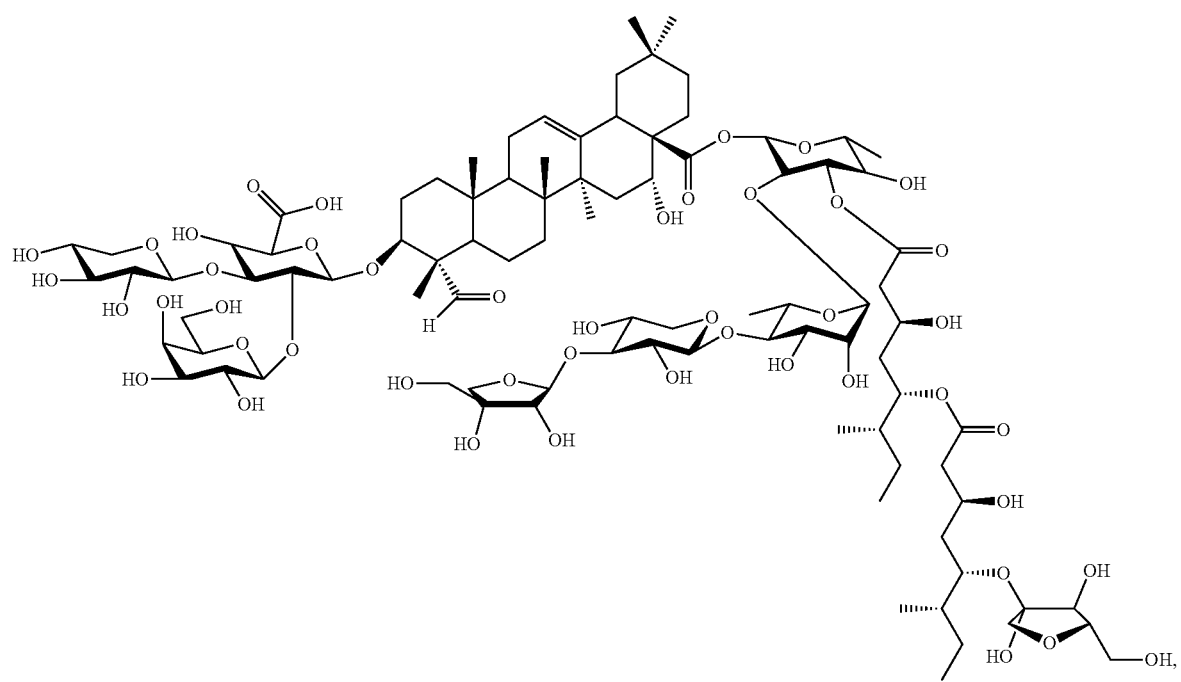

-continued
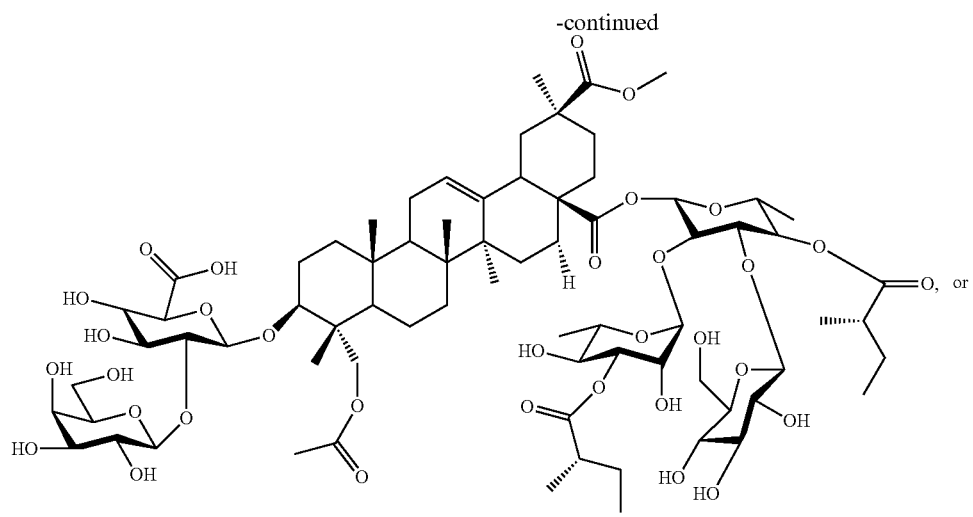
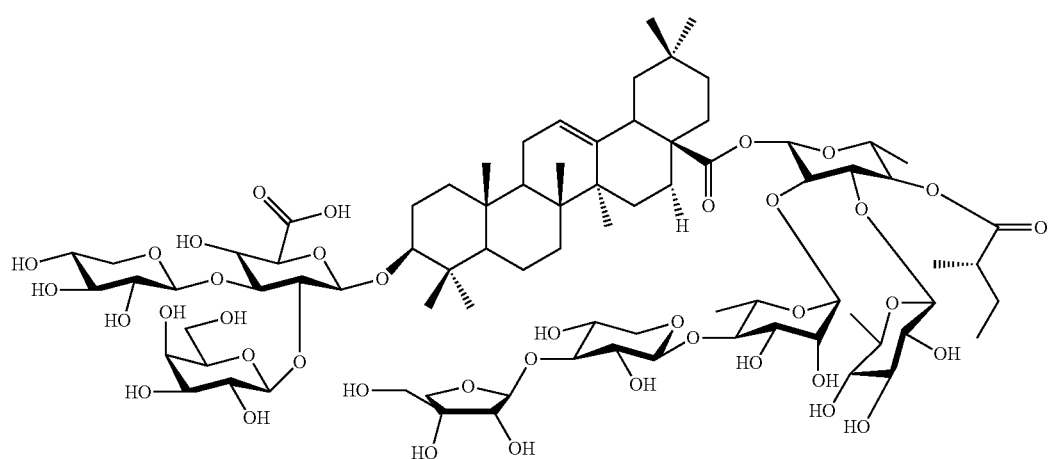
and 2118 component.

Clause 44. The saponin extract according to any one of clauses 40 to 43, wherein the extract contains 1% or less of
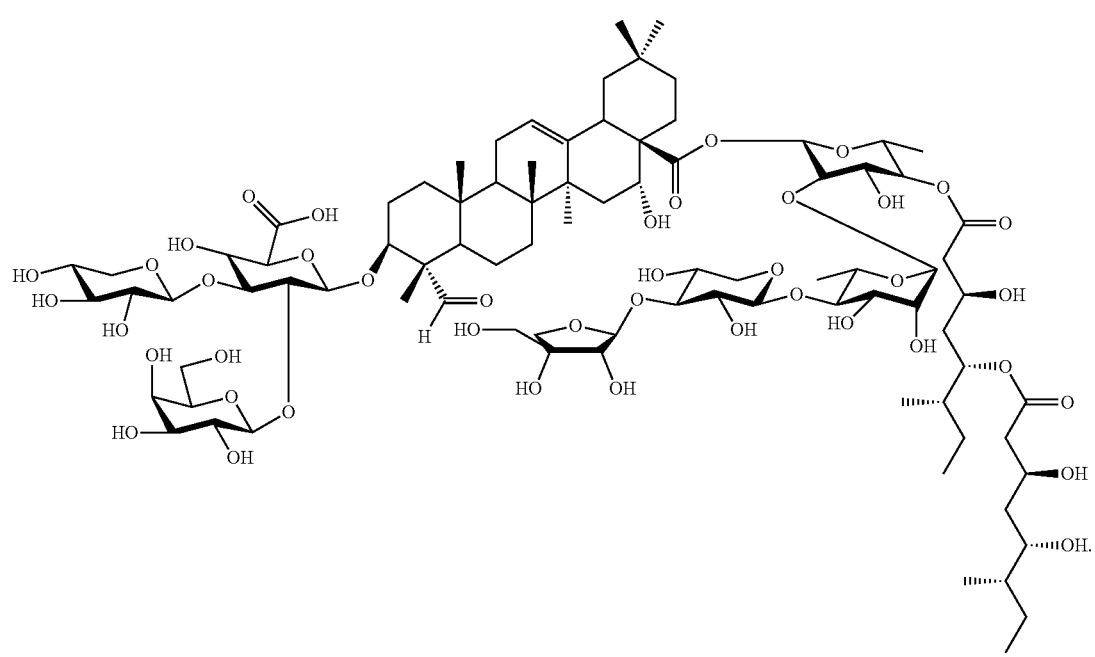
Clause 45. The saponin extract according to clause 44, wherein the extract contains 1% or less of any other peak by UV absorbance at 214 nm.
Clause 46. The saponin extract according to clause 40, containing at least 98%
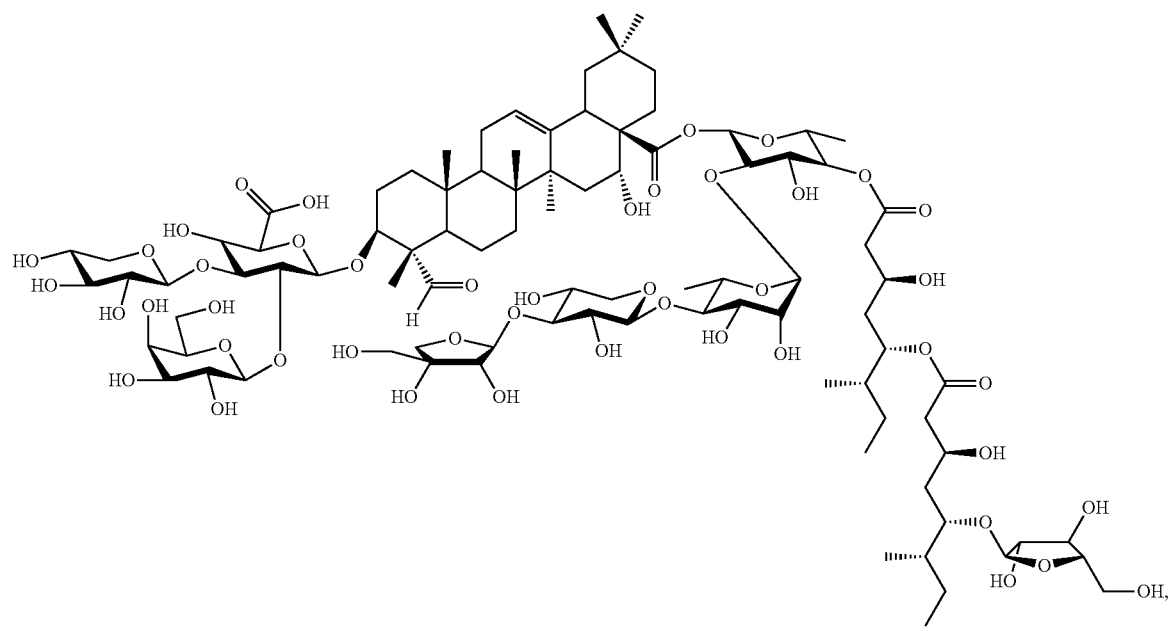

-continued
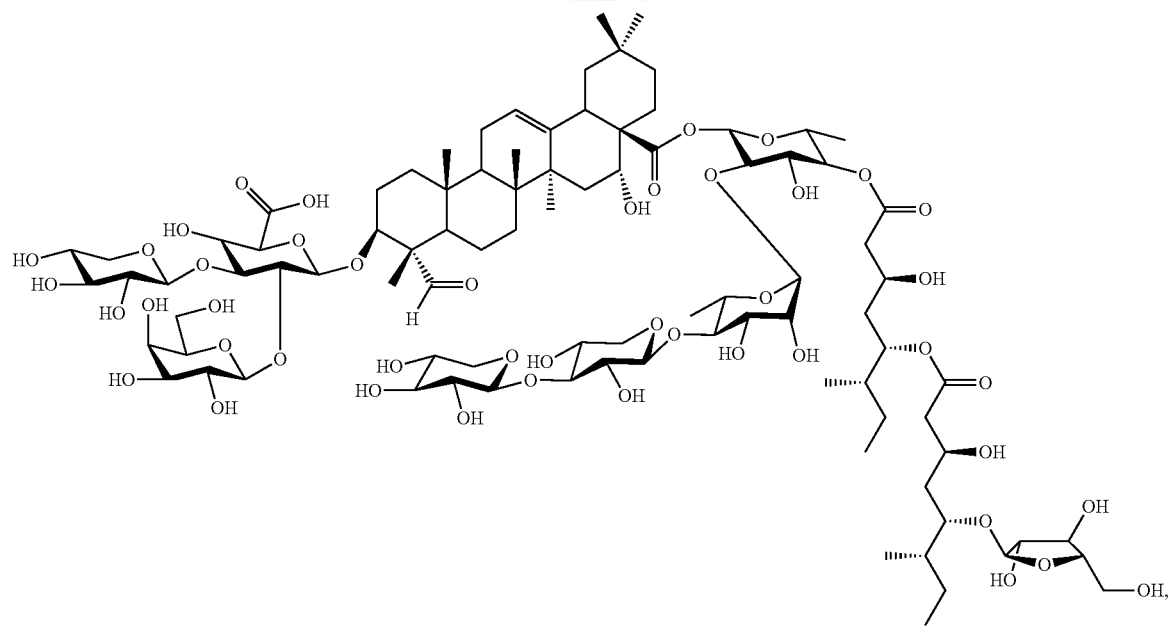
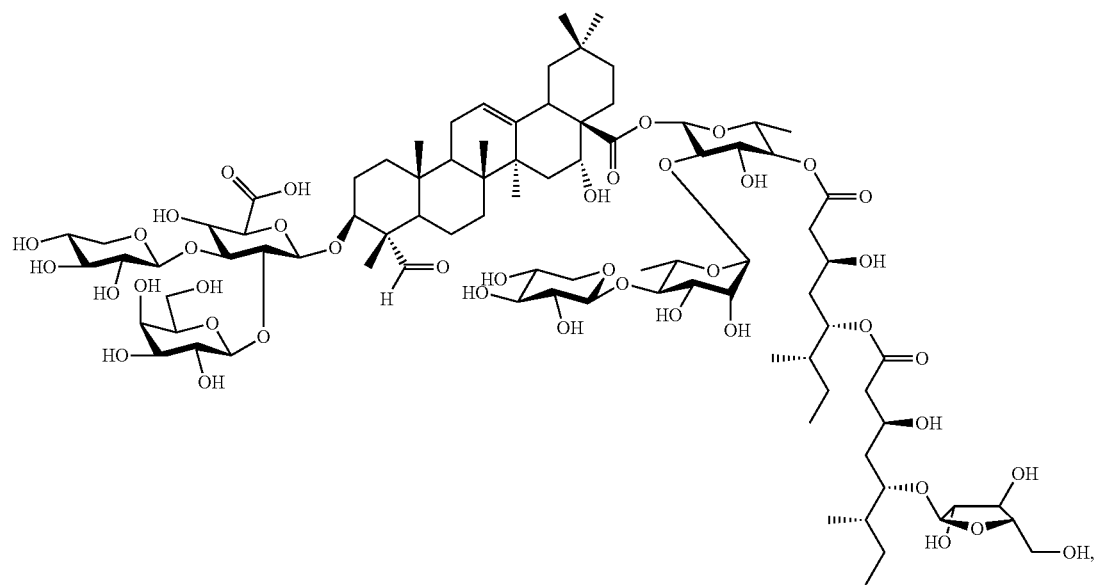

123
-continued
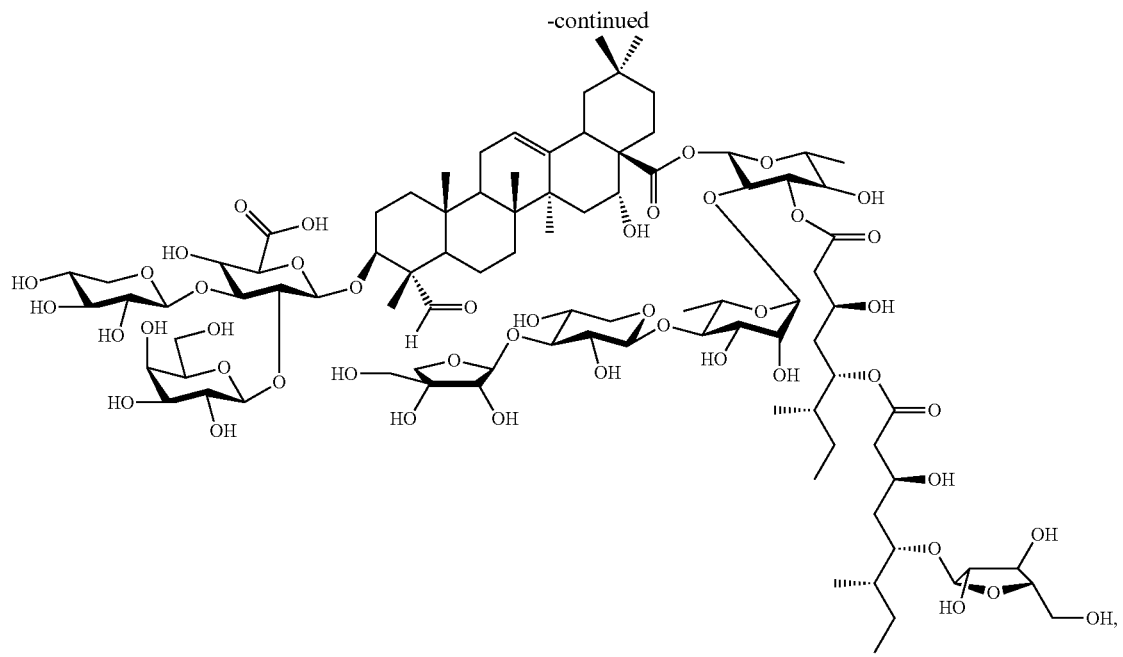
124
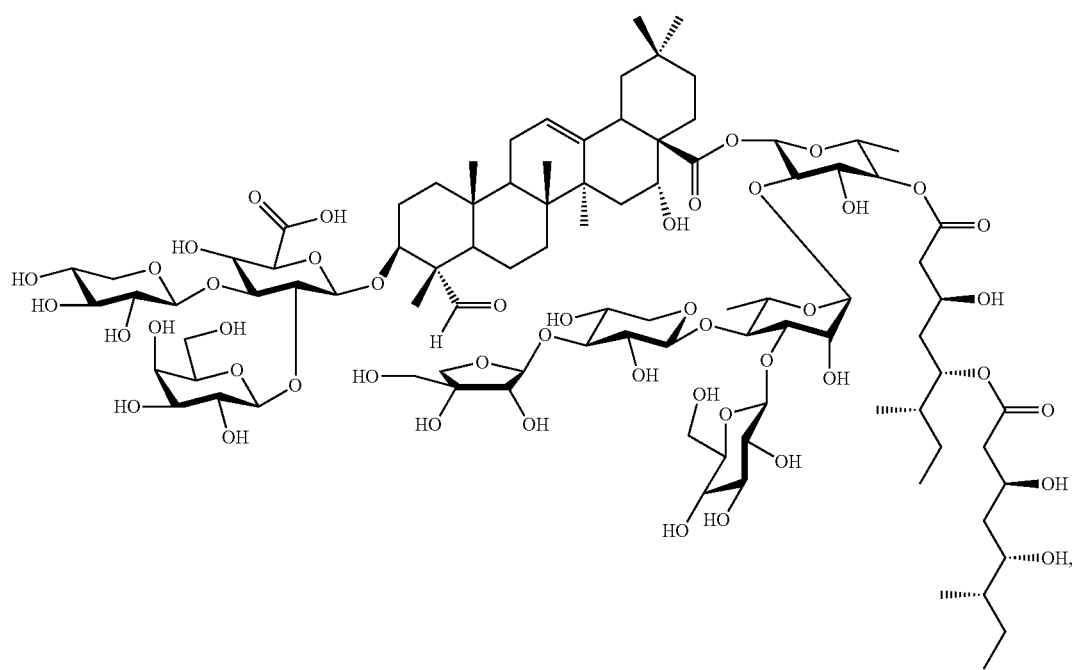

-continued
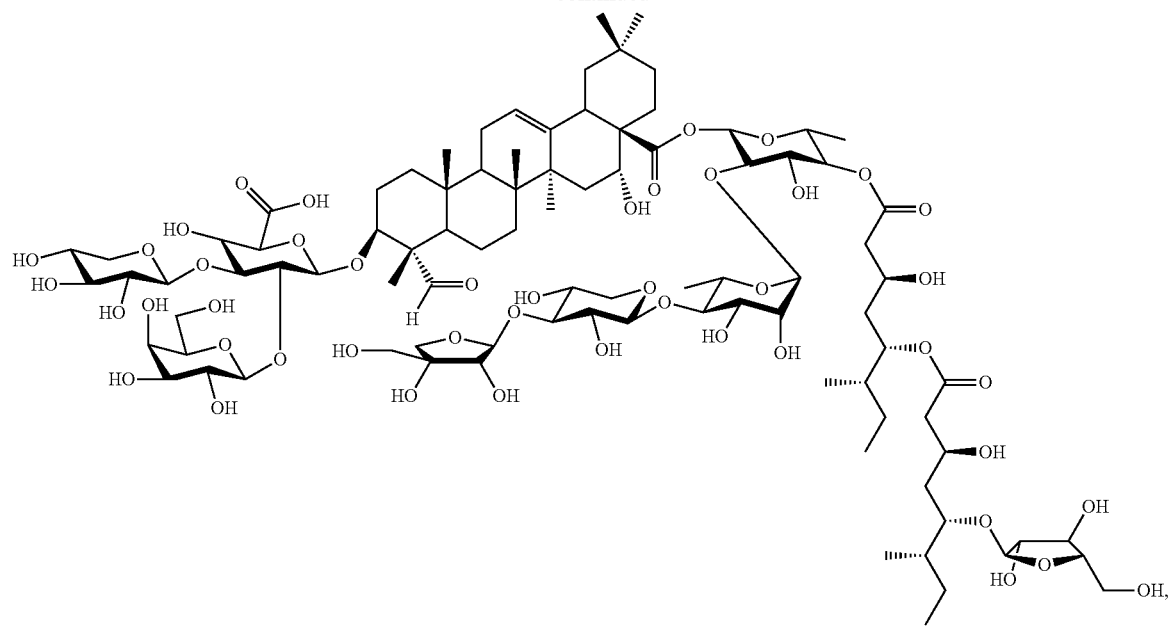
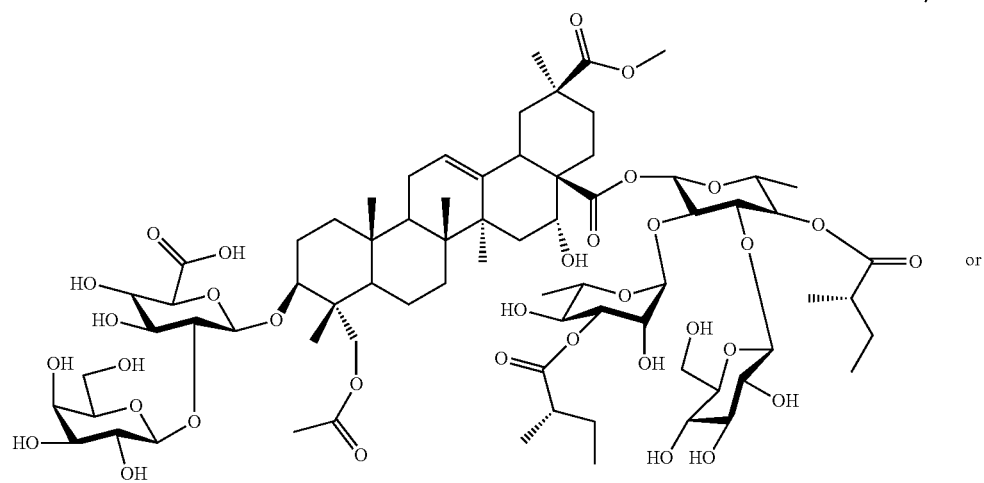
or
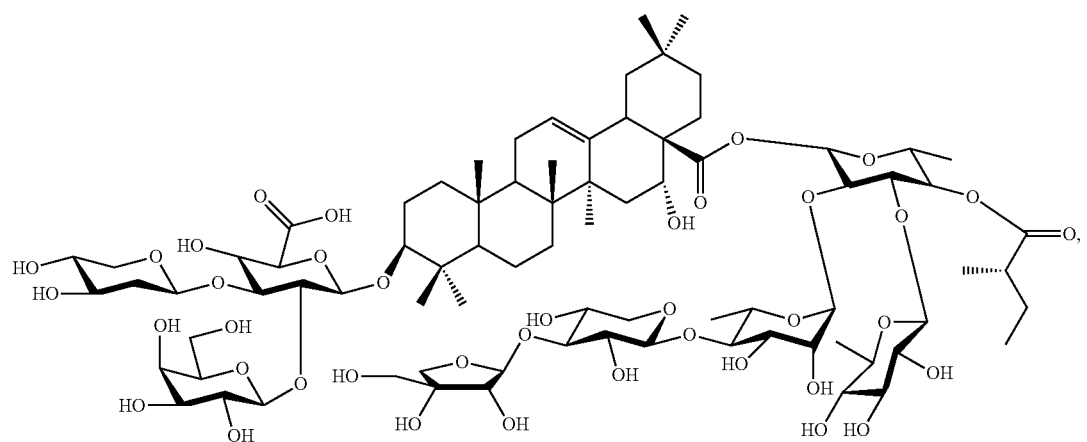

at least 88% such as at least 90%, at least 91%, at least 92% or at least 93%:
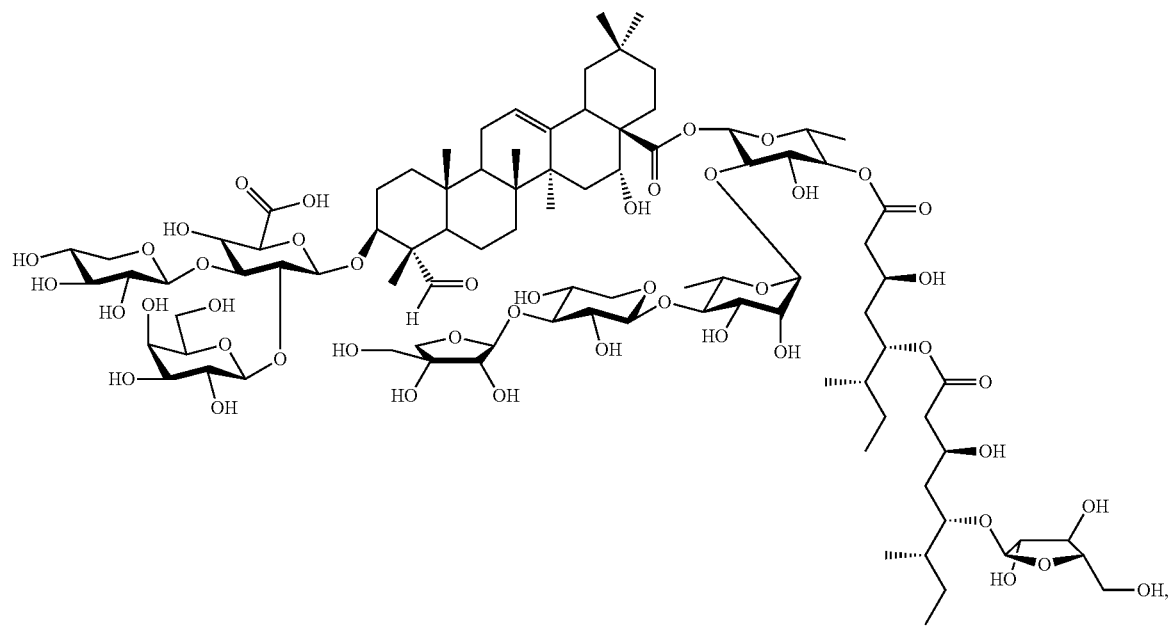
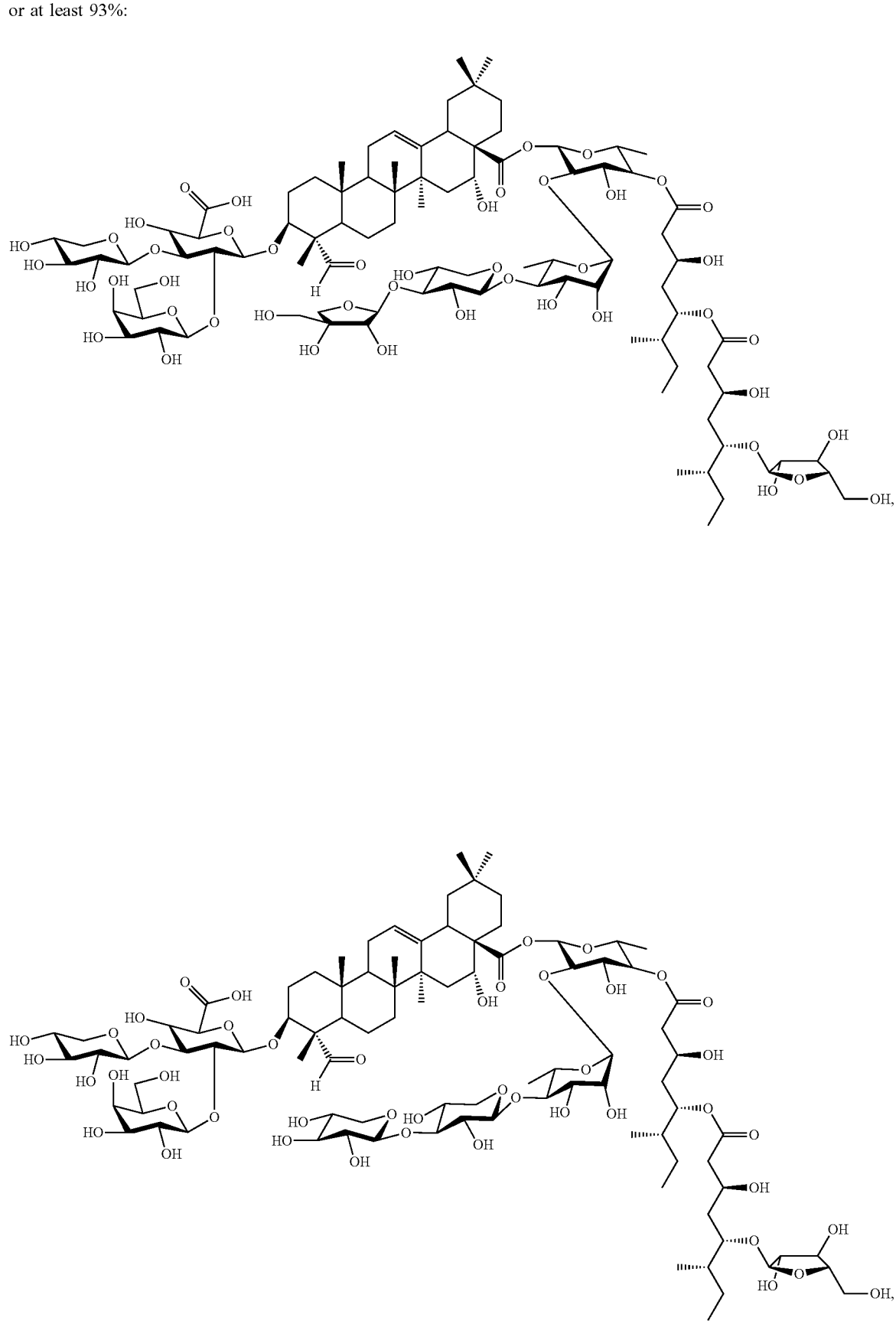

-continued
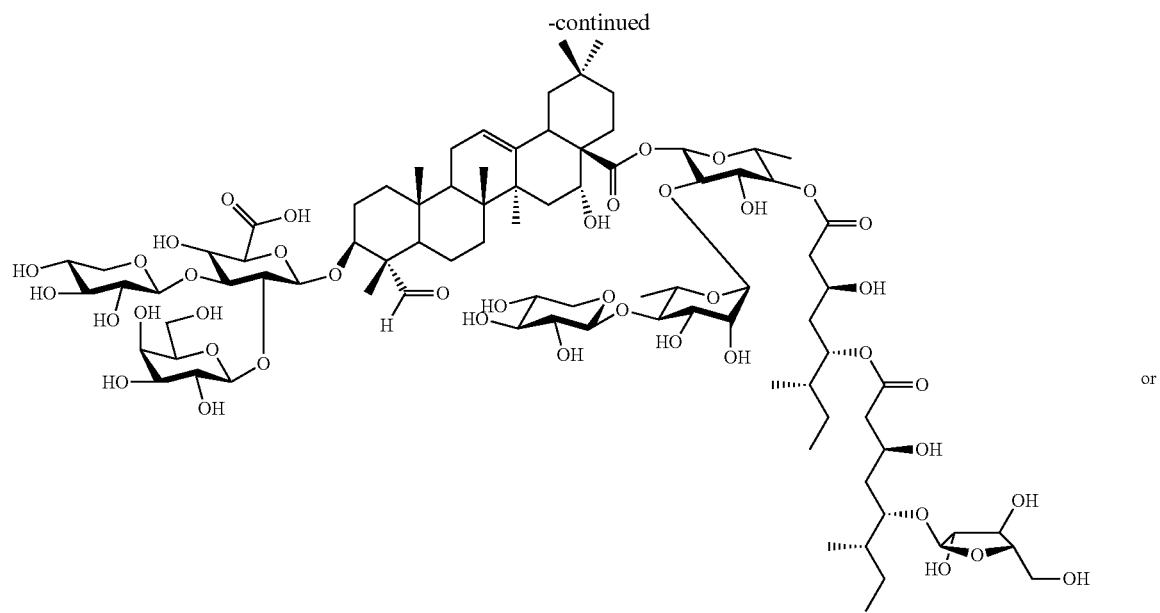
or
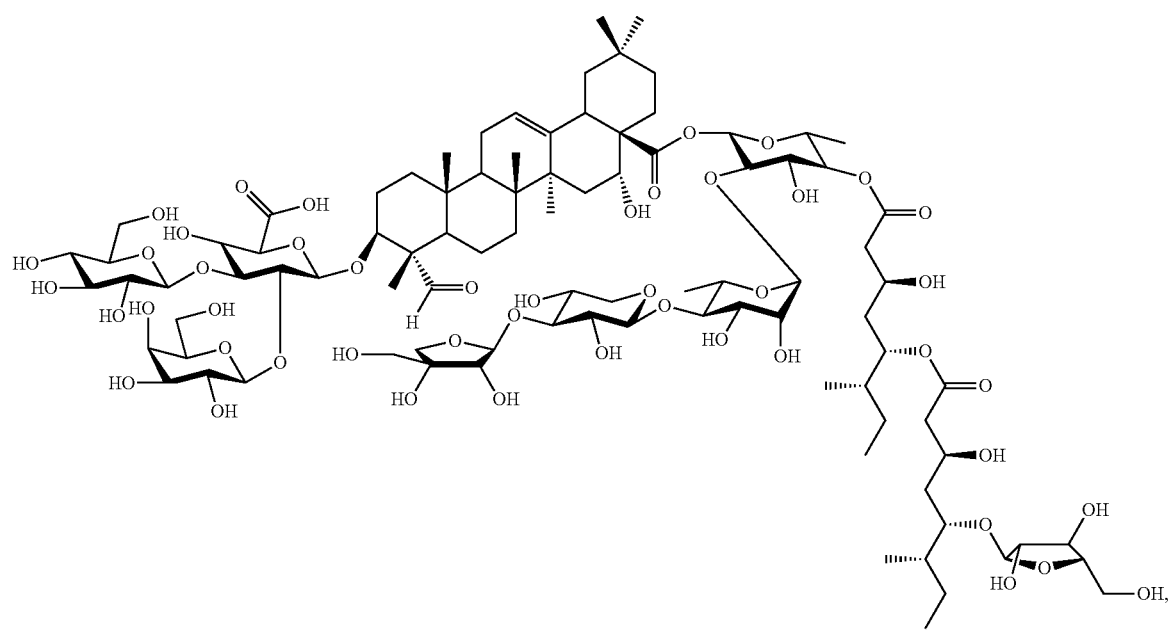

>3% to 10%:
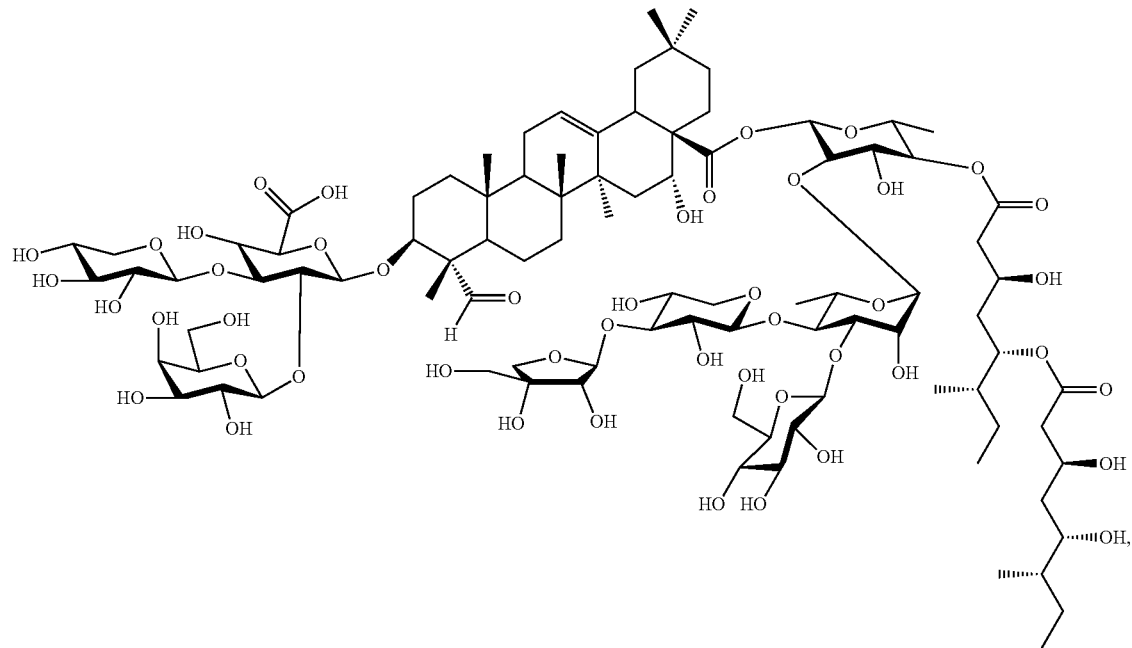
1% or less of any other peak by UV absorbance at 214 nm and wherein the monoisotope of the most abundant species is 1987.9 m/z.
Clause 47. The saponin extract according to clause 40, containing at least 98%
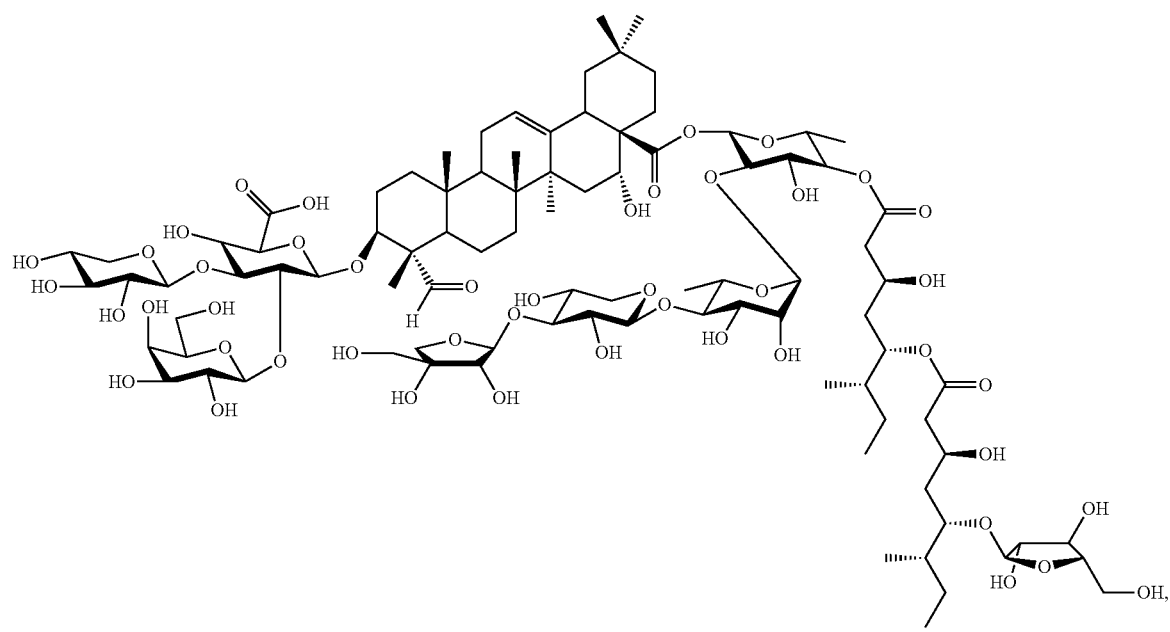

-continued
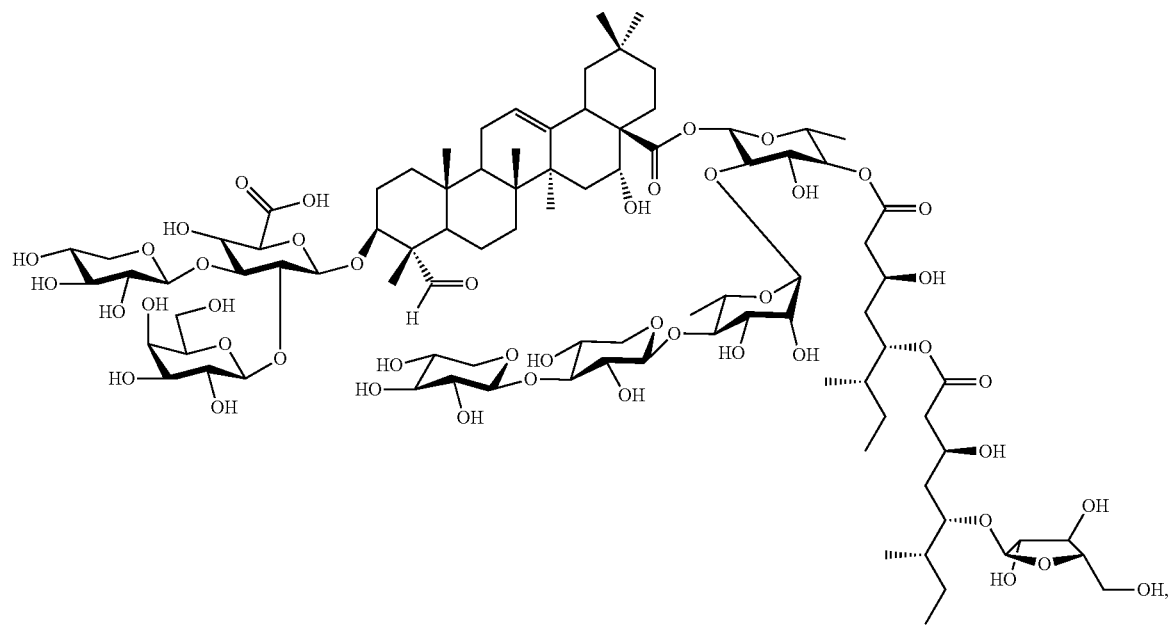
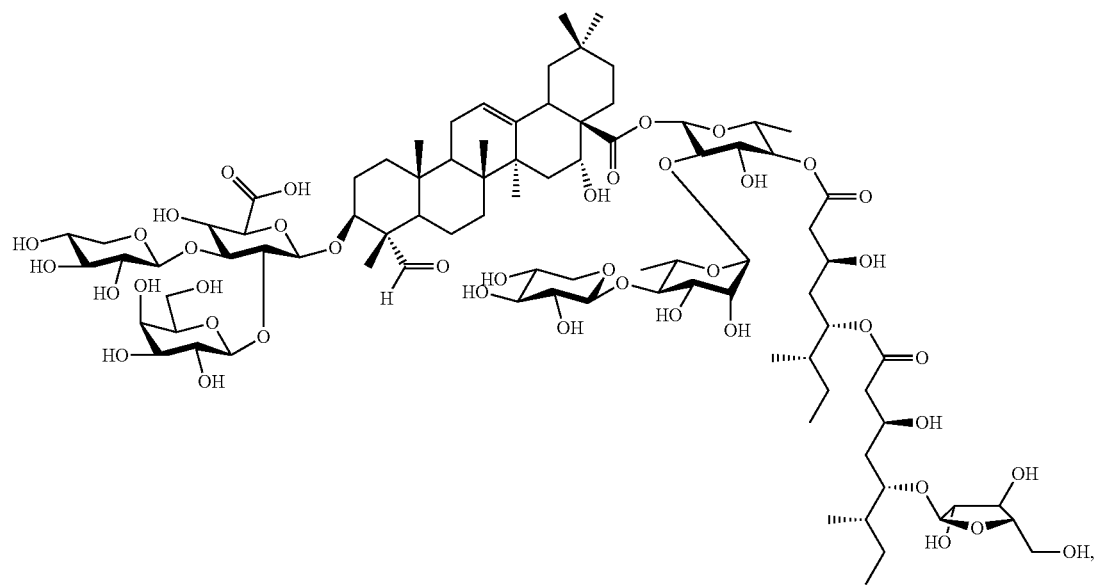

-continued
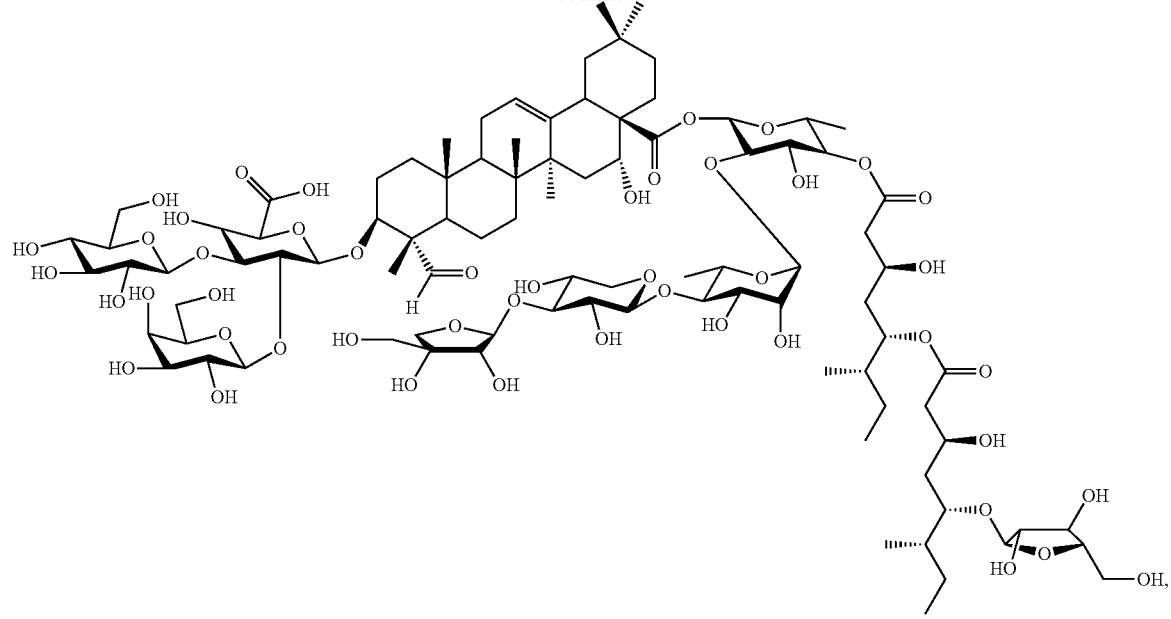
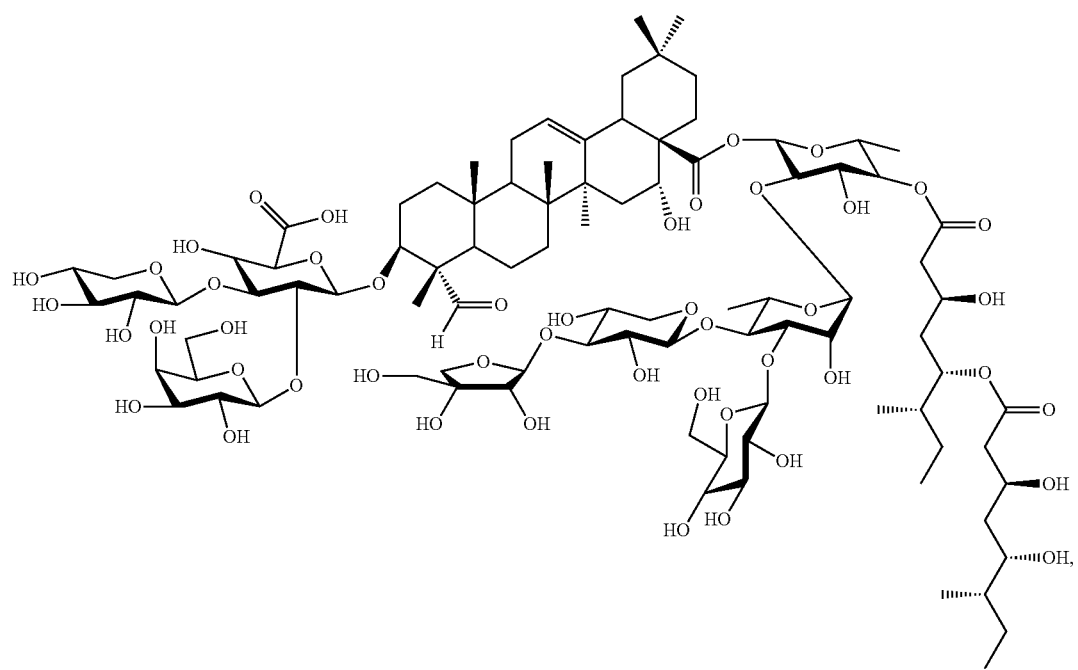

-continued
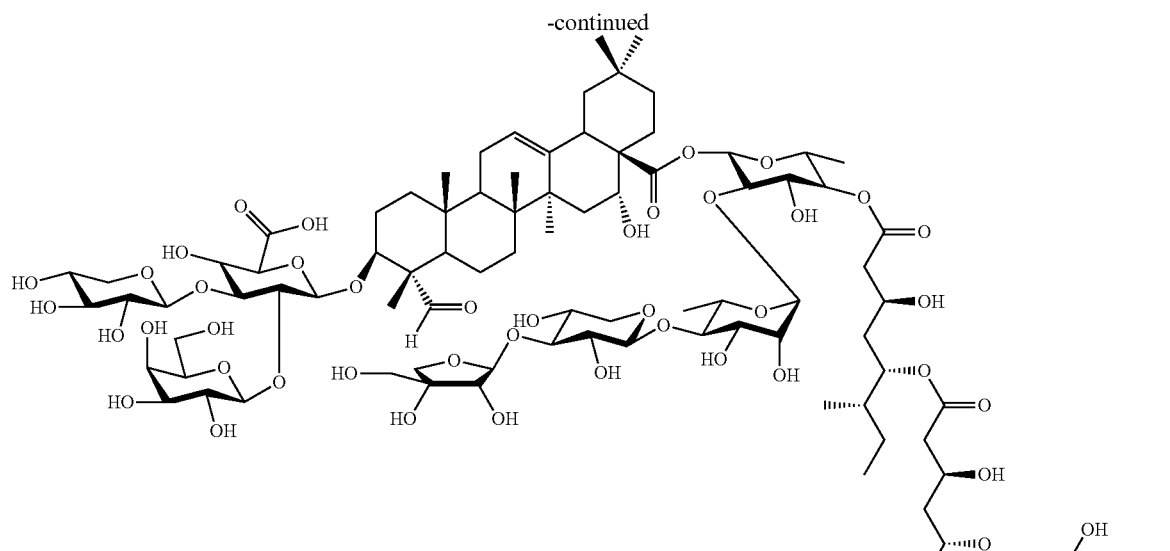
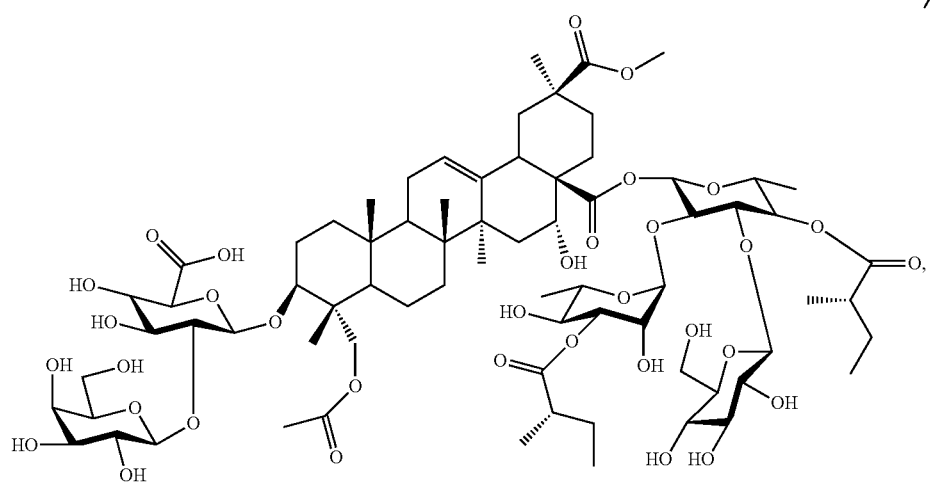
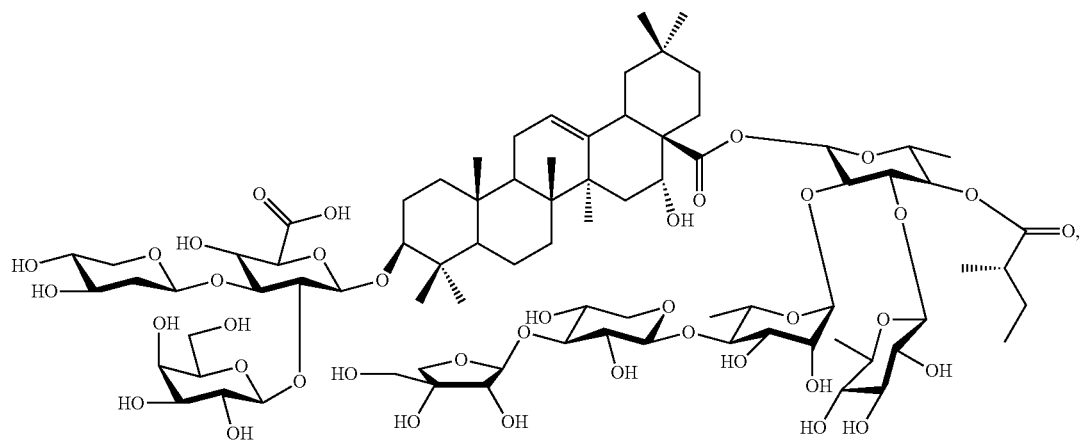
or 2118 component, at least 88%, such as at least 90%, at least 91%, at least 92% or at least 93%:
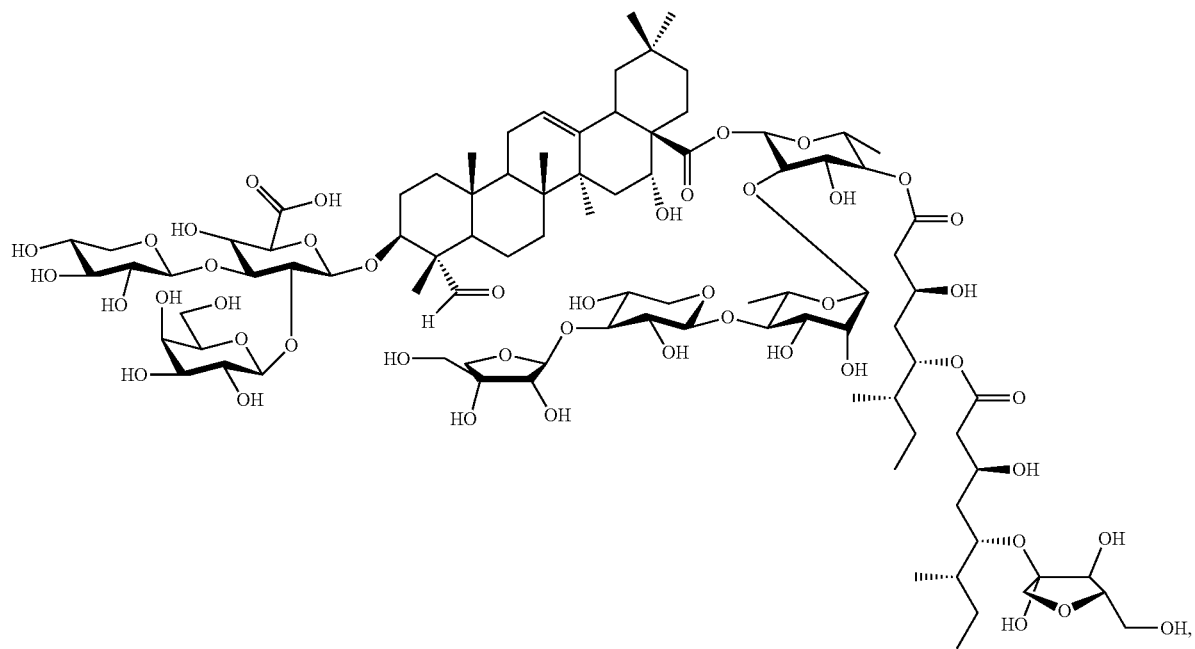
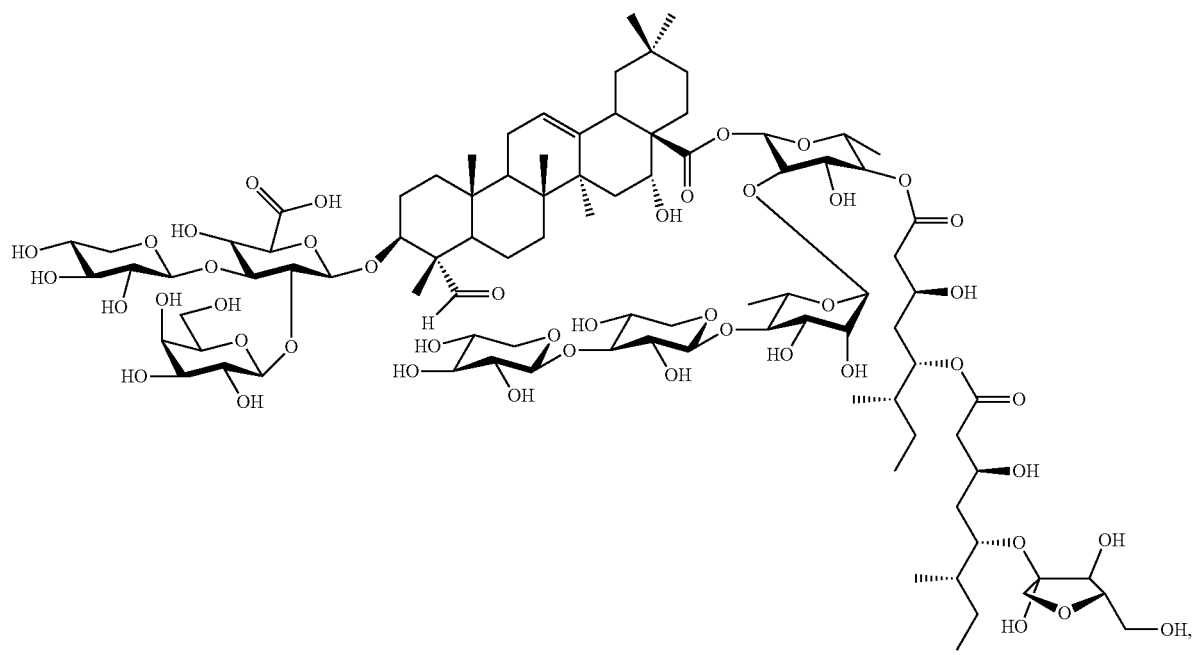

-continued
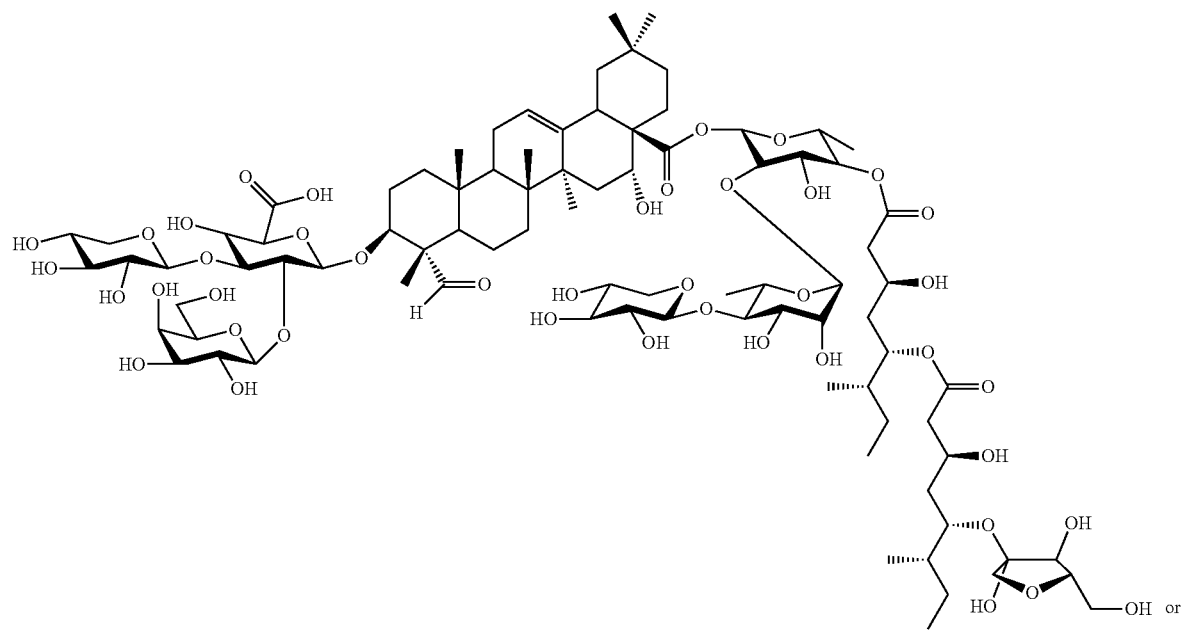
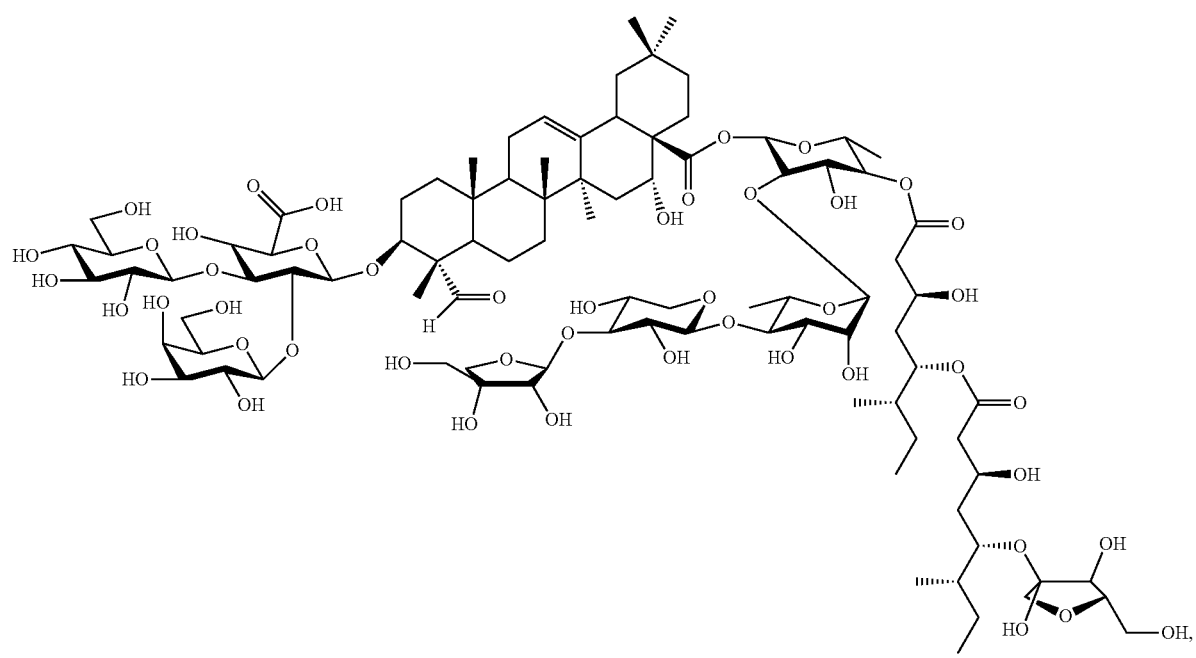

>3% to 10%:
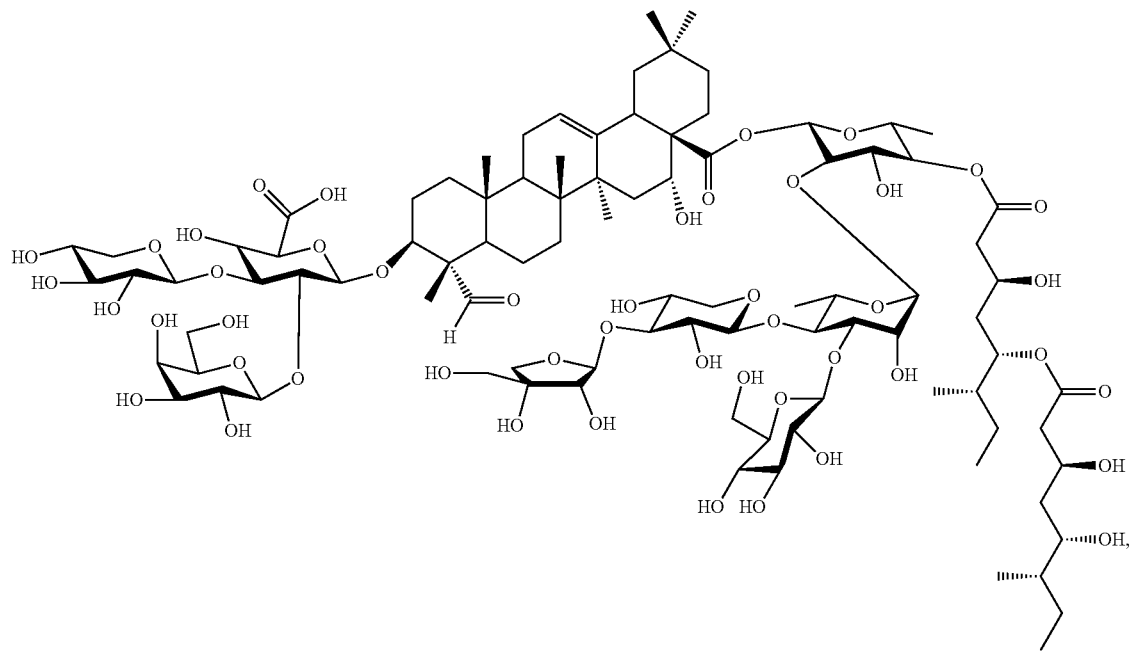
1% or less of any other peak by UV absorbance at 214 nm and wherein the monoisotope of the most abundant species is 1987.9 m/z.
Clause 48. The saponin extract according to any one of clauses 40 to 47, containing at least 40%, such as at least 50%, in particular at least 60%, especially at least 65%, such as at least 70%,
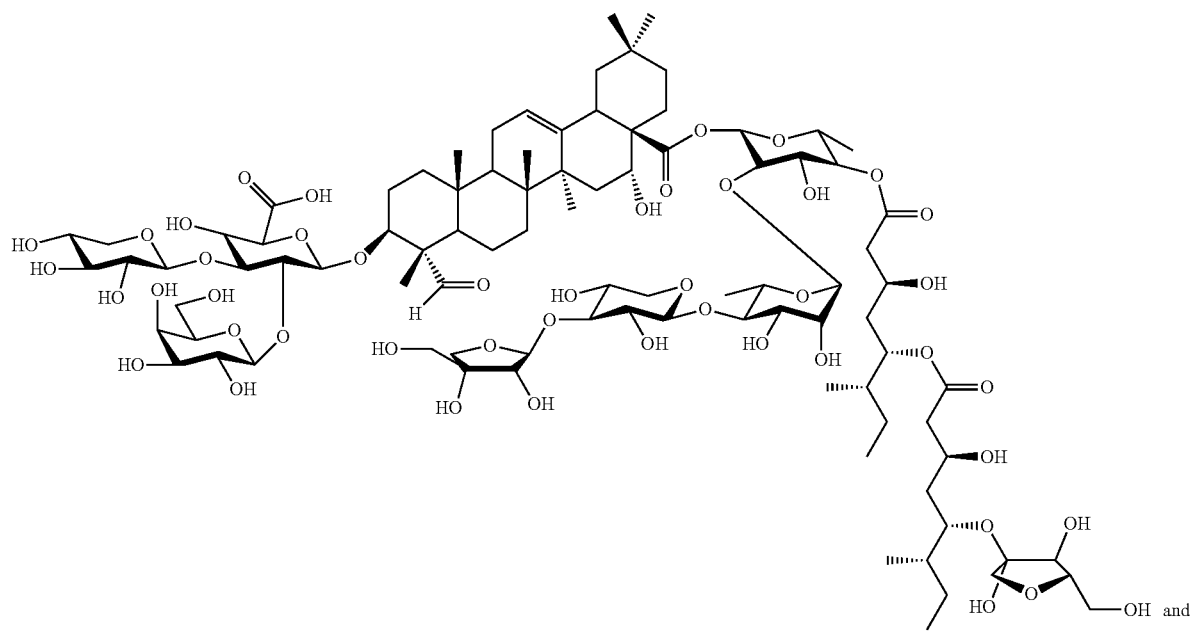
and -continued
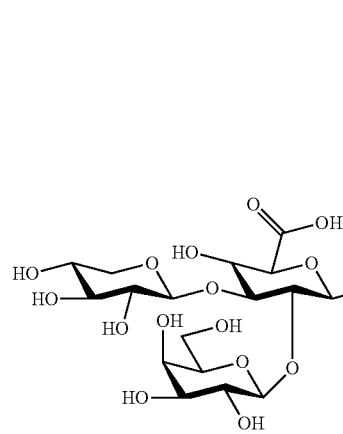
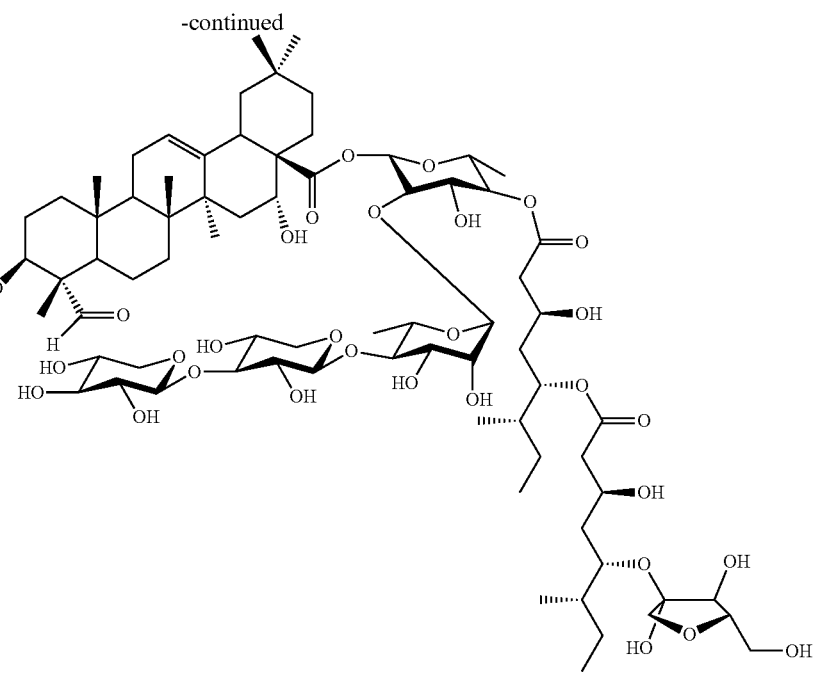
by UV absorbance at 214 nm and by relative ion abundance.
Clause 49. The saponin extract according to any one of clauses 40 to 48, containing 30% or less, such as 25% or less,
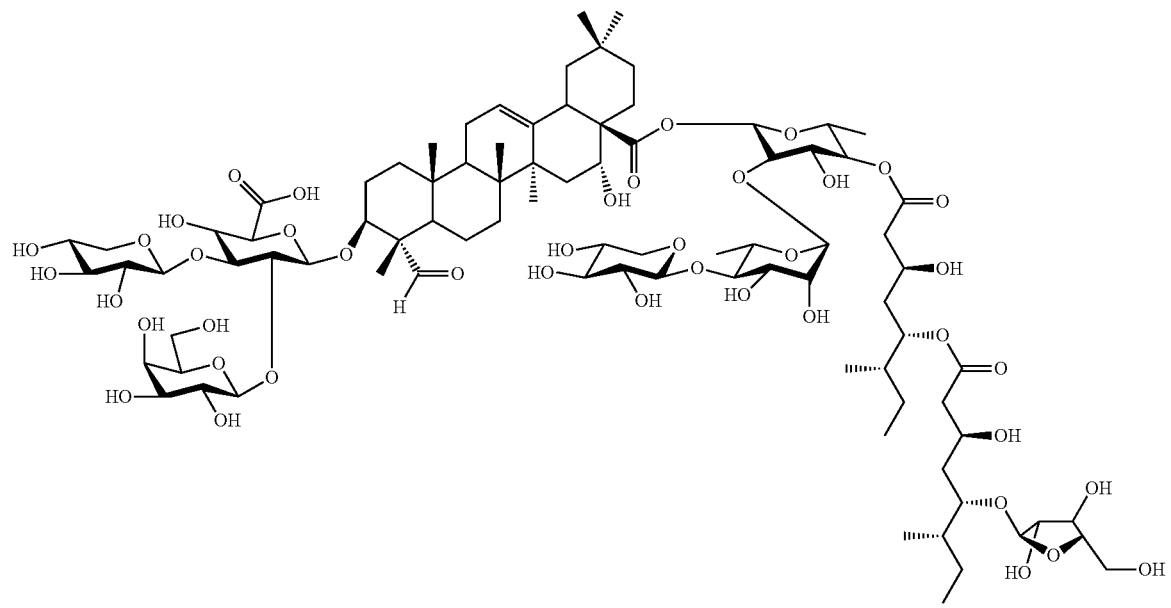
by UV absorbance at 214 nm and by relative ion abundance.
Clause 50. The saponin extract according to any one of clauses 40 to 49, containing at least 5%, such as at least 10%,

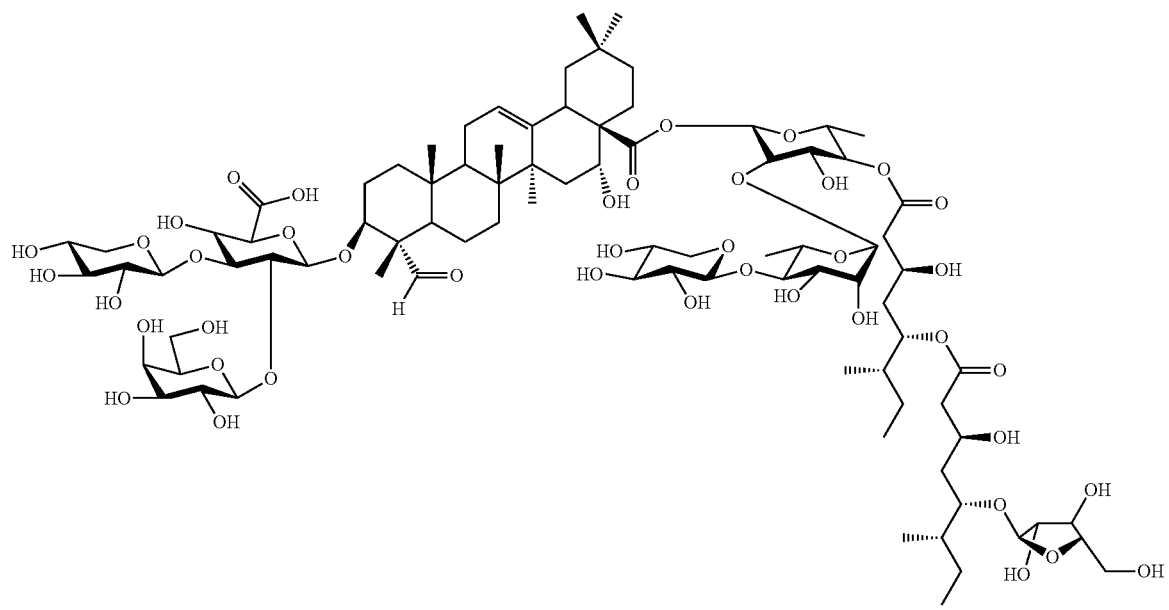
by UV absorbance at 214 nm and by relative ion abundance.
Clause 51. The saponin extract according to any one of clauses 40 to 50, containing 40% or less, such as 30% or less, in particular 20% or less, especially 10% or less
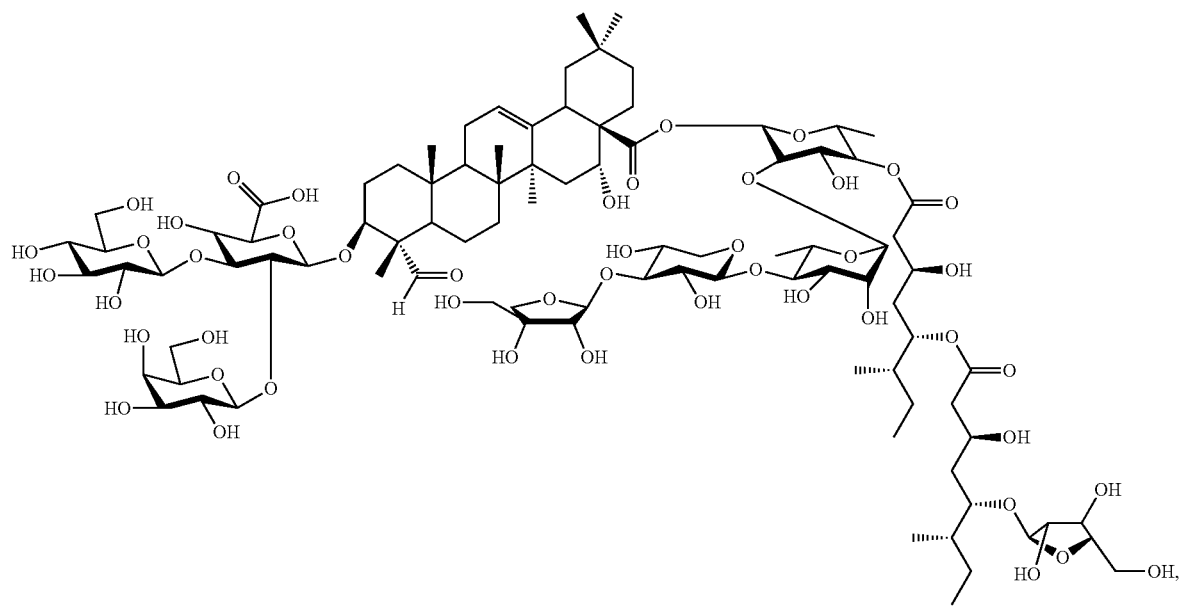
by UV absorbance at 214 nm and by relative ion abundance.
Clause 52. The saponin extract according to any one of clauses 40 to 51, containing at least 0.5%, such as at least 1%,

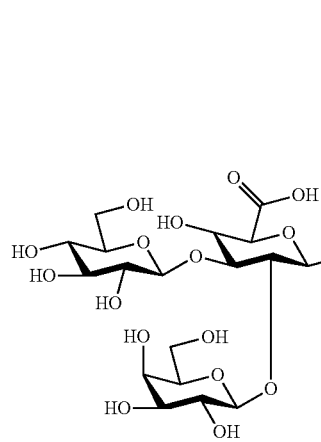
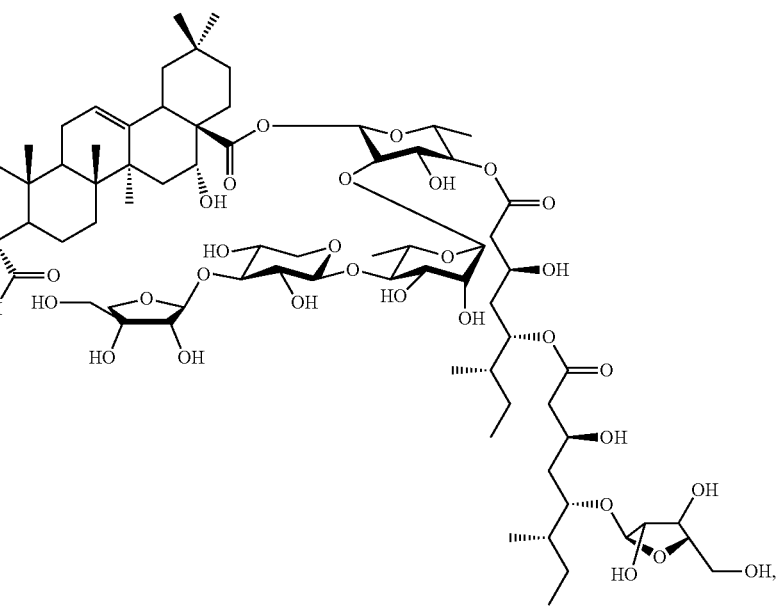
by UV absorbance at 214 nm and by relative ion abundance.
Clause 53. The saponin extract according to any one of clauses 40 to 52, comprising at least 3.5%, such as at least 4% or at least 4.5%
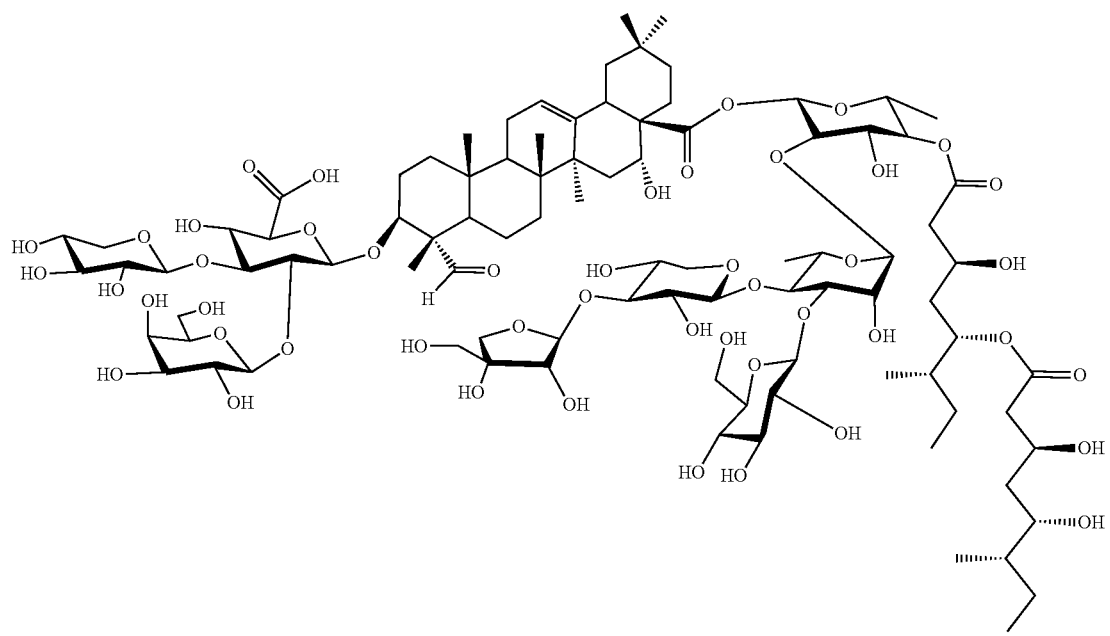
by UV absorbance at 214 nm.
Clause 54. The saponin extract according to any one of clauses 40 to 53, comprising 9% or less, such as 8% or less or 7% or less:

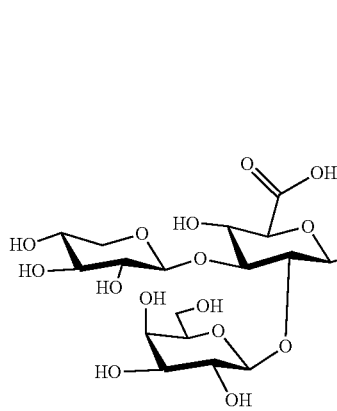
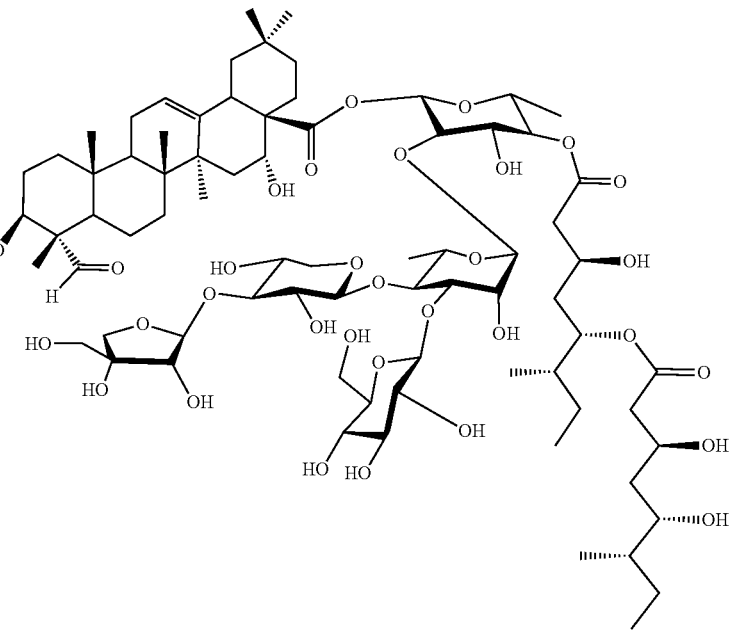

by UV absorbance at 214 nm.

Clause 55. The saponin extract according to any one of clauses 1 to 54, which is dried.

Clause 56. A method for identifying a crude aqueous extract of *Quillaja saponaria* Molina for use in the manufacture of a purified saponin extract, said method comprising the steps of:
  (i) determining the ratio of 2018 component/QS-21 main peak by UPLC-UV absorbance at 214 nm; and
  (ii) selecting a crude aqueous extract having a ratio of 2018 component/QS-21 main peak which is >0.075.

Clause 57. The method according to clause 56, wherein the crude aqueous extract selected in step (ii) has a ratio of 2018 component/QS-21 main peak which is >0.078.

Clause 58. The method according to clause 56 or 57, for use in the manufacture of the saponin extract of any one of clauses 1 to 55.

Clause 59. A method for the manufacture of a purified saponin extract comprising the steps of:
  (i) selecting a crude aqueous extract of *Quillaja saponaria* Molina having a 2018 component to QS-21 main peak ratio of >0.075;
  (ii) purifying the extract by polyvinylpyrollidone adsorption;
  (iii) purifying the extract by diafiltration, ultrafiltration or dialysis;
  (iv) purifying the extract by reverse phase chromatography using a polystyrene resin; and
  (v) purifying the extract by reverse phase chromatography using a phenyl resin.

Clause 60. The method of clause 59, wherein step (iii) uses purification by diafiltration.

Clause 61. The method of either clause 59 or 60, wherein step (iv) uses acetonitrile and water, in particular, under gradient conditions.

Clause 62. The method of any one of clauses 59 to 61, wherein step (v) uses acetonitrile and water, in particular, under isocratic conditions.

Clause 63. The method of any one of clauses 59 to 62, comprising the additional step of removing solvent to provide a dried saponin extract.

Clause 64. The method of clause 63, wherein removing solvent uses lyophilisation.

Clause 65. The method of any one of clauses 59 to 64, comprising the additional step of concentrating the extract by reverse phase chromatography using a C8 resin.

Clause 66. The method of clause 65, wherein concentrating the extract by reverse phase chromatography using a C8 resin uses acetonitrile and water, in particular, under stepped gradient conditions.

Clause 67. The method of either clause 65 or 66, comprising the additional step of exchanging the solvent.

Clause 68. The method of clause 67, wherein exchanging the solvent uses diafiltration, ultrafiltration or dialysis, especially diafiltration.

Clause 69. The method of any one of clauses 59 to 68, wherein the crude aqueous extract of *Quillaja saponaria* Molina has a 2018 component to QS-21 main peak ratio of >0.078.

Clause 70. The method of any one of clauses 59 to 69, wherein the crude aqueous extract of *Quillaja saponaria* Molina is an aqueous solution containing at least 1 g/L, such as at least 2 g/L, especially at least 2.5 g/L and in particular at least 2.8 g/L QS-21 main peak.

Clause 71. The method of any one of clauses 59 to 70, wherein the crude aqueous extract of *Quillaja saponaria* Molina is a bark extract.

Clause. 72. The method of any one of clauses 59 to 71, wherein the step (i) of selecting a crude aqueous extract of *Quillaja saponaria* Molina includes testing the crude aqueous extract composition to determine 2018 component content.

Clause 73. Use of a saponin extract according to any one of clauses 1 to 55 in the manufacture of a medicament, such as an adjuvant or immunogenic composition.

Clause 74. A saponin extract according to any one of clauses 1 to 55 for use as an adjuvant.

Clause 75. An adjuvant composition comprising a saponin extract according to any one of clauses 1 to 55.

Clause 76. The use, saponin extract or adjuvant composition according to any one of clauses 73 to 75, wherein adjuvant is a liposomal formulation.

Clause 77. The use, saponin extract or adjuvant composition according to any one of clauses 73 to 76, wherein adjuvant comprises a TLR4 agonist.

Clause 78. The use, saponin extract or adjuvant composition according to clause 77, wherein the TLR4 agonist is 3D-MPL.

Clause 79. An immunogenic composition comprising an adjuvant composition according to any one of clauses 75 to 78 and an immunogen or antigen, or a polynucleotide encoding the immunogen or antigen.

Clause 80. The immunogenic composition according to clause 79, wherein the antigen is derived from a human or non-human pathogen including, e.g., bacteria, fungi, parasitic microorganisms or multicellular parasites which infect human and non-human vertebrates, or from a cancer cell or tumor cell.

Clause 81. The immunogenic composition according to clause 80, wherein the antigen is derived from *Plasmodium falciparum* or *Plasmodium vivax*, such as the antigen of SEQ ID No 1.

Clause 82. The immunogenic composition according to clause 80, wherein the antigen is derived from *Mycobacterium* spp., such as derived from any one of SEQ ID Nos 2 to 5.

Clause 83. The immunogenic composition according to clause 80, wherein the antigen is derived from Varicella zoster virus, such as the antigen of SEQ ID No 6.

Clause 84. The immunogenic composition according to clause 80, wherein the antigen is derived from human respiratory syncytial virus, such as the antigen of SEQ ID No 7.

Clause 85. The immunogenic composition according to clause 80, wherein the antigen is derived from HIV, such as the antigen of SEQ ID No 8 or 9.

Clause 86. The immunogenic composition according to clause 80, wherein the antigen is derived from non-typeable *H. influenzae* (NTHi) and/or *M. catarrhalis*.

Clause 87. The immunogenic composition according to any one of clauses 79 to 86, wherein the antigen is provided as a polypeptide.

Clause 88. The immunogenic composition according to any one of clauses 79 to 86, wherein a polynucleotide is provided which encodes the polypeptide antigen.

Clause 89. A method for determining the ratio of 2018 component/QS-21 main peak in a crude aqueous extract of *Quillaja saponaria* Molina, said method comprising the steps of:
 (i) determining the 2018 component content in the crude aqueous extract of *Quillaja saponaria* Molina by UPLC-UV absorbance at 214 nm;
 (ii) determining the QS-21 main peak content in the crude aqueous extract of *Quillaja saponaria* Molina by UPLC-UV absorbance at 214 nm; and
 (iii) comparing the 2018 component content to the QS-21 main peak content to determine the ratio of 2018 component/QS-21 main peak.

Clause 90. A method for the manufacture of a purified saponin extract containing at least 88% QS-21 main peak and >3 to 10% 2018 component by UV absorbance at 214 nm, said method comprising the steps of:
 (i) selecting *Quillaja saponaria* Molina material having a suitable 2018 component composition;
 (ii) preparing a crude aqueous extract of the *Quillaja saponaria* Molina material under suitable conditions; and
 (iii) purifying the crude aqueous extract to obtain the purified saponin extract.

Clause 91. The method of clause 90, for the manufacture of a saponin extract according to any one of clauses 1 to 55.

The teaching of all references in the present application, including patent applications and granted patents, are herein fully incorporated by reference. A composition or method or process defined as "comprising" certain elements is understood to encompass a composition, method or process (respectively) consisting of those elements. As used herein, 'consisting essentially of' means additional components may be present provided they do not alter the overall properties or function.

The invention will be further described by reference to the following, non-limiting, examples:

EXAMPLES

Example 1—HPLC of a Crude Aqueous Extract of *Quillaja saponaria* Molina

Crude bark extract was separated by reverse phase HPLC using a C4 column and gradient elution: mobile phase A—water/acetonitrile, 7/3 v/v with 0.15% trifluoroacetic acid; mobile phase B—acetonitrile with 0.15% trifluoroacetic acid. UV detection was at 214 nm.

Crude bark extract samples are diluted as necessary with purified water.

Polyvinylpolypyrrolidone (PVPP; 60 mg/mL) was added, the mixture stirred for approximately 30 minutes, and then centrifuged to separate the PVPP resin from the supernatant. The supernatant was then analysed to provide an HPLC UV chromatogram.

FIG. 1 provides a representative example of an HPLC UV chromatogram. The peak corresponding to the QS-21 fraction is indicated.

Example 2—Analytical Methods

HPLC-UV
Equipment
Waters Alliance 2690/2695 separations module
Waters 2487 UV Detector or 2996 PDA Detector
Vydac Protein C4 4.6×250 mm 5 um column
Mobile Phase A (MPA)—0.15% trifluoroacetic acid in water/acetonitrile (70:30 v/v)
Mobile Phase B (MPB)—0.15% trifluoroacetic acid in acetonitrile
Linear Gradient Conditions:

| Time | Flow rate (ml/min) | % MPA | % MPB |
| --- | --- | --- | --- |
| 0 | 1 | 100 | 0 |
| 30 | 1 | 78.6 | 21.4 |
| 33 | 1 | 14.3 | 85.7 |

40 ul of sample is injected. UV detection is set at 214 nM. Using a blank injection for reference, integration of peaks in the chromatogram provides a total absorbance. Peak of interest (e.g. QS-21 main peak) is compared to total absorbance to determine peak content as a percentage.

The HPLC-UV method is also conveniently used to determine QS-21 main peak content and Preceding peak to QS-21 main peak ratio.

UPLC-UV
Equipment
Waters Acquity UPLC
Waters Acquity Tunable UV Detector

Waters Acquity BEH C18 2.1×100 mm 1.7 um column
Mobile Phase A (MPA)—0.025% acetic acid in water/acetonitrile (70:30 v/v)
Mobile Phase B (MPB)—0.025% trifluoroacetic acid in water/acetonitrile (30:70 v/v)
Linear Gradient Conditions:

| Time | Flow rate (ml/min) | % MPA | % MPB |
|---|---|---|---|
| 0 | 0.5 | 88 | 12 |
| 10.2 | 0.5 | 65.7 | 34.3 |
| 11.2 | 0.5 | 10 | 90 |
| 13.2 | 0.5 | 10 | 90 |

Column temperature 28 degrees C. 10 ul of sample is injected. UV detection is set at 214 nM.
Using a blank injection for reference, integration of peaks in the chromatogram provides a total absorbance. Peak of interest (e.g. QS-21 main peak) is compared to total absorbance to determine peak content as a percentage.
The UPLC-UV method is also conveniently used to determine 2018/QS-21 Ratio.
UPLC-UV/MS
Equipment
Waters Acquity UPLC
Waters Acquity Tunable UV Detector
Waters Single-Quadrupole Mass Detector SQD1 (scanning range 1400 to 2040 M/Z)
Waters Acquity BEH C18 2.1×100 mm 1.7 um column
Mobile Phase A (MPA)—0.025% trifluoroacetic acid in water/acetonitrile/isopropyl alcohol
(75:20:5 v/v)
Mobile Phase B (MPB)—0.025% trifluoroacetic acid in water/acetonitrile/isopropyl alcohol
(10:72:18 v/v)
Linear Gradient Conditions:

| Time | Flow rate (ml/min) | % MPA | % MPB |
|---|---|---|---|
| 0 | 0.6 | 100 | 0 |
| 6.23 | 0.6 | 23 | 77 |

Figure 5:
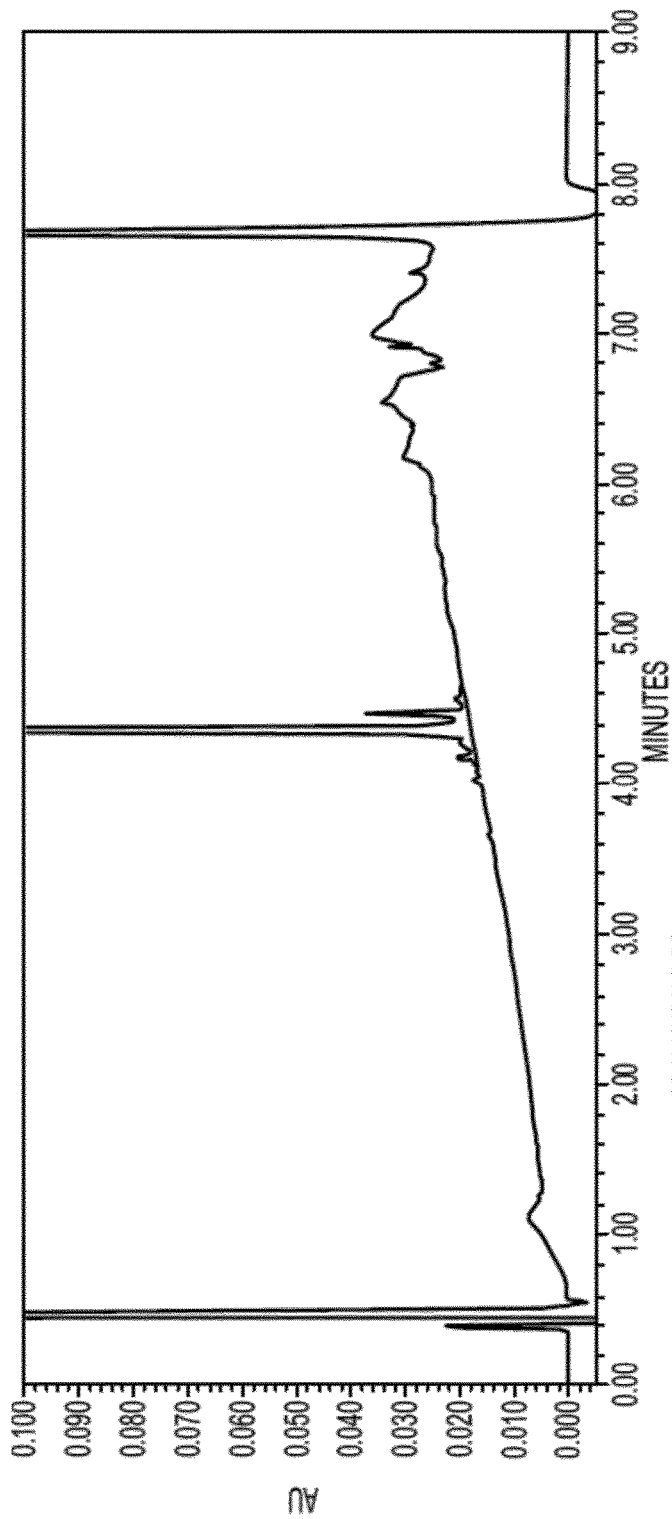
Figure 7:
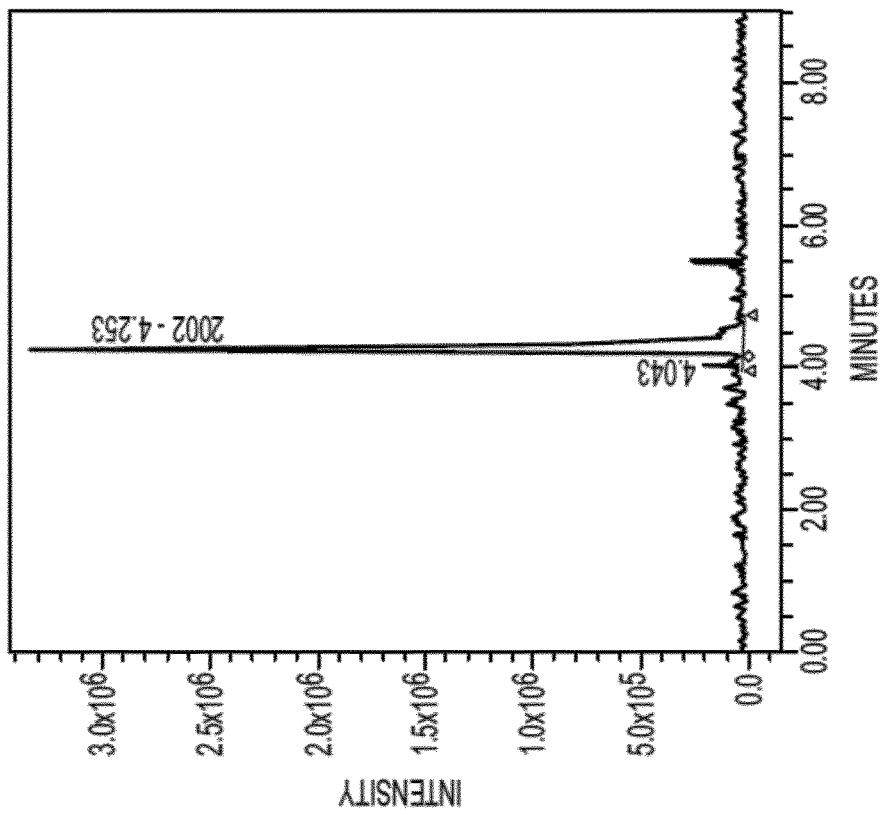
Figure 7:
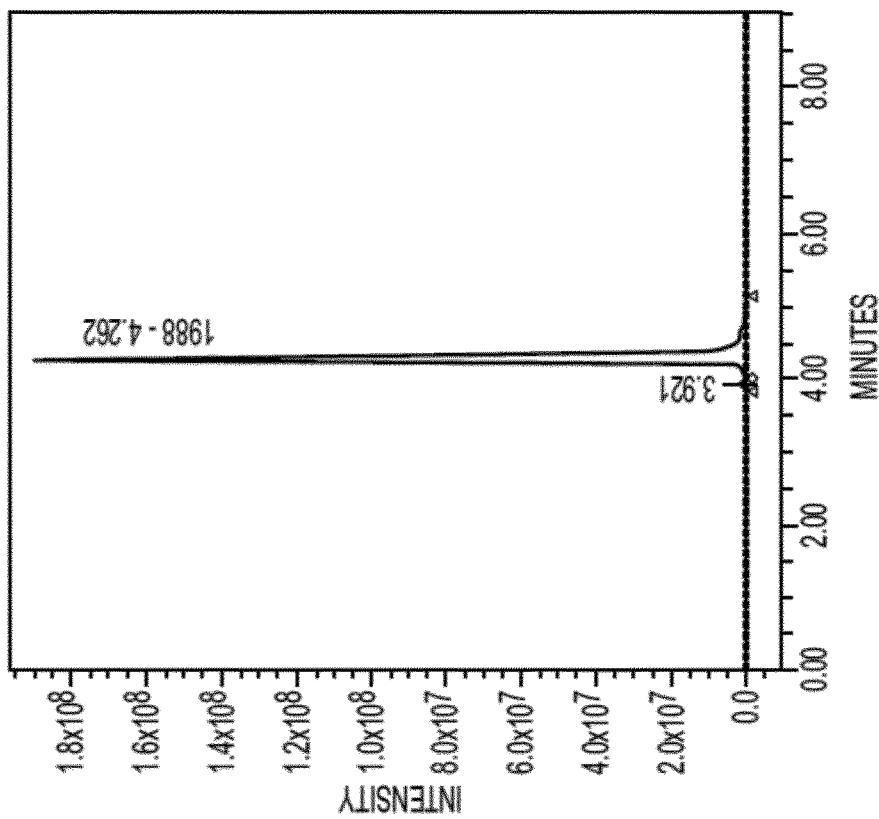
Figure 8:
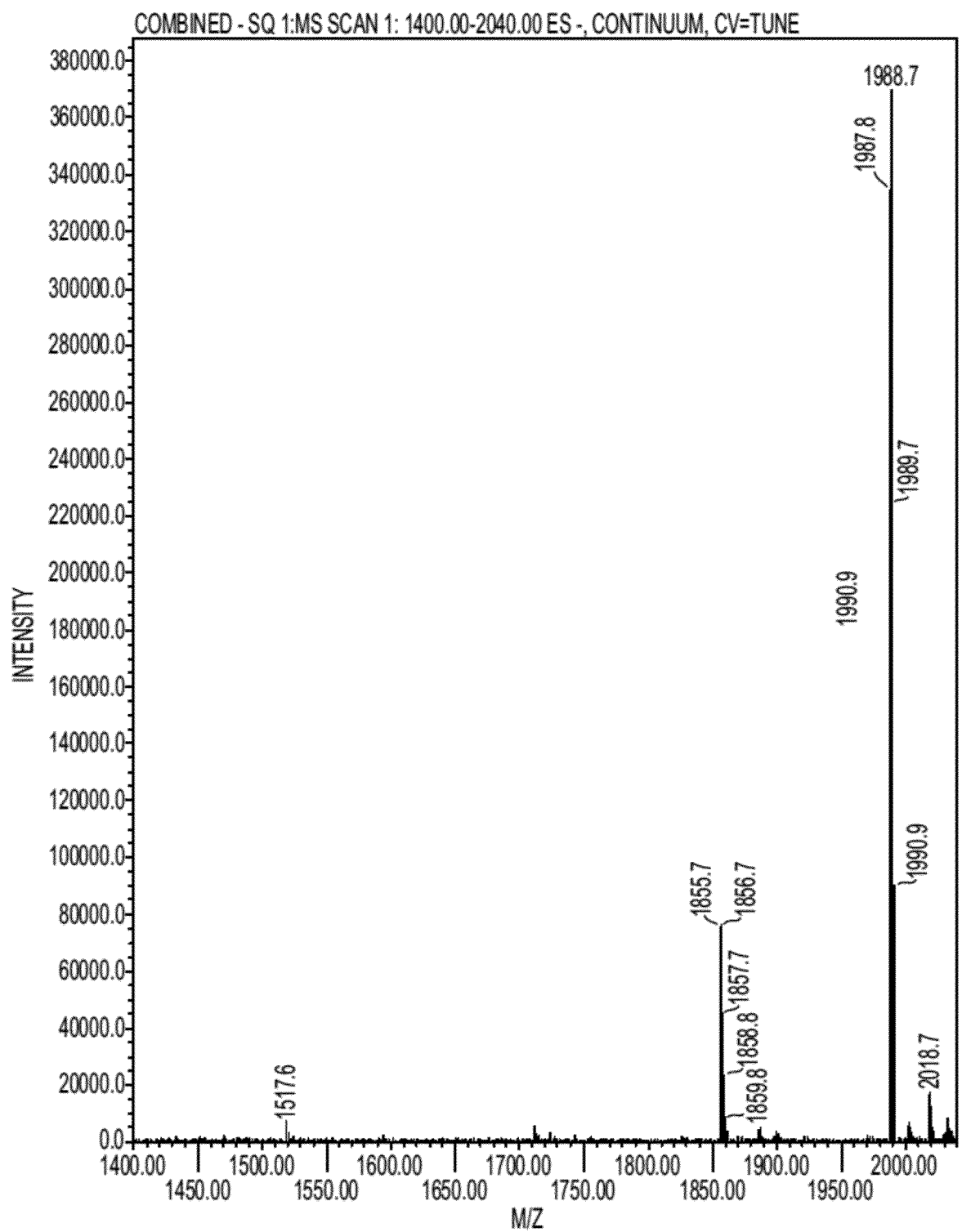

Test sample is prepared in 0.2% acetic acid in water/acetonitrile (70:30 v/v). Column temperature 55 degrees C. 10 ul of sample is injected. UV detection is set at 214 nM. Although retention times vary slightly between runs, the QS-21 group is located at approximately 3.8 min (B-isomer) to approximately 4.5 minutes (prior to lyo impurity).
Using a blank injection for reference, integration of peaks in the chromatogram that elute after the solvent front between 0.5 and around 5.50 minutes and do not appear in the blank is undertaken.
The monoisotope of the most abundant species is identified by combining TIC over the entire chromatogram to create a combined spectrum.
Ratio of 2002 component to 1988 component is calculated by comparing the ion current associated with the 2002 component with the ion current associated with the 1988 component within the QS-21 main peak.
FIG. 5 provides an chromatogram of an exemplary saponin extract. FIG. 6 shows expanded detail of the region including the QS-21 group and lyo component.
FIGS. 7A and 7B provides extracted mass chromatograms for 1988 (FIG. 7A) and 2002 (FIG. 7B) molecular weight ions of an exemplary purified Quillaja saponaria Molina saponin extract.

Example 3—Purification of a Crude Aqueous Extract of Quillaja saponaria Molina

Figure 3:
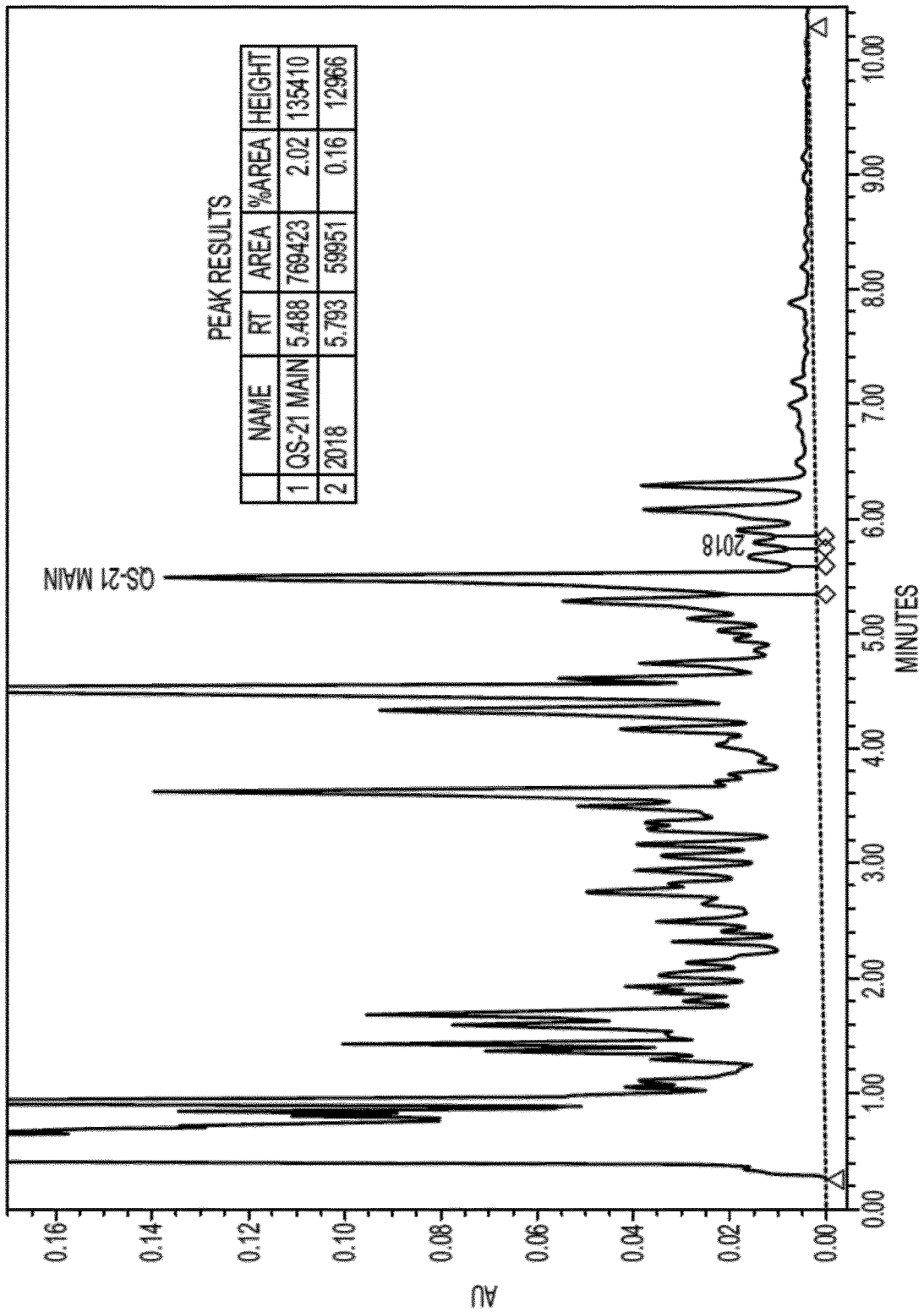

Crude aqueous extract of Quillaja saponaria Molina material having a 2018 component to QS-21 main peak ratio of 0.064 or lower and a Preceding peak to QS-21 main peak ratio of 0.4 or lower, was treated with PVPP (1 kg PVPP per litre of crude aqueous extract). After adsorption the mixture was filtered to separate the PVPP and bound impurities from the liquor.
FIG. 2 provides an example HPLC-UV chromatogram for crude aqueous extract of Quillaja saponaria Molina (used for Preceding peak to QS-21 main peak ratio determination and QS-21 main peak content).
FIG. 3 provides an example UPLC-UV chromatogram for crude aqueous extract of Quillaja saponaria Molina (used for 2018 component to QS-21 main peak ratio determination).
Filtered liquor was concentrated and further purified by ultrafiltration/diafiltration using a 30 kD Hellicon membrane.
Resulting permeate was purified by reverse phase chromatography using a polystyrene resin (Amberchrom XT20) and the following conditions:

| Step | Duration (min) | Initial % Eluent A | Initial % Eluent B | Final % Eluent A | Final % Eluent B |
|---|---|---|---|---|---|
| Injection + Rinse | 11.3 | 100% | 0% | 100% | 0% |
| Gradient Elution 1 | 3.0 | 100% | 0% | 71% | 29% |
| Gradient Elution 2 | 50.0 | 71% | 29% | 53% | 47% |
| Gradient Elution 3 | 3.0 | 53% | 47% | 0% | 100% |
| Regeneration | 10 | 0% | 100% | 0% | 100% |
| Gradient | 3.0 | 0% | 100% | 100% | 0% |
| Equilibration | 13.0 | 100% | 0% | 100% | 0% |

Figure 4:
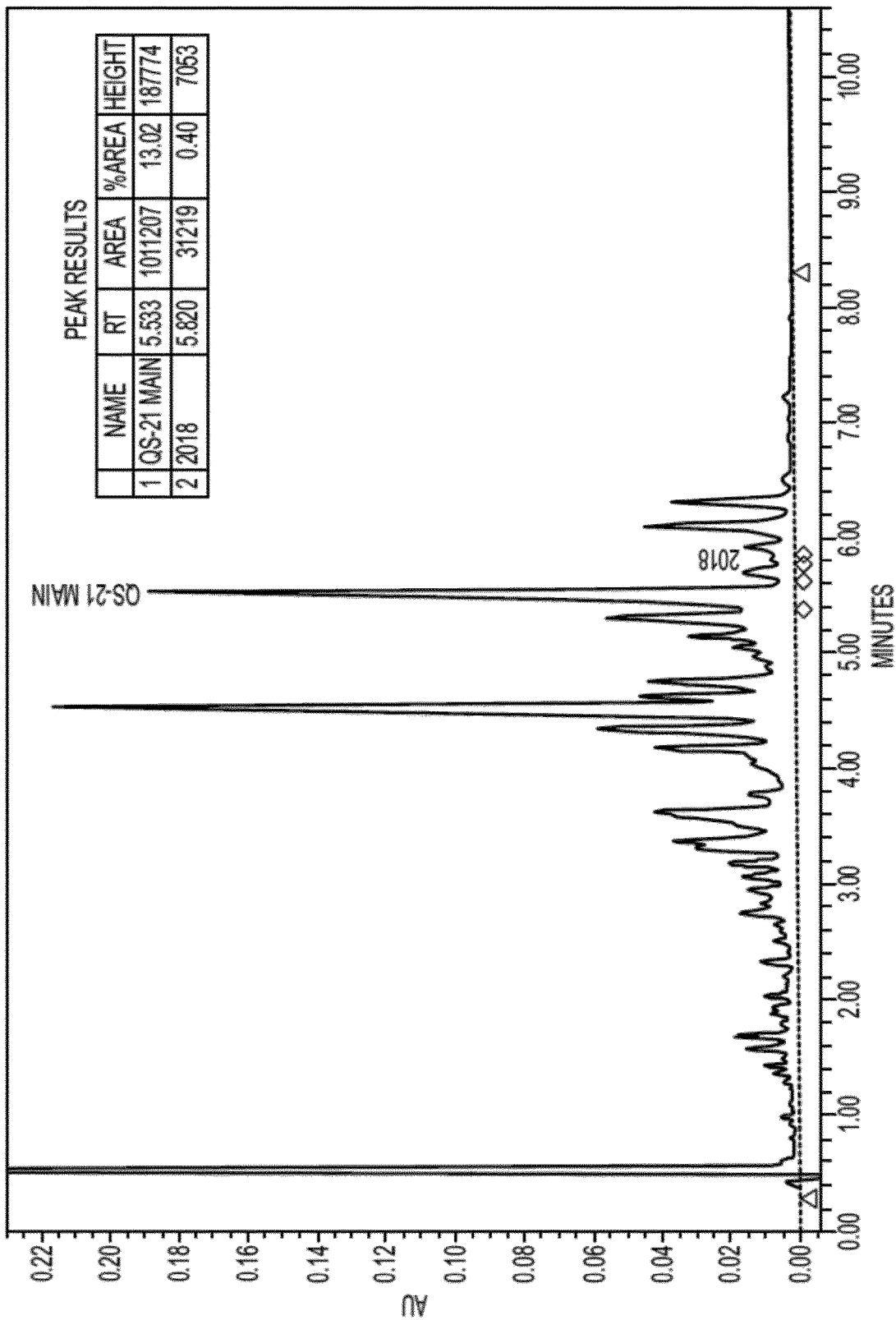

Eluent A: 5% Acetonitrile and 0.25% acetic acid
Eluent B: 90% Acetonitrile and 0.25% acetic acid
Column: 30 cm ID
Loading: 50-110 g per injection Fractions were pooled to provide polystyrene purified saponin extract with a composition: % QS-21 main peak•18% (by HPLC)
and
2018 component/QS-21 main peak ratio•0.054 (by UPLC-UV).
FIG. 4 provides an example UPLC-UV chromatogram for a polystyrene purified saponin extract pool.
The combined polystyrene purified fraction pool was further purified by reverse phase chromatography using a phenyl resin (EPDM) and the following conditions:

| Step | Duration (min) | % Eluent C | % Eluent B |
|---|---|---|---|
| Injection + Rinse | 2.0 | 100% | 0% |
| Isocratic Elution | 58.0 | 100% | 0% |
| Regeneration | 5.0 | 0% | 100% |
| Equilibration | 10.0 | 100% | 0% |

Eluent B: 90% Acetonitrile and 0.25% acetic acid
Eluent C: 35.2% acetonitrile and 0.25% acetic acid
Column: 45 cm ID
Loading: 13-21 g per injection Fractions were pooled to provide phenyl purified saponin extract with a composition:
% QS-21 group•98.5%
QS-21 main peak•94.5%
2018 component•2.7%
Main peak outside of the QS-21 group•1% (by UPLC-UV/MS).
The combined phenyl purified saponin extract was concentrated by capture and release with reverse phase chromatography using a C8 resin (Lichroprep RP8) and the following conditions: Loaded to column conditioned at 24% acetonitrile and 0.20% acetic acid.
Eluted with 60% acetonitrile and 0.20% acetic acid.
11 cm column
Load: 50-142 g per injection
The C8 concentrated saponin extract was subjected to solvent exchange using ultrafiltration/diafiltration and a Pellicon 1 kDa membrane to reduce acetonitrile content below 21%.
The resulting solvent exchanged saponin extract was then lyophilised in a single step to provide a final purified saponin extract product.
Starting with appropriate crude extracts and/or applying component spiking, the use of the process as described in Example 3 can consistently provide a purified saponin extract of *Quillaja saponaria* Molina having a defined content in terms of QS-21 main peak and 2018 component, such as consistently at least 88% of QS-21 main peak and >3 to 10% of 2018.

Example 4—Purified QS-21 Saponin Extracts with High Content of 2018

Figure 9:
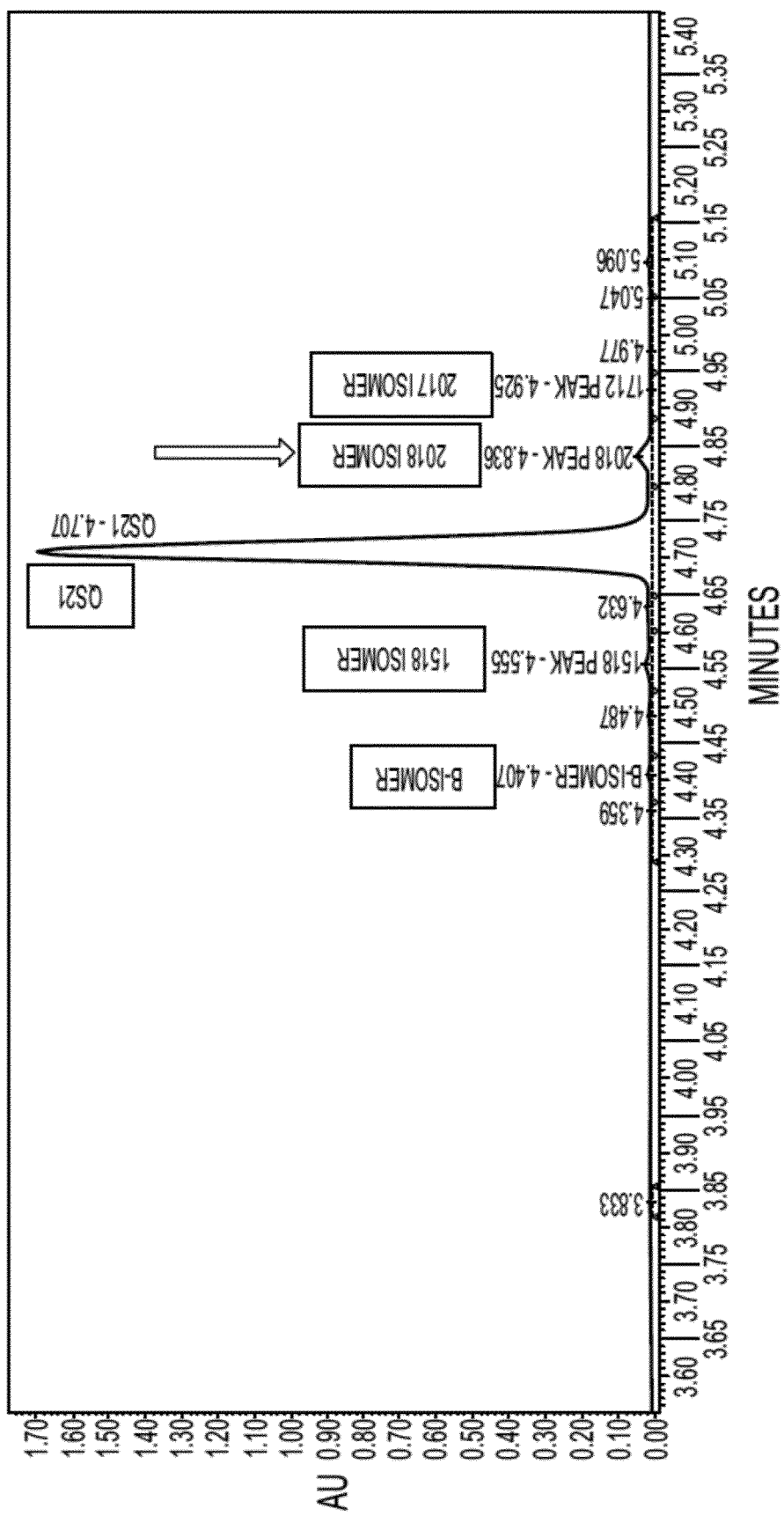

4.1 Preparation of a Purified Saponin Extract Enriched in 2018 Component
Reverse phase chromatography was used to prepare a purified saponin extract enriched in 2018 component. Starting from a QS-21 purified saponin extract with low content of 2018 component prepared according to Example 3 (see FIG. 9), over multiple runs, the fraction corresponding to the 2018 peak was collected to provide batch A and batch B of a purified saponin extract enriched in 2018 component (or "2018 concentrate").
System: UPLC Waters with fraction collector
Column: UPLC Waters Acquity BEH C18, 2.1 mm×100 mm, 1.7 um
Mobile phases: A: Water/ACN/IPA (75/20/5, V/V/V) at 0.025% TFA
B: Water/ACN/IPA (10/72/18, V/V/V) at 0.025% TFA
Flow rate: 0.6 mL/min
Column oven temperature: 55° C.
Injected volume: 10•l
Detector UV: Wavelength 214 nm
Gradient

| Time (min) | phase A (%) | phase B (%) | Curve |
|---|---|---|---|
| 0 | 100 | 0 | 5 |
| 6.23 | 23 | 77 | 5 |
| 6.4 | 0 | 100 | 5 |
| 7.1 | 0 | 100 | 5 |
| 7.3 | 100 | 0 | 5 |
| 9.0 | 100 | 0 | 5 |

Batch A was 300 µl at a total concentration of 22.6 µg/ml.
Batch B was 750 µl at a total concentration of 66.4 µg/ml.

Figure 10:
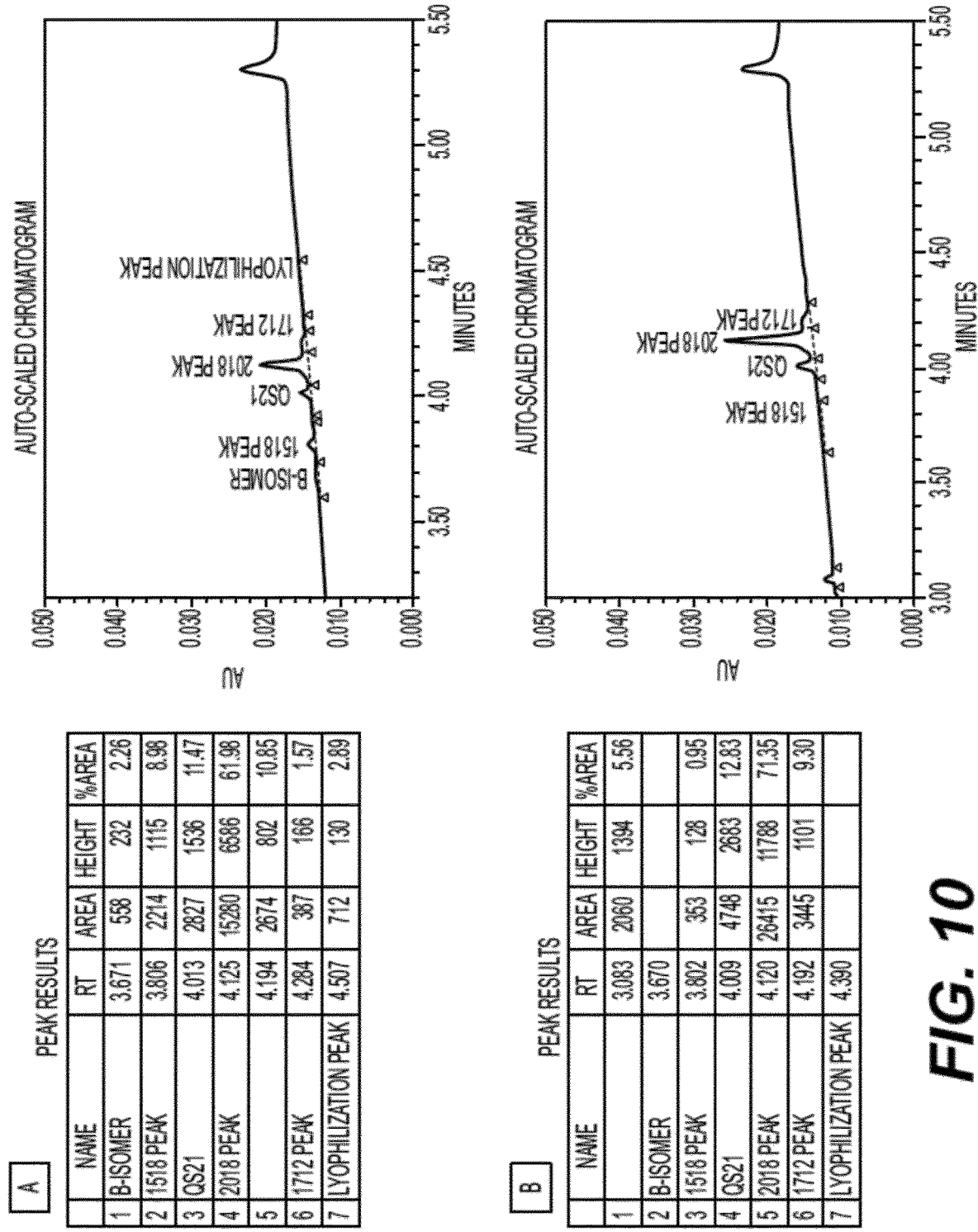

Batches A and B were analysed by UPLC-UV, prior to combining to provide the final 2018 concentrate.
Results
UPLC-UV analyses of batches A and B are provided in FIGS. 10A (Batch A) and 10B (Batch B).

| Component | Starting* material | Batch A | Batch B | Combined 2018 concentrate |
|---|---|---|---|---|
| QS-21 main peak (%) | 93.9 | 11.5 | 12.8 | 12.7 |
| 2018 component (%) | 2.2 | 62.0 | 71.4 | 70.3 |

*QS-21 purified saponin extract with low content of 2018 component prepared according to Example 3

4.2 Spiking of a QS-21 Purified Saponin Extract with Low Content of 2018 Component with an Increasing Percentage of the Purified Saponin Extract Enriched in 2018 Component
The 2018 concentrate obtained in section 4.1 was combined in varying proportions with the QS-21 purified saponin extract with low content of 2018 component (FIG. 9) to provide 7 QS-21 saponin extracts having an increasing content of 2018 component, each at a total concentration of 22 µg/ml. The percentage of QS-21 Main Peak and 2018 component of each resulting QS-21 saponin extract is provided in the following Table.

TABLE 1

| Extract No. | Proportion of 2018-enriched extract (%) | Proportion of QS-21 extract with low content of 2018 (%) | QS-21 main peak (%) | 2018 component (%) |
|---|---|---|---|---|
| 1 | 0 | 100 | 93.9 | 2.2 |
| 2 | 5 | 95 | 90.0 | 5.5 |
| 3 | 10 | 90 | 86.0 | 8.8 |
| 4 | 20 | 80 | 77.5 | 15.9 |
| 5 | 40 | 60 | 61.4 | 29.5 |
| 6 | 80 | 20 | 29.5 | 56.2 |
| 7 | 100 | 0 | 12.7 | 70.3 |

4.3 Bioactivity of a 2018 Component-Enriched Saponin Extract
The bioactivity of the 7 QS-21 saponin extracts prepared according to section 4.1 and section 4.2 has been evaluated by measuring the TNF-α and IL-8 cytokine response in an in vitro cell culture assay. The percentage of "QS-21 main peak" and "2018 component" in each extract is provided in Table 1.
The human THP1 cell line (ATCC) was cultured in 10% FCS-RPMI+additives medium in T175 flasks. The cells were cultured until they reached PDL 13 (Population Doubling Level) while fresh medium was added 2 times per week.
For the testing, the cells were transferred into 96-well-plates. THP1 cells were stimulated with LPS (3 ng/ml) for 1 h and then with a QS-21 purified saponin extract with low content of 2018 component (2 µg/ml) for 16 h. Supernatants were then tested for the cytokine responses independently.
After the 16 h incubation period, the supernatants of the different wells were harvested and frozen at −80° C. until testing. Quantitation of secreted TNF-α and IL-8 was performed using CBA kits from BD Biosciences.
Individual TNF-α and IL-8 concentrations were plotted in function of percentage of 2018 component in the QS-21 purified saponin extracts. The ANOVA model was used to estimate geometric means of concentrations (GMC) with 95% confidence interval (CI) for each percentage of 2018 component and geometric mean ratios (GMR), as compared with the reference "QS-21 purified saponin extract with low content of 2018 component" (i.e. containing 2.2% of 2018 component). All analyses were performed using SAS version 9.4 (SAS Institute Inc., Cary, NC, USA).

Results

TNF-α Response

Figure 11:
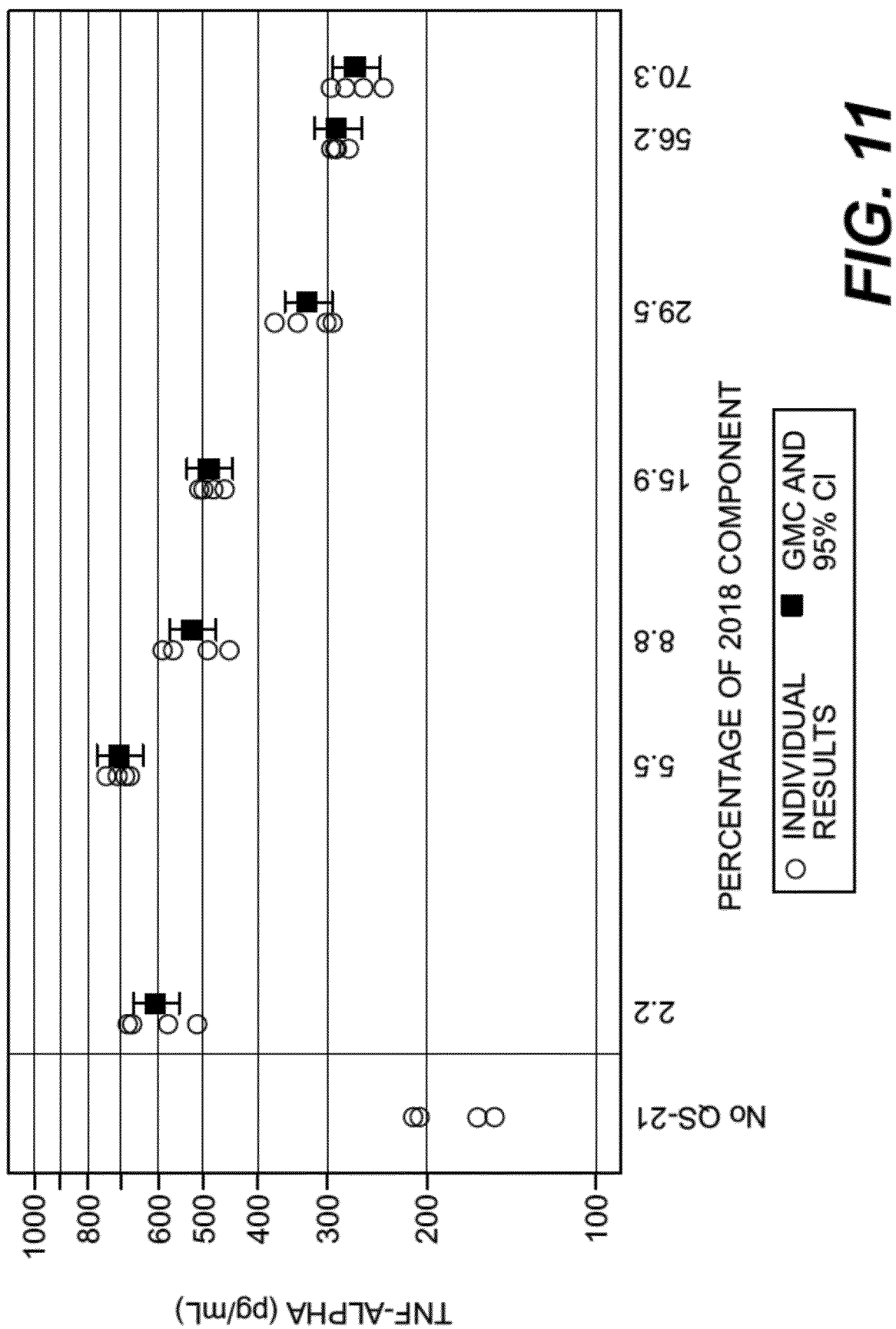
Figure 12:
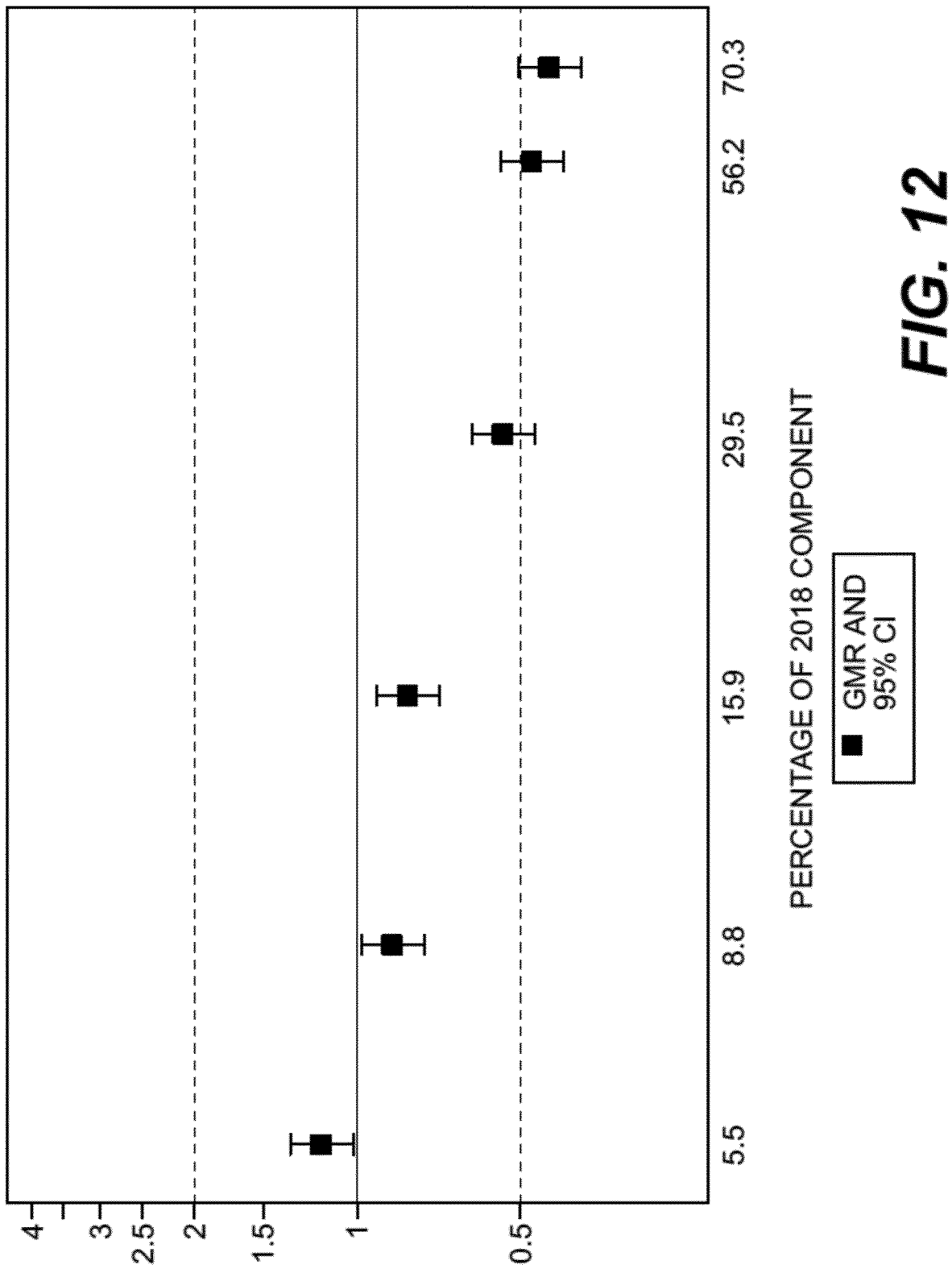

FIG. 11 represents individual TNF-α concentrations measured in the absence of QS-21 purified saponin extract and in the presence of QS-21 purified saponin extracts at 2 µg/ml (having an increasing percentage of 2018 component) and corresponding GMCs+/−Cls. Weak responses below 220 µg/ml were obtained for the medium including LPS only (with no QS-21 purified saponin extract added at all). When adding a QS-21 purified saponin extract with a low content of 2018 component (i.e. 2.2%), responses between 500 and 700 µg/ml were observed. When adding QS-21 purified saponin extracts with an increasing percentage of 2018 component (i.e. 5.5%, 8.8%, 15.9%, 29.5%, 56.2% and 70.3%), no significant change in the TNF-α response was observed for the range 5.5% to 15.9% of 2018 component. Each QS-21 purified saponin extract having an increased percentage of 2018 component was compared with the reference "QS-21 purified saponin extract with low content of 2018 component" (i.e. containing 2.2% of 2018 component). For each comparison, the GMRs (ratios of GMCs) and 95% Cl estimated from ANOVA model are presented in Table 2 and plotted in FIG. 12.

TABLE 2

TNF-• (pg/ml)

| Groups compared with QS-21 purified saponin extract with low content of 2018 component (i.e. 2.2%) | GMR | Lower limit 95% CI GMR | Upper limit 95% CI GMR |
|---|---|---|---|
| 5.5% 2018 in QS-21 purified saponin extract | 1.16 | 1.02 | 1.33 |
| 8.8% 2018 in QS-21 purified saponin extract | 0.86 | 0.75 | 0.98 |
| 15.9% 2018 in QS-21 purified saponin extract | 0.80 | 0.70 | 0.92 |
| 29.5% 2018 in QS-21 purified saponin extract | 0.54 | 0.47 | 0.61 |
| 56.2% 2018 in QS-21 purified saponin extract | 0.48 | 0.42 | 0.54 |
| 70.3% 2018 in QS-21 purified saponin extract | 0.44 | 0.39 | 0.50 |

IL-8 Response

Figure 13:
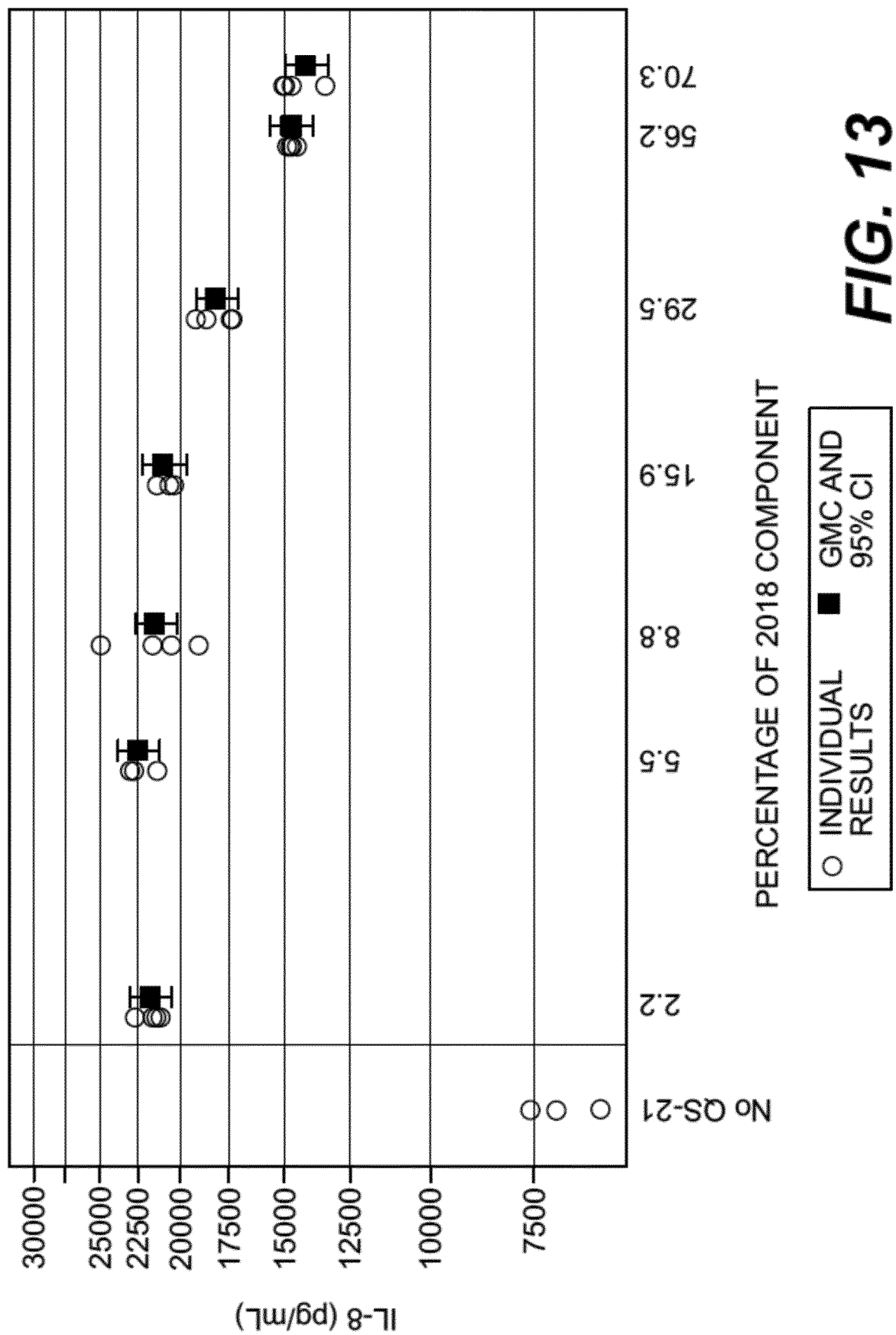
FIG. 13 IL-8 response induced by QS-21 purified saponin extracts having an increasing percentage of 2018 component FIG. 14 IL-8 response ratios (increasing percentage of 2018 component over 2.2% 2018 component)

FIG. 13 represents individual 11-8 concentrations measured in the absence of QS-21 purified saponin extract and in the presence of QS-21 purified saponin extracts at 2 µg/ml (having an increasing percentage of 2018 component) and corresponding GMCs+/−Cls.

Weak responses below 8000 µg/ml were obtained for the medium including LPS only (with no QS-21 purified saponin extract added at all). When adding a QS-21 purified saponin extract with a low content of 2018 component (i.e. 2.2%), responses close to 22000 µg/ml were observed. When adding QS-21 purified saponin extracts with an increasing percentage of 2018 component (i.e. 5.5%, 8.8%, 15.9%, 29.5%, 56.2% and 70.3%), a similar IL-8 response was observed for the range 5.5% to 15.9% of 2018 component.

Figure 14:
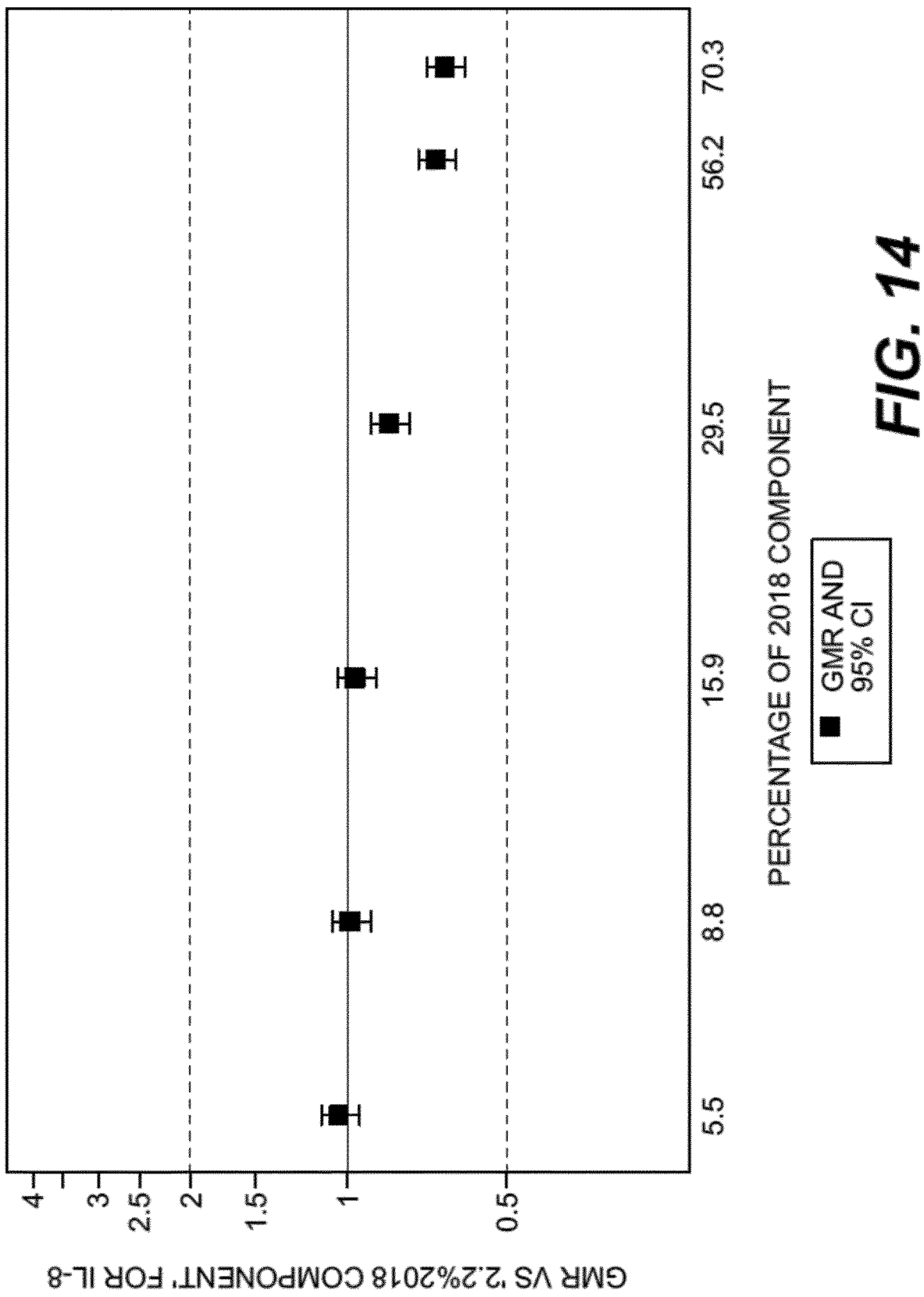

Each QS-21 purified saponin extract having an increased percentage of 2018 component was compared with the reference "QS-21 purified saponin extract with low content of 2018 component" (i.e. containing 2.2% of 2018 component). For each comparison, the GMRs (ratios of GMCs) and 95% Cl estimated from ANOVA model are presented in Table 3 and plotted in FIG. 14.

TABLE 3

IL-8 (pg/mL)

| Groups compared with QS-21 purified saponin extract with low content of 2018 component (i.e. 2.2%) | GMR | Lower limit 95% CI GMR | Upper limit 95% CI GMR |
|---|---|---|---|
| 5.5% 2018 in QS-21 purified saponin extract | 1.03 | 0.95 | 1.12 |
| 8.8% 2018 in QS-21 purified saponin extract | 0.99 | 0.91 | 1.07 |
| 15.9% 2018 in QS-21 purified saponin extract | 0.96 | 0.89 | 1.05 |
| 29.5% 2018 in QS-21 purified saponin extract | 0.83 | 0.77 | 0.91 |
| 56.2% 2018 in QS-21 purified saponin extract | 0.68 | 0.62 | 0.73 |
| 70.3% 2018 in QS-21 purified saponin extract | 0.65 | 0.60 | 0.71 |

Example 5—Fraction Pooling to Achieve QS-21 Purified Saponin Extracts of Specific Final Composition A crude aqueous extract of *Quillaja saponaria* Molina bark was prepared having a QS-21 concentration of 2.8 g/l, preceding peak to QS-21 main peak ratio of 0.5 and 2018/QS-21 main peak ratio of 0.081. The crude extract was then subjected to reverse phase chromatography using a polystyrene resin. Fractions were collected and a subset of fractions combined to provide a partially purified extract having a QS-21 purity of 19.5% and 2018 to 1988 ratio of 0.084.

Figure 15:
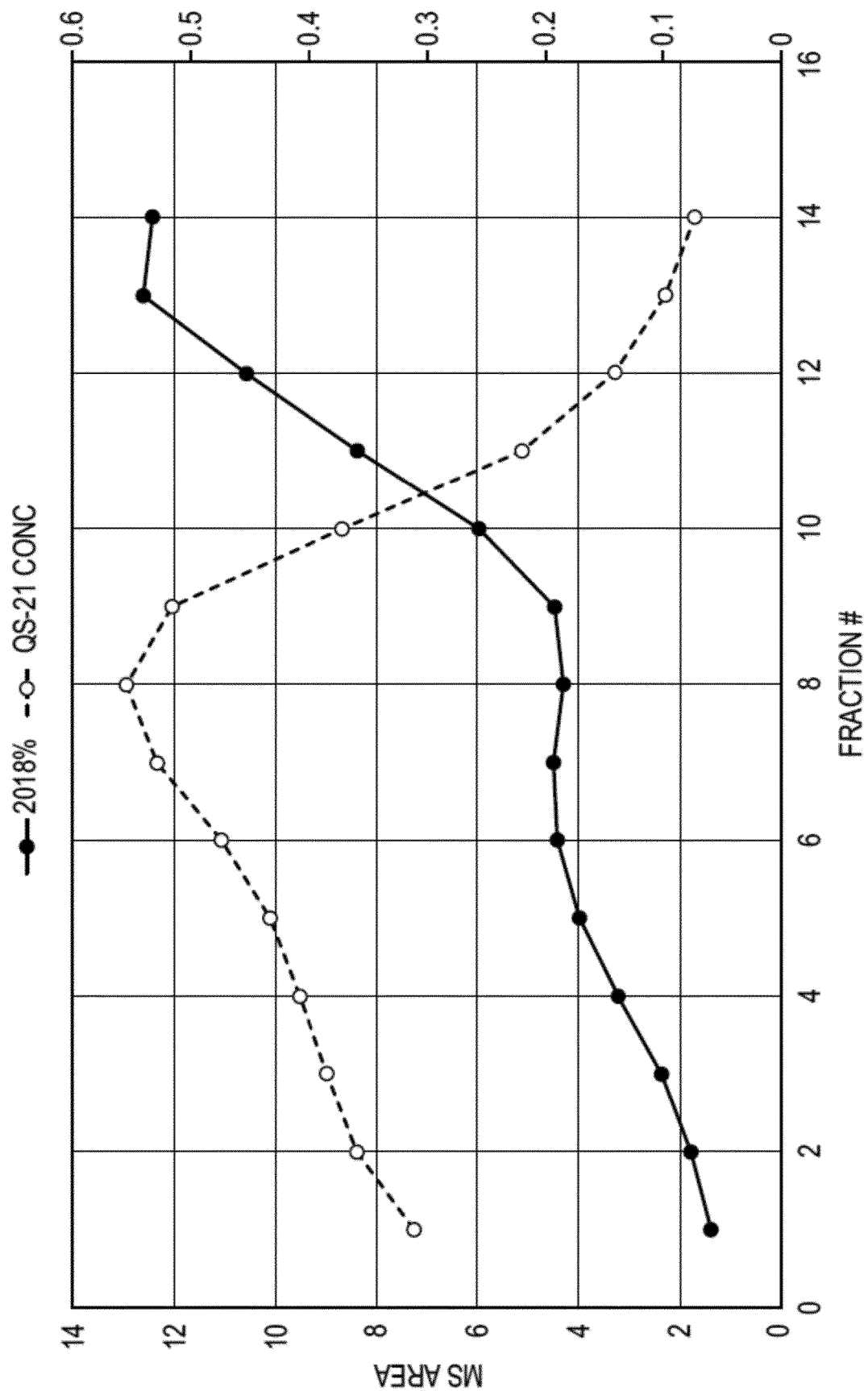
FIG. 15 QS-21 group concentration (g/L) and 2018 component content of phenyl resin fractions FIG. 16 Anti-gE antibody titres on day 21 following vaccination of mice with gE VZV antigen formulations containing different QS-21 compositions as described in Example 6.

Subsequently, the partially purified extract was subjected to reverse phase chromatography using a phenyl resin (Asahi phenyl column 4.6 mm×250 mm). A total of 14 fractions in the region of the QS-21 main peak were collected over 30 second intervals and their content analysed by UPLC-UV/MS (FIG. 15). Combination of various fractions were determined to facilitate phenyl resin purified extracts with the following expected compositions:

| Objective | Pooled fractions | Yield | QS-21 Group (%) | QS-21 main peak (%) | 2018 component (%) | 1988 portion of QS-21 main peak (%) | 2002 portion of QS-21 main peak (%) | 1856 portion of QS-21 main peak (%) |
|---|---|---|---|---|---|---|---|---|
| High Yield | 4-14 | 94 | 99.5 | 91.6 | 5.23 | 76 | 8 | 15 |
| High 2002 | 1-7 | 71 | 99.8 | 91.4 | 3.59 | 48 | 30 | 22 |
| High 2018 | 8-14 | 49 | 99.2 | 90.6 | 6.30 | 86 | 1 | 13 |

In line with the method described above, three batches of purified and freeze-dried QS-21 were prepared. The resulting material was analysed by UPLC-UV/MS and found to have the following compositions:

| Sample | QS-21 Group (%) | QS-21 main peak (%) | 2018 component (%) | QS-21 main peak 2022/1988 ratio | QS-21 main peak 1856/1988 ratio | B-isomer (%) | Lyo peak (%) |
|---|---|---|---|---|---|---|---|
| High Yield | 98.8 | 91.9 | 4.3 | 0.085 | 0.214 | 0.27 | 0.5 |
| High 2002 | 99.4 | 92.2 | 3.2 | 0.405 | 0.305 | 0.38 | 0.2 |
| High 2018 | 98.6 | 90.3 | 5.7 | 0.008 | 0.2 | 0.37 | 1 |

Conclusion

Three QS-21 purified saponin extracts with high content of 2018 component in accordance with the present invention were obtained.

Example 6—Immune Responses

The objective of the study was to assess whether QS-21 composition changes impacted adjuvanticity. More precisely, the study evaluated the adjuvanticity of the three QS-21 lots (QS-21 High Yield, QS-21 High 2002 and QS-21 High 2018) prepared as described in Example 5, formulated with 3D-MPL and VZV gE antigen, compared to QS-21 purified saponin extract with low content of 2018 component (QS-21 Low 2018).

A liposomal adjuvant formulation of each of the four QS-21 compositions was prepared, containing QS-21 and 3D-MPL (1:1 w/w); antigen-containing formulations were prepared by mixing with VZV gE antigen. Three different dose levels of gE antigen were prepared for each QS-21 liposomal formulation: 5 µg, 1 µg, and 0.4 µg gE (corresponding to ¹⁄₁₀, ¹⁄₅₀, and ¹⁄₁₂₅ of the amount of gE antigen contained in a human dose of Shingrix™)

Each gE antigen formulation was administered to 6-8 week old female C57BL6 mice (10/group). Antigen formulations were injected twice intramuscularly with a 14-day interval. A control group of 3 mice received phosphate buffered saline alone.

Spleens and sera were collected at D21, and analysed for T and antibody responses, respectively.

ELISA

Figure 16:
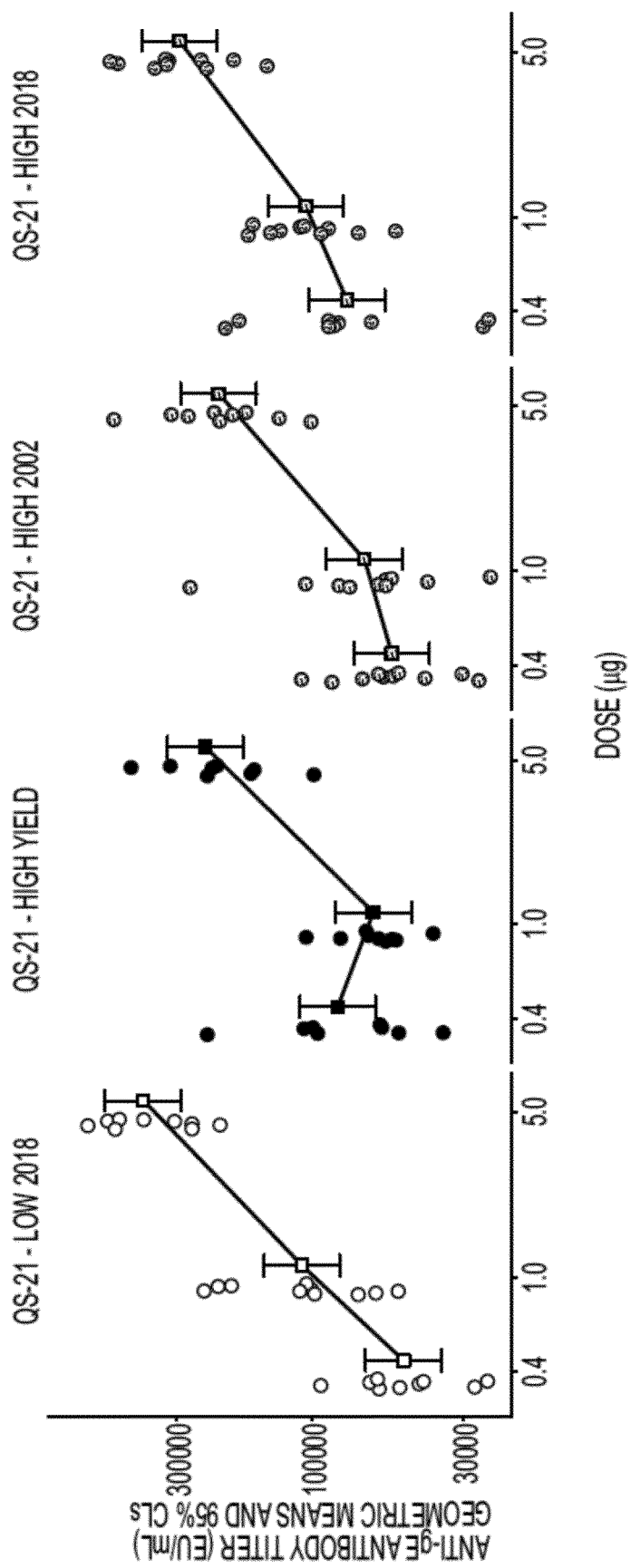
Figure 17:
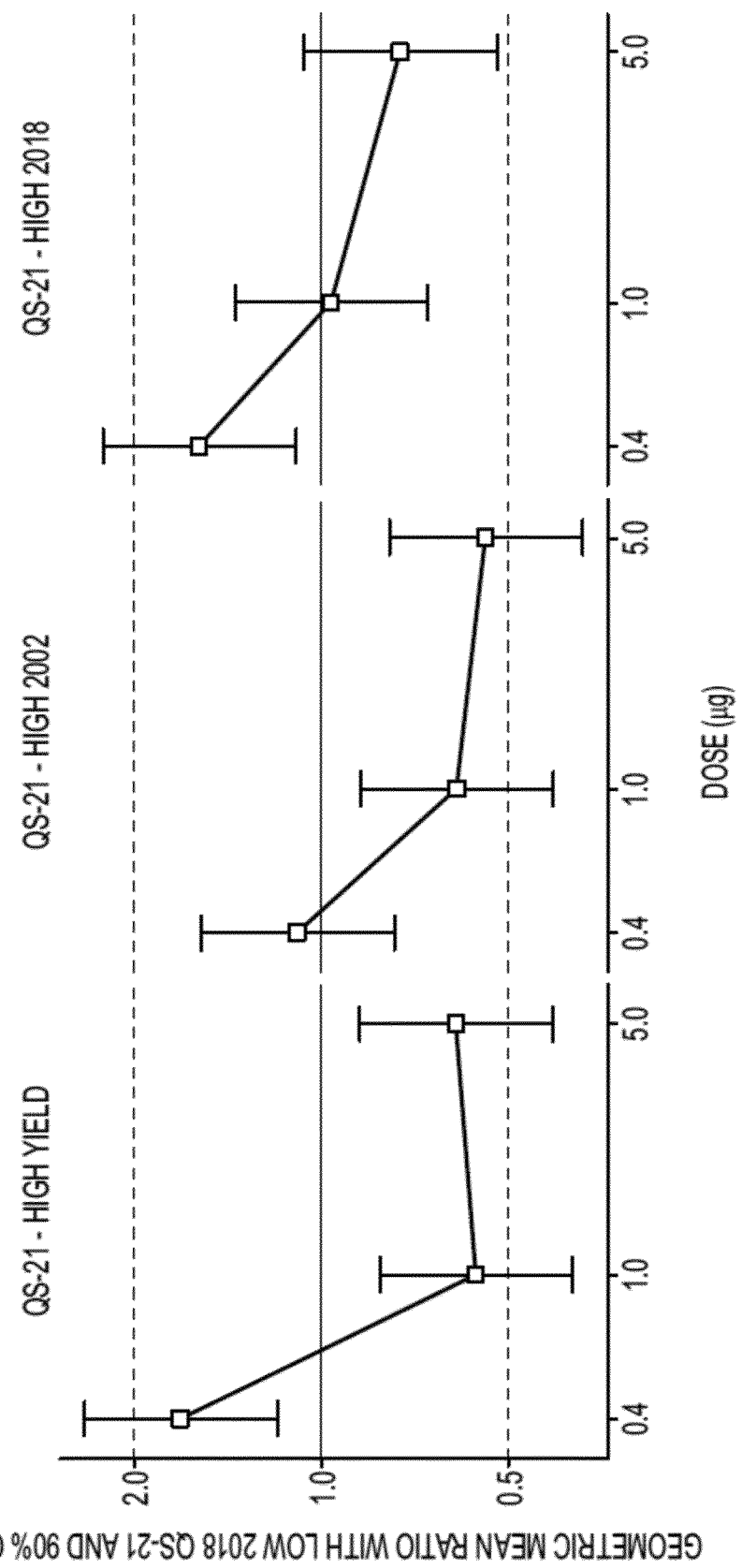
FIG. 17 Geometric mean ratio of anti-gE antibody titres on day 21 following vaccination of mice with gE VZV antigen formulations containing different QS-21 compositions as described in Example 6.

Anti-VZV gE total IgG were measured by ELISA. 96 well-plates were coated with antigen overnight at 4° C. Coating buffer was removed and plates were saturated with a saturation buffer for 1 hour at 37° C. After, 100 ul of diluted mouse serum or standard or control was added and incubated for 1 h30 at 37° C. After wash, the plates were incubated for 1 hour at 37° C. with 100 µl anti mouse IgG-Biotinylated. After wash, the plates were incubated for 30 min at 37° C. with 100 ul Streptavidin-POD conjugate. After wash, 100 ul of TMB per well was added and the plates were kept in the dark at room temperature for 15 minutes. To stop the reaction, 100 ul of $H_2SO_4$ 0.4 N was added per well. The absorbance was read at a wavelength of 450/620 nm by an Elisa plate reader. Results were calculated using the Softmax-Pro software. Results are shown in FIGS. 16 and 17.

ICS (Intracellular Cytokine Staining)

Spleens were collected in RPMI medium and dissociated using a potter tissue grinder (homogenizer) using two up and down strokes. Homogenized samples were transferred to 50 ml polypropylene tubes. Fibrous material was removed by filtration through a 100 uM nylon cell strainer. Cells were then washed, counted and re-suspended at $10^7$ cells per ml.

Lymphoid cells were re-stimulated for 6 hours in vitro with gE peptides or medium in the presence of a protein transport inhibitor (brefeldin A) during the last 4 hours. These cells were then processed by conventional immunofluorescent procedures using fluorescent antibodies (extracellular staining: CD4; intracellular staining: TNF-alpha, IFN-gamma and IL2).

Figure 18:
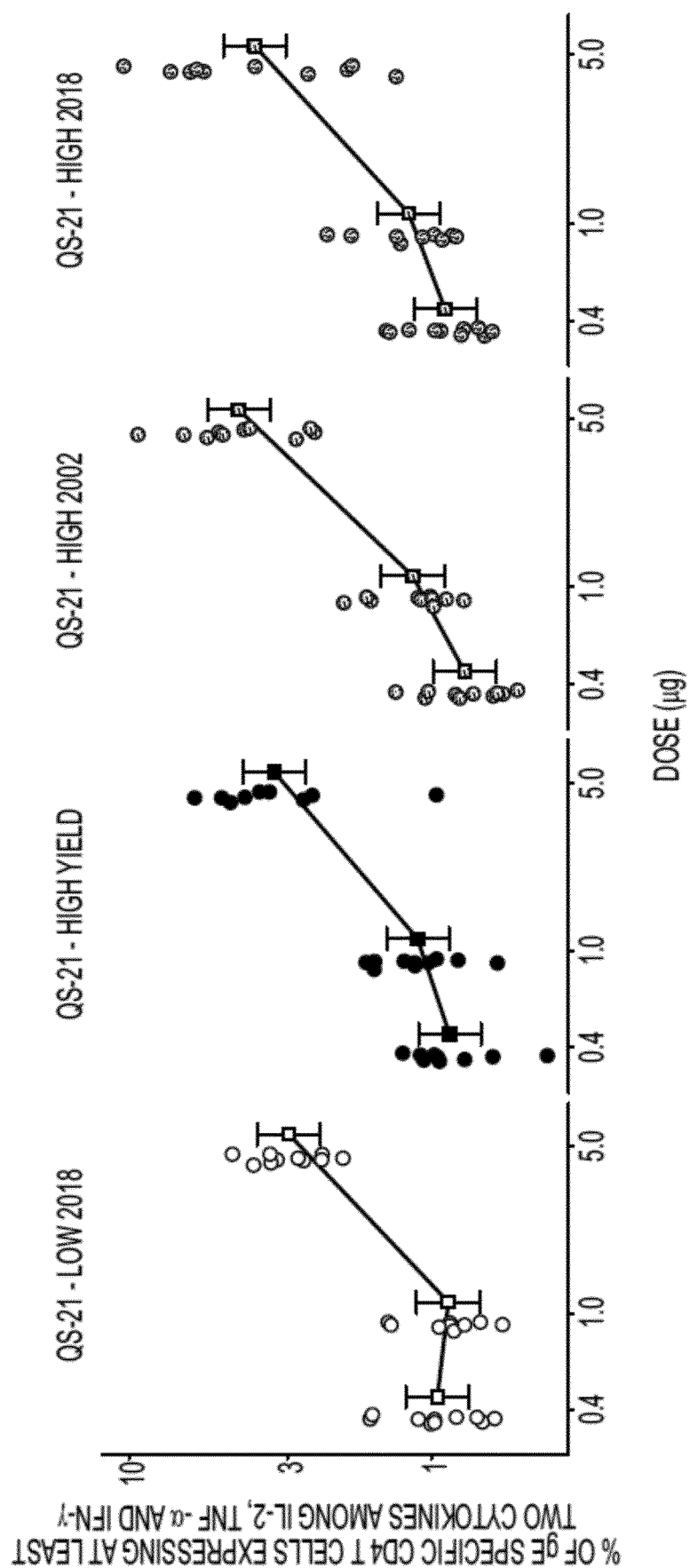
FIG. 18 Percentage of gE specific CD4 T cells on day 21 following vaccination of mice with gE VZV antigen formulations containing different QS-21 compositions as described in Example 6.
Figure 19:
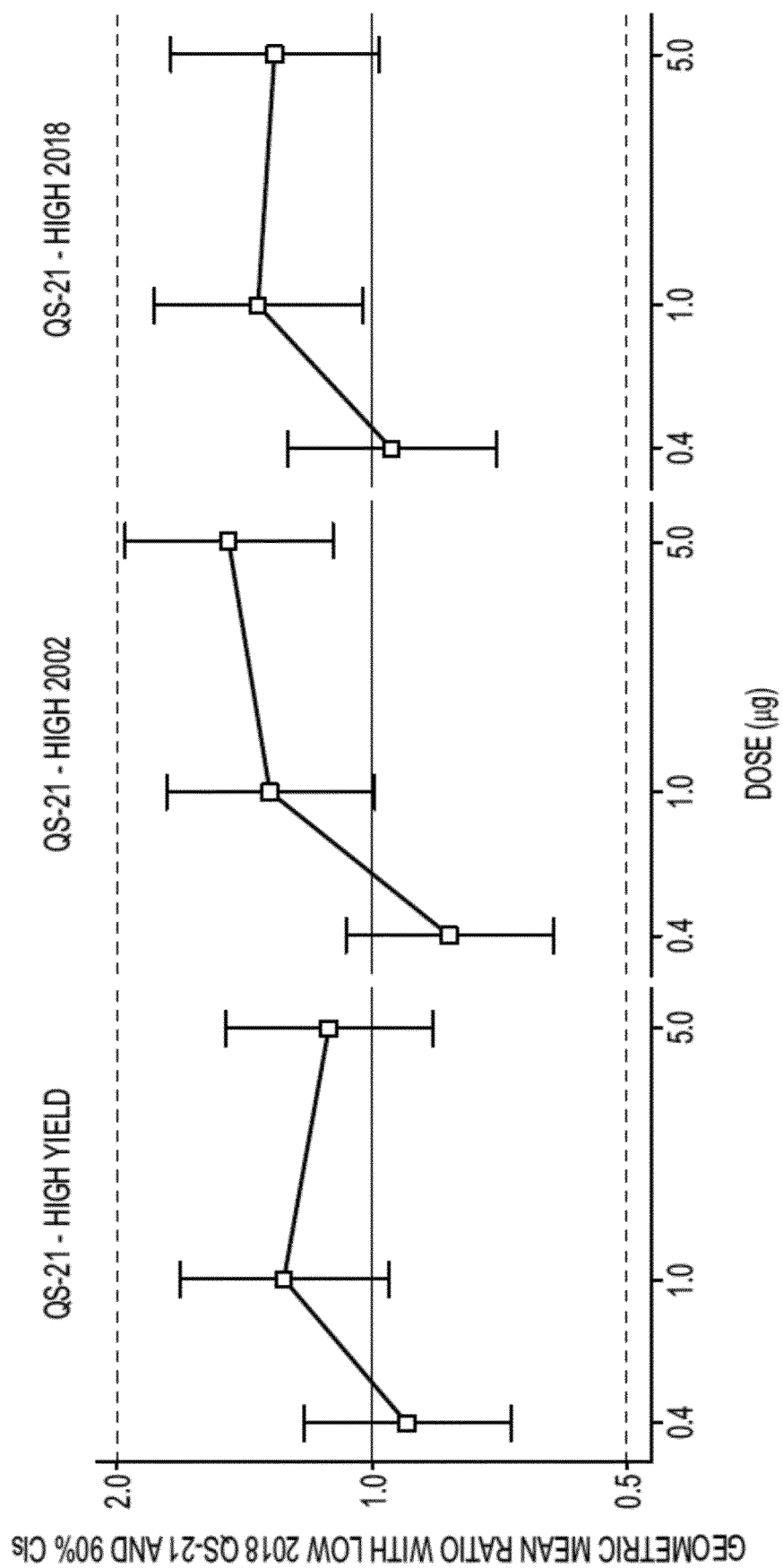
FIG. 19 Geometric mean ratio of gE specific CD4 T cells on day 21 following vaccination of mice with gE VZV antigen formulations containing different QS-21 compositions as described in Example 6.

Results are expressed as a frequency of cytokine positive cells within CD4 cell populations after subtraction of the medium condition for each mouse. The data are presented for the population that showed expression of at least two cytokines (IL2, IFN-alpha or TNF-alpha). Results are shown in FIGS. 18 and 19.

Conclusions

No clinical signs were observed for any animals regardless of the injected formulations suggesting an acceptable safety profile.

The CD4+ T cell response induced by QS-21 with broadened specifications (QS-21 High QS-21 Yield, QS-21 High 2002 and QS-21 High 2018) was shown to be equivalent (margins [0.5-2]) to the one induced by QS-21 purified saponin extract with low content of 2018 component (QS-21 Low 2018) each of the 3 doses tested.

The impact of broadening specifications for QS-21 on the antibody response was limited (less than a 2-fold difference in the geometric mean ratios were observed) with a tendency for QS-21 with broadened specifications to induce higher titers of antibodies than QS-21 purified saponin extract with low content of 2018 component at the lowest dose (0.4 µg) and slightly lower titers than the current one at higher doses. Altogether the results suggest that broadening QS-21 has no or limited impact on adjuvanticity, such as the adjuvanticity of a liposomal composition of QS-21 and 3D-MPL.

Example 7—Immune Responses II

The objective of the study was to demonstrate equivalence, for both antibody and CD4+ T cell responses, between the three QS-21 lots prepared as described in Example 5, formulated with 3D-MPL and VZV gE antigen, compared to QS-21 purified saponin extract with low content of 2018 component (QS-21 Low 2018).

6-8 week old female C57BL6 mice (16/group) were injected twice intramuscularly with a 28-day interval with 5 ug gE antigen formulated with a liposomal formulation comprising 3D-MPL and QS-21 (1:1 w/w). A control group of 3 mice received phosphate buffered saline alone and a control group of 3 mice received VZV gE antigen alone.

Vaccines were prepared with 5 ug of each of 3D-MPL/QS-21 per animal (corresponding to ¹⁄₁₀ of a typical human dose). Injection volume was 50 ul.

Sera were collected at D42 (2 weeks post second immunisation) and D49 (3 weeks post second immunisation) and analysed for antibody responses. Spleens were collected at D49 and analysed for CD4+ T cell responses.

ICS (Intracellular Cytokine Staining)

Spleens were collected in RPMI medium and dissociated using a potter tissue grinder (homogenizer). Homogenized samples were transferred to 50 ml polypropylene tubes. Fibrous material was removed by filtration through a 100 uM nylon cell strainer. Cells were then washed, counted and re-suspended at $10^7$ cells per ml.

Figure 20:
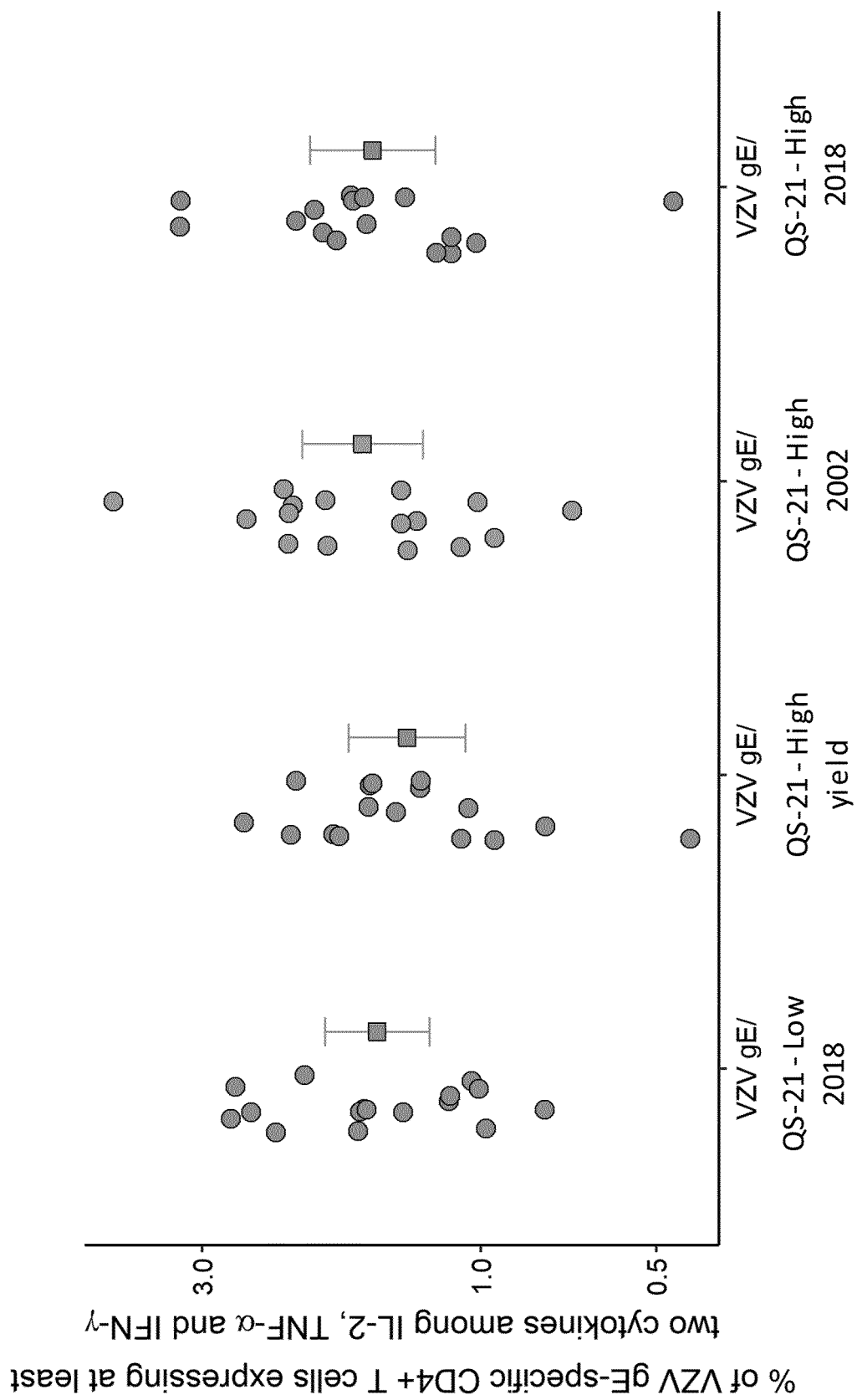
FIG. 20 Percentage of gE specific CD4 T cells on day 21 following vaccination of mice with gE VZV antigen formulations containing different QS-21 compositions as described in Example 7.
Figure 21:
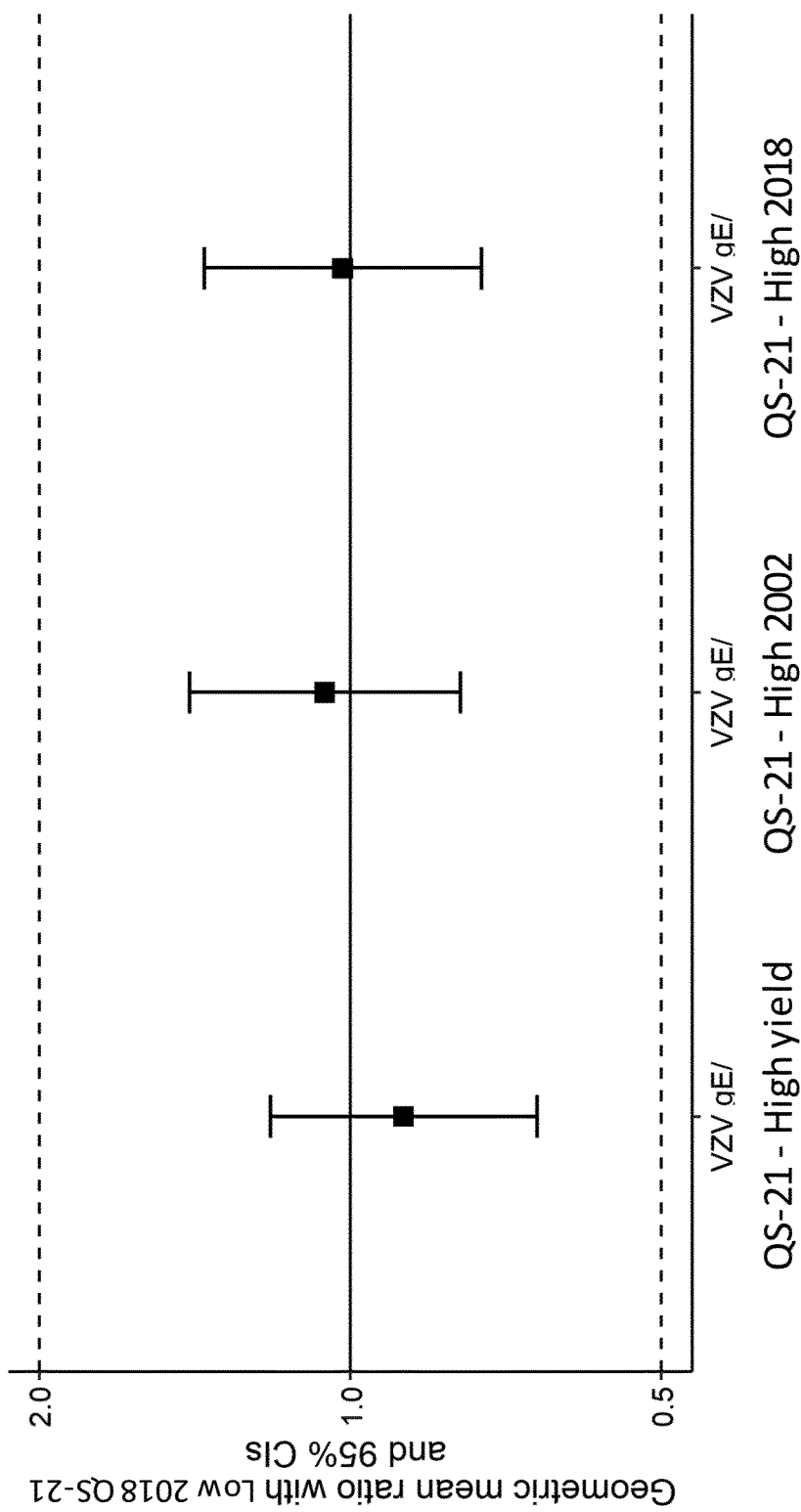
FIG. 21 Geometric mean ratio of gE specific CD4 T cells on day 21 following vaccination of mice with gE VZV formulations containing different QS-21 compositions as described in Example 7.

Lymphoid cells are re-stimulated for 6 hours in vitro with gE peptides or medium in the presence of a protein transport inhibitor (brefeldin A) during the last 4 hours. Cells were stained with fluorescently labelled antibodies extracellular staining (e.g. CD4) and intracellular staining (e.g. TNF-alpha, IFN-gamma and IL2) for subsequent flow cytometry analysis. Results were expressed as a frequency of cytokine positive cells within CD4+ T cell populations after subtraction of the medium condition for each mouse. The statistical analysis was done on the population that showed expression of at least two cytokines (IL2, IFN-gamma or TNF-alpha). Results are shown in FIGS. 20 and 21.

ELISA

Figure 22:
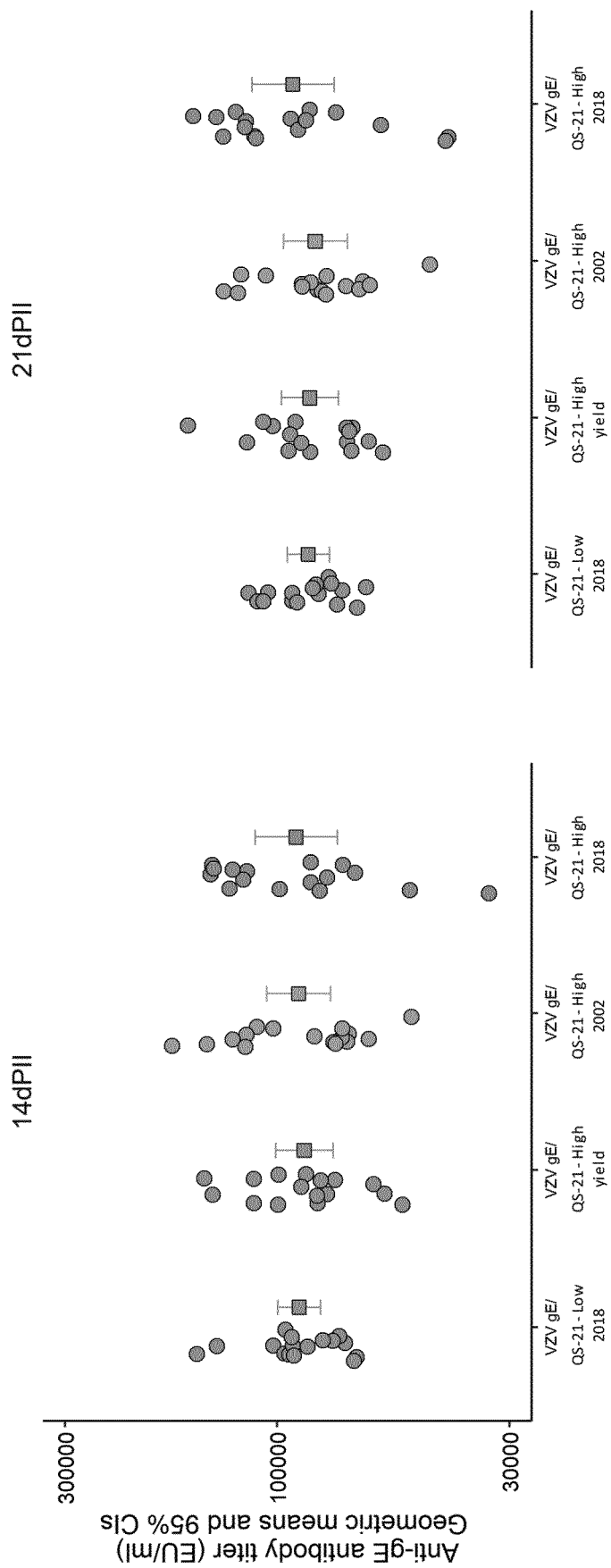
FIG. 22 Anti-gE antibody titres on days 14 and 21 following vaccination of mice with gE VZV antigen formulations containing different QS-21 compositions as described in Example 7.
Figure 23:
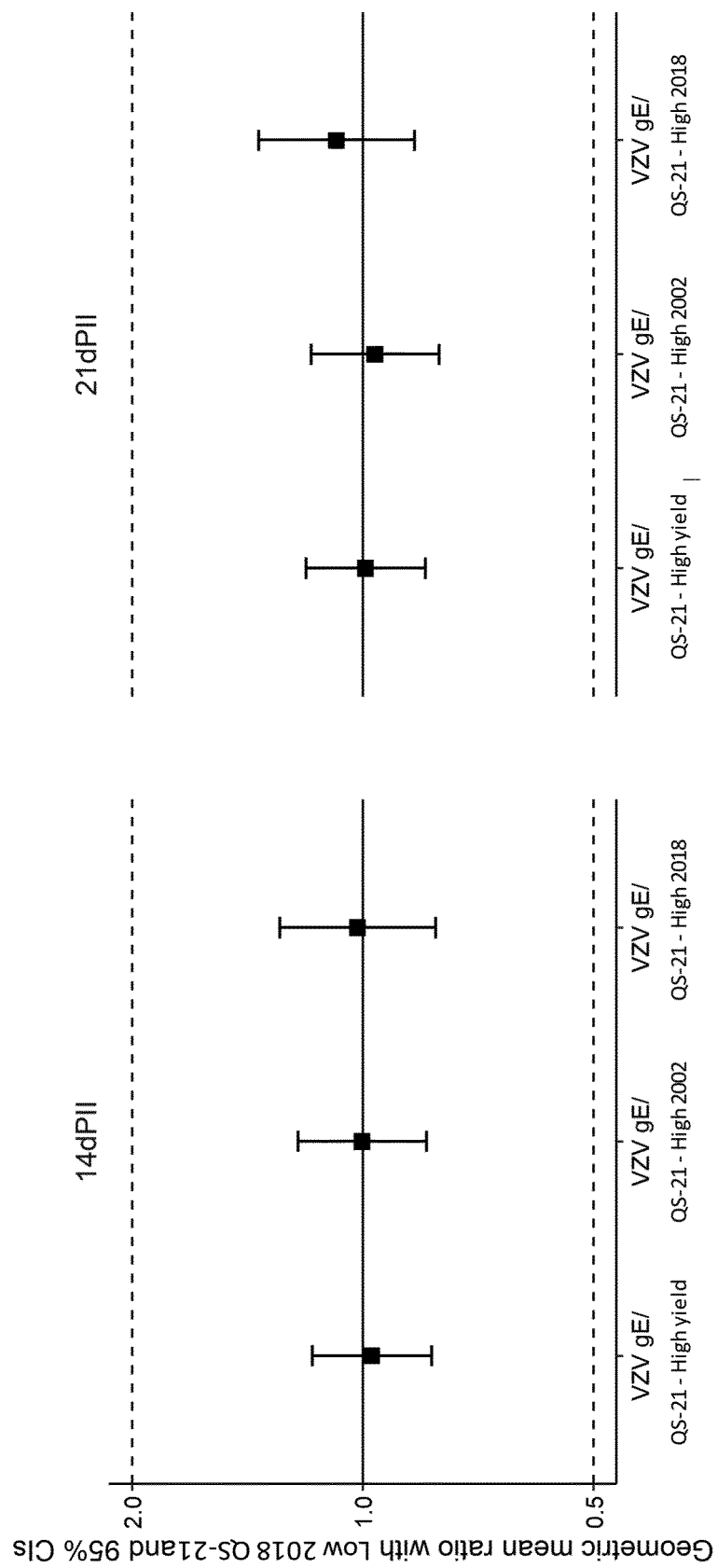
FIG. 23 Geometric mean ratio of anti-gE antibody titres on days 14 and 21 following vaccination of mice with gE VZV antigen formulations containing different QS-21 compositions as described in Example 7.
Figure 24:
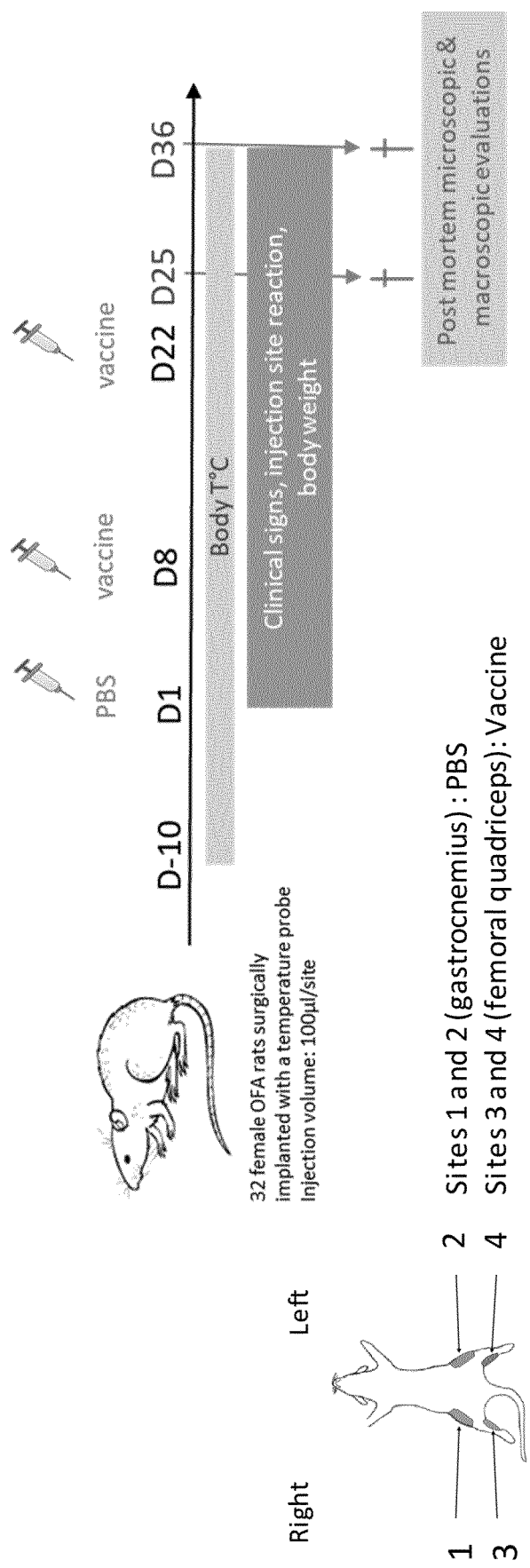
FIG. 24 Schematic for vaccination protocol followed in Example 8.

The ELISA method was as described in Example 6.
Results are shown in FIGS. 22 and 23.

Statistical Methods

The antibody titers and CD4+ frequencies were considered as lognormally distributed.

For the evaluation of the antibody response, an analysis of variance (ANOVA) model was fitted on log 10 titers with test groups, time-points and their interaction as fixed effects and with a repeated statement for time-points. Homogeneity of variances were not assumed between groups. This model was used to compute the geometric means and geometric mean ratios between test groups and their respective 95% confidence intervals.

The CD4+ T cell response was assessed through the frequency of cells expressing at least two cytokines out of IL-2, TNF-alpha and IFN-gamma for which the in vitro medium stimulation was removed. Then, an analysis of variance (ANOVA) model was fitted on log 10 frequencies with test groups as fixed effect. Homogeneity of variances was not assumed between groups. This model was used to compute the geometric means and geometric mean ratios between test groups and their respective 95% confidence intervals.

Conclusions

FIG. 20 represents the individual percentages of VZV gE-specific CD4+ T cells expressing at least two cytokines among IL-2, TNF-α and IFN-g, among total CD4+ T cells with their geometric means and 95% confidence intervals. Similar frequencies of VZV gE-specific CD4+ T cells were observed for the QS-21 with low 2018 component content (QS-21 Low 2018) and the three other test compositions (QS-21 High Yield, QS-21 High 2002, QS-21 High 2018). Minimal VZV gE-specific CD4+ T cells (<0.05%) were detected in mice injected with PBS or VZV gE alone (data not shown).

The geometric mean ratios (and 95% confidence intervals) between the percentages of VZV gE-specific CD4+ T cells observed and QS-21 with low 2018 component content (QS-21 Low 2018) are presented in FIG. 21. Those geometric mean ratios were close to one (between 0.89 and 1.06) and the confidence intervals were inside a [0.5 and 2] interval. Hence, equivalence in terms of CD4+ T cell response was demonstrated.

Anti-VZV gE antibody titers induced by QS-21 with low 2018 component content (QS-21 Low 2018) and the three other test compositions (QS-21 High Yield, QS-21 High 2002, QS-21 High 2018) were similar at D42 and D49. Note that low anti-VZV gE antibody titers (<1200 EU/ml) were detected in mice injected with PBS VZV gE alone (data not shown).

The geometric mean ratios (and 95% confidence intervals) between the anti-VZV gE antibody titer observed as compared to QS-21 with low 2018 component content (QS-21 Low 2018) are presented in FIG. 23. The observed geometric mean ratios (black squares) are close to 1 and 95% confidence intervals (error bars) are within the [0.5 and 2] interval. Hence, the equivalence in terms of antibody response is demonstrated.

Altogether those results statistically demonstrated that QS-21 High Yield, QS-21 High 2002, and QS-21 High 2018 induced equivalent potent adaptive immune responses as observed with QS-21 with low 2018 component content, hence had no impact on adjuvanticity, such as the adjuvanticity of a liposomal composition of QS-21 and 3D-MPL.

Example 8—Reactogenicity

The objective of the study was to demonstrate reactogenicity equivalence between three QS-21 lots prepared as described in Example 5, formulated with 3D-MPL and VZV gE antigen, compared to QS-21 purified saponin extract with low content of 2018 component.

Female OFA rats (8/group) were injected at three time points with PBS or with VZV gE antigen formulated with a liposomal formulation comprising 3D-MPL and QS-21 (1:1 w/w). Vaccines were prepared with 20 ug VZV gE antigen formulated with 20 ug of each of 3D-MPL/QS-21 per animal (corresponding to ⅔ of a typical human dose, ⅕ being administered per injection site). Injection volume was 100 ul per site. PBS was administered to the left and right gastrocnemius at Day 1, with vaccine administered to the left and right femoral quadriceps at Days 8 and 22.

Body temperature was monitored from Day −10 to Day 36 using an implanted temperature probe. Clinical signs, injection site reaction and body weight were monitored from Day 1 to Day 36. Post-mortem microscopic and macroscopic evaluations were undertaken at Days 25 and 36.

Results

Clinical signs and local reactions:
  No unscheduled deaths occurred during the study.
  No treatment-related clinical signs were observed in any animals treated.
  On Day 8 (6 h post 1), some animals presented expected local reactions following administration of vaccine such as oedema, erythema, dryness and desquamation with all formulations of VZV gE/AS01.
  No relevant differences in the onset and duration of these transient reactions were observed between the formulations groups, as they appeared generally a few hours after the injection and disappeared within a few days.

Body Temperature:
  Mean body T° increased (around 1.5° C.) similarly after the first and the second i.m. injection in all groups compared to the initial PBS injection.
  The mean differences increases in temperature (from baseline) and the peaks of T° after each i.m. injection showed a comparable pattern profile that was of the same proportion in all groups.

Figure 25:
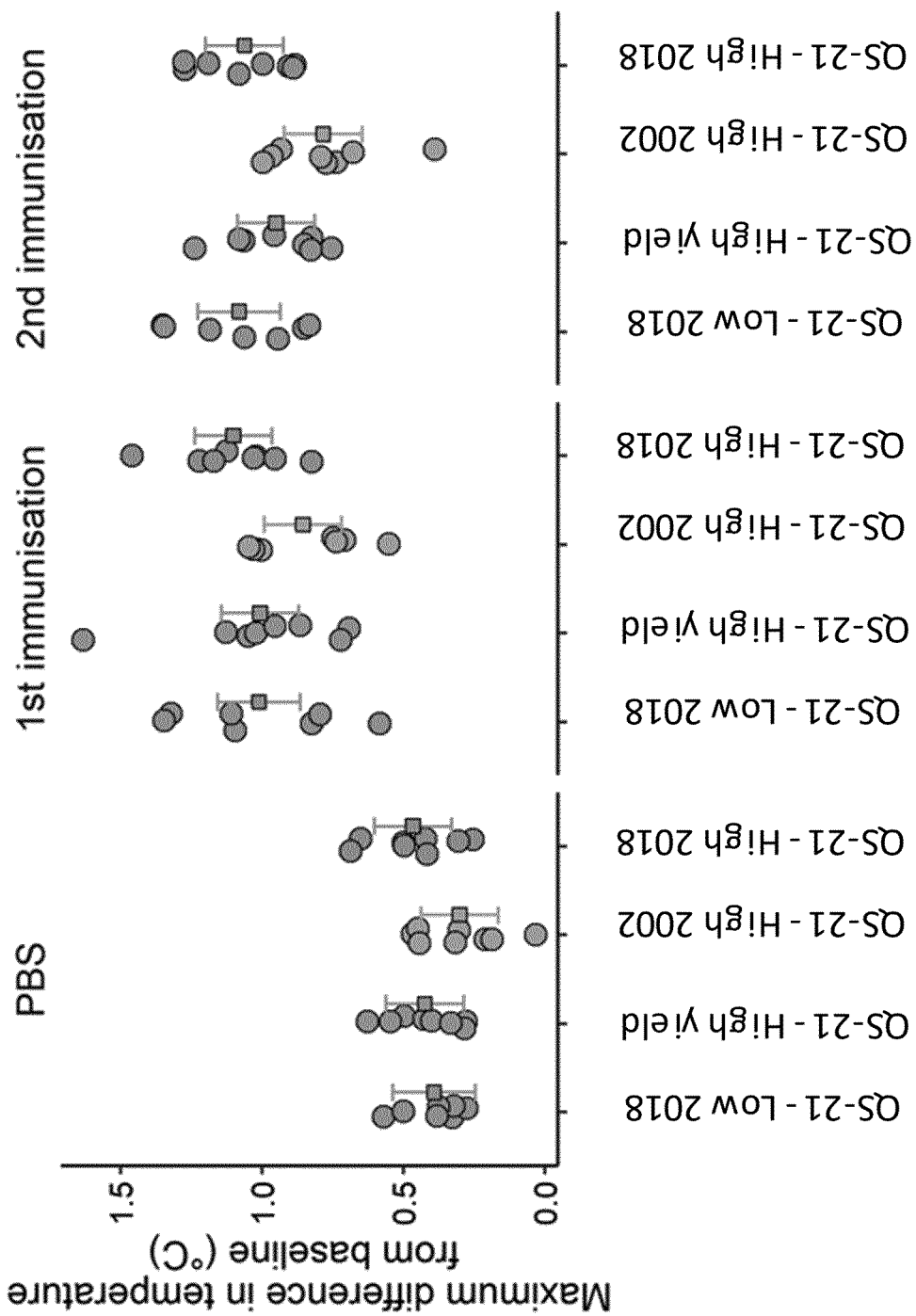
FIG. 25 Maximum temperature difference observed for each animal together with mean and 95% confidence intervals for all treatment groups after first (Day 8) and second (Day 23) immunisations in Example 8.

FIG. 25 shows the maximum temperature difference observed for each animal together with mean and 95% confidence intervals for all treatment groups after first (Day 8) and second (Day 23) immunisations.

Body weight:

Transient and minor mean body weight losses were observed on the day following vaccine injection for all groups. No body weight change differences were observed between groups.

Post-mortem micro and macroscopic evaluation:

The three formulations containing QS-21 with increased 2018 induced non-adverse, minimal to moderate, partially reversible subacute inflammation at the injection sites which was similar to the reference formulation containing QS-21 with low 2018 component content. This inflammation was mainly characterized by infiltrate of mixed inflammatory cells and fibroplasia/fibrosis.

Macroscopic enlargement of the draining lymph nodes correlating with increased lymphoid cellularity was seen with all formulations. This observation at D25 (3dPII) was partially or completely reverted at Day 36 (14dPII)

BIBLIOGRAPHY

Dalsgaard et al. in 1974 ("Saponin adjuvants", Archiv. für die gesamte Virusforschung, Vol. 44, Springer Verlag, Berlin, p243-254)

De Becker, G., V. Moulin, B. Pajak, C. Bruck, M. Francotte, C. Thiriart, J. Urbain, and M. Moser. 2000. The adjuvant monophosphoryl lipid A increases the function of antigen-presenting cells. *International immunology.* 12:807-815.

Didierlaurent A. M., Collignon C., Bourguignon P., Wouters S., Fierens K., Fochesato M., Dendouga N., Langlet C., Malissen B., Lambrecht B. N., Garcon N., Van Mechelen M., and S. Morel. 2014 Enhancement of Adaptive Immunity by the Human Vaccine Adjuvant AS01 Depends on Activated Dendritic Cells *Journal of Immunology* 193(4): 1920-1930.

Didierlaurent et al, 2017 Adjuvant system AS01: helping to overcome the challenges of modern vaccines *Expert Reviews of Vaccines* 16(1): 55-63

Garcon, N., and M. Van Mechelen. 2011. Recent clinical experience with vaccines using MPL- and QS-21-containing adjuvant systems. *Expert review of vaccines.* 10:471-486

Han et al 2014 Characterization of the Structure and Immunostimulatory Activity of a Vaccine Adjuvant, De-O-Acylated Lipooligosaccharide PLoS ONE 9(1):e85838 (and associated correction Han et al 2014 PLoS ONE 9(4):94517)

Ismaili, J., J. Rennesson, E. Aksoy, J. Vekemans, B. Vincart, Z. Amraoui, F. Van Laethem, M. Goldman, and P. M. Dubois. 2002. Monophosphoryl lipid A activates both human dendritic cells and T cells. *Journal of immunology.* 168:926-932.

Kensil, C. R., U. Patel, M. Lennick, and D. Marciani. 1991. Separation and characterization of saponins with adjuvant activity from *Quillaja saponaria* Molina cortex. *Journal of immunology.* 146:431-437.

Kensil, C. R., and R. Kammer. 1998. QS-21: a water-soluble triterpene glycoside adjuvant. *Expert opinion on investigational drugs.* 7:1475-1482.

Lambrecht, B. N., M. Kool, M. A. Willart, and H. Hammad. 2009. Mechanism of action of clinically approved adjuvants. *Current opinion in immunology.* 21:23-29.

Leroux-Roels I. et al. J. Infect. Dis. 2012, 206: 1280-1290

Li, H., S. B. Willingham, J. P. Ting, and F. Re. 2008. Cutting edge: inflammasome activation by alum and alum's adjuvant effect are mediated by NLRP3. *Journal of immunology.* 181:17-21.

Livingston, P. O., S. Adluri, F. Helling, T. J. Yao, C. R. Kensil, M. J. Newman, and D. Marciani. 1994. Phase 1 trial of immunological adjuvant QS-21 with a GM2 ganglioside-keyhole limpet haemocyanin conjugate vaccine in patients with malignant melanoma. *Vaccine.* 12:1275-1280.

Ragupathi, G., J. R. Gardner, P. O. Livingston, and D. Y. Gin. 2011. Natural and synthetic saponin adjuvant QS-21 for vaccines against cancer. *Expert review of vaccines.* 10:463-470

Martin, M., S. M. Michalek, and J. Katz. 2003. Role of innate immune factors in the adjuvant activity of monophosphoryl lipid A. *Infection and immunity.* 71:2498-2507.

Marty-Roix, R. et al. Identification of QS-21 as an Inflammasome-activating Molecular Component of Saponin Adjuvants. *J. Biol. Chem.* 291, 1123-36 (2016)

Mata-Haro, V., C. Cekic, M. Martin, P. M. Chilton, C. R. Casella, and T. C. Mitchell. 2007. The vaccine adjuvant monophosphoryl lipid A as a TRIF-biased agonist of TLR4. *Science.* 316:1628-1632.

Newman, M. J., J. Y. Wu, B. H. Gardner, K. J. Munroe, D. Leombruno, J. Recchia, C. R. Kensil, and R. T. Coughlin. 1992. Saponin adjuvant induction of ovalbumin-specific CD8+ cytotoxic T lymphocyte responses. *Journal of immunology.* 148:2357-2362.

Soltysik, S., J. Y. Wu, J. Recchia, D. A. Wheeler, M. J. Newman, R. T. Coughlin, and C. R. Kensil. 1995. Structure/function studies of QS-21 adjuvant: assessment of triterpene aldehyde and glucuronic acid roles in adjuvant function. *Vaccine.* 13:1403-1410.

The invention claimed is:

1. A composition comprising: (i) a saponin extract and (ii) liposomes or an emulsion; the liposomes comprising cholesterol; the emulsion comprising a toll-like receptor 4 (TLR-4) agonist; the saponin extract comprising: (i) at least 88% of a QS-21 main peak and (ii) greater than 3% but less than or equal to 10% of a 2018 component; the at least 88% of the QS-21 main peak and the greater than 3% but less than or equal to 10% of the 2018 component being determined by:
  (a) injecting at a retention time of 0 minutes 10 μL of a candidate saponin extract that is in an injection solution into an ultra-performance liquid chromatography (UPLC) column at a flow rate of 0.6 mL per minute of a first mobile phase solution until a retention time of 6.23 minutes and a flow rate of 0.6 mL per minute of a second mobile phase solution at retention times from 6.23 minutes to 9.0 minutes, thereby obtaining a candidate saponin extract eluant,
    (1) the injection solution consisting of 0.2% by g acetic acid per mL of: (A) 70% by volume water and (B) 30% volume acetonitrile,
    (2) the first mobile phase solution consisting of 0.025% by g trifluoracetic acid per mL of: (A) 5% by volume isopropyl alcohol, (B) 20% by volume acetonitrile, and (C) 75% by volume water,
    (3) the second mobile phase solution consisting of: (A) 23% by volume the first mobile phase solution and (B) 77% by volume of a first solution,
    (4) the first solution consisting of: 0.025% by g trifluoroacetic acid per mL of: (A) 18% by volume isopropyl alcohol, (B) 72% by volume acetonitrile, and (C) 10% by volume water, and
    (5) the UPLC column having an inner diameter of 2.1 mm, a length of 100 mm, and 1.7 μm diameter ethylene bridged hybrid C18 particles and being 55° C.;
  (b) measuring ultraviolet (UV) absorbance at a wavelength of 214 nm of the candidate saponin extract eluant during (a), thereby obtaining a raw candidate saponin extract UV absorbances versus the retention times; the raw candidate saponin extract UV absorbances versus retention times comprising a solvent front and a plurality of raw candidate saponin extract absorbance peaks; the plurality of raw candidate saponin extract absorbance peaks comprising a raw candidate QS-21 main absorbance peak and a raw candidate 2018 component absorbance peak; the raw candidate QS-21 main absorbance peak having a retention time of approximately 4.4 minutes; and the raw candidate 2018 component absorbance peak having a retention time of approximately 4.5 minutes;
  (c) measuring the monoisotopic weights of the candidate saponin extract eluant during (a) with a quadrupole mass spectrometer under a scanning range of monoisotopic weights from 1400 to 2040, thereby obtaining raw candidate saponin extract monoisotopic weights versus the retention times; the raw candidate saponin extract monoisotopic weights versus the retention times comprising a plurality of monoisotopic weight peaks; the plurality of monoisotopic weight peaks comprising a candidate QS-21 main monoisotopic weights peak and a candidate 2018 component monoisotopic weights peak; the candidate QS-21 main monoisotopic weights peak having the retention time of approximately 4.4 minutes; the candidate 2018 component monoisotopic weights peak having the retention time of approximately 4.5 minutes;
  (d) injecting at a blank retention time of 0 minutes of 10 μL of the injection solution into the UPLC column at a flow rate of 0.6 mL per minute of the first mobile phase solution until the blank retention time of 6.23 minutes followed by a flow rate of 0.6 mL per minute of the second mobile phase solution at the blank retention times of from 6.23 minutes to 9.0 minutes, thereby obtaining a blank eluant;
  (e) measuring the UV absorbance at a wavelength of 214 nm of the blank eluant during (d), thereby obtaining blank UV absorbances versus blank retention times; the blank UV absorbances versus blank retention times comprising a plurality of blank absorbance peaks; the plurality of blank saponin extract absorbance peaks comprising a blank candidate QS-21 main absorbance peak and a blank candidate 2018 component absorbance peak; the blank candidate QS-21 main absorbance peak having a blank retention time of approximately 4.4 minutes; and the blank candidate 2018 component absorbance peak having a blank retention time of approximately 4.5 minutes;
  (f) subtracting the blank UV absorbance for each of the blank retention times from the raw candidate saponin extract UV absorbance for each of the respective retention times, thereby obtaining blank-subtracted candidate saponin extract absorbances versus retention times; the blank-subtracted candidate saponin extract absorbances versus retention times comprising a plurality of blank-subtracted candidate saponin extract absorbance peaks; the plurality of blank-subtracted candidate saponin extract absorbance peaks comprising a blank-subtracted candidate QS-21 main absorbance peak and a blank-subtracted candidate 2018 component absorbance peak; the blank-subtracted candidate QS-21 main absorbance peak thereby being obtained by subtracting the blank candidate QS-21 main absorbance peak for each blank retention time of approximately 4.4 minutes from the raw candidate QS-21 main absorbance peak for each of the respective retention times of approximately 4.4 minutes; and the blank-subtracted candidate 2018 component absorbance peak thereby being obtained by subtracting the blank candidate 2018 component absorbance peak for each of the blank retention times of approximately 4.5 minutes from the raw candidate 2018 component absorbance peak for each of the retention times of approximately 4.5 minutes;
  (g) confirming that:
    (1) the candidate QS-21 main monoisotopic weights peak comprises triterpenoid glycosides that have monoisotopic weights of 1855.9, 1987.9, and 2001.9, thereby, with the obtaining the blank-subtracted candidate QS-21 main absorbance peak of (f), obtaining the QS-21 main peak; and
    (2) the candidate 2018 component monoisotopic weights peak comprises a triterpenoid glycoside that has a monoisotopic weight of 2017.9, thereby, with the obtaining the blank-subtracted candidate 2018 component absorbance peak of (f), obtaining the 2018 component;

(h) obtaining:
   (1) an area of the plurality of blank-subtracted saponin extract absorbance peaks that elude from the later of the solvent front and the retention time of 0.5 minutes and until the retention time of 5.5 minutes, thereby obtaining a total peaks area;
   (2) an area that is of the blank-subtracted candidate QS-21 main absorbance peak, thereby obtaining a QS-21 main peak area; and
   (3) an area that is of the blank-subtracted candidate 2018 component absorbance peak, thereby obtaining a 2018 component peak area;
(i) dividing:
   (1) the QS-21 main peak area by the total peaks area, thereby obtaining a fraction of the QS-21 main peak; and
   (2) the 2018 component peak area by the total peaks area, thereby obtaining a fraction of the 2018 component;
(j) multiplying:
   (1) the fraction of the QS-21 main peak by 100, thereby obtaining a percentage of the QS-21 main peak; and
   (2) the fraction of the 2018 component by 100, thereby obtaining a percentage of the 2018 component; and
(k) confirming that:
   (1) the percentage of the QS-21 main peak is at least 88% and, thereby obtaining the at least 88% of the QS-21 main peak; and
   (2) the percentage of the 2018 component is greater than 3% but less than or equal to 10% and thereby obtaining the greater than 3% but less than or equal to 10% of the 2018 component.

2. The composition of claim 1, wherein the saponin extract comprises greater than 4.5% but less than or equal to 10% of the 2018 component, wherein in (k), the percentage of the 2018 component is greater than 4.5% but less than or equal to 10%, thereby obtaining the greater than 4.5% but less than or equal to 10% of the 2018 component.

3. The composition of claim 1, wherein the saponin extract comprises greater than 3% but less than or equal to 9% of the 2018 component, wherein in (k), the percentage of the 2018 component is greater than 3% but less than or equal to 9%, thereby obtaining the greater than 3% but less than or equal to 9% of the 2018 component.

4. The composition of claim 1, the saponin extract comprising at least 98% of a QS-21 group; the QS-21 group comprising the QS-21 main peak, the 2018 component, and a QS-21 ancillary component; the QS-21 ancillary component comprising a B-isomer, a 1518 component, or a 1712/2118 peak; the 1712/2118 peak comprising a 1712 component or a 2118 component; the at least 98% of the QS-21 group being determined by (a)-(k), wherein:
   in (b), the plurality of raw candidate saponin extract absorbance peaks further comprises a raw candidate B-isomer absorbance peak, a raw candidate 1518 component absorbance peak, or a raw candidate 1712/2118 absorbance peak; the raw candidate B-isomer absorbance peak having a retention time of approximately 4.0 minutes; the raw candidate 1518 component absorbance peak having a retention time of approximately 4.2 minutes; and the raw candidate 1712/2118 absorbance peak having a retention time of approximately 4.6 minutes;
   in (c), the plurality of monoisotopic weight peaks further comprises a raw candidate B-isomer monoisotopic weight peak, a raw candidate 1518 component monoisotopic weight peak, or a raw candidate 1712/2118 monoisotopic weight peak; the candidate B-isomer monoisotopic weight peak having the retention time of approximately 4.0 minutes, the raw candidate 1518 component monoisotopic weight peak having the retention time of approximately 4.2 minutes, and the raw candidate 1712/2118 monoisotopic weight peak having the retention time of approximately 4.6 minutes;
   in (e), the plurality of blank saponin extract absorbance peaks further comprises a blank candidate B-isomer absorbance peak, a blank candidate 1518 component absorbance peak, or a blank candidate 1712/2118 absorbance peak; the blank candidate B-isomer absorbance peak having a blank retention time of approximately 4.0 minutes; the blank candidate 1518 component absorbance peak having a blank retention time of approximately 4.2 minutes; and the blank candidate 1712/2118 absorbance peak having a blank retention time of approximately 4.6 minutes;
   in (f), the plurality of blank-subtracted candidate saponin extract absorbance peaks further comprises a blank-subtracted candidate B-isomer absorbance peak, a blank-subtracted candidate 1518 component absorbance peak, or a blank-subtracted candidate 1712/2118 absorbance peak; the blank-subtracted candidate B-isomer absorbance peak thereby being obtained by subtracting the blank candidate B-isomer absorbance peak for each blank retention time of approximately 4.0 minutes from the raw candidate B-isomer absorbance peak for each respective retention time of approximately 4.0 minutes; the blank-subtracted candidate 1518 component absorbance peak thereby being obtained by subtracting the blank candidate 1518 absorbance peak for each blank retention time of approximately 4.2 minutes from the raw candidate 1518 component absorbance peak for each of the respective retention times of approximately 4.2 minutes; the blank-subtracted candidate 1712/2118 absorbance peak thereby being obtained by subtracting the blank candidate 1712/2118 absorbance peak for each of the blank retention times of approximately 4.6 minutes from the raw candidate 1712/2118 absorbance peak for each of the retention times of approximately 4.6 minutes;
   in (g), further confirming at least one of the following to thereby obtain the QS-21 ancillary component and thereby the QS-21 group:
      (3) the candidate B-isomer monoisotopic weight peak comprises a triterpenoid glycoside that has a monoisotopic weight of 1987.9, thereby, with the obtaining the blank-subtracted candidate B-isomer absorbance peak of (f), obtaining the B-isomer;
      (4) the candidate 1518 component monoisotopic weights peak comprises a triterpenoid glycoside that has a monoisotopic weight of 1517.7, thereby, with the obtaining the blank-subtracted candidate 1518 component absorbance peak of (f), obtaining the 1518 component peak; and
      (5) the candidate 1712/2118 monoisotopic weights peak comprises a triterpenoid glycoside that has monoisotopic weight of 1711.8 or a triterpenoid glycoside that has a monoisotopic weight of 2118, thereby, with the obtaining the blank-subtracted candidate 1712/2118 absorbance peak of (f), obtaining the 1712/2118 peak; the confirming that the candidate 1712/2118 monoisotopic weights peak comprises the triterpenoid glycoside that has monoisotopic weight of 1711.8 thereby obtaining the 1712 component; and the confirming that the candidate 1712/2118 monoisotopic weights peak comprises the triterpenoid glycoside that has a monoisotopic weight of 2118 thereby obtaining the 2118 component;

in (h), further obtaining:
(4) an area that is of the blank-subtracted candidate B-isomer absorbance peak, thereby obtaining a B-isomer peak area, the B-isomer peak area being zero when the B-isomer is not obtained;
(5) an area that is of the blank-subtracted candidate 1518 component absorbance peak, thereby obtaining a 1518 component peak area, the 1518 component peak area being zero when the 1518 component is not obtained;
(6) an area that is of the blank-subtracted candidate 1712/2118 absorbance peak, thereby obtaining a 1712/2118 peak area, the 1712/2118 peak area being zero when the 1712/2118 peak is not obtained; and
(7) the sum of: (i) QS-21 main peak area, (ii) the B-isomer peak area, (iii) the 1518 component peak area, (iv) the 1712/2118 peak area, and (v) the 2018 component peak area, thereby obtaining the sum area of the QS-21 group;

in (i), further dividing:
(3) the sum area of the QS-21 group by the total peaks area, thereby obtaining a QS-21 group fraction;

in (j), further multiplying:
(3) the QS-21 group fraction by 100, thereby obtaining a percentage of the QS-21 group; and in (k), further confirming that:
(3) the percentage of the QS-21 group is at least 98%, thereby obtaining the at least 98% of the QS-21 group.

5. The composition of claim 1, wherein the saponin extract comprises at least 90% of the QS-21 main peak; wherein in (k), the percentage of the QS-21 main peak is at least 90%, thereby obtaining the at least 90% of the QS-21 main peak.

6. The composition of claim 1 comprising liposomes and the TLR4 agonist.

7. The composition of claim 6, wherein the TLR4 agonist is 3-de-O-acylated monophosphoryl lipid A.

8. An immunogenic composition comprising: (i) the composition of claim 1 and (ii) an immunogen or a polynucleotide encoding the immunogen.

9. A method for the manufacture of the composition of claim 1, the method comprising admixing: (i) the saponin extract and (ii) the liposomes or the emulsion.

10. A method of eliciting an immune response to the immunogen in a subject, the method comprising administering to the subject the immunogenic composition of claim 8.

11. A composition comprising: (i) a saponin extract and (ii) liposomes or an emulsion; the liposomes comprising cholesterol; the emulsion comprising a TLR4 agonist; the saponin extract comprising: (i) at least 88% in sum of one or more of a compound (a), a compound (b), and a compound (c) and (ii) greater than 3% but less than or equal to 10% of a compound (d); wherein:

the compound (a) is:

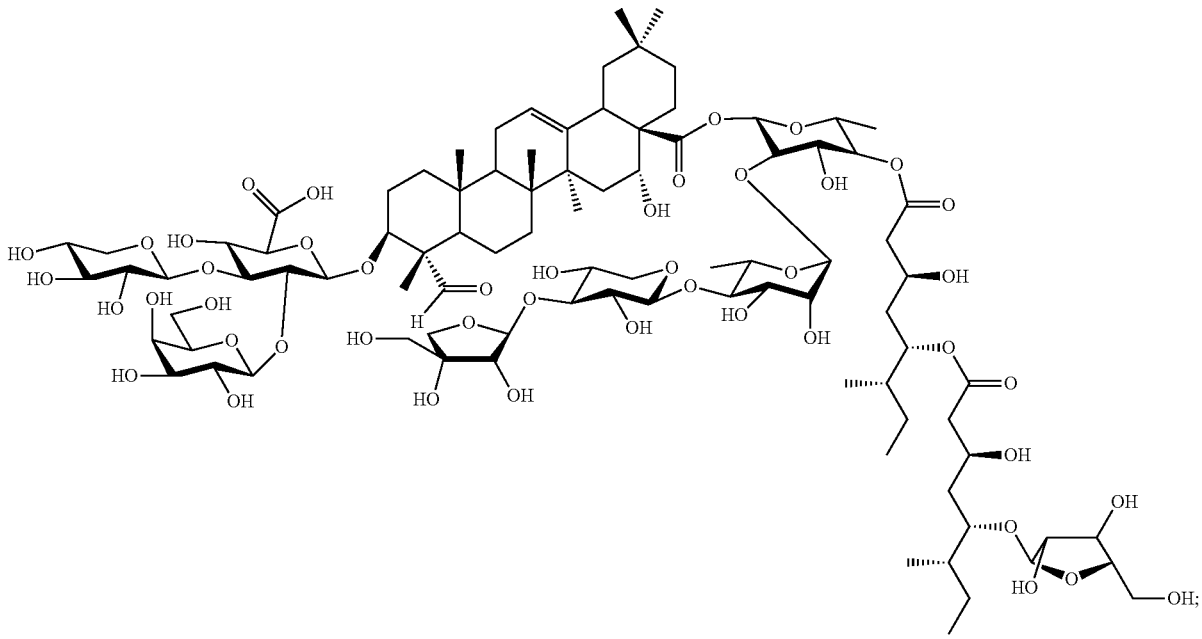

the compound (b) is:
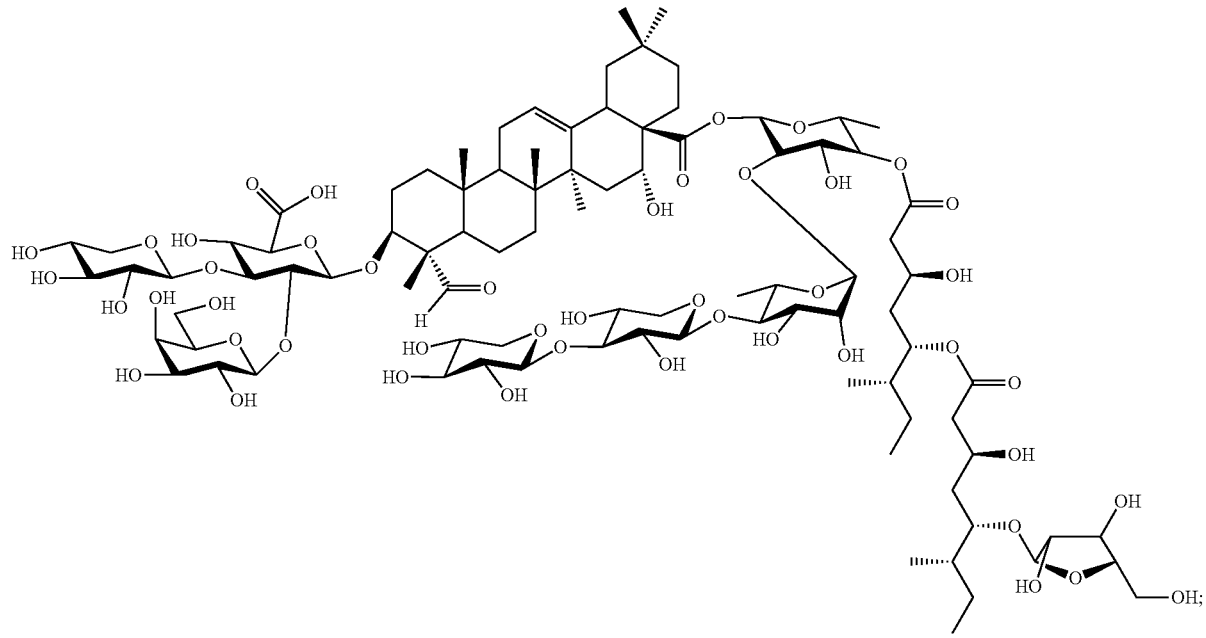
the compound (c) is:
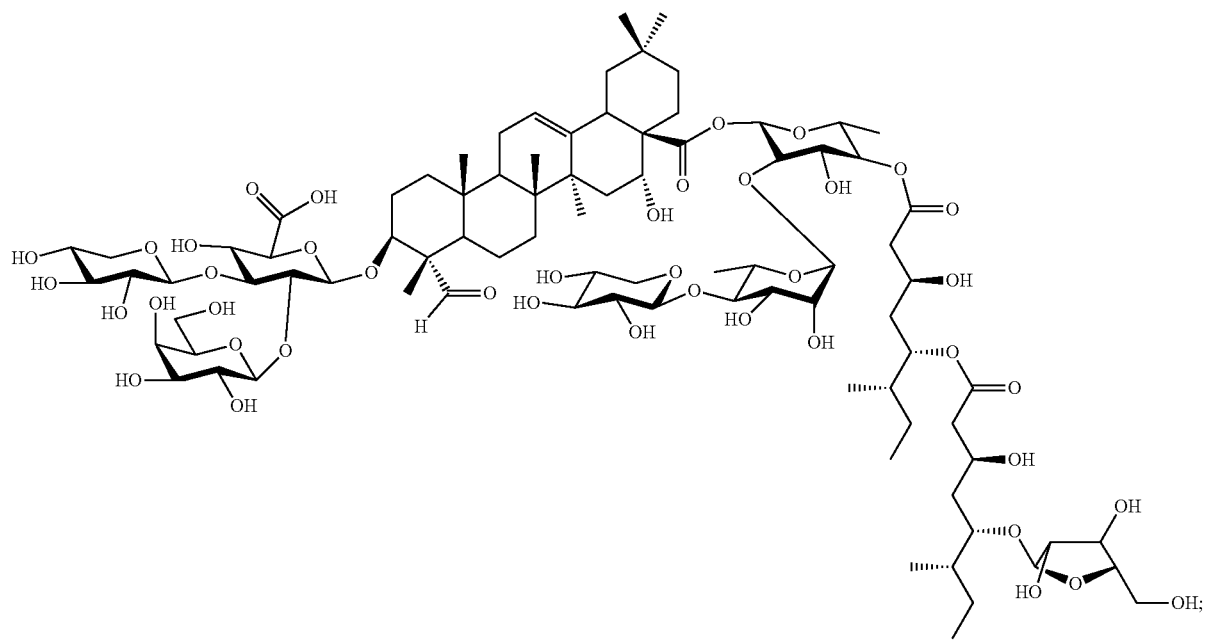

the compound (d) is:

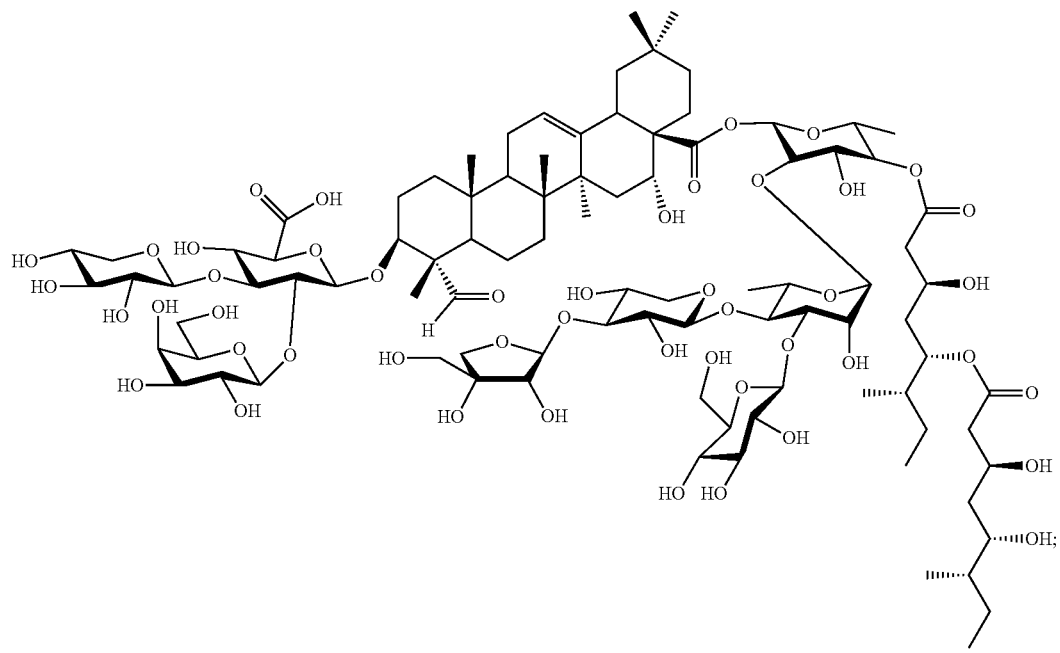

and the at least 88% in sum of the one or more of the compound (a), the compound (b), and the compound (c) and the greater than 3% but less than or equal to 10% of the compound (d) is determined by:
- (a) injecting at a retention time of 0 minutes 10 μL of a candidate saponin extract that is in an injection solution into a UPLC column at a flow rate of 0.6 mL per minute of a first mobile phase solution until a retention time of 6.23 minutes and a flow rate of 0.6 mL per minute of a second mobile phase solution at retention times from 6.23 minutes to 9.0 minutes, thereby obtaining a candidate saponin extract eluant,
    - (1) the injection solution consisting of 0.2% by g acetic acid per mL of: (A) 70% by volume water and (B) 30% volume acetonitrile,
    - (2) the first mobile phase solution consisting of 0.025% by g trifluoracetic acid per mL of: (A) 5% by volume isopropyl alcohol, (B) 20% by volume acetonitrile, and (C) 75% by volume water,
    - (3) the second mobile phase solution consisting of: (A) 23% by volume the first mobile phase solution and (B) 77% by volume of a first solution,
    - (4) the first solution consisting of: 0.025% by g trifluoroacetic acid per mL of: (A) 18% by volume isopropyl alcohol, (B) 72% by volume acetonitrile, and (C) 10% by volume water, and
    - (5) the UPLC column having an inner diameter of 2.1 mm, a length of 100 mm, and 1.7 um diameter ethylene bridged hybrid C18 particles and being 55° C.;
- (b) measuring UV absorbance at a wavelength of 214 nm of the candidate saponin extract eluant during (a), thereby obtaining raw candidate saponin extract UV absorbances versus the retention times; the raw candidate saponin extract UV absorbances versus retention times comprising a solvent front and a plurality of raw candidate saponin extract absorbance peaks; the plurality of raw candidate saponin extract absorbance peaks comprising a raw candidate compounds (a)-(c) absorbance peak and a raw candidate compound (d) absorbance peak;
- (c) measuring the monoisotopic weights of the candidate saponin extract eluant during (a) with a quadrupole mass spectrometer under a scanning range of monoisotopic weights from 1400 to 2040, thereby obtaining raw candidate saponin extract monoisotopic weights versus the retention times; the raw candidate saponin extract monoisotopic weights versus the retention times comprising a plurality of monoisotopic weight peaks; the plurality of monoisotopic weight peaks comprising a candidate compounds (a)-(c) monoisotopic weights peak and a candidate compound (d) monoisotopic weights peak; the candidate compounds (a)-(c) monoisotopic weights peak having a retention time equal to the retention time of the raw candidate compounds (a)-(c) absorbance peak; and the candidate compound (d) monoisotopic weights peak having a retention time equal to the retention time of the raw candidate compound (d) absorbance peak;
- (d) confirming that:
    - (1) the candidate compounds (a)-(c) monoisotopic weights peak comprises a triterpenoid glycoside that has a monoisotopic weight of 1855.9 or at least one first triterpenoid glycoside that has a monoisotopic weight of 1987.9; the confirming that the candidate compounds (a)-(c) monoisotopic weights peak comprises the at least one first triterpenoid glycoside that has a monoisotopic weight of 1987.9 further comprising confirming that the candidate compounds (a)-(c) monoisotopic weights peak comprises: (i) the compound (a), (ii) the compound (b), or (iii) the compound (a) and the compound (b) and the confirming that the candidate compounds (a)-(c) monoisotopic weights peak comprises the triterpenoid glycoside that has a monoisotopic weight of 1855.9 further comprising confirming that the candidate compounds (a)-(c) monoisotopic weights peak comprises the compound (c), thereby obtaining the one or more of the compound (a), the compound (b), and the compound (c), and thereby confirming the raw candidate compounds (a)-(c) absorbance peak is a raw compounds (a)-(c) absorbance peak; and (2) the candidate compound (d) monoisotopic weights peak comprises a triterpenoid glycoside that has a monoisotopic weight of 2017.9 and further confirming that the triterpenoid glycoside that has a monoisotopic weight of 2017.9 is the compound (d), thereby obtaining the compound (d) and thereby confirming the raw candidate compound (d) absorbance peak is a raw compound (d) absorbance peak;

(e) injecting at a blank retention time of 0 minutes of 10 μL of the injection solution into the UPLC column at a flow rate of 0.6 mL per minute of the first mobile phase solution until the blank retention time of 6.23 minutes followed by a flow rate of 0.6 mL per minute of the second mobile phase solution at the blank retention times of from 6.23 minutes to 9.0 minutes, thereby obtaining a blank eluant;

(f) measuring the UV absorbance at a wavelength of 214 nm of the blank eluant during (d), thereby obtaining blank UV absorbances versus blank retention times; the blank UV absorbances versus blank retention times comprising a plurality of blank absorbance peaks; the plurality of blank saponin extract absorbance peaks comprising a blank compounds (a)-(c) absorbance peak and a blank compound (d) absorbance peak; the blank compounds (a)-(c) absorbance peak having a blank retention time equal to the retention time of the raw compounds (a)-(c) absorbance peak; the blank compound (d) absorbance peak having a blank retention time equal to the retention time of the raw compound (d) absorbance peak;

(g) subtracting the blank UV absorbance for each of the blank retention times from the raw candidate saponin extract UV absorbance for each of the respective retention times, thereby obtaining blank-subtracted saponin extract absorbances versus retention times; the blank-subtracted saponin extract absorbances versus retention times comprising a plurality of blank-subtracted saponin extract absorbance peaks; the plurality of blank-subtracted saponin extract absorbance peaks comprising a blank-subtracted compounds (a)-(c) absorbance peak and a blank-subtracted compound (d) absorbance peak;

(h) obtaining:
  (1) an area of the plurality of blank-subtracted saponin extract absorbance peaks that elude from the later of the solvent front and the retention time of 0.5 minutes and until the retention time of 5.5 minutes, thereby obtaining a total peaks area;
  (2) an area that is of the blank-subtracted compounds (a)-(c) absorbance peak, thereby obtaining a compounds (a)-(c) peak area; and
  (3) an area that is of the blank-subtracted compound (d) absorbance peak, thereby obtaining a compound (d) peak area;

(i) dividing:
  (1) the compounds (a)-(c) peak area by the total peaks area, thereby obtaining a fraction of the compounds (a)-(c) peak; and
  (2) the compound (d) peak area by the total peaks area, thereby obtaining a fraction of the compound (d);

(j) multiplying:
  (1) the fraction of the compounds (a)-(c) peak by 100, thereby obtaining a percentage of the compounds (a)-(c) peak; and
  (2) the fraction of the compound (d) by 100, thereby obtaining a percentage of the compound (d); and (k) confirming that:
  (1) the percentage of the compounds (a)-(c) peak is at least 88% and, thereby obtaining the at least 88% in sum of the one or more of the compound (a), the compound (b), and the compound (c); and
  (2) the percentage of the compound (d) is greater than 3% but less than or equal to 10% and thereby obtaining the greater than 3% but less than or equal to 10% of the compound (d).

12. The composition of claim 11, wherein the saponin extract comprises greater than 4.5% but less than or equal to 10% of the compound (d), wherein in (k), the percentage of the compound (d) is greater than 4.5% but less than or equal to 10%, thereby obtaining the greater than 4.5% but less than or equal to 10% of the compound (d).

13. The composition of claim 11, wherein the saponin extract comprises greater than 3% but less than or equal to 9% of the compound (d), wherein in (k), the percentage of the compound (d) is greater than 3% but less than or equal to 9%, thereby obtaining the greater than 3% but less than or equal to 9% of the compound (d).

14. The composition of claim 11, the saponin extract comprising at least 98% of a first group of compounds; the first group of compounds comprising: (i) the compound (d); (ii) one or more of (A) the compound (a), (B) the compound (b), and (C) the compound (c); and (iii) one or more of (A) a compound (e), (B) a compound (f), and (C) a compound (g); the at least 98% of the first group of compounds being determined by (a)-(k), wherein:

the compound (e) is:
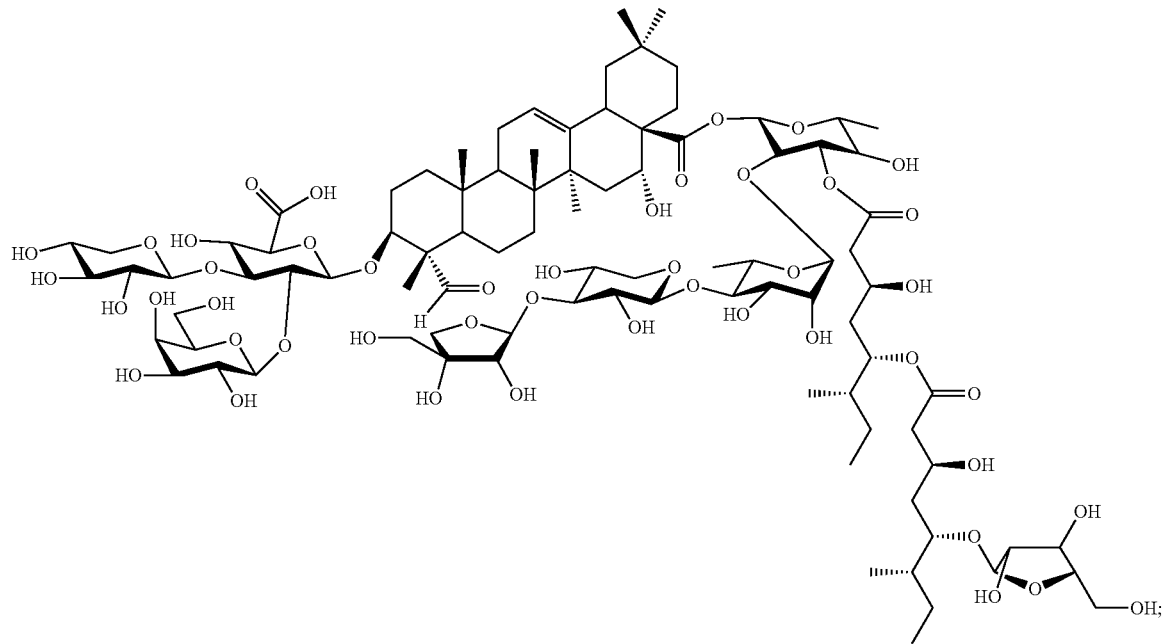
the compound (f) is:
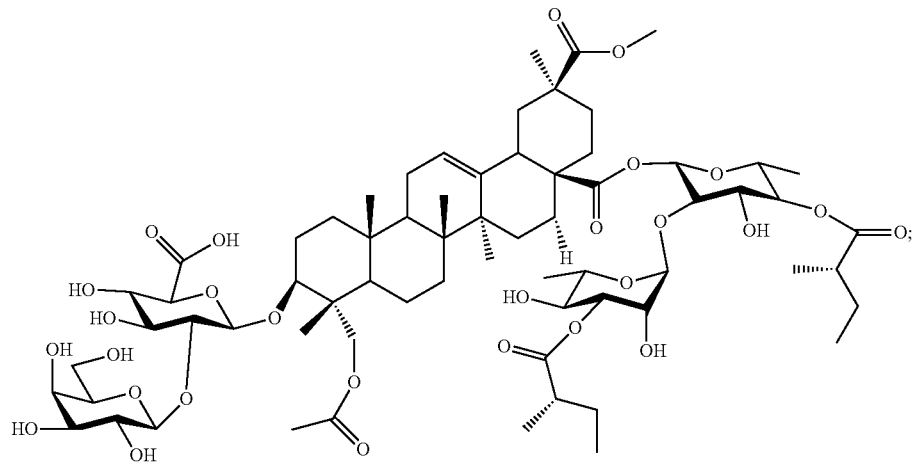
the compound (g) is:
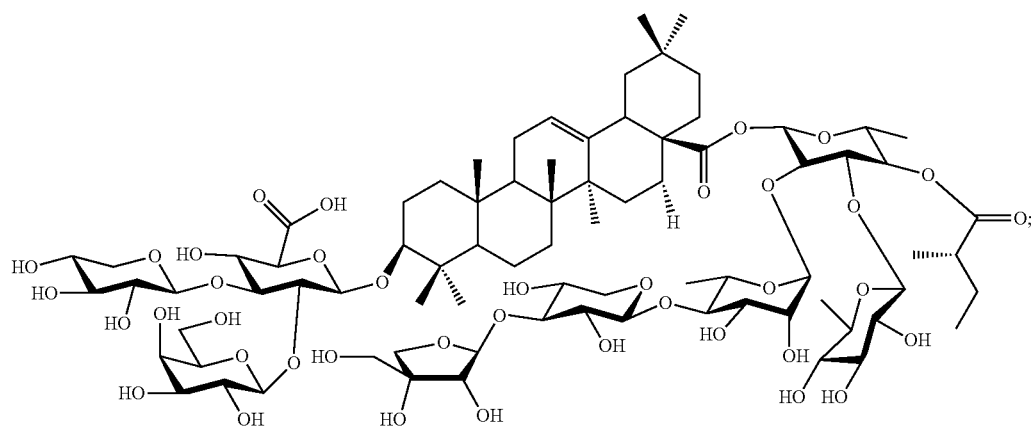

in (b), the plurality of raw candidate saponin extract absorbance peaks further comprises a raw candidate compound (e) absorbance peak, a raw candidate compound (f) absorbance peak, or a raw candidate compound (g) peak; the raw candidate compound (e) absorbance peak having a retention time that is before the retention time of the raw candidate compounds (a)-(c) absorbance peak;

in (c), the plurality of monoisotopic weight peaks further comprises a raw candidate compound (e) monoisotopic weight peak, a raw candidate compound (f) monoisotopic weight peak, or a raw candidate compound (g) monoisotopic weight peak; the raw candidate compound (e) monoisotopic weight peak having a retention time equal to the retention time of the raw candidate compound (e) absorbance peak, the raw candidate compound (f) monoisotopic weight peak having a retention time equal to the retention time of the raw candidate compound (f) absorbance peak, and the raw candidate compound (g) monoisotopic weight peak having a retention time equal to the retention time of the raw candidate compound (g) absorbance peak;

in (d), further confirming at least one of the following to thereby obtain (iii) the one or more of (A) the compound (e), (B) the compound (f), and (C) the compound (g):

(3) that the raw candidate compound (e) monoisotopic weight peak comprises a second triterpenoid glycoside that has a monoisotopic weight of 1987.9 and further confirming that the second triterpenoid glycoside that has a monoisotopic weight of 1987.9 is the compound (e), thereby obtaining the compound (e) and thereby confirming the raw candidate compound (e) absorbance peak is a raw compound (e) absorbance peak;

(4) that the raw candidate compound (f) monoisotopic weight peak comprises a triterpenoid glycoside that has a monoisotopic weight of 1517.7 and further confirming that the triterpenoid glycoside that has a monoisotopic weight of 1517.7 is the compound (f), thereby obtaining the compound (f) and thereby confirming the raw candidate compound (f) absorbance peak is a raw compound (f) absorbance peak; and (5) that the raw candidate compound (g) monoisotopic weight peak comprises a triterpenoid glycoside that has a monoisotopic weight of 1711.8 and further confirming that the triterpenoid glycoside that has a monoisotopic weight of 1711.8 is the compound (g), thereby obtaining the compound (g) and thereby confirming the raw candidate compound (g) absorbance peak is a raw compound (g) absorbance peak;

in (f), the plurality of blank saponin extract absorbance peaks further comprises a blank compound (e) absorbance peak, a blank compound (f) absorbance peak, or a blank compound (g) absorbance peak; the blank compound (e) absorbance peak having a blank retention time equal to the retention time of the raw compound (e) absorbance peak; the blank compound (f) absorbance peak having a blank retention time equal to the retention time of the raw compound (f) absorbance peak; and the blank compound (g) absorbance peak having a blank retention time equal to the retention time of the raw compound (g) absorbance peak;

in (g), the plurality of blank-subtracted candidate saponin extract absorbance peaks further comprising a blank-subtracted compound (e) absorbance peak, a blank-subtracted compound (f) component absorbance peak, or a blank-subtracted compound (g) absorbance peak;

in (h), further obtaining:

(4) an area that is of the blank-subtracted compound (e) absorbance peak, thereby obtaining a compound (e) peak area, the compound (e) peak area being zero when the compound (e) is not obtained;

(5) an area that is of the blank-subtracted compound (f) absorbance peak, thereby obtaining a compound (f) peak area, the compound (f) peak area being zero when the compound (f) is not obtained;

(6) an area that is of the blank-subtracted compound (g) absorbance peak, thereby obtaining a compound (g) peak area, the compound (g) peak area being zero when the compound (g) is not obtained; and (7) the sum of: (i) the compounds (a)-(c) peak area, (ii) the compound (e) peak area, (iii) the compound (f) peak area, (iv) the compound (g), and (v) the compound (d) peak area, thereby obtaining a sum area of the first group of compounds;

in (i), further dividing:

(3) the sum area of the first group compounds by the total peaks area, thereby obtaining a first group of compounds fraction;

in (j), further multiplying:

(3) the first group of compounds fraction by 100, thereby obtaining a percentage of the first group of compounds; and in (k), further confirming that:

(3) the percentage of the first group of compounds is at least 98%, thereby obtaining the at least 98% of the first group of compounds.

15. The composition of claim 11, wherein the saponin extract comprises at least 90% in sum of the one or more of the compound (a), the compound (b), and the compound (c); wherein in (k), the percentage of the compounds (a)-(c) peak is at least 90%, thereby obtaining the at least 90% of the one or more of the compound (a), the compound (b), and the compound (c).

16. The composition of claim 11 comprising liposomes and the TLR4 agonist.

17. The composition of claim 16, wherein the TLR4 agonist is 3-de-O-acylated monophosphoryl lipid A.

18. An immunogenic composition comprising (i) the composition of claim 11 and (ii) an immunogen or a polynucleotide encoding the immunogen.

19. A method for the manufacture of the composition of claim 11, the method comprising admixing: (i) the saponin extract and (ii) the liposomes or the emulsion.

20. A method of eliciting an immune response to the immunogen in a subject, the method comprising administering to the subject the immunogenic composition of claim 18.

* * * * *

SEQUENCE LISTING

```
<160> NUMBER OF SEQ ID NOS: 9

<210> SEQ ID NO 1
<211> LENGTH: 424
<212> TYPE: PRT
<213> ORGANISM: Artificial
<220> FEATURE:
<223> OTHER INFORMATION: RTS

<400> SEQUENCE: 1
```

-continued

```
Met Met Ala Pro Asp Pro Asn Ala Asn Pro Asn Ala Asn Pro Asn Ala
1               5                   10                  15
Asn Pro Asn Ala Asn Pro Asn Ala Asn Pro Asn Ala Asn Pro Asn Ala
            20                  25                  30
Asn Pro Asn Ala Asn Pro Asn Ala Asn Pro Asn Ala Asn Pro Asn Ala
            35                  40                  45
Asn Pro Asn Ala Asn Pro Asn Ala Asn Pro Asn Ala Asn Pro Asn Ala
50                      55                  60
Asn Pro Asn Ala Asn Pro Asn Ala Asn Pro Asn Ala Asn Pro Asn Lys
65                  70                  75                  80
Asn Asn Gln Gly Asn Gly Gln Gly His Asn Met Pro Asn Asp Pro Asn
                85                  90                  95
Arg Asn Val Asp Glu Asn Ala Asn Ala Asn Ser Ala Val Lys Asn Asn
                100                 105                 110
Asn Asn Glu Glu Pro Ser Asp Lys His Ile Lys Glu Tyr Leu Asn Lys
            115                 120                 125
Ile Gln Asn Ser Leu Ser Thr Glu Trp Ser Pro Cys Ser Val Thr Cys
    130                 135                 140
Gly Asn Gly Ile Gln Val Arg Ile Lys Pro Gly Ser Ala Asn Lys Pro
145                 150                 155                 160
Lys Asp Glu Leu Asp Tyr Ala Asn Asp Ile Glu Lys Lys Ile Cys Lys
                165                 170                 175
Met Glu Lys Cys Ser Ser Val Phe Asn Val Val Asn Ser Ser Ile Gly
                180                 185                 190
Leu Gly Pro Val Thr Asn Met Glu Asn Ile Thr Ser Gly Phe Leu Gly
            195                 200                 205
Pro Leu Leu Val Leu Gln Ala Gly Phe Phe Leu Leu Thr Arg Ile Leu
210                 215                 220
Thr Ile Pro Gln Ser Leu Asp Ser Trp Trp Thr Ser Leu Asn Phe Leu
225                 230                 235                 240
Gly Gly Ser Pro Val Cys Leu Gly Gln Asn Ser Gln Ser Pro Thr Ser
            245                 250                 255
Asn His Ser Pro Thr Ser Cys Pro Pro Ile Cys Pro Gly Tyr Arg Trp
            260                 265                 270
Met Cys Leu Arg Arg Phe Ile Ile Phe Leu Phe Ile Leu Leu Leu Cys
        275                 280                 285
Leu Ile Phe Leu Leu Val Leu Leu Asp Tyr Gln Gly Met Leu Pro Val
        290                 295                 300
Cys Pro Leu Ile Pro Gly Ser Thr Thr Thr Asn Thr Gly Pro Cys Lys
305                 310                 315                 320
Thr Cys Thr Thr Pro Ala Gln Gly Asn Ser Met Phe Pro Ser Cys Cys
                325                 330                 335
Cys Thr Lys Pro Thr Asp Gly Asn Cys Thr Cys Ile Pro Ile Pro Ser
            340                 345                 350
Ser Trp Ala Phe Ala Lys Tyr Leu Trp Glu Trp Ala Ser Val Arg Phe
        355                 360                 365
Ser Trp Leu Ser Leu Leu Val Pro Phe Val Gln Trp Phe Val Gly Leu
        370                 375                 380
Ser Pro Thr Val Trp Leu Ser Ala Ile Trp Met Met Trp Tyr Trp Gly
385                 390                 395                 400
Pro Ser Leu Tyr Ser Ile Val Ser Pro Phe Ile Pro Leu Leu Pro Ile
            405                 410                 415
```

```
Phe Phe Cys Leu Trp Val Tyr Ile
            420

<210> SEQ ID NO 2
<211> LENGTH: 391
<212> TYPE: PRT
<213> ORGANISM: Mycobacterium tuberculosis

<400> SEQUENCE: 2

Met Val Asp Phe Gly Ala Leu Pro Pro Glu Ile Asn Ser Ala Arg Met
1               5                   10                  15

Tyr Ala Gly Pro Gly Ser Ala Ser Leu Val Ala Ala Gln Met Trp
            20                  25                  30

Asp Ser Val Ala Ser Asp Leu Phe Ser Ala Ala Ser Ala Phe Gln Ser
            35                  40                  45

Val Val Trp Gly Leu Thr Val Gly Ser Trp Ile Gly Ser Ser Ala Gly
    50                  55                  60

Leu Met Val Ala Ala Ser Pro Tyr Val Ala Trp Met Ser Val Thr
65                  70                  75                  80

Ala Gly Gln Ala Glu Leu Thr Ala Ala Gln Val Arg Val Ala Ala Ala
                85                  90                  95

Ala Tyr Glu Thr Ala Tyr Gly Leu Thr Val Pro Pro Val Ile Ala
                100                 105                 110

Glu Asn Arg Ala Glu Leu Met Ile Leu Ile Ala Thr Asn Leu Leu Gly
                115                 120                 125

Gln Asn Thr Pro Ala Ile Ala Val Asn Glu Ala Glu Tyr Gly Glu Met
            130                 135                 140

Trp Ala Gln Asp Ala Ala Ala Met Phe Gly Tyr Ala Ala Ala Thr Ala
145                 150                 155                 160

Thr Ala Thr Ala Thr Leu Leu Pro Phe Glu Glu Ala Pro Glu Met Thr
                165                 170                 175

Ser Ala Gly Gly Leu Leu Glu Gln Ala Ala Val Glu Glu Ala Ser
            180                 185                 190

Asp Thr Ala Ala Ala Asn Gln Leu Met Asn Asn Val Pro Gln Ala Leu
            195                 200                 205

Gln Gln Leu Ala Gln Pro Thr Gln Gly Thr Thr Pro Ser Ser Lys Leu
210                 215                 220

Gly Gly Leu Trp Lys Thr Val Ser Pro His Arg Ser Pro Ile Ser Asn
225                 230                 235                 240

Met Val Ser Met Ala Asn Asn His Met Ser Met Thr Asn Ser Gly Val
                245                 250                 255

Ser Met Thr Asn Thr Leu Ser Ser Met Leu Lys Gly Phe Ala Pro Ala
            260                 265                 270

Ala Ala Ala Gln Ala Val Gln Thr Ala Ala Gln Asn Gly Val Arg Ala
            275                 280                 285

Met Ser Ser Leu Gly Ser Ser Leu Gly Ser Ser Gly Leu Gly Gly Gly
            290                 295                 300

Val Ala Ala Asn Leu Gly Arg Ala Ala Ser Val Gly Ser Leu Ser Val
305                 310                 315                 320

Pro Gln Ala Trp Ala Ala Asn Gln Ala Val Thr Pro Ala Ala Arg
                325                 330                 335

Ala Leu Pro Leu Thr Ser Leu Thr Ser Ala Glu Arg Gly Pro Gly
            340                 345                 350

Gln Met Leu Gly Gly Leu Pro Val Gly Gln Met Gly Ala Arg Ala Gly
            355                 360                 365
```

-continued

Gly Gly Leu Ser Gly Val Leu Arg Val Pro Pro Arg Pro Tyr Val Met
        370                 375                 380

Pro His Ser Pro Ala Ala Gly
385                 390

<210> SEQ ID NO 3
<211> LENGTH: 323
<212> TYPE: PRT
<213> ORGANISM: Mycobacterium tuberculosis

<400> SEQUENCE: 3

Ala Pro Pro Ala Leu Ser Gln Asp Arg Phe Ala Asp Phe Pro Ala Leu
1               5                   10                  15

Pro Leu Asp Pro Ser Ala Met Val Ala Gln Val Gly Pro Gln Val Val
            20                  25                  30

Asn Ile Asn Thr Lys Leu Gly Tyr Asn Asn Ala Val Gly Ala Gly Thr
        35                  40                  45

Gly Ile Val Ile Asp Pro Asn Gly Val Val Leu Thr Asn Asn His Val
    50                  55                  60

Ile Ala Gly Ala Thr Asp Ile Asn Ala Phe Ser Val Gly Ser Gly Gln
65                  70                  75                  80

Thr Tyr Gly Val Asp Val Val Gly Tyr Asp Arg Thr Gln Asp Val Ala
                85                  90                  95

Val Leu Gln Leu Arg Gly Ala Gly Gly Leu Pro Ser Ala Ala Ile Gly
            100                 105                 110

Gly Gly Val Ala Val Gly Glu Pro Val Val Ala Met Gly Asn Ser Gly
        115                 120                 125

Gly Gln Gly Gly Thr Pro Arg Ala Val Pro Gly Arg Val Val Ala Leu
    130                 135                 140

Gly Gln Thr Val Gln Ala Ser Asp Ser Leu Thr Gly Ala Glu Glu Thr
145                 150                 155                 160

Leu Asn Gly Leu Ile Gln Phe Asp Ala Ala Ile Gln Pro Gly Asp Ser
                165                 170                 175

Gly Gly Pro Val Val Asn Gly Leu Gly Gln Val Val Gly Met Asn Thr
            180                 185                 190

Ala Ala Ser Asp Asn Phe Gln Leu Ser Gln Gly Gly Gln Gly Phe Ala
        195                 200                 205

Ile Pro Ile Gly Gln Ala Met Ala Ile Ala Gly Gln Ile Arg Ser Gly
    210                 215                 220

Gly Gly Ser Pro Thr Val His Ile Gly Pro Thr Ala Phe Leu Gly Leu
225                 230                 235                 240

Gly Val Val Asp Asn Asn Gly Asn Gly Ala Arg Val Gln Arg Val Val
                245                 250                 255

Gly Ser Ala Pro Ala Ala Ser Leu Gly Ile Ser Thr Gly Asp Val Ile
            260                 265                 270

Thr Ala Val Asp Gly Ala Pro Ile Asn Ser Ala Thr Ala Met Ala Asp
        275                 280                 285

Ala Leu Asn Gly His His Pro Gly Asp Val Ile Ser Val Thr Trp Gln
    290                 295                 300

Thr Lys Ser Gly Gly Thr Arg Thr Gly Asn Val Thr Leu Ala Glu Gly
305                 310                 315                 320

Pro Pro Ala

<210> SEQ ID NO 4

```
<211> LENGTH: 723
<212> TYPE: PRT
<213> ORGANISM: Artificial
<220> FEATURE:
<223> OTHER INFORMATION: M72

<400> SEQUENCE: 4
```

Met Thr Ala Ala Ser Asp Asn Phe Gln Leu Ser Gln Gly Gly Gln Gly
1               5                   10                  15

Phe Ala Ile Pro Ile Gly Gln Ala Met Ala Ile Ala Gly Gln Ile Arg
            20                  25                  30

Ser Gly Gly Gly Ser Pro Thr Val His Ile Gly Pro Thr Ala Phe Leu
        35                  40                  45

Gly Leu Gly Val Val Asp Asn Asn Gly Asn Gly Ala Arg Val Gln Arg
    50                  55                  60

Val Val Gly Ser Ala Pro Ala Ala Ser Leu Gly Ile Ser Thr Gly Asp
65                  70                  75                  80

Val Ile Thr Ala Val Asp Gly Ala Pro Ile Asn Ser Ala Thr Ala Met
                85                  90                  95

Ala Asp Ala Leu Asn Gly His His Pro Gly Asp Val Ile Ser Val Thr
            100                 105                 110

Trp Gln Thr Lys Ser Gly Gly Thr Arg Thr Gly Asn Val Thr Leu Ala
        115                 120                 125

Glu Gly Pro Pro Ala Glu Phe Met Val Asp Phe Gly Ala Leu Pro Pro
    130                 135                 140

Glu Ile Asn Ser Ala Arg Met Tyr Ala Gly Pro Gly Ser Ala Ser Leu
145                 150                 155                 160

Val Ala Ala Ala Gln Met Trp Asp Ser Val Ala Ser Asp Leu Phe Ser
                165                 170                 175

Ala Ala Ser Ala Phe Gln Ser Val Val Trp Gly Leu Thr Val Gly Ser
            180                 185                 190

Trp Ile Gly Ser Ser Ala Gly Leu Met Val Ala Ala Ser Pro Tyr
        195                 200                 205

Val Ala Trp Met Ser Val Thr Ala Gly Gln Ala Glu Leu Thr Ala Ala
    210                 215                 220

Gln Val Arg Val Ala Ala Ala Tyr Glu Thr Ala Tyr Gly Leu Thr
225                 230                 235                 240

Val Pro Pro Pro Val Ile Ala Glu Asn Arg Ala Glu Leu Met Ile Leu
                245                 250                 255

Ile Ala Thr Asn Leu Leu Gly Gln Asn Thr Pro Ala Ile Ala Val Asn
            260                 265                 270

Glu Ala Glu Tyr Gly Glu Met Trp Ala Gln Asp Ala Ala Ala Met Phe
        275                 280                 285

Gly Tyr Ala Ala Ala Thr Ala Thr Ala Thr Ala Leu Leu Pro Phe
    290                 295                 300

Glu Glu Ala Pro Glu Met Thr Ser Ala Gly Gly Leu Leu Glu Gln Ala
305                 310                 315                 320

Ala Ala Val Glu Glu Ala Ser Asp Thr Ala Ala Ala Asn Gln Leu Met
                325                 330                 335

Asn Asn Val Pro Gln Ala Leu Gln Gln Leu Ala Gln Pro Thr Gln Gly
            340                 345                 350

Thr Thr Pro Ser Ser Lys Leu Gly Gly Leu Trp Lys Thr Val Ser Pro
        355                 360                 365

His Arg Ser Pro Ile Ser Asn Met Val Ser Met Ala Asn Asn His Met
    370                 375                 380

```
Ser Met Thr Asn Ser Gly Val Ser Met Thr Asn Thr Leu Ser Ser Met
385                 390                 395                 400

Leu Lys Gly Phe Ala Pro Ala Ala Ala Gln Ala Val Gln Thr Ala
            405                 410                 415

Ala Gln Asn Gly Val Arg Ala Met Ser Ser Leu Gly Ser Ser Leu Gly
            420                 425                 430

Ser Ser Gly Leu Gly Gly Val Ala Ala Asn Leu Gly Arg Ala Ala
        435                 440                 445

Ser Val Gly Ser Leu Ser Val Pro Gln Ala Trp Ala Ala Asn Gln
    450                 455                 460

Ala Val Thr Pro Ala Ala Arg Ala Leu Pro Leu Thr Ser Leu Thr Ser
465                 470                 475                 480

Ala Ala Glu Arg Gly Pro Gly Gln Met Leu Gly Gly Leu Pro Val Gly
            485                 490                 495

Gln Met Gly Ala Arg Ala Gly Gly Leu Ser Gly Val Leu Arg Val
            500                 505                 510

Pro Pro Arg Pro Tyr Val Met Pro His Ser Pro Ala Ala Gly Asp Ile
        515                 520                 525

Ala Pro Pro Ala Leu Ser Gln Asp Arg Phe Ala Asp Phe Pro Ala Leu
        530                 535                 540

Pro Leu Asp Pro Ser Ala Met Val Ala Gln Val Gly Pro Gln Val Val
545                 550                 555                 560

Asn Ile Asn Thr Lys Leu Gly Tyr Asn Asn Ala Val Gly Ala Gly Thr
            565                 570                 575

Gly Ile Val Ile Asp Pro Asn Gly Val Val Leu Thr Asn Asn His Val
            580                 585                 590

Ile Ala Gly Ala Thr Asp Ile Asn Ala Phe Ser Val Gly Ser Gly Gln
        595                 600                 605

Thr Tyr Gly Val Asp Val Val Gly Tyr Asp Arg Thr Gln Asp Val Ala
    610                 615                 620

Val Leu Gln Leu Arg Gly Ala Gly Gly Leu Pro Ser Ala Ala Ile Gly
625                 630                 635                 640

Gly Gly Val Ala Val Gly Glu Pro Val Val Ala Met Gly Asn Ser Gly
            645                 650                 655

Gly Gln Gly Gly Thr Pro Arg Ala Val Pro Gly Arg Val Val Ala Leu
            660                 665                 670

Gly Gln Thr Val Gln Ala Ser Asp Ser Leu Thr Gly Ala Glu Glu Thr
        675                 680                 685

Leu Asn Gly Leu Ile Gln Phe Asp Ala Ala Ile Gln Pro Gly Asp Ala
    690                 695                 700

Gly Gly Pro Val Val Asn Gly Leu Gly Gln Val Val Gly Met Asn Thr
705                 710                 715                 720

Ala Ala Ser

<210> SEQ ID NO 5
<211> LENGTH: 725
<212> TYPE: PRT
<213> ORGANISM: Artificial
<220> FEATURE:
<223> OTHER INFORMATION: M72-2His

<400> SEQUENCE: 5

Met His His Thr Ala Ala Ser Asp Asn Phe Gln Leu Ser Gln Gly Gly
1               5                   10                  15
```

-continued

```
Gln Gly Phe Ala Ile Pro Ile Gly Gln Ala Met Ala Ile Ala Gly Gln
             20                  25                  30

Ile Arg Ser Gly Gly Gly Ser Pro Thr Val His Ile Gly Pro Thr Ala
         35                  40                  45

Phe Leu Gly Leu Gly Val Val Asp Asn Asn Gly Asn Gly Ala Arg Val
     50                  55                  60

Gln Arg Val Val Gly Ser Ala Pro Ala Ala Ser Leu Gly Ile Ser Thr
 65                  70                  75                  80

Gly Asp Val Ile Thr Ala Val Asp Gly Ala Pro Ile Asn Ser Ala Thr
                 85                  90                  95

Ala Met Ala Asp Ala Leu Asn Gly His His Pro Gly Asp Val Ile Ser
            100                 105                 110

Val Thr Trp Gln Thr Lys Ser Gly Gly Thr Arg Thr Gly Asn Val Thr
        115                 120                 125

Leu Ala Glu Gly Pro Pro Ala Glu Phe Met Val Asp Phe Gly Ala Leu
    130                 135                 140

Pro Pro Glu Ile Asn Ser Ala Arg Met Tyr Ala Gly Pro Gly Ser Ala
145                 150                 155                 160

Ser Leu Val Ala Ala Ala Gln Met Trp Asp Ser Val Ala Ser Asp Leu
                165                 170                 175

Phe Ser Ala Ala Ser Ala Phe Gln Ser Val Val Trp Gly Leu Thr Val
            180                 185                 190

Gly Ser Trp Ile Gly Ser Ser Ala Gly Leu Met Val Ala Ala Ala Ser
        195                 200                 205

Pro Tyr Val Ala Trp Met Ser Val Thr Ala Gly Gln Ala Glu Leu Thr
    210                 215                 220

Ala Ala Gln Val Arg Val Ala Ala Ala Tyr Glu Thr Ala Tyr Gly
225                 230                 235                 240

Leu Thr Val Pro Pro Pro Val Ile Ala Glu Asn Arg Ala Glu Leu Met
                245                 250                 255

Ile Leu Ile Ala Thr Asn Leu Leu Gly Gln Asn Thr Pro Ala Ile Ala
            260                 265                 270

Val Asn Glu Ala Glu Tyr Gly Glu Met Trp Ala Gln Asp Ala Ala Ala
        275                 280                 285

Met Phe Gly Tyr Ala Ala Ala Thr Ala Thr Ala Thr Ala Thr Leu Leu
    290                 295                 300

Pro Phe Glu Glu Ala Pro Glu Met Thr Ser Ala Gly Gly Leu Leu Glu
305                 310                 315                 320

Gln Ala Ala Ala Val Glu Glu Ala Ser Asp Thr Ala Ala Ala Asn Gln
                325                 330                 335

Leu Met Asn Asn Val Pro Gln Ala Leu Gln Gln Leu Ala Gln Pro Thr
            340                 345                 350

Gln Gly Thr Thr Pro Ser Ser Lys Leu Gly Gly Leu Trp Lys Thr Val
        355                 360                 365

Ser Pro His Arg Ser Pro Ile Ser Asn Met Val Ser Met Ala Asn Asn
    370                 375                 380

His Met Ser Met Thr Asn Ser Gly Val Ser Met Thr Asn Thr Leu Ser
385                 390                 395                 400

Ser Met Leu Lys Gly Phe Ala Pro Ala Ala Ala Gln Ala Val Gln
                405                 410                 415

Thr Ala Ala Gln Asn Gly Val Arg Ala Met Ser Ser Leu Gly Ser Ser
            420                 425                 430

Leu Gly Ser Ser Gly Leu Gly Gly Gly Val Ala Ala Asn Leu Gly Arg
```

```
        435                 440                 445

Ala Ala Ser Val Gly Ser Leu Ser Val Pro Gln Ala Trp Ala Ala Ala
    450                 455                 460

Asn Gln Ala Val Thr Pro Ala Ala Arg Ala Leu Pro Leu Thr Ser Leu
465                 470                 475                 480

Thr Ser Ala Ala Glu Arg Gly Pro Gly Gln Met Leu Gly Gly Leu Pro
                485                 490                 495

Val Gly Gln Met Gly Ala Arg Ala Gly Gly Gly Leu Ser Gly Val Leu
            500                 505                 510

Arg Val Pro Pro Arg Pro Tyr Val Met Pro His Ser Pro Ala Ala Gly
        515                 520                 525

Asp Ile Ala Pro Pro Ala Leu Ser Gln Asp Arg Phe Ala Asp Phe Pro
    530                 535                 540

Ala Leu Pro Leu Asp Pro Ser Ala Met Val Ala Gln Val Gly Pro Gln
545                 550                 555                 560

Val Val Asn Ile Asn Thr Lys Leu Gly Tyr Asn Asn Ala Val Gly Ala
                565                 570                 575

Gly Thr Gly Ile Val Ile Asp Pro Asn Gly Val Val Leu Thr Asn Asn
            580                 585                 590

His Val Ile Ala Gly Ala Thr Asp Ile Asn Ala Phe Ser Val Gly Ser
        595                 600                 605

Gly Gln Thr Tyr Gly Val Asp Val Val Gly Tyr Asp Arg Thr Gln Asp
    610                 615                 620

Val Ala Val Leu Gln Leu Arg Gly Ala Gly Gly Leu Pro Ser Ala Ala
625                 630                 635                 640

Ile Gly Gly Gly Val Ala Val Gly Glu Pro Val Val Ala Met Gly Asn
                645                 650                 655

Ser Gly Gly Gln Gly Gly Thr Pro Arg Ala Val Pro Gly Arg Val Val
            660                 665                 670

Ala Leu Gly Gln Thr Val Gln Ala Ser Asp Ser Leu Thr Gly Ala Glu
        675                 680                 685

Glu Thr Leu Asn Gly Leu Ile Gln Phe Asp Ala Ala Ile Gln Pro Gly
    690                 695                 700

Asp Ala Gly Gly Pro Val Val Asn Gly Leu Gly Gln Val Val Gly Met
705                 710                 715                 720

Asn Thr Ala Ala Ser
                725

<210> SEQ ID NO 6
<211> LENGTH: 516
<212> TYPE: PRT
<213> ORGANISM: Varicella zoster

<400> SEQUENCE: 6

Ser Val Leu Arg Tyr Asp Asp Phe His Ile Asp Glu Asp Lys Leu Asp
1               5                   10                  15

Thr Asn Ser Val Tyr Glu Pro Tyr Tyr His Ser Asp His Ala Glu Ser
            20                  25                  30

Ser Trp Val Asn Arg Gly Glu Ser Ser Arg Lys Ala Tyr Asp His Asn
        35                  40                  45

Ser Pro Tyr Ile Trp Pro Arg Asn Asp Tyr Asp Gly Phe Leu Glu Asn
    50                  55                  60

Ala His Glu His His Gly Val Tyr Asn Gln Gly Arg Gly Ile Asp Ser
65                  70                  75                  80
```

```
Gly Glu Arg Leu Met Gln Pro Thr Gln Met Ser Ala Gln Glu Asp Leu
                85                  90                  95

Gly Asp Asp Thr Gly Ile His Val Ile Pro Thr Leu Asn Gly Asp Asp
            100                 105                 110

Arg His Lys Ile Val Asn Val Asn Gln Arg Gln Tyr Gly Asp Val Phe
            115                 120                 125

Lys Gly Asp Leu Asn Pro Lys Pro Gln Gly Gln Arg Leu Ile Glu Val
            130                 135                 140

Ser Val Glu Glu Asn His Pro Phe Thr Leu Arg Ala Pro Ile Gln Arg
145                 150                 155                 160

Ile Tyr Gly Val Arg Tyr Thr Glu Thr Trp Ser Phe Leu Pro Ser Leu
                165                 170                 175

Thr Cys Thr Gly Asp Ala Ala Pro Ala Ile Gln His Ile Cys Leu Lys
            180                 185                 190

His Thr Thr Cys Phe Gln Asp Val Val Asp Val Asp Cys Ala Glu
            195                 200                 205

Asn Thr Lys Glu Asp Gln Leu Ala Glu Ile Ser Tyr Arg Phe Gln Gly
            210                 215                 220

Lys Lys Glu Ala Asp Gln Pro Trp Ile Val Val Asn Thr Ser Thr Leu
225                 230                 235                 240

Phe Asp Glu Leu Glu Leu Asp Pro Pro Glu Ile Glu Pro Gly Val Leu
                245                 250                 255

Lys Val Leu Arg Thr Glu Lys Gln Tyr Leu Gly Val Tyr Ile Trp Asn
            260                 265                 270

Met Arg Gly Ser Asp Gly Thr Ser Thr Tyr Ala Thr Phe Leu Val Thr
            275                 280                 285

Trp Lys Gly Asp Glu Lys Thr Arg Asn Pro Thr Pro Ala Val Thr Pro
290                 295                 300

Gln Pro Arg Gly Ala Glu Phe His Met Trp Asn Tyr His Ser His Val
305                 310                 315                 320

Phe Ser Val Gly Asp Thr Phe Ser Leu Ala Met His Leu Gln Tyr Lys
                325                 330                 335

Ile His Glu Ala Pro Phe Asp Leu Leu Leu Glu Trp Leu Tyr Val Pro
            340                 345                 350

Ile Asp Pro Thr Cys Gln Pro Met Arg Leu Tyr Ser Thr Cys Leu Tyr
            355                 360                 365

His Pro Asn Ala Pro Gln Cys Leu Ser His Met Asn Ser Gly Cys Thr
            370                 375                 380

Phe Thr Ser Pro His Leu Ala Gln Arg Val Ala Ser Thr Val Tyr Gln
385                 390                 395                 400

Asn Cys Glu His Ala Asp Asn Tyr Thr Ala Tyr Cys Leu Gly Ile Ser
            405                 410                 415

His Met Glu Pro Ser Phe Gly Leu Ile Leu His Asp Gly Thr Thr
            420                 425                 430

Leu Lys Phe Val Asp Thr Pro Glu Ser Leu Ser Gly Leu Tyr Val Phe
            435                 440                 445

Val Val Tyr Phe Asn Gly His Val Glu Ala Val Ala Tyr Thr Val Val
            450                 455                 460

Ser Tyr Val Asp His Phe Val Asn Ala Ile Glu Arg Gly Phe Pro
465                 470                 475                 480

Pro Thr Ala Gly Gln Pro Pro Ala Thr Lys Pro Lys Glu Ile Thr
                485                 490                 495

Pro Val Asn Pro Gly Thr Ser Pro Leu Ile Arg Tyr Ala Ala Trp Thr
```

```
        500                 505                 510

Gly Gly Leu Ala
        515

<210> SEQ ID NO 7
<211> LENGTH: 514
<212> TYPE: PRT
<213> ORGANISM: respiratory syncytial virus

<400> SEQUENCE: 7

Met Glu Leu Leu Ile Leu Lys Thr Asn Ala Ile Thr Ala Ile Leu Ala
1               5                   10                  15

Ala Val Thr Leu Cys Phe Ala Ser Ser Gln Asn Ile Thr Glu Glu Phe
            20                  25                  30

Tyr Gln Ser Thr Cys Ser Ala Val Ser Lys Gly Tyr Leu Ser Ala Leu
        35                  40                  45

Arg Thr Gly Trp Tyr Thr Ser Val Ile Thr Ile Glu Leu Ser Asn Ile
    50                  55                  60

Lys Glu Asn Lys Cys Asn Gly Thr Asp Ala Lys Val Lys Leu Ile Lys
65                  70                  75                  80

Gln Glu Leu Asp Lys Tyr Lys Ser Ala Val Thr Glu Leu Gln Leu Leu
                85                  90                  95

Met Gln Ser Thr Pro Ala Thr Asn Asn Lys Phe Leu Gly Phe Leu Gln
            100                 105                 110

Gly Val Gly Ser Ala Ile Ala Ser Gly Ile Ala Val Ser Lys Val Leu
        115                 120                 125

His Leu Glu Gly Glu Val Asn Lys Ile Lys Ser Ala Leu Leu Ser Thr
    130                 135                 140

Asn Lys Ala Val Val Ser Leu Ser Asn Gly Val Ser Val Leu Thr Ser
145                 150                 155                 160

Lys Val Leu Asp Leu Lys Asn Tyr Ile Asp Lys Gln Leu Leu Pro Ile
                165                 170                 175

Val Asn Lys Gln Ser Cys Ser Ile Ser Asn Ile Glu Thr Val Ile Glu
            180                 185                 190

Phe Gln Gln Lys Asn Asn Arg Leu Leu Glu Ile Thr Arg Glu Phe Ser
        195                 200                 205

Val Asn Ala Gly Val Thr Thr Pro Val Ser Thr Tyr Met Leu Thr Asn
    210                 215                 220

Ser Glu Leu Leu Ser Leu Ile Asn Asp Met Pro Ile Thr Asn Asp Gln
225                 230                 235                 240

Lys Lys Leu Met Ser Asn Asn Val Gln Ile Val Arg Gln Gln Ser Tyr
                245                 250                 255

Ser Ile Met Ser Ile Ile Lys Glu Glu Val Leu Ala Tyr Val Val Gln
            260                 265                 270

Leu Pro Leu Tyr Gly Val Ile Asp Thr Pro Cys Trp Lys Leu His Thr
        275                 280                 285

Ser Pro Leu Cys Thr Thr Asn Thr Lys Glu Gly Ser Asn Ile Cys Leu
    290                 295                 300

Thr Arg Thr Asp Arg Gly Trp Tyr Cys Asp Asn Ala Gly Ser Val Ser
305                 310                 315                 320

Phe Phe Pro Leu Ala Glu Thr Cys Lys Val Gln Ser Asn Arg Val Phe
                325                 330                 335

Cys Asp Thr Met Asn Ser Leu Thr Leu Pro Ser Glu Val Asn Leu Cys
            340                 345                 350
```

Asn Ile Asp Ile Phe Asn Pro Lys Tyr Asp Cys Lys Ile Met Thr Ser
            355                 360                 365

Lys Thr Asp Val Ser Ser Val Ile Thr Ser Leu Gly Ala Ile Val
    370                 375                 380

Ser Cys Tyr Gly Lys Thr Lys Cys Thr Ala Ser Asn Lys Asn Arg Gly
385                 390                 395                 400

Ile Ile Lys Thr Phe Ser Asn Gly Cys Asp Tyr Val Ser Asn Lys Gly
                405                 410                 415

Val Asp Thr Val Ser Val Gly Asn Thr Leu Tyr Tyr Val Asn Lys Gln
            420                 425                 430

Glu Gly Lys Ser Leu Tyr Val Lys Gly Glu Pro Ile Ile Asn Phe Tyr
        435                 440                 445

Asp Pro Leu Val Phe Pro Ser Asp Glu Phe Asp Ala Ser Ile Ser Gln
    450                 455                 460

Val Asn Glu Lys Ile Asn Gly Thr Leu Ala Phe Ile Arg Lys Ser Asp
465                 470                 475                 480

Glu Lys Leu His Asn Val Glu Asp Lys Ile Glu Ile Leu Ser Lys
                485                 490                 495

Ile Tyr His Ile Glu Asn Glu Ile Ala Arg Ile Lys Lys Leu Ile Gly
            500                 505                 510

Glu Ala

<210> SEQ ID NO 8
<211> LENGTH: 488
<212> TYPE: PRT
<213> ORGANISM: Human immunodeficiency virus

<400> SEQUENCE: 8

Asn Thr Glu Asp Leu Trp Val Thr Val Tyr Tyr Gly Val Pro Val Trp
1               5                   10                  15

Arg Asp Ala Lys Thr Thr Leu Phe Cys Ala Ser Asp Ala Lys Ala Tyr
            20                  25                  30

Glu Thr Glu Val His Asn Val Trp Ala Thr His Ala Cys Val Pro Thr
        35                  40                  45

Asp Pro Asn Pro Gln Glu Ile Val Leu Gly Asn Val Thr Glu Asn Phe
    50                  55                  60

Asn Met Trp Lys Asn Asp Met Ala Asp Gln Met His Glu Asp Val Ile
65                  70                  75                  80

Ser Leu Trp Asp Gln Ser Leu Lys Pro Cys Val Lys Leu Thr Pro Leu
                85                  90                  95

Cys Val Thr Leu Asn Cys Thr Asp Thr Asn Val Thr Gly Asn Arg Thr
            100                 105                 110

Val Thr Gly Asn Ser Thr Asn Asn Thr Asn Gly Thr Gly Ile Tyr Asn
        115                 120                 125

Ile Glu Glu Met Lys Asn Cys Ser Phe Asn Ala Thr Thr Glu Leu Arg
    130                 135                 140

Asp Lys Lys His Lys Glu Tyr Ala Leu Phe Tyr Arg Leu Asp Ile Val
145                 150                 155                 160

Pro Leu Asn Glu Asn Ser Asp Asn Phe Thr Tyr Arg Leu Ile Asn Cys
                165                 170                 175

Asn Thr Ser Thr Ile Thr Gln Ala Cys Pro Lys Val Ser Phe Asp Pro
            180                 185                 190

Ile Pro Ile His Tyr Cys Ala Pro Ala Gly Tyr Ala Ile Leu Lys Cys
        195                 200                 205

-continued

Asn Asn Lys Thr Phe Asn Gly Thr Gly Pro Cys Tyr Asn Val Ser Thr
210                 215                 220

Val Gln Cys Thr His Gly Ile Lys Pro Val Val Ser Thr Gln Leu Leu
225                 230                 235                 240

Leu Asn Gly Ser Leu Ala Glu Glu Gly Ile Ile Ile Arg Ser Glu Asn
            245                 250                 255

Leu Thr Glu Asn Thr Lys Thr Ile Ile Val His Leu Asn Glu Ser Val
        260                 265                 270

Glu Ile Asn Cys Thr Arg Pro Asn Asn Thr Arg Lys Ser Val Arg
    275                 280                 285

Ile Gly Pro Gly Gln Ala Phe Tyr Ala Thr Asn Asp Val Ile Gly Asn
290                 295                 300

Ile Arg Gln Ala His Cys Asn Ile Ser Thr Asp Arg Trp Asn Lys Thr
305                 310                 315                 320

Leu Gln Gln Val Met Lys Lys Leu Gly Glu His Phe Pro Asn Lys Thr
            325                 330                 335

Ile Gln Phe Lys Pro His Ala Gly Gly Asp Leu Glu Ile Thr Met His
        340                 345                 350

Ser Phe Asn Cys Arg Gly Glu Phe Phe Tyr Cys Asn Thr Ser Asn Leu
    355                 360                 365

Phe Asn Ser Thr Tyr His Ser Asn Asn Gly Thr Tyr Lys Tyr Asn Gly
370                 375                 380

Asn Ser Ser Ser Pro Ile Thr Leu Gln Cys Lys Ile Lys Gln Ile Val
385                 390                 395                 400

Arg Met Trp Gln Gly Val Gly Gln Ala Thr Tyr Ala Pro Pro Ile Ala
            405                 410                 415

Gly Asn Ile Thr Cys Arg Ser Asn Ile Thr Gly Ile Leu Leu Thr Arg
        420                 425                 430

Asp Gly Gly Phe Asn Thr Thr Asn Asn Thr Glu Thr Phe Arg Pro Gly
    435                 440                 445

Gly Gly Asp Met Arg Asp Asn Trp Arg Ser Glu Leu Tyr Lys Tyr Lys
450                 455                 460

Val Val Glu Ile Lys Pro Leu Gly Ile Ala Pro Thr Lys Ala Lys Arg
465                 470                 475                 480

Arg Val Val Gln Arg Glu Lys Arg
            485

<210> SEQ ID NO 9
<211> LENGTH: 469
<212> TYPE: PRT
<213> ORGANISM: Human immunodeficiency virus

<400> SEQUENCE: 9

Ser Trp Val Thr Val Tyr Tyr Gly Val Pro Val Trp Lys Glu Ala Lys
1               5                   10                  15

Thr Thr Leu Phe Cys Ala Ser Asp Ala Lys Ala Tyr Glu Lys Glu Val
            20                  25                  30

His Asn Val Trp Ala Thr His Ala Cys Val Pro Thr Asp Pro Asn Pro
        35                  40                  45

Gln Glu Met Val Leu Ala Asn Val Thr Glu Asn Phe Asn Met Trp Lys
    50                  55                  60

Asn Asp Met Val Glu Gln Met His Glu Asp Ile Ile Ser Leu Trp Asp
65                  70                  75                  80

Glu Ser Leu Lys Pro Cys Val Lys Leu Thr Pro Leu Cys Val Thr Leu
                85                  90                  95

Asn Cys Thr Asn Val Lys Gly Asn Glu Ser Asp Thr Ser Glu Val Met
            100                 105                 110

Lys Asn Cys Ser Phe Lys Ala Thr Thr Glu Leu Lys Asp Lys Lys His
            115                 120                 125

Lys Val His Ala Leu Phe Tyr Lys Leu Asp Val Val Pro Leu Asn Gly
130                 135                 140

Asn Ser Ser Ser Ser Gly Glu Tyr Arg Leu Ile Asn Cys Asn Thr Ser
145                 150                 155                 160

Ala Ile Thr Gln Ala Cys Pro Lys Val Ser Phe Asp Pro Ile Pro Leu
            165                 170                 175

His Tyr Cys Ala Pro Ala Gly Phe Ala Ile Leu Lys Cys Asn Asn Lys
            180                 185                 190

Thr Phe Asn Gly Thr Gly Pro Cys Arg Asn Val Ser Thr Val Gln Cys
            195                 200                 205

Thr His Gly Ile Lys Pro Val Val Ser Thr Gln Leu Leu Leu Asn Gly
            210                 215                 220

Ser Leu Ala Glu Glu Ile Ile Ile Arg Ser Glu Asn Leu Thr Asn
225                 230                 235                 240

Asn Ala Lys Thr Ile Ile Val His Leu Asn Glu Ser Val Asn Ile Val
            245                 250                 255

Cys Thr Arg Pro Asn Asn Asn Thr Arg Lys Ser Ile Arg Ile Gly Pro
            260                 265                 270

Gly Gln Thr Phe Tyr Ala Thr Gly Asp Ile Ile Gly Asn Ile Arg Gln
            275                 280                 285

Ala His Cys Asn Ile Asn Glu Ser Lys Trp Asn Asn Thr Leu Gln Lys
            290                 295                 300

Val Gly Glu Glu Leu Ala Lys His Phe Pro Ser Lys Thr Ile Lys Phe
305                 310                 315                 320

Glu Pro Ser Ser Gly Gly Asp Leu Glu Ile Thr Thr His Ser Phe Asn
            325                 330                 335

Cys Arg Gly Glu Phe Phe Tyr Cys Asn Thr Ser Asp Leu Phe Asn Gly
            340                 345                 350

Thr Tyr Arg Asn Gly Thr Tyr Asn His Thr Gly Arg Ser Ser Asn Gly
            355                 360                 365

Thr Ile Thr Leu Gln Cys Lys Ile Lys Gln Ile Ile Asn Met Trp Gln
            370                 375                 380

Glu Val Gly Arg Ala Ile Tyr Ala Pro Pro Ile Glu Gly Glu Ile Thr
385                 390                 395                 400

Cys Asn Ser Asn Ile Thr Gly Leu Leu Leu Leu Arg Asp Gly Gly Gln
            405                 410                 415

Ser Asn Glu Thr Asn Asp Thr Glu Thr Phe Arg Pro Gly Gly Gly Asp
            420                 425                 430

Met Arg Asp Asn Trp Arg Ser Glu Leu Tyr Lys Tyr Lys Val Val Glu
            435                 440                 445

Ile Lys Pro Leu Gly Val Ala Pro Thr Glu Ala Lys Arg Arg Val Val
            450                 455                 460

Glu Arg Glu Lys Arg
465